US011829096B2

(12) United States Patent
Ozaki et al.

(10) Patent No.: US 11,829,096 B2
(45) Date of Patent: Nov. 28, 2023

(54) CARTRIDGE, ATTACHMENT AND MOUNTING KIT

(71) Applicant: CANON KABUSHIKI KAISHA, Tokyo (JP)

(72) Inventors: Goshi Ozaki, Kanagawa (JP); Shigemi Kamoshida, Kanagawa (JP); Isao Koishi, Kanagawa (JP); Yukio Kubo, Tokyo (JP); Noriyuki Komatsu, Shizuoka (JP); Tetsuo Uesugi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/527,309

(22) Filed: Nov. 16, 2021

(65) Prior Publication Data

US 2022/0075312 A1 Mar. 10, 2022

Related U.S. Application Data

(63) Continuation of application No. PCT/JP2020/023320, filed on Jun. 9, 2020.

(30) Foreign Application Priority Data

Jun. 12, 2019 (JP) ................................. 2019-109672
Sep. 30, 2019 (JP) ................................. 2019-180284

(51) Int. Cl.
*G03G 15/00* (2006.01)
*G03G 21/16* (2006.01)
(Continued)

(52) U.S. Cl.
CPC ........... *G03G 21/1647* (2013.01); *F16D 3/04* (2013.01); *G03G 15/757* (2013.01);
(Continued)

(58) Field of Classification Search
CPC ............. G03G 15/757; G03G 21/1647; G03G 21/1671; G03G 21/186; G03G 21/1864;
(Continued)

(56) References Cited

U.S. PATENT DOCUMENTS 6,671,477 B2  12/2003  Komatsu et al.
7,003,247 B2   2/2006  Koishi et al.
(Continued)

FOREIGN PATENT DOCUMENTS

CL    2016-00526 A    2/2017
CL    2017-02160 A    4/2018
(Continued)

OTHER PUBLICATIONS

English translation of Japanese Patent Application Pub. No. 2019-020542.
(Continued)

*Primary Examiner* — Sophia S Chen
(74) *Attorney, Agent, or Firm* — Venable LLP

(57) ABSTRACT

The cartridge is detachably mountable to a main assembly of an image forming apparatus that includes a drive output member configured to output a driving force, and a main assembly side pushing member configured to incline the drive output member by pushing the drive output member. The cartridge includes a photosensitive drum and a cartridge side pushing member. The cartridge side pushing member is configured such that an inclination angle of the drive output member is changed by pushing the main assembly side pushing member.

70 Claims, 113 Drawing Sheets

(51) Int. Cl.
*G03G 21/18* (2006.01)
*F16D 3/04* (2006.01)

(52) U.S. Cl.
CPC ....... *G03G 21/1671* (2013.01); *G03G 21/186* (2013.01); *G03G 21/1864* (2013.01); *G03G 2221/1654* (2013.01); *G03G 2221/1657* (2013.01)

(58) Field of Classification Search
CPC .... G03G 2221/1654; G03G 2221/1657; F16D 3/00; F16D 3/04; F16D 1/10; F16D 1/112
See application file for complete search history.

(56) References Cited

U.S. PATENT DOCUMENTS

| | | |
|---|---|---|
| 7,024,131 B2 | 4/2006 | Komatsu et al. |
| 7,072,601 B2 | 7/2006 | Kakitani |
| 7,110,703 B2 | 9/2006 | Uratani et al. |
| 7,139,502 B2 | 11/2006 | Koishi et al. |
| 7,156,797 B2 | 1/2007 | Komatsu et al. |
| 7,158,749 B2 | 1/2007 | Ueno et al. |
| 7,184,690 B2 | 2/2007 | Ueno et al. |
| 7,266,326 B2 | 9/2007 | Karakama et al. |
| 7,283,765 B2 | 10/2007 | Uratani et al. |
| 7,315,710 B2 | 1/2008 | Ueno et al. |
| 7,457,566 B2 | 11/2008 | Koishi et al. |
| 7,813,671 B2 | 10/2010 | Nittani et al. |
| 7,856,192 B2 | 12/2010 | Koishi et al. |
| 7,890,012 B2 | 2/2011 | Koishi et al. |
| 8,139,979 B2 | 3/2012 | Koishi et al. |
| 8,208,830 B2 | 6/2012 | Uratani et al. |
| 8,526,841 B2 | 9/2013 | Koishi et al. |
| 8,565,639 B2 | 10/2013 | Nittani et al. |
| 8,571,445 B2 | 10/2013 | Komatsu et al. |
| 8,583,001 B2 | 11/2013 | Kubo et al. |
| 8,781,355 B2 | 7/2014 | Koishi |
| 8,787,794 B2 | 7/2014 | Miyazaki et al. |
| 8,862,015 B2 | 10/2014 | Koishi et al. |
| 8,942,592 B2 | 1/2015 | Uratani et al. |
| 9,063,464 B2 | 6/2015 | Furutani et al. |
| 9,146,500 B2 | 9/2015 | Uesugi et al. |
| 9,176,467 B2 | 11/2015 | Gu et al. |
| 9,207,581 B2 | 12/2015 | Wada et al. |
| 9,302,801 B2 | 4/2016 | Matsumura et al. |
| 9,304,440 B2 | 4/2016 | Koshida et al. |
| 9,304,483 B2 | 4/2016 | Komatsu et al. |
| 9,310,717 B2 | 4/2016 | Matsunaga et al. |
| 9,354,553 B2 | 5/2016 | Yoshida et al. |
| 9,395,679 B2 | 7/2016 | Kawakami et al. |
| 9,417,604 B2 | 8/2016 | Matsumaru et al. |
| 9,423,767 B2 | 8/2016 | Fujino et al. |
| 9,429,906 B2 | 8/2016 | Yoshimura et al. |
| 9,442,457 B2 | 9/2016 | Maeda et al. |
| 9,471,031 B2 | 10/2016 | Kusano et al. |
| 9,483,016 B2 | 11/2016 | Kashiide et al. |
| 9,494,890 B2 | 11/2016 | Komatsu et al. |
| 9,501,031 B2 | 11/2016 | Hayashi et al. |
| 9,529,304 B2 | 12/2016 | Uesugi et al. |
| 9,665,040 B2 | 5/2017 | Matsuzaki et al. |
| 9,772,598 B2 | 9/2017 | Komatsu et al. |
| 9,778,613 B2 | 10/2017 | Komatsu et al. |
| 9,791,825 B2 | 10/2017 | Kamoshida et al. |
| 9,823,619 B2 | 11/2017 | Kawakami et al. |
| 9,836,020 B2 | 12/2017 | Yoshimura et al. |
| 9,885,978 B2 | 2/2018 | Matsuzaki et al. |
| 10,168,664 B2 | 1/2019 | Yoshimura et al. |
| 10,175,609 B2 | 1/2019 | Matsuzaki et al. |
| 10,197,967 B2 | 2/2019 | Komatsu et al. |
| 10,203,652 B2 | 2/2019 | Kamoshida et al. |
| 10,353,339 B2 | 7/2019 | Koishi et al. |
| 10,386,751 B2 | 8/2019 | Hayashi et al. |
| 10,386,786 B2 | 8/2019 | Sato et al. |
| 10,401,788 B2 | 9/2019 | Koshimura et al. |
| 10,427,867 B2 | 10/2019 | Koishi et al. |
| 10,452,016 B2 | 10/2019 | Kamoshida et al. |
| 10,539,915 B2 | 1/2020 | Mori et al. |
| 10,551,790 B2 | 2/2020 | Komatsu et al. |
| 10,591,868 B2 | 3/2020 | Yoshimura et al. |
| 10,620,567 B2 | 4/2020 | Matsuzaki et al. |
| 10,635,045 B2 | 4/2020 | Kawakami et al. |
| 10,635,047 B2 | 4/2020 | Kamoshida et al. |
| 10,671,013 B2 | 6/2020 | Uesugi et al. |
| 10,671,015 B2 | 6/2020 | Kamoshida et al. |
| 10,795,311 B2 | 10/2020 | Kamoshida et al. |
| 10,824,106 B2 | 11/2020 | Mori et al. |
| 10,915,055 B2 | 2/2021 | Kamoshida et al. |
| 10,948,871 B2 | 3/2021 | Uesugi et al. |
| 10,948,872 B2 | 3/2021 | Ogawa et al. |
| 10,955,796 B2 | 3/2021 | Uesugi et al. |
| 10,969,730 B2 | 4/2021 | Sueshige et al. |
| 10,996,620 B2 | 5/2021 | Komatsu et al. |
| 11,016,438 B2 | 5/2021 | Kamoshida et al. |
| 11,048,207 B2 | 6/2021 | Kimura et al. |
| 11,061,364 B2 | 7/2021 | Uesugi et al. |
| 11,061,366 B2 | 7/2021 | Uesugi et al. |
| 11,061,367 B2 | 7/2021 | Uesugi et al. |
| 11,061,368 B2 | 7/2021 | Uesugi et al. |
| 11,067,942 B2 | 7/2021 | Uesugi et al. |
| 11,067,947 B2 | 7/2021 | Uesugi et al. |
| 11,067,948 B2 | 7/2021 | Uesugi et al. |
| 11,073,790 B2 | 7/2021 | Uesugi et al. |
| 11,073,791 B2 | 7/2021 | Uesugi et al. |
| 11,099,518 B2 | 8/2021 | Komatsu et al. |
| 11,112,753 B2 | 9/2021 | Kawakami et al. |
| 11,131,960 B2 | 9/2021 | Sato et al. |
| 11,150,591 B2 | 10/2021 | Mori et al. |
| 11,156,954 B2 | 10/2021 | Yoshimura et al. |
| 11,163,259 B2 | 11/2021 | Kawakami et al. |
| 11,199,807 B2 | 12/2021 | Kamoshida et al. |
| 2012/0275824 A1 | 11/2012 | Gu et al. |
| 2013/0308978 A1 | 11/2013 | Nittani et al. |
| 2014/0126930 A1 | 5/2014 | Kashiide et al. |
| 2015/0177683 A1 | 6/2015 | Gu et al. |
| 2016/0091815 A1 | 3/2016 | Morgan |
| 2016/0246250 A1 | 8/2016 | Kamoshida et al. |
| 2017/0329279 A1 | 11/2017 | Hirayama et al. |
| 2017/0351214 A1 | 12/2017 | Uesugi et al. |
| 2018/0341215 A1* | 11/2018 | Munetsugu ........ G03G 21/1864 |
| 2019/0179257 A1* | 6/2019 | Murakami ........... G03G 21/186 |
| 2020/0033792 A1 | 1/2020 | Uesugi et al. |
| 2020/0033795 A1 | 1/2020 | Uesugi et al. |
| 2020/0033798 A1 | 1/2020 | Uesugi et al. |
| 2020/0033799 A1 | 1/2020 | Uesugi et al. |
| 2020/0073325 A1 | 3/2020 | Zeng et al. |
| 2020/0142353 A1 | 5/2020 | Sato et al. |
| 2020/0249623 A1 | 8/2020 | Sato et al. |
| 2020/0301352 A1 | 9/2020 | Matsumaru et al. |
| 2021/0088958 A1 | 3/2021 | Kamoshida et al. |
| 2021/0109479 A1 | 4/2021 | Kubo et al. |
| 2021/0181672 A1 | 6/2021 | Ogawa et al. |
| 2021/0216036 A1 | 7/2021 | Komatsu et al. |
| 2021/0263467 A1 | 8/2021 | Sato et al. |
| 2021/0271203 A1 | 9/2021 | Kimura et al. |
| 2021/0286312 A1 | 9/2021 | Uesugi et al. |
| 2021/0341870 A1 | 11/2021 | Mori et al. |
| 2021/0341873 A1 | 11/2021 | Komatsu et al. |
| 2021/0364983 A1 | 11/2021 | Kawakami et al. |
| 2021/0389720 A1 | 12/2021 | Kawakami et al. |
| 2021/0405583 A1 | 12/2021 | Yoshimura et al. |
| 2022/0035307 A1 | 2/2022 | Munetsugu et al. |
| 2022/0043389 A1 | 2/2022 | Kamoshida et al. |
| 2022/0066385 A1 | 3/2022 | Uesugi et al. |

FOREIGN PATENT DOCUMENTS

| | | |
|---|---|---|
| CL | 2017-02162 A | 4/2018 |
| CN | 109212940 A | 1/2019 |
| EP | 2 362 274 A | 8/2011 |
| EP | 3 470 931 A | 4/2019 |
| EP | 3 726 298 A | 10/2020 |
| JP | 2007-206596 A | 8/2007 |
| JP | 2009-109877 A | 5/2009 |
| JP | 2013-122537 A | 6/2013 |

(56) References Cited

FOREIGN PATENT DOCUMENTS

| JP | 2019-020542 A | 2/2016 |
|---|---|---|
| JP | 2016-040625 A | 3/2016 |
| JP | 2018-116305 A | 7/2018 |

OTHER PUBLICATIONS

English translation of Japanese Patent Application Pub. No. 2018-116305.
English translation of Japanese Patent Application Pub. No. 2019-109877.
English translation of Japanese Patent Application Pub. No. 2013-122537.
English translation of Japanese Patent Application Pub. No. 2007-206596.
International Search Report and Written Opinion for International Patent Application No. PCT/JP2020/023320.
Copending U.S. Appl. No. 17/574,690, filed Jan. 13, 2022.
Jun. 30, 2022 Office Action in Taiwanese Patent Application No. 109119870.
Jun. 8, 2022 Office Action in Indian Patent Application No. 202147056084.
May 2, 2023 Office Action in Chilean Patent Application No. 2021-03302.
May 25, 2023 Extended Search Report in European Patent Application No. 20 821 673.9.
Feb. 18, 2023 Office Action in Australian Patent Application No. 2020294030.
Jun. 23, 2023 Office Action in Indonesian Patent Application No. P00202111870.

\* cited by examiner (a)

(b)

(a)

(b)

(a)

(b)

(a)

(b)

(a)

(b)

(a)

(b)

(a)

(b)

(c)

(d)

(e)

(f)

(a)

(b)

(a)

(b)

(a)

(b)

(a)

(b)

(a)

(b)

(a)

(b)

(a)

(b)

(c)

(d)

(e)

(a)

(b)

(a)

(b)

CARTRIDGE, ATTACHMENT AND MOUNTING KIT

FIELD OF THE INVENTION

The present invention relates to a cartridge, an attachment, a mounting kit, and an image forming apparatus.

The cartridge is mountable to and dismountable to the apparatus main assembly of the image forming apparatus (electrophotographic image forming apparatus).

The attachment can be mounted to the main assembly of the image forming apparatus separately from the cartridge.

In addition, the attachment and the cartridge are collectively called mounting kit.

The image forming apparatus is an image forming apparatus which forms an image on a recording material by using an electrophotographic image forming process. For example, an electrophotographic copying machine, an electrophotographic printer (LED printer, laser beam printer, and so on), a facsimile machine, a word processor, and the like are included.

BACKGROUND OF THE INVENTION

In the electrophotographic image forming apparatus (hereinafter, also simply referred to as "image forming apparatus"), the electrophotographic photosensitive member, which is generally a drum type as an image bearing member, that is, the photosensitive drum (electrophotographic photosensitive drum) is uniformly charged. Next, an electrostatic latent image (electrostatic image) is formed on the photosensitive drum by selectively exposing the charged photosensitive drum. Then, the electrostatic latent image formed on the photosensitive drum is developed into a toner image with toner as a developer. Then, the toner image formed on the photosensitive drum is transferred onto a recording material such as recording sheet or a plastic sheet, and heat or pressure is applied to the toner image transferred on the recording material to fix the toner image, thus performing the image recording operation.

Such an image forming apparatus generally requires toner replenishment and maintenance for various process means. In order to make easier these toner replenishment and maintenance operations, the photosensitive drum, the charging means, the developing means, the cleaning means, and so on are collectively provided in a frame into a cartridge, and the cartridge which can be mounted to and dismounted from the image forming apparatus main assembly has been put into practical use.

According to this cartridge system, portions of the deice which requires maintenance operation can be effected by the user himself/herself without relying on the service person in charge of after-sales service. Therefore, the operability of the apparatus can be remarkably improved, and an image forming apparatus having excellent usability can be provided. For this reason, this cartridge method is widely used with an image forming apparatus.

A process cartridge is an example of such a cartridge. The process cartridge is a device in which the electrophotographic photosensitive drum and the process means acting on the electrophotographic photosensitive drum are integrally formed into a cartridge and which is dismountably mounted to the main assembly of the image forming apparatus.

In the process cartridge described above, a structure is widely used in which a coupling member is provided at a free end of the photosensitive drum in order to transmit the driving force from the apparatus main assembly to the photosensitive drum. Japanese Laid-open Patent Application No. 2016-40625 proposes a structure in which a coupling member is structured to be able to advance and retract in the longitudinal direction, and a structure is proposed in which a push rod provided in a process cartridge is operated to trigger the advancement/retraction movement of the coupling member. Further, a structure has been proposed in which the advancement/retraction movement of the coupling member is effected by moving the tension cord fixed to the coupling member (Japanese Laid-open Patent Application No. 2016-40625).

SUMMARY OF THE INVENTION

Problem to be Solved

An object of the present invention is to further develop the above-mentioned prior art.

Means for Solving the Problem

A typical structure according to the present application is a cartridge detachably mountable to a main assembly of an image forming apparatus, the main assembly including a drive output member configured to output a driving force, a main assembly side pushing member configured to incline the drive output member by pushing the drive output member, the cartridge comprising:
  a photosensitive drum; and
  a cartridge side pushing member configured to change an inclination angle of the drive output member by pushing the main assembly side pushing member.

Another typical structure according to the present application is a cartridge comprising:
  a photosensitive drum provided in a front part of the cartridge; and
  a movable pushing member provided at one side of the cartridge in an axial direction of the photosensitive drum, in a front part of the cartridge,
  wherein the pushing member is configured to perform at least (a) a first operation of moving in an axial direction of the photosensitive drum toward an outside of the cartridge and (b) a second operation of moving in a direction different from the axial direction.

Another typical structure according to the present application is a cartridge comprising:
  a photosensitive drum provided in a front part of the cartridge;
  a first movable member provided adjacent to an end portion of the photosensitive drum so as to be movable in an axial direction of the photosensitive drum;
  a second movable member provided on the same side as the side provided with the first movable member in the axial direction of the photosensitive drum, the second movable member being configured to perform at least (a) a first operation of moving in an axial direction of the photosensitive drum toward an outside of the cartridge and (b) a second operation of moving in a direction different from the axial direction.

Another typical structure according to the present application is an attachment mountable to a main assembly of an image forming apparatus, the main assembly including a drive output member configured to output a driving force, a main assembly side pushing member configured to incline the drive output member by urging the drive output member, wherein a cartridge is detachably mountable to the main assembly, the attachment comprising:
- a contact portion configured to change an inclination angle of the drive output member by moving, for connecting the drive output member with the cartridge, the main assembly side pushing member in contact with the main assembly side pushing member.

Another typical structure according to the present application is a cartridge detachably mountable to a main assembly of an apparatus, the apparatus including an inclinable drive output member capable of outputting a driving force, the cartridge comprising:
- a photosensitive drum;
- an engagement member provided adjacent to an end portion of the photosensitive drum so as to be movable in an axial direction of the photosensitive drum, the engagement member being engageable with the drive output member; and
- a movable positioning member configured to determine a position of the cartridge inside the main assembly,
- wherein the engagement member is configured to be brought into contact with the drive output member by moving toward the drive output member, and
- wherein the cartridge is configured such that by movement of the positioning member in a state that the engagement member is in contact with the drive output member, (a) an inclination angle of the drive output member is changed, and (b) the cartridge is moved to a mounted position which is inside the main assembly.

Another typical structure is a cartridge comprising:
- a photosensitive drum provided in a front part of the cartridge;
- an engagement member provided adjacent to an end portion of the photosensitive drum so as to be movable in an axial direction of the photosensitive drum;
- an operation member configured to move the engagement member in the axial direction toward an outside of the cartridge by receiving an external force from an outside of the cartridge; and
- a positioning member provided at a position which is in a front part of the cartridge and which is on a side opposite from the engagement member in the axial direction of the photosensitive drum, the positioning member projecting toward a front side of the cartridge and movable toward a rear side thereof.

Another typical structure a cartridge comprising:
- a photosensitive drum provided in a front part of the cartridge;
- an engagement member provided adjacent to an end portion of the photosensitive drum so as to be movable in an axial direction of the photosensitive drum;
- a movable positioning member provided at a position which is in a front part of the cartridge and which is on the same side as the side provided with the engagement member in the axial direction of the photosensitive drum; and
- an operation member configured to move the positioning member away from an axis of the photosensitive drum by receiving an external force from an outside of the cartridge.

Another typical structure is a cartridge comprising:
- a photosensitive drum provided in a front part of the cartridge;
- a first movable member provided adjacent to an end portion of the photosensitive drum so as to be movable in an axial direction of the photosensitive drum;
- a second movable member provided outside the photosensitive drum at a position which is in the front part of the cartridge and which is on the same side as the side provided with the first movable member; and
- an operation member configured to move the second movable member toward the front side by receiving an external force from an outside of the cartridge.

Another typical structure is an attachment mountable to a main assembly of an image forming apparatus, the main assembly including an inclinable drive output member capable of outputting a driving force, wherein a cartridge is detachably mountable to the main assembly, the attachment comprising:
- a movable positioning member configured to determine the position of the cartridge inside the main assembly of the image forming apparatus,
- wherein the positioning member is configured such that by movement of the positioning member in a state that an engagement member provided on the cartridge is in contact with the drive output member, (a) an inclination angle of the drive output member is changed, and (b) the cartridge is moved to a mounted position which is inside the main assembly.

Another typical structure is a cartridge detachably mountable to a main assembly of an image forming apparatus, the main assembly including an inclinable drive output member capable of outputting a driving force, the cartridge comprising:
- a photosensitive drum;
- a pushing member provided outside the photosensitive drum and movable in an axial direction of the photosensitive drum, the pushing member being configured to change an inclination angle of the drive output member by pushing the drive output member; and
- an engagement member provided adjacent to an end portion of the photosensitive drum so as to be movable in an axial direction of the photosensitive drum, the engagement member being configured to be enabled to engage with the drive output member by moving toward the drive output member pushed by the pushing member.

Another typical structure is a cartridge comprising:
- a photosensitive drum provided in a front part of the cartridge;
- an engagement member provided adjacent to an end portion of the photosensitive drum so as to be movable in an axial direction of the photosensitive drum;
- a pushing member provided outside the photosensitive drum at a position which is in the front part of the cartridge and which is on the same side as the side provided with the engagement member; and
- an operation member configured to cause the engagement member to move in the axial direction toward an outside of the cartridge by receiving an external force from an outside of the cartridge.

Another typical structure is a cartridge detachably mountable to a main assembly of an image forming apparatus, the main assembly including an inclinable drive output member capable of outputting a driving force, the cartridge comprising:
- a photosensitive drum;
- a gear member configured to cause the drive output member to approach to the cartridge by rotation thereof in a state of being in engagement with a gear portion provided in the drive output member; and
- a contact portion provided outside the photosensitive drum and configured to change an inclination angle of the drive output member by contacting the drive output member caused to approach to the cartridge by the gear member.

Another typical structure is a cartridge comprising:
a photosensitive drum;
a developing roller;
a gear member provided on a first side of the cartridge in an axial direction of the photosensitive drum; and
an inclined portion provided on the first side of the cartridge outside the photosensitive drum,
wherein when a second side of the cartridge is a side opposite from the first side in the axial direction,
at least a part of teeth of the gear member is more away from the second side than the inclined portion in the axial direction of the photosensitive drum,
a distance measured from the axis of the photosensitive drum to the inclined portion in a direction perpendicular to the axis increases as a distance from the second side of the cartridge in the axial direction increases, and
wherein as viewed in a direction of the axis of the photosensitive drum, a center of the gear member is within the range of more than 60° and less than 120°, as measured from a line extending from a center of the photosensitive drum through the center of the developing roller, toward an upstream in a rotational direction of the photosensitive drum.

Another typical structure is an attachment for a main assembly of the image forming apparatus to which a cartridge is detachably mountable, the main assembly including a drive output member capable of outputting a driving force, the attachment comprising:
a gear member configured to cause the drive output member to approach to the cartridge to connect the drive output member with the cartridge by rotation thereof in a state of being in engagement with a gear portion of the drive output member.

Another typical structure is a cartridge comprising:
a photosensitive drum;
a gear member provided on a first side of the cartridge in an axial direction of the photosensitive drum; and
an inclined portion provided on the first side of the cartridge,
wherein when a second side of the cartridge is a side opposite from the first side in the axial direction,
at least a part of teeth of the gear member is more away from the second side than the inclined portion in the axial direction of the photosensitive drum,
a distance measured from the axis of the photosensitive drum to the inclined portion in a direction perpendicular to the axis increases as a distance from the second side of the cartridge in the axial direction increases, and
wherein the gear member is movable such that a distance from an axis of the photosensitive drum to the axis of the gear member is changed.

Another typical structure is a cartridge detachably mountable to a main assembly of an image forming apparatus, the main assembly including an inclinable drive output member capable of outputting a driving force, the cartridge comprising:
a photosensitive drum; and
a coupling member provided adjacent to an end portion of the photosensitive drum, capable of transmitting the driving force toward the photosensitive drum and movable in an axial direction of the photosensitive drum, the coupling member including (a) a driving force receiving portion capable of receiving the driving force from the drive output member and (b) an inclined portion movable together with the driving force receiving portion in the axial direction and rotatable together with the driving force receiving portion,
wherein the inclined portion is more remote from an axis of the photosensitive drum than the driving force receiving portion, and
the inclined portion is configured to contact the drive output member to reduce an inclination angle of the drive output member to enable engagement between the drive output member and the driving force receiving portion when the coupling member moves toward the drive output member.

Another typical structure is a cartridge detachably mountable to a main assembly of the image forming apparatus, the cartridge comprising:
a photosensitive drum having a first end portion and a second end portion opposite from the first end portion; and
a coupling member provided adjacent to a first end portion of the photosensitive drum, capable of transmitting a driving force to the photosensitive drum and movable in an axial direction of the photosensitive drum, the coupling member including a projected driving force receiving portion and an inclined portion capable of advancing and retracting together with the driving force receiving portion,
wherein the inclined portion is more away from the axis of photosensitive drum than the driving force receiving portion, and
wherein a distance measured from the axis of the photosensitive drum to the inclined portion in a direction perpendicular to the axis increases as a distance from the second end portion of the photosensitive drum in the axial direction increases.

Effect of the Invention

The conventional structure can be further developed.

EMBODIMENTS

Embodiment 1

Hereinafter, Embodiment 1 will be described in detail in conjunction with the accompanying drawings.

The direction of the rotation axis of the electrophotographic photosensitive drum is simply referred to as the longitudinal direction, unless otherwise specified.

Further, in the longitudinal direction, a side on which the electrophotographic photosensitive drum receives the driving force from the image forming apparatus main assembly is a driving side, and the opposite side thereto is a non-driving side.

Figure 1:
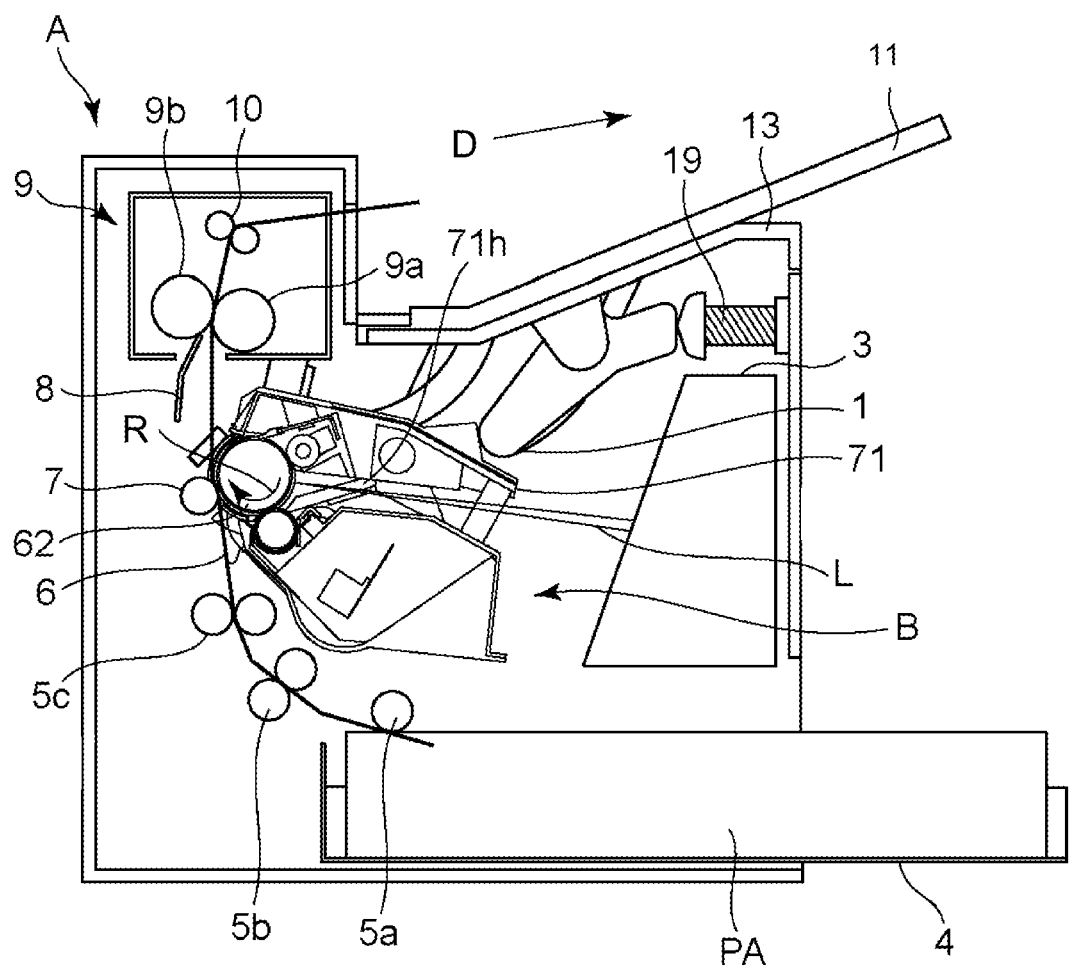
FIG. 1 is a sectional view of an image forming apparatus.

Referring to FIG. 1, parts (a) and (b) of FIG. 2, the overall structure and the image formation process will be described.

FIG. 1 is a sectional view of the apparatus main assembly (electrophotographic image forming apparatus main assembly, image forming apparatus main assembly) A of an electrophotographic image forming apparatus and a process cartridge (hereinafter, referred to as cartridge B). Part (a) of FIG. 2 is a sectional view of the cartridge B. Here, the apparatus main assembly A is a portion of the electrophotographic image forming apparatus excluding the cartridge B. The cartridge B is mountable to and dismountable from the apparatus main assembly A.

Figure 2:
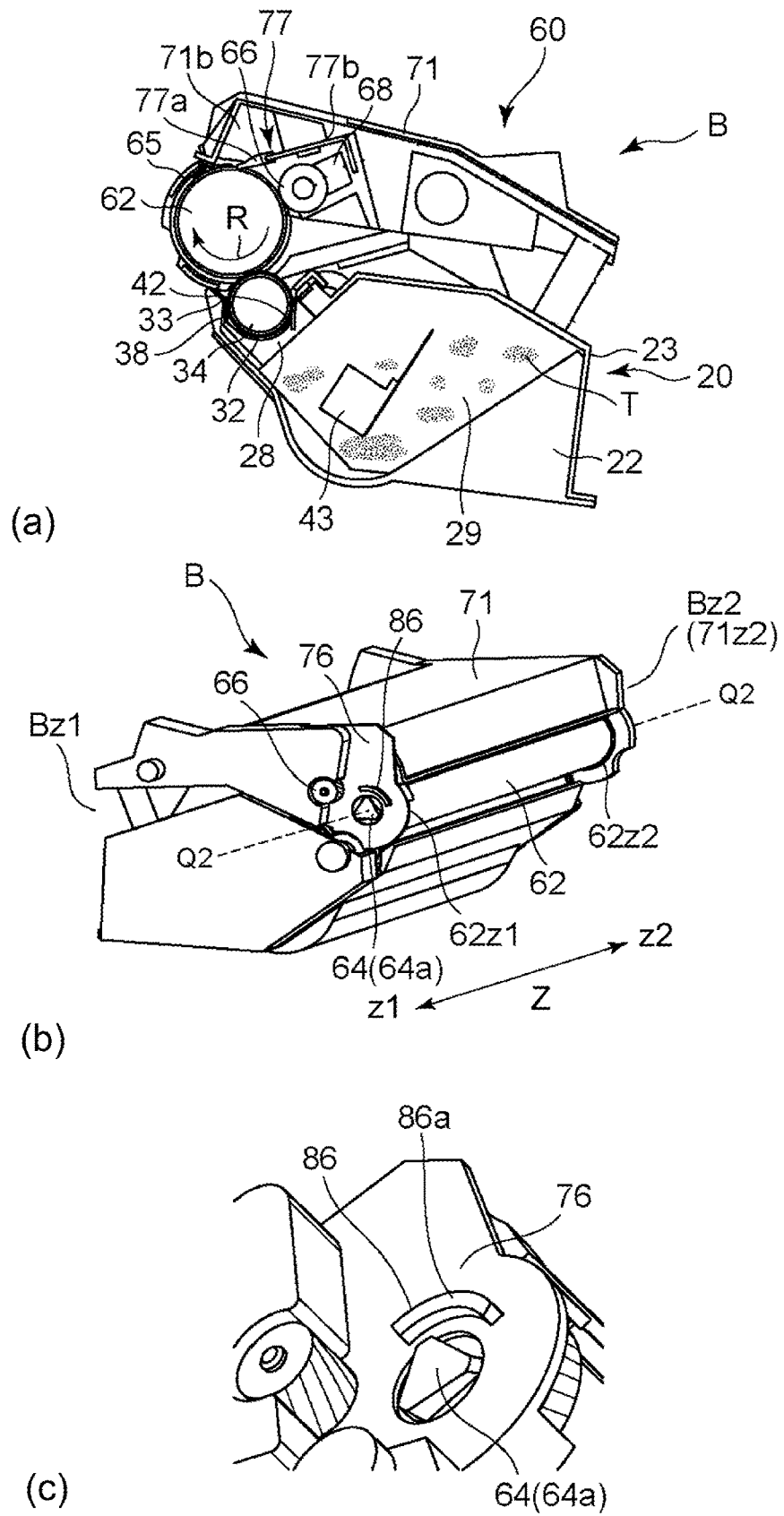
In FIG. 2, part (a) is a sectional view of a cartridge, part (b) is a perspective view of the cartridge, and part (c) is an enlarged view around a coupling member.

Part (b) of FIG. 2 is a perspective view of the cartridge. As shown in this Figure, the cartridge B comprises a photosensitive drum 62 and a coupling member 64 which receives a driving force for rotating the photosensitive drum 62 and can transmit the driving force toward the photosensitive drum 62. In an axial direction Z parallel to a rotation axis Q2 of the photosensitive drum 62, the downstream side in the arrow z1 direction on which the coupling member 64 is provided is the drive side (first side) Bz1 of the cartridge B. Further, the downstream side in the arrow z2 direction is the non-driving side (second side) Bz2 of the cartridge B, which is the opposite side to the driving side Bz1.

Unless otherwise specified, the side of the cartridge where the photosensitive drum is placed is regarded as the front of the cartridge. That is, the left side in part (a) of FIG. 2 is the front side of the cartridge, and the right side is the rear side.

Details of the structure of the cartridge B will be described hereinafter.

<General Arrangement of Electrophotographic Image Forming Apparatus>

The electrophotographic image forming apparatus (image forming apparatus) shown in FIG. 1 is a laser beam printer using an electrophotographic system in which the cartridge B is mountable to and mountable from the apparatus main assembly A. There is provided an exposure device 3 (laser scanner unit) for forming a latent image on the electrophotographic photosensitive drum 62 as an image bearing member of the cartridge B when the cartridge B is mounted to the apparatus main assembly A. Further, a sheet tray 4 containing a recording material (hereinafter, referred to as a sheet material PA) to be subjected to image forming operation is provided under the cartridge B. The electrophotographic photosensitive drum 62 is a photosensitive member (electrophotographic photosensitive member) used for forming an electrophotographic image thereon.

Further, the apparatus main assembly A includes a pickup roller 5a, a feeding roller pair 5b, a feed roller pair 5c, a transfer guide 6, a transfer roller 7, a feeding guide 8, and a fixing device 9, a discharging roller pair 10, a discharge tray 11, and the like which are arranged along the feed direction D of the sheet material PA. The fixing device 9 includes a heating roller 9a and a pressure roller 9b.

<Image Forming Process>

Next, the outline of the image formation process will be described. In response to a print start signal, the electrophotographic photosensitive drum (hereinafter, referred to as the photosensitive drum 62, or simply the drum 62) is rotationally driven in an arrow R direction at a predetermined peripheral speed (process speed).

The charging roller (charging member) 66 to which the bias voltage is applied contacts the outer peripheral surface of the drum 62 and uniformly charges the outer peripheral surface of the drum 62. The charging roller 66 is a rotatable member (roller) which can rotate and move in contact with the drum 62. The charging member is not limited to such a rotatable contact roller type, and a charging member (charger) fixed with a space from the drum 62, such as a corona charger, can be used.

The exposure device 3 outputs a laser beam L in accordance with the image information. The laser beam L passes through the laser opening 71h provided in the cleaning frame 71 of the cartridge B, and scans and exposes the outer peripheral surface of the drum 62. By this, an electrostatic latent image corresponding to the image information is formed on the outer peripheral surface of the drum 62.

On the other hand, as shown in part (a) of FIG. 2, in the developing unit 20 as a developing device, toner T in the toner chamber 29 is stirred and fed to the toner supply chamber 28, by the rotation of the feeding member (stirring member) 43.

The toner T is carried on a surface of the developing roller 32 by a magnetic force of a magnet roller 34 (fixed magnet). The developing roller 32 is a developer carrying member which carries the developer on the surface thereof in order to develop the latent image (electrostatic latent image) formed on the drum 62 with the developer (toner T). In this embodiment, a non-contact developing method is used to develop the latent image with a small gap provided between the developing roller 32 and the drum 62. It is also possible to employ a contact type developing method in which the latent image is developed with the developing roller 32 in contact with the drum 62.

By the developing blade 42, the toner T is triboelectrically charged, and the layer thickness thereof on the peripheral surface of the developing roller 32 as the developer carrying member is regulated.

The toner T is supplied to the drum 62 in accordance with the electrostatic latent image to develop the latent image. By this, the latent image is visualized into a toner image. The drum 62 is an image bearing member which carries the latent image or the image (toner image, developer image) formed of toner (developer) on the surface thereof.

Further, the drum 62 and the developing roller 32 are rotatable members (rotating members) which can rotate while carrying the developer (toner) on the surface thereof.

As shown in FIG. 1, in timed relation with the output timing of the laser beam L, the sheet material PA stored in a lower portion of the apparatus main assembly A is moved from the sheet tray 4 by the pickup roller 5a, the feeding roller pair 5b, and the feed roller pair 5c. Then, the sheet material PA is fed to a transfer position which is between the drum 62 and the transfer roller 7, by way of a transfer guide 6. At this transfer position, the toner image is sequentially transferred from the drum 62 onto the sheet material PA.

The sheet material PA onto which the toner image is transferred is separated from the drum 62 and fed into the fixing device 9 along a feeding guide 8. Then, the sheet material PA passes through the nip portion provided between the heating roller 9a and the pressure roller 9b constituting the fixing device 9. Pressure and heat fixing process is performed at this nip portion, by which the toner image is fixed on the sheet material PA. The sheet material PA which has been subjected to the toner image fixing process is fed to the discharge roller pair 10 and is discharged to the discharge tray 11.

On the other hand, as shown in part (a) of FIG. 2, the drum 62 after transfer is used again in the image forming process after the residual toner is removed from the outer peripheral surface by the cleaning blade 77. The toner removed from the drum 62 is stored in a waste toner chamber 71b of a cleaning unit 60. The cleaning unit 60 is a unit including a photosensitive drum 62.

In the above description, the charging roller 66, the developing roller 32, the transfer roller 7, and the cleaning blade 77 are the process means (process member, acting member) actable on the drum 62.

<Overall Structure of the Entire Cartridge>

Next, referring to FIG. 2, the overall structure of the cartridge B will be described. Part (a) of FIG. 2 is a cross-sectional view of the cartridge. Part (b) of FIG. 2 is a perspective view of the cartridge. Part (c) of FIG. 2 is an enlarged view of a periphery of the coupling member 64.

The cartridge B includes a cleaning unit (photosensitive member holding unit, drum holding unit, image carrying member holding unit, first unit) 60, and a developing unit (developer carrying member holding unit, second unit) 20.

The cartridge B of this embodiment is a process cartridge. The process cartridge comprises an electrophotographic photosensitive member and at least one of the process means actable on the photosensitive member which are integrated into a cartridge so that the process cartridge can be mounted to and dismounted from the main assembly (apparatus main assembly). Examples of process means include charging means, developing means, cleaning means and the like.

As shown in part (a) of FIG. 2, the cleaning unit 60 includes a drum 62, a charging roller 66, a cleaning member 77, and a cleaning frame 71 which supports them. The drum 62 is rotatably supported by the cleaning frame 71. The cleaning frame 77 is a part of the cartridge frame (casing), supports each member arranged in the cleaning unit, and forms a waste toner chamber 71b which will be described hereinafter.

In the cleaning unit 60, the charging roller 66 and the cleaning member 77 are arranged in contact with the outer peripheral surface of the drum 62, respectively. The cleaning member 77 includes a rubber blade 77a, which is a blade-shaped elastic member made of rubber as an elastic material, and includes a support member 77b which supports the rubber blade. The rubber blade 77a is in contact with the drum 62 counterdirectionally with respect to the rotational movement direction of the drum 62. That is, the rubber blade 77a is in contact with the drum 62 so that free end portion thereof faces the upstream side in the rotational movement direction of the drum 62. The waste toner removed from the surface of the drum 62 by the cleaning member 77 is stored in the waste toner chamber 71b formed by the cleaning frame 71 and the cleaning member 77.

Further, a receptor sheet 65 for preventing waste toner from leaking from the cleaning frame is provided at the edge of the cleaning frame 71 so as to contact with the drum 62.

The charging roller 66 is rotatably mounted to the cleaning unit 60 by way of a charging roller bearing (not shown) at opposite ends of the cleaning frame 71 in the longitudinal direction.

The longitudinal direction of the cleaning frame 71 (longitudinal direction of the cartridge B) is substantially parallel to the direction in which the rotation axis of the drum 62 extends (axis direction). Hereinafter, when a longitudinal direction or an axial direction is simply referred to, the axial direction of the drum 62 is intended, unless otherwise specified. The axial direction is the direction in which the axis or a line parallel to the axis extends.

The charging roller 66 is pressed against the drum 62 by pressing charging roller bearings 68 toward the drum 62 by an urging member (not shown). The charging roller 66 is driven by the rotation of the drum 62.

The developing unit 20 includes a developing roller 32, a developing container 23 which supports the developing roller 32, a developing blade 42, and so on. The developing roller 32 is rotatably mounted to the developing container 23 by bearing members (not shown) provided at the opposite ends. The developing container 23 and the bearing members mounted to the developing container are a part of the cartridge frame (casing), similarly to the cleaning frame 71 described above. One of the frame of the cleaning unit (cleaning frame 71, and so on) and the frame of the developing unit 20 (development container 23, and so on) may be referred to as a first frame (first casing), and the other may be referred to as a second frame (first).

Further, a magnet roller 34 is provided in the developing roller 32. In the developing unit 20, a developing blade 42 for regulating the toner layer on the developing roller 32 is provided. Spacing members 38 are mounted at opposite ends of the developing roller 32 (not shown), and when the spacing member 38 and the drum 62 contacting with each other, the developing roller 32 is held with a small gap from the drum 62. In addition, a blowout prevention sheet 33 for preventing toner from leaking from the developing unit 20 is provided at the edge of the bottom member 22 in contact with the developing roller 32. Furthermore, a feed member 43 is provided in the toner chamber 29 formed by the developing container 23 and the bottom member 22. The feed member 43 stirs the toner contained in the toner chamber 29 and transports the toner to the toner supply chamber 28.

<Tilting Mechanism for Drive Transmission Member>

Next, referring to FIGS. 3 to 6, the tilting mechanism for the drive transmission member 81 of the apparatus main body A will be described. The drive transmission member 81 is a drive output member which outputs a driving force. It engages with a coupling member (see FIG. 7) provided in the cartridge B by a mechanism which will be described hereinafter, and transmits a driving force to the cartridge. Although the details will be described hereinafter, the drive transmission member 81 is supported so as to be tiltable.

Figure 3:
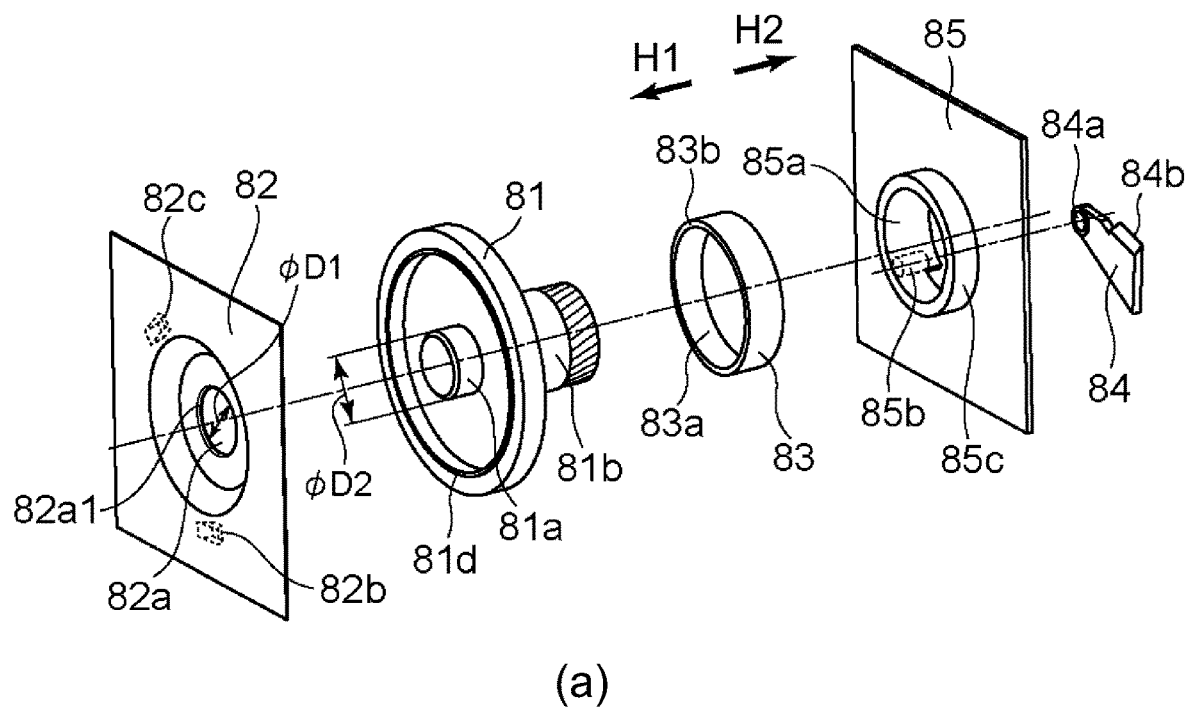
FIG. 3 is a perspective view of a drive transmission member and related members.
Figure 3:
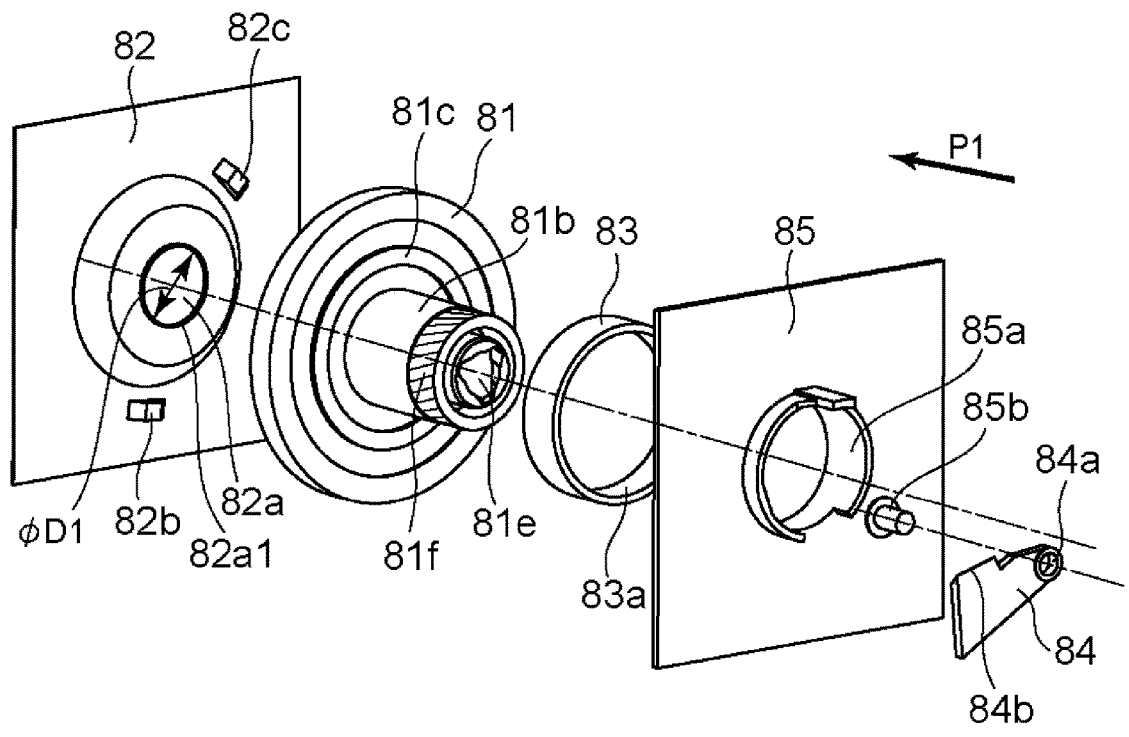
Figure 4:
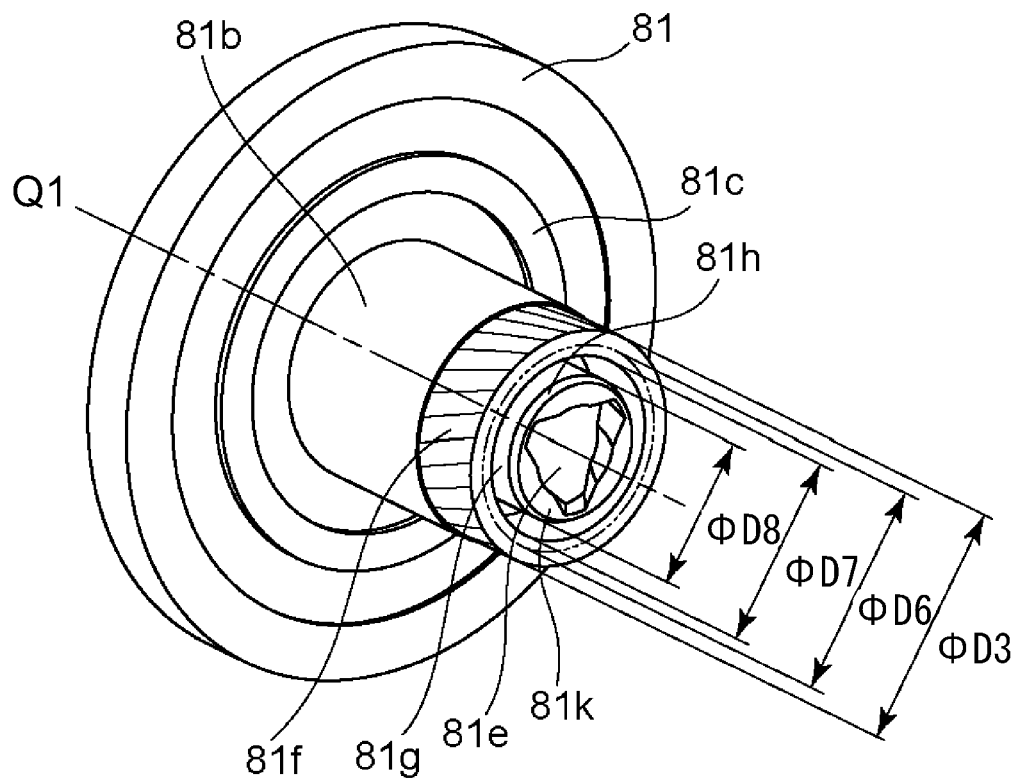
FIG. 4 is a perspective view of the drive transmission member.
Figure 5:
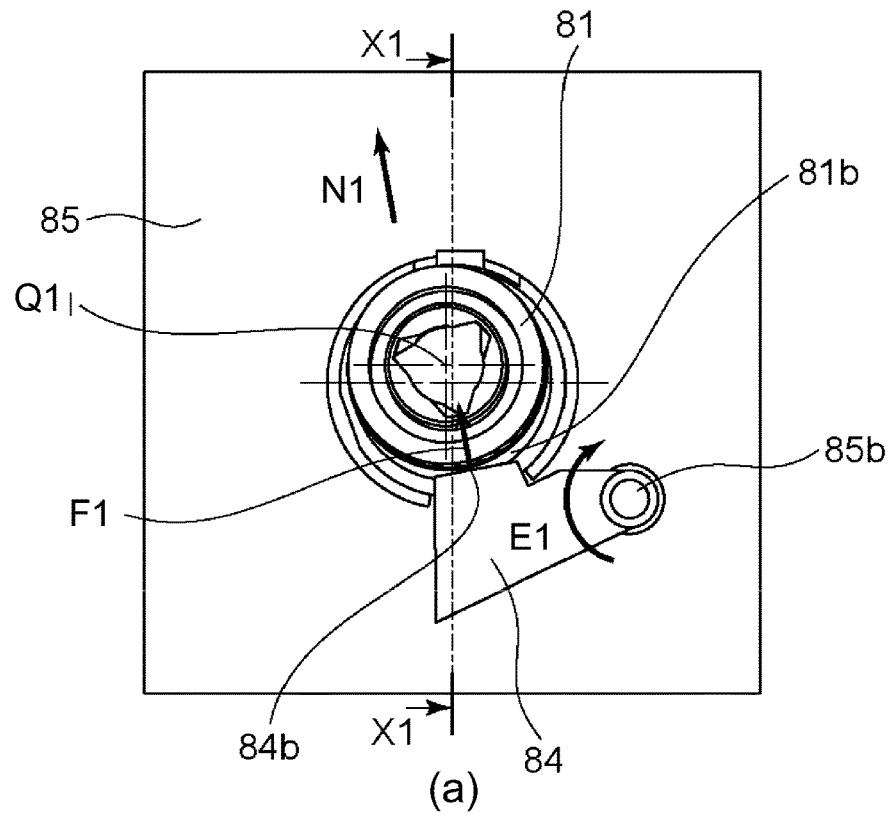
FIG. 5 is an illustration of the drive transmission member.
Figure 5:
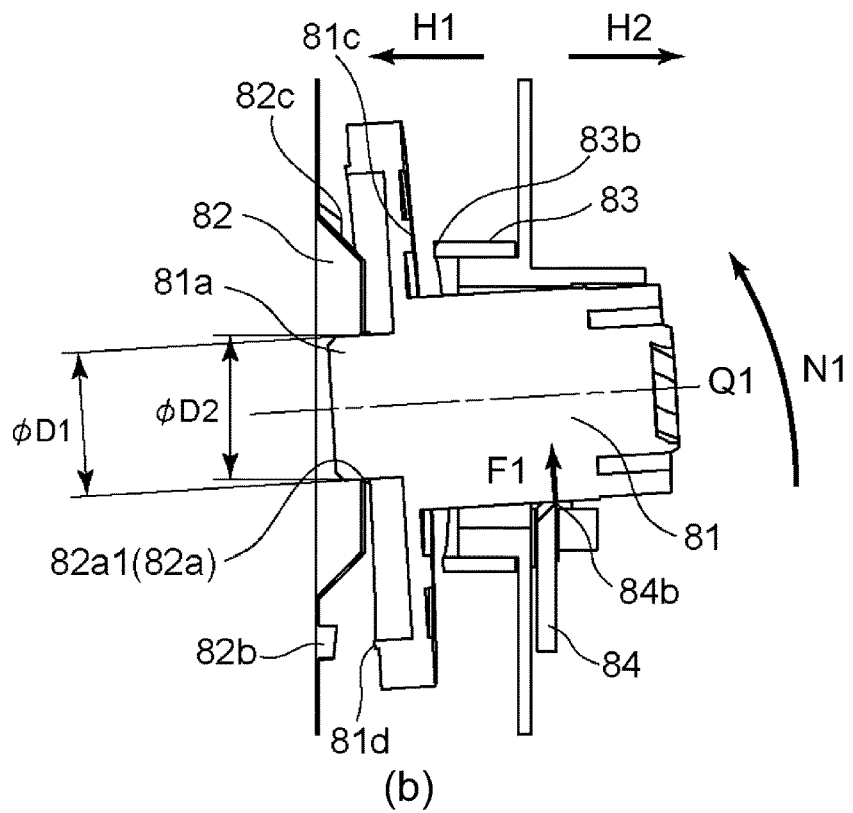
Figure 6:
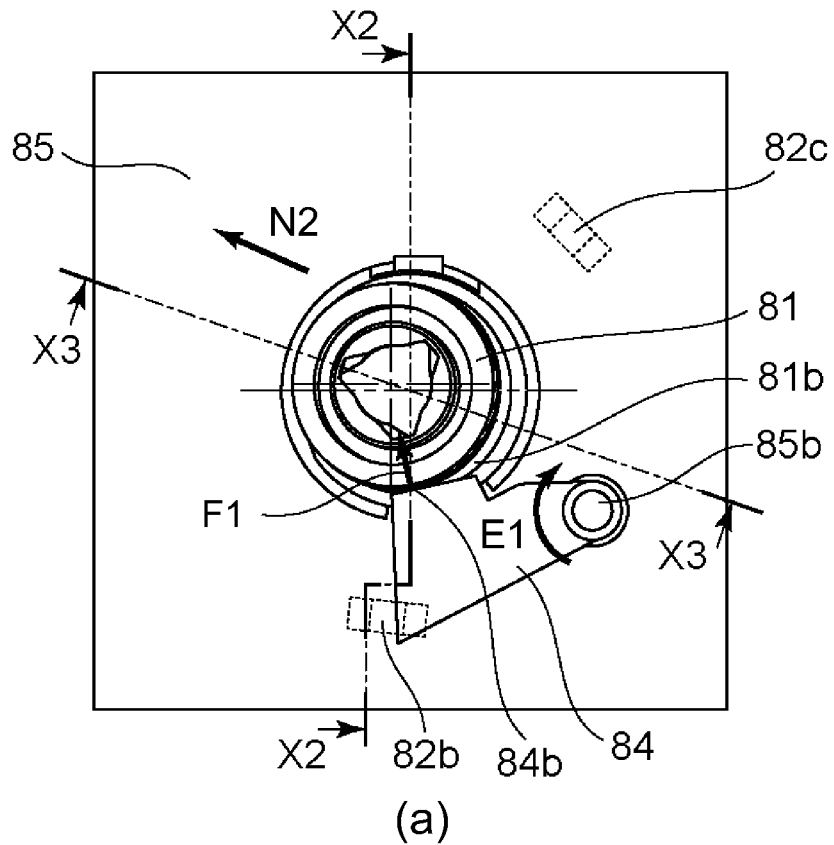
FIG. 6 is an illustration of the drive transmission member.
Figure 6:
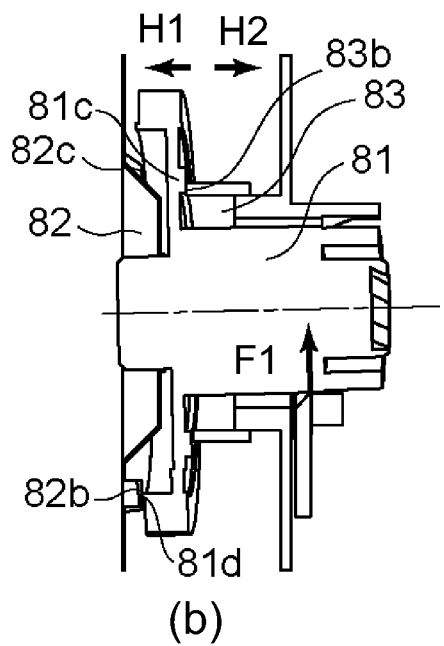
Figure 6:
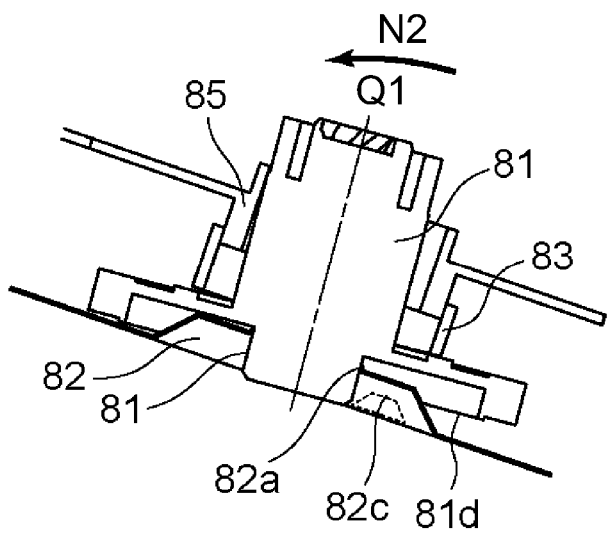

FIG. 3 is an exploded perspective view illustrating a support structure for the drive transmission member 81. FIG. 4 is a perspective view of the drive transmission member 81. Part (a) of FIG. 5 is a side view of part (b) of FIG. 3 as viewed from the direction of arrow P1 with the opening/closing door 13 (see FIG. 1) closed. Part (b) of FIG. 5 is a cross-section of X1-X1 of part (a) of FIG. 5. Part (a) of FIG. 6 is a side view of part (b) of FIG. 3 seen from the direction of arrow P1 with the opening/closing door 13 open. Part (b) of FIG. 6 is a sectional view taken along a line X2-X2 of part (a) of FIG. 6, and part (c) of FIG. 6 is a sectional view taken along a line X3-X3 of part (a) of FIG. 6.

As shown in part (a) of FIG. 3 and part (b) of FIG. 3, the drive transmission member 81 is provided with a sliding portion 81a which is rotatably supported by a support hole 82a of a support side plate 82 provided in the apparatus main assembly A. The support side plate 82 is provided with a projection 82b and a projection 82c. The drive transmission member 81 has a cylindrical portion 81b which is inserted into the hole portion 85a provided in the frame 85 by way of the cylindrical cam 83. An inner peripheral surface 83a of the cylindrical cam 83 is slidably supported by an annular rib 85c of the frame 85. The cylindrical cam 83 can move in an arrow H1 direction and an arrow H2 direction in interrelation with the opening/closing operation of the opening/closing door 13 by a mechanism (not shown). The frame 85 is provided with a boss 85b, which rotatably supports a hole portion 84a of a pressing member 84. As shown in FIG. 4, the drive transmission member 81 includes a gear portion (output gear portion) 81f which is a right-handed helical gear. In this embodiment, tip diameter φD3, first module, first helix angle, and root diameter φD6 of the gear portion 81f are φD3=φ25.5 (mm),
first module=0.7,
first helix angle=25°,
φD6=φ22.35.

The units of the module and the diameters are mm (millimeter) (hereinafter, the same applies). Further, a circumferential slit 81g is provided at the free end of the drive transmission member 81, and the outer diameter φD7 and the inner diameter φD8 of the slit 81g are

φD7=φ20,
φD8=φ15.8.

Further, a slope 81h is provided at the free end of the drive transmission member 81. Further, as shown in part (a) of FIG. 5, the pressing member 84 is urged in the direction of an arrow E1 about the boss 85b by a spring (not shown). By this, a contact portion 84b of the pressing member 84 presses the cylindrical portion 81b of the drive transmission member 81 with a pressing force F1. Here, as shown in part (b) of FIG. 5, the drive transmission member 81 is freely tiltable about the edge 82a1 of the support hole 82a as a fulcrum within a play between the diameter φD1 of the sliding portion 81a and the diameter φD2 of the support hole 82a of the support side plate 82. At the same time, it can freely advance and retract in the direction of the axis Q1 of the sliding portion 81a. Therefore, the drive transmission member 81 is tilted in the direction of arrow N1 by the pressing force F1.

When the opening/closing door 13 is opened, the cylindrical cam 83 moves in the direction of the arrow H1 in interrelation with the opening/closing door 13. As a result, the contact surface 83b of the cylindrical cam 83 comes into contact with the contacted surface 81c of the drive transmission member 81, so that the drive transmission member 81 moves in the direction of arrow H1 together with the cylindrical cam 83 as shown in part (b) of FIG. 6. Then, the abutting surface 81d of the drive transmission member 81 comes into contact with at least one of the projections 82b and the projection 82c of the support side plate 82. By this, the drive transmission member 81 is inclined in the direction of arrow N2 as shown in part (a) of FIG. 6 and part (c) of FIG. 6.

The reasons for inclining the drive transmission member 81 as described above are, for example, as follows. The cartridge B can be mounted to and dismounted from the apparatus main assembly A. Depending on the structure of the cartridge and the main assembly of the apparatus, it is possible to smoothly remove and set the cartridge B by inclining the drive transmission member 81 when mounting or dismounting the cartridge. That is, by inclining the drive transmission member 81, it may be easier to avoid interference between the cartridge B and the drive transmission member 81 when the cartridge B is mounted or dismounted.

Therefore, in this embodiment, the drive transmission member 81 is provided tiltably so that the inclination angle of the drive transmission member 81 becomes larger especially when the opening/closing door 13 for mounting/ dismounting the cartridge B is opened.

Even if the drive transmission member 81 can be greatly tilted, it is desirable to reduce the inclination angle of the drive transmission member 81 when connecting the drive transmission member 81 and the cartridge B with each other. The means for reducing the inclination of the drive transmission member 81 will be described below.

<Coupling Member Engagement Mechanism>

Figure 7:
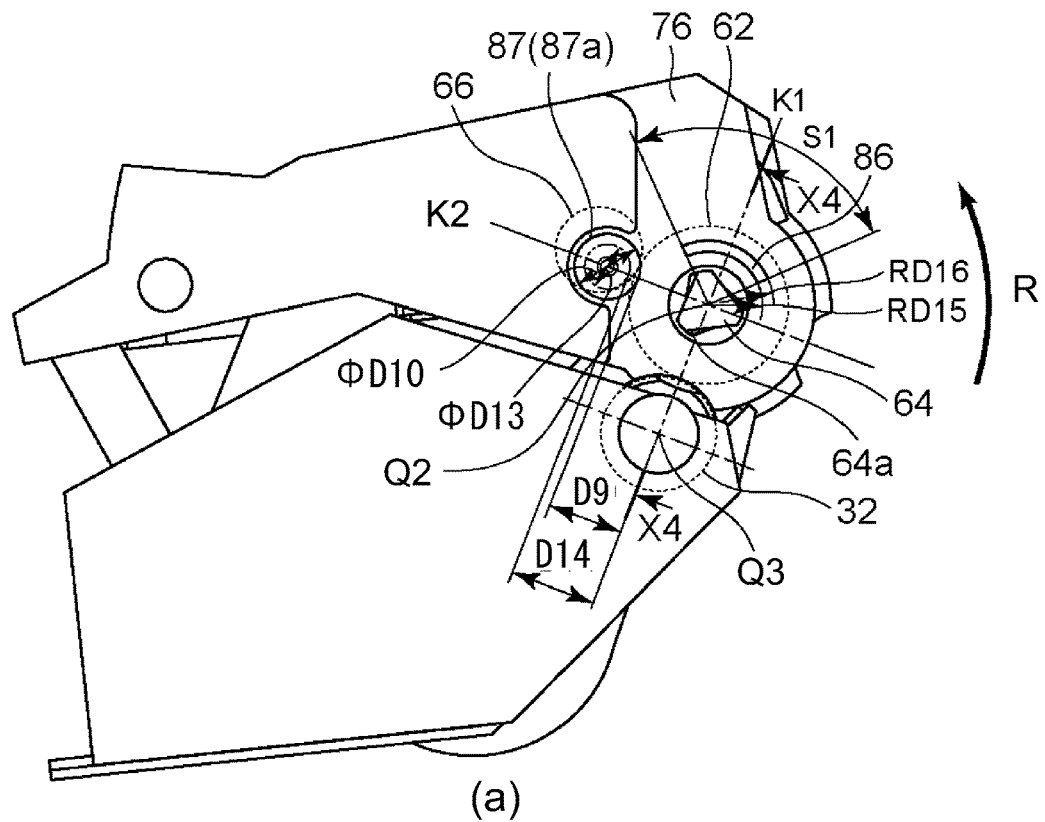
In FIG. 7, part (a) is a side view of the cartridge, and part (b) is a sectional view of the cartridge.
Figure 7:
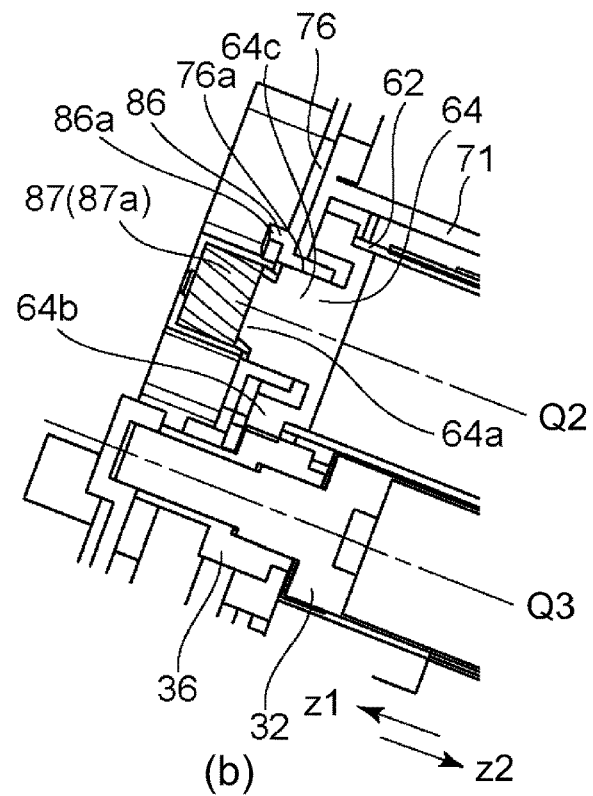

Next, referring to FIGS. 2, 4, 7 to 11, the coupling member 64 and the structure required for the coupling member 64 and the drive transmission member 81 to engage with each other will be described. The coupling member 64 is a member (drive input member, input coupling) for receiving a driving force (rotational force) for rotating the drum 62 and the developing roller 32 from the outside of the cartridge B (that is, the image forming apparatus main assembly). Part (a) of FIG. 7 is a side view of the drive side of the cartridge B, and part (b) of FIG. 7 is a cross-sectional view of X4-X4 in part (a) of FIG. 7. Part (a) of FIG. 8, part (a) of FIG. 9, part (a) of FIG. 10, and FIG. 11 (*a*) are side views in a state that the cartridge B is inserted. Part (b) of FIG. 8, part (b) of FIG. 9, part (b) of FIG. 10, and FIG. 11 (*b*) are sectional views taken along lines X5-X5, X6-X6, X7-X7 and X8-X8 of part (a) of FIG. 8, part (a) of FIG. 9, part (a) of FIG. 10, and FIG. 11 (*a*), respectively.

As shown in FIG. 4, the drive transmission member 81 includes a recess (drive transmission portion 81*e*) having a substantially triangular shape. The coupling member 64 receives a driving force by engaging a driven transmission portion 64*a* of the coupling member 64 shown in part (a) of FIG. 7 with the recess (drive transmission portion 81*e*). The coupling member 64 is an engaging member which engages with the drive transmission member 81. The driven transmission portion 64*a* is placed on the axis of the photosensitive drum 62.

As described above, the side of the cartridge provided with the coupling member 64 in the axial direction of the photosensitive drum 62 is referred to as the drive side, and the opposite side of the drive side is referred to as the non-drive side. Part (a) of FIG. 7 is a side view of the drive side. Further, the side of the cartridge on which the photosensitive drum 62 is provided is referred to as the front side, and the right side is the front side and the left side is the rear side in part (a) of FIG. 7. The front of the cartridge corresponds to the downstream side in the mounting direction of the cartridge, and the rear corresponds to the upstream side in the mounting direction. Unless otherwise specified, the upper and lower parts of the cartridge are defined in the attitude shown in part (a) of FIG. 7. In part (a) of FIG. 7, a cleaning unit including the photosensitive drum is disposed on the developing unit including the developing roller.

As shown in part (b) of FIG. 7, the coupling member 64 is fixed to the end of the photosensitive drum by means such as press fitting or clamping.

Therefore, when the coupling member 64 rotates, the photosensitive drum 62 also rotates. The photosensitive drum 62 and the members which rotate integrally with the photosensitive drum 62 and are collectively referred to as a drum unit. The coupling member 64 is a part of the drum unit.

A sliding portion 64*c* of the coupling member 64 is rotatably supported by a bearing portion 76*a* of a side member 76 integrally fixed to the cleaning frame 71. The side member 76 is a portion that partially forms a side surface on the drive side of the cartridge and is a portion of the frame (casing) of the cartridge.

In addition, the coupling member 64 is provided with a gear portion 64*b*. A developing roller gear 36 is provided at the end of the developing roller 32, and the gear portion 64*b* of the coupling member 64 meshes with the developing roller gear 36. By this, the driving force (rotational force) received by the coupling member 64 from the drive transmission member 81 is transmitted to the photosensitive drum 62 and the developing roller 32. In this embodiment, the driven transmission portion 64*a* of the coupling member 64 employs a projection shape (projection) having a substantially triangular cross-section. Specifically, a shape is employed which is provided by twisting a substantially triangular cross-section counterclockwisely about the axis of the photosensitive drum from the driving side to the non-driving side. However, the driven transmission portion 64*a* is not limited to the one having such a shape, and may be any one that can engage with the drive transmission member 81 (see FIG. 4) to receive the driving force. In this embodiment, the drive transmission member 81 of the apparatus main assembly A is provided with a substantially triangular recess (drive transmission portion, output coupling portion) 81*e* which can engage with the driven transmission portion 64*a*. Therefore, the driven transmission portion 64*a* has a projection shape which engageable with the recess portion. The number of the projection shape is not limited to but may be plural, and the shape is not limited to a triangle. Furthermore, the projection shape is like a twisted triangle, but it does not necessarily have to be twisted.

On the other hand, a damper gear 87 is rotatably supported by the side member 76. The damper gear 87 has a predetermined rotational resistance provided by a mechanism such as a rotary damper including a built-in oil damper. The damper gear 87 includes a gear portion 87*a* which is a left-handed helical gear. As shown in part (a) of FIG. 7, in this embodiment, the distance D9 between the addendum circle of the gear portion 87*a* and the rotation axis Q2 of the drum 62, the tip end circle diameter φD10 of the gear portion 87*a*, the second module, the second helix angle, The root diameter φD13 and the distance D14 between the deddendum circle and the rotation axis Q2 of the drum 62 are D9=11.3
φD10=φ10,
second module=0.7,
second helix angle=20°,
φD13=φ6.85,
D14=12.875.

Figure 11:
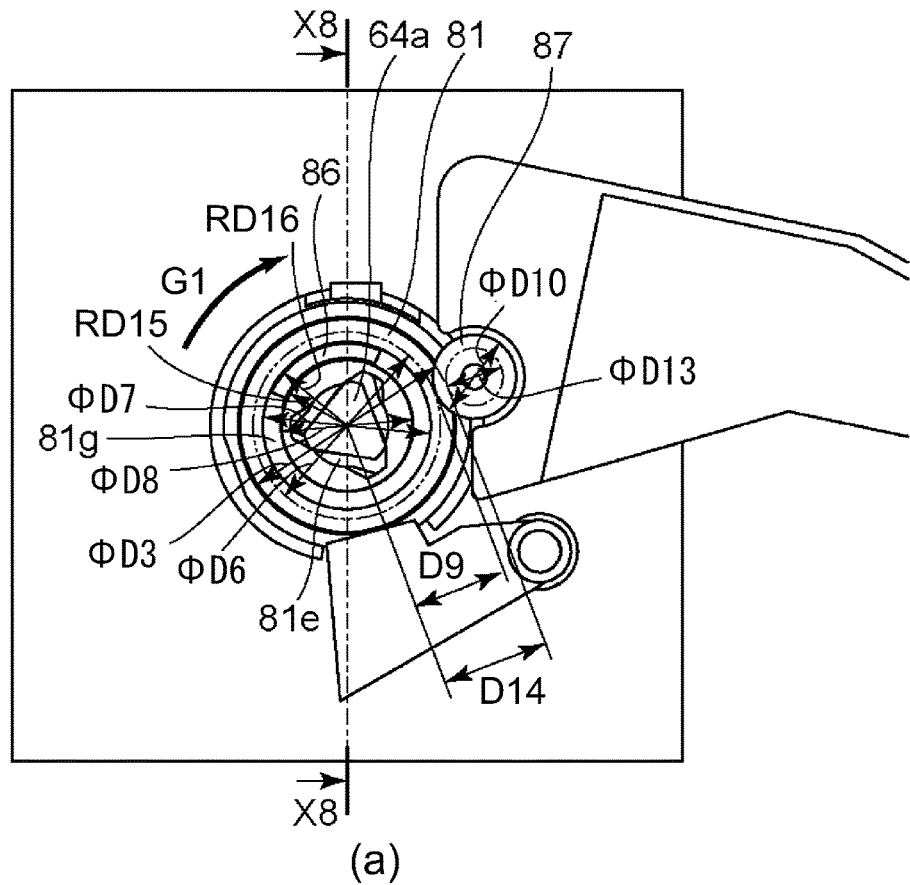
FIG. 11 is an illustration of the drive transmission member.
Figure 11:
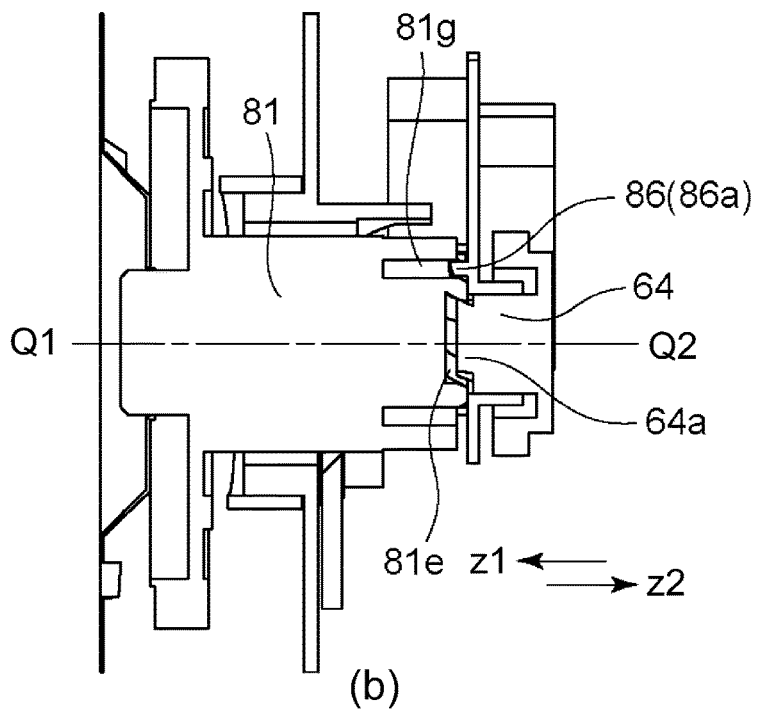

That is, with respect to the addendum diameter φD3, the first module, the first helix angle, and the deddedum φD6 of the gear portion 81*f* of the drive transmission member 81 (see FIG. 4 and part (a) of FIG. 11, a relationship $$D6/2 < D9 < D3/2 < D14$$

first module=D10=0.7
first helix angle=second helix angle=20° is satisfied.

In this embodiment, the damper gear 87 is on a straight line K2 substantially perpendicular to the straight line K1 connecting the rotating axis Q2 of the drum 62 and the rotating axis Q3 of the developing roller 32, with respect to the rotating axis Q2 of the drum 62. The damper gear 87 is provided at a position 90° upstream of the rotational direction R of the drum 62 with respect to the developing roller 32.

Further, the side member 76 is provided with an arcuate inclined rib (projecting portion) 86 projecting from the side member 76. In this embodiment, the range S1 in which the inclined rib 86 is provided is ±45° on the side opposite from the rotation axis Q3 of the developing roller 32 with respect to the rotation axis Q2 of the drum 62. The inner diameter RD15 and the outer diameter RD16 of the inclined rib 86 are
RD15=R8.1
RD16=R9.8.
That is, in relation to the outer diameter φD7 and the inner diameter φD8 of the slit 81g of the drive transmission member 81, a relationship of D8<2×D15<2×D16<D7 is satisfied (see FIG. 4 and part (a) of FIG. 11). In addition, as shown in part (c) of FIG. 2, part (b) of FIG. 7 and FIG. 84, the inclined rib 86 is provided with an inclined surface (inclined portion, contact portion) 86a.

Figure 8:
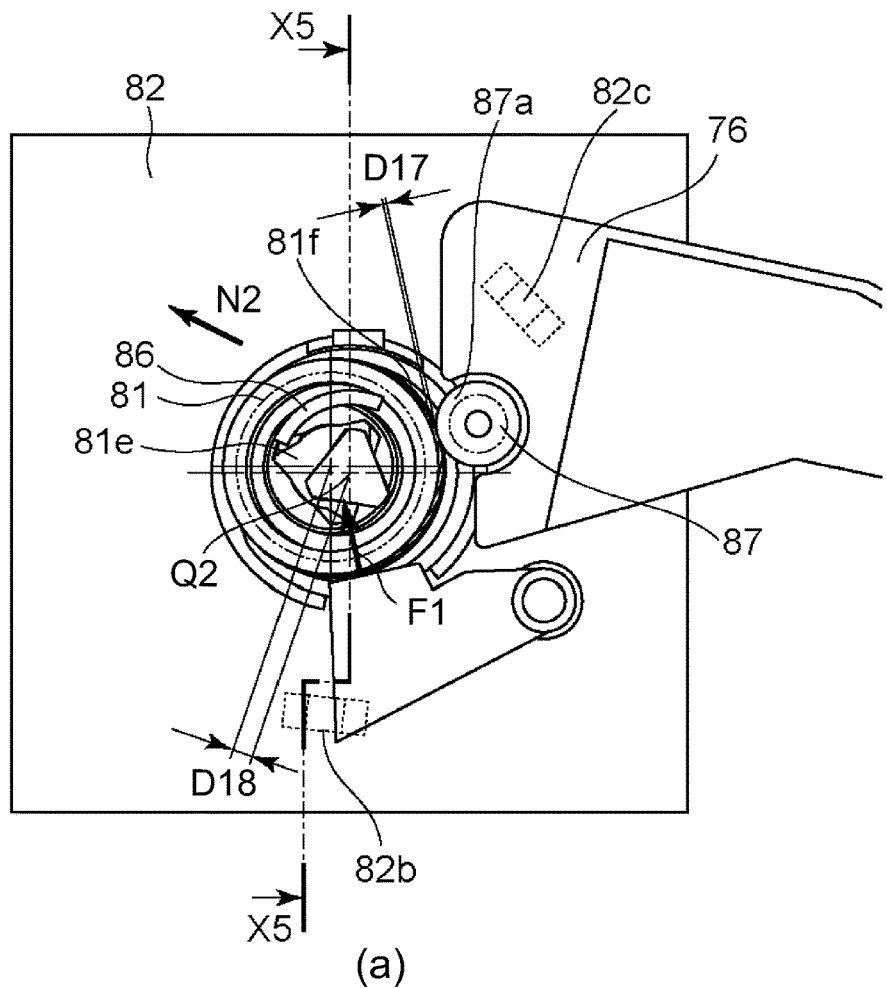
FIG. 8 is an illustration of the drive transmission member.
Figure 8:
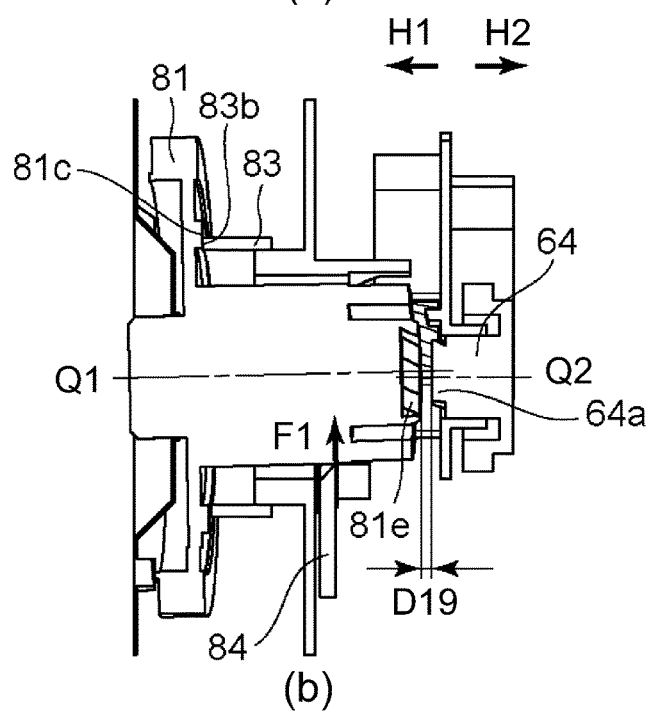
Figure 9:
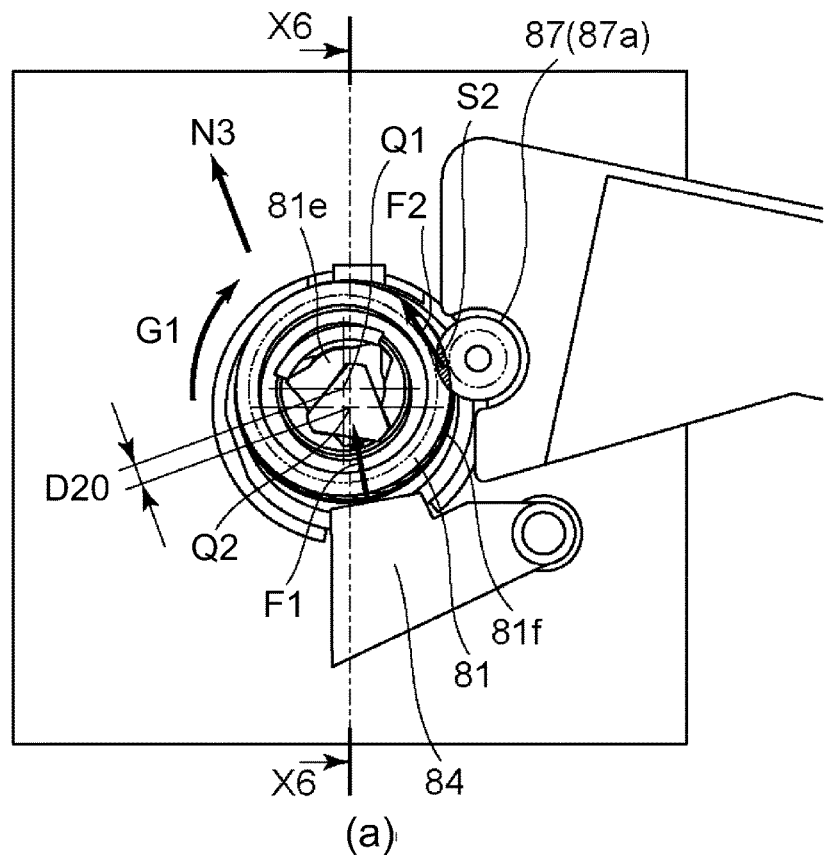
FIG. 9 is an illustration of the drive transmission member.
Figure 9:
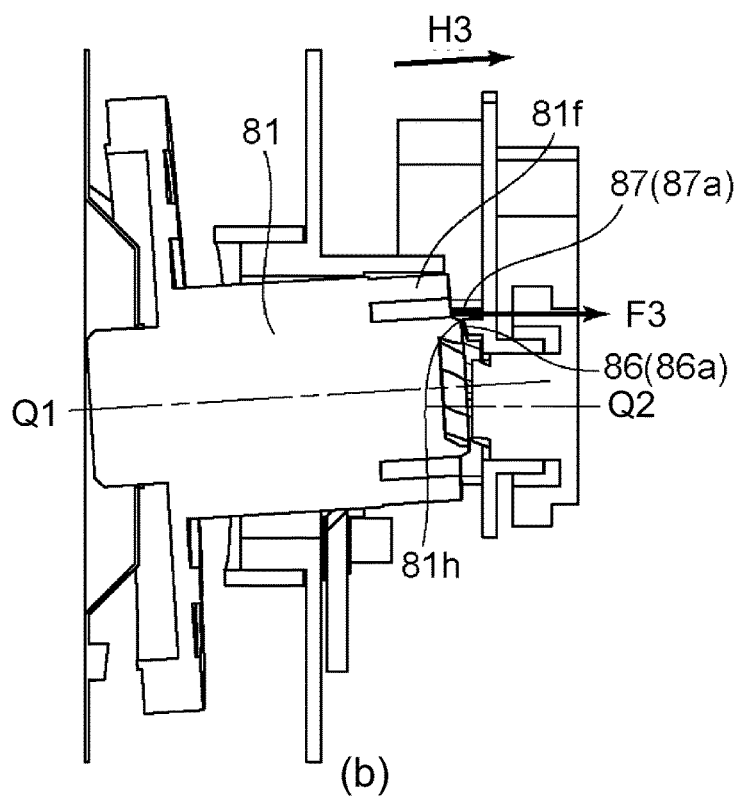
Figure 10:
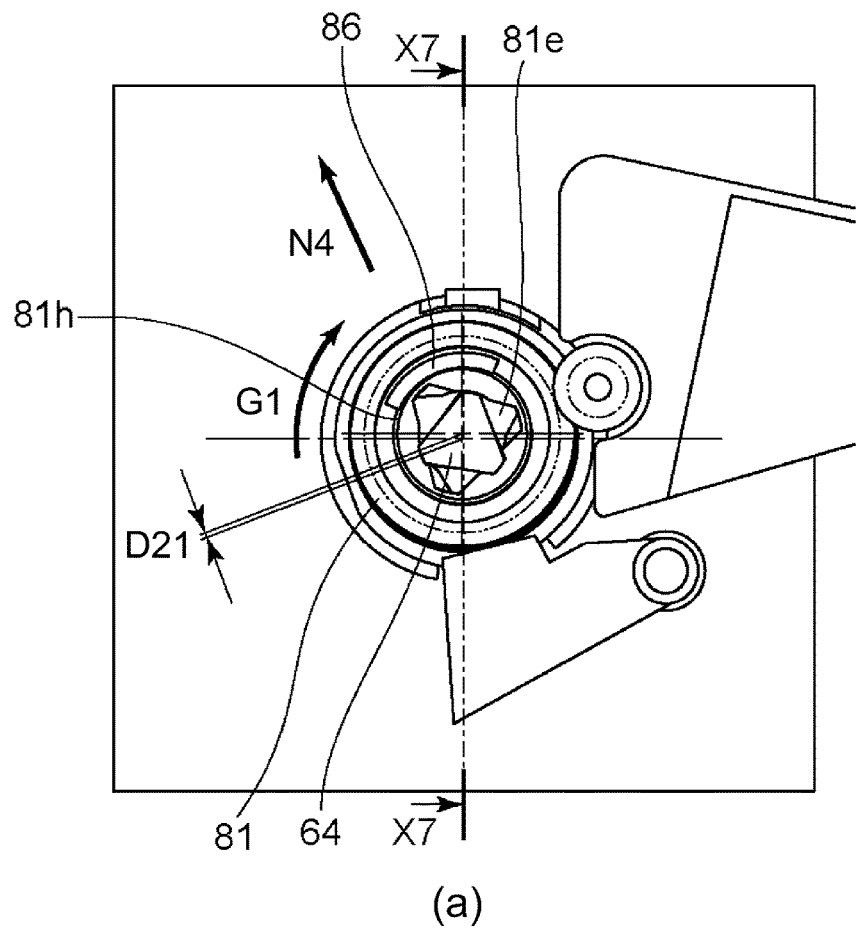
FIG. 10 is an illustration of the drive transmission member.
Figure 10:
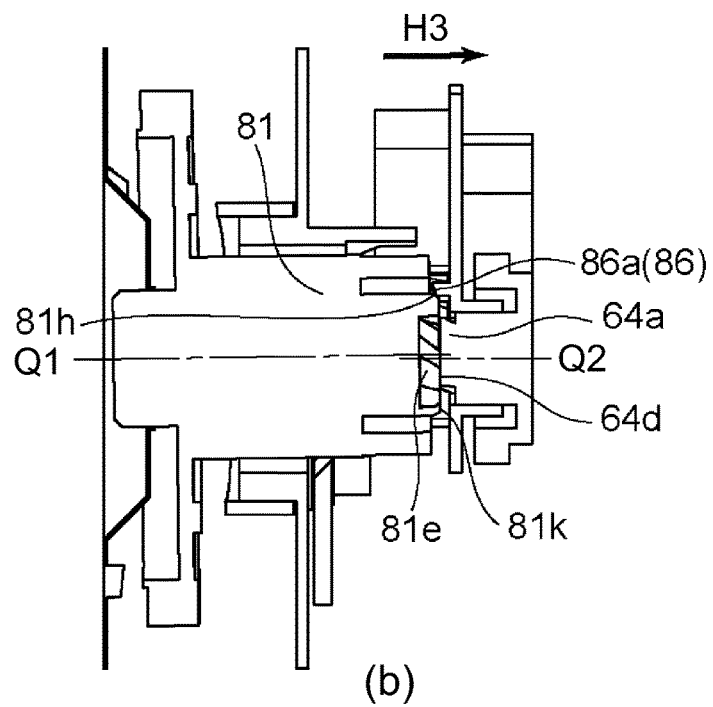

Next, referring to FIGS. 8 to 11, the engagement of the coupling member 64 will be described. FIG. 8 shows a state in which the opening/closing door 13 is opened, that is, the state in which the cartridge B has been inserted into the apparatus main assembly A in the state, that is, in the state shown in FIG. 6. FIG. 9 shows a state when the opening/closing door 13 is closed from the state of FIG. 8. FIG. 10 shows a state in which the apparatus main assembly A is driven and the drive transmission member 81 is rotated, from the state of FIG. 9. FIG. 11 shows a state in which the drive transmission member 81 is further rotated from the state of FIG. 10 and the drive transmission member 81 and the coupling member 64 are engaged with each other. In FIGS. 8 to 11, for better illustration, only three portions of the cartridge B, that is, the coupling member 64, the damper gear 87, and the side member 76, are shown.

When the cartridge B is inserted into the apparatus main assembly A from the state in which the opening/closing door 13 is opened, that is, from the state of part (t) of FIG. 6 he damper gear 87 is in the neighborhood of the gear portion 81f of the drive transmission gear 81 inclined in the N2 direction, as shown in part (a) of FIG. 8. The gear portion 81f of the drive transmission member 81 and the gear portion 87a of the damper gear 87 are separated by a gap D17. At this time, the drive transmission portion 81e of the drive transmission member 81 and the rotation axis Q2 of the drum 62 are misaligned due to the misalignment amount D18. Further, as shown in part (b) of FIG. 8, the drive transmission portion 81e of the drive transmission member 81 and the driven transmission portion 64a of the coupling member 64 are separated by a gap D19 in the longitudinal direction.

When the opening/closing door 13 is closed here, the cylindrical cam 83 moves in the direction of arrow H2 shown in part (b) of FIG. 8, so that the contact surface 83b of the cylindrical cam and the contact surface 81c of the drive transmission member 81 are separated from each other. As described above, the drive transmission member 81 is pressed by the pressing member 84 with the pressing force F1, and therefore, the drive transmission member 81 is inclined in the direction of arrow N3 as shown in part (a) of FIG. 9. As a result, the gear portion 81f of the drive transmission member 81 and the gear portion 87a of the damper gear 87 are brought into meshing engagement with each other in the region S2. The drive transmission portion 81e of the drive transmission member 81 is in a state of being misaligned with respect to the rotation axis Q2 of the drum 62 due to the amount D20 of misalignment.

Figure 84:
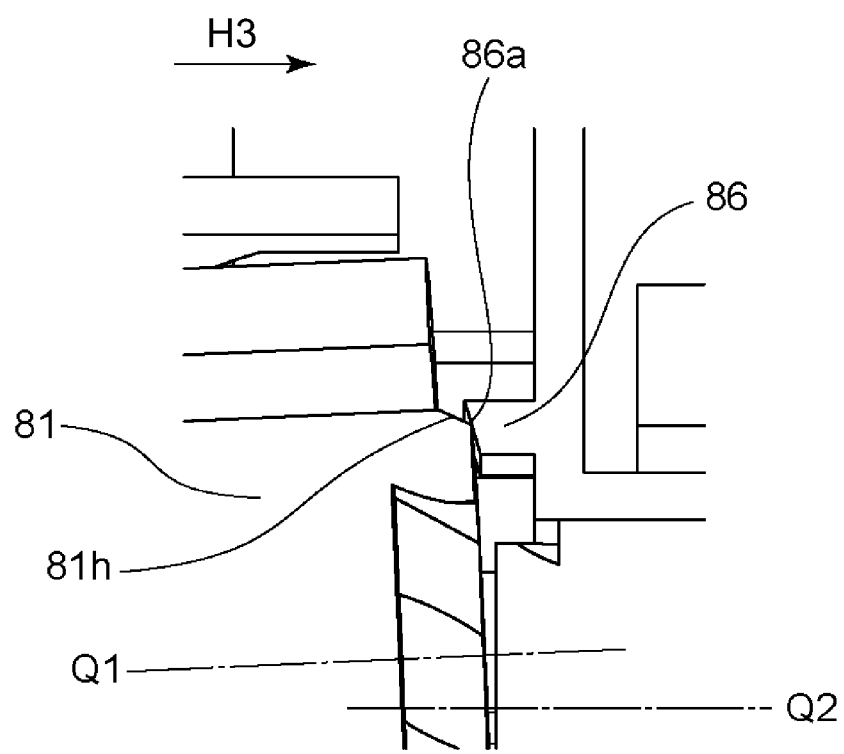
FIG. 84 is a sectional view of the periphery of the drive transmission member.

In this state, the apparatus main assembly A is driven to rotate the drive transmission member in the direction of the arrow G1 about the rotation axis Q1. As described above, the damper gear 87 has a predetermined rotational resistance. For this reason, between the gear portion 81f of the drive transmission member 81, which is a helical tooth gear, and the gear portion 87a of the damper gear 87, the meshing force F2 in the direction perpendicular to the axial direction of the photosensitive drum and the engagement force F3 in the thrust direction shown in part (b) of FIG. 9 are produced. As a result, the drive transmission member 81 is moved in the direction of arrow H3 along the rotation axis Q1. Then, as shown in FIG. 84, the slope 81h is guided by the slope 86a of the inclined rib 86, and as a result, the free end surface 81k and the free end 64d of the coupling member 64 come into contact with each other with an amount D21 of misalignment in the N4 direction, as shown in part (a) of FIG. 10 and part (b) of FIG. 10. At this time, the relationship between the misalignment amount D20 and the misalignment amount D21 is
D20>D21.

When the drive transmission member 81 further rotates in the direction of the arrow G1 from this state, the phases of the drive transmission portion 81e of the drive transmission member 81 having a substantially triangular shape and the driven transmission portion 64a of the coupling member 64 are brought into alignment with each other. Then, the drive transmission member 81 further moves in the direction of the arrow H3, and as shown in FIG. 11, the drive transmission portion 81e of the drive transmission member and the driven transmission portion 64a of the coupling member 64 are engaged with each other.

In this embodiment, the damper gear 87 is an independent gear having a predetermined rotational resistance, but such a structure is not always necessary. For example, it may be a part of a drive train connected with the charging roller 66 or the feed member 43. In that case, it is not necessary to incorporate an oil damper or the like as described above in the damper gear 87 by utilizing the rotational resistance of the drive train.

Further, in this embodiment, the center of the damper gear 87 (rotational axis) is placed at a position moved by 90° from the position of the center of the developing roller 32 (rotational axis) toward the upstream side of the rotational direction R of the drum 62, but it is not necessary to place the damper gear 87 exactly at this position, the position may be such that it can mesh with the gear portion 81f of the drive transmission member 81 inclined in the direction of arrow N3, as shown in part (a) of FIG. 9. For example, the drum 62 may be arranged in a range of 60° to 120° toward the upstream side of the drum rotational direction R with respect to the developing roller 32.

Further, although the damper gear 87 is a helical gear in the foregoing description, it is not always necessary to use the damper gear 87, and it is sufficient that the damper gear 87 meshes with the gear portion 81f of the drive transmission member 81.

Figure 12:
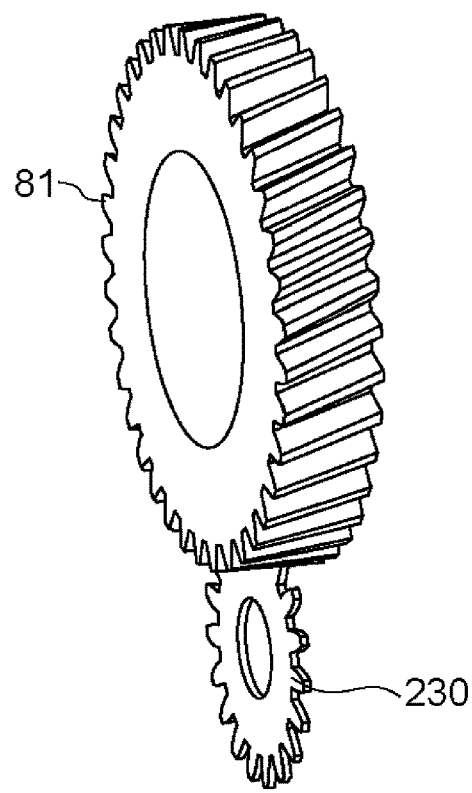
FIG. 12 is an illustration of the gear.
Figure 12:
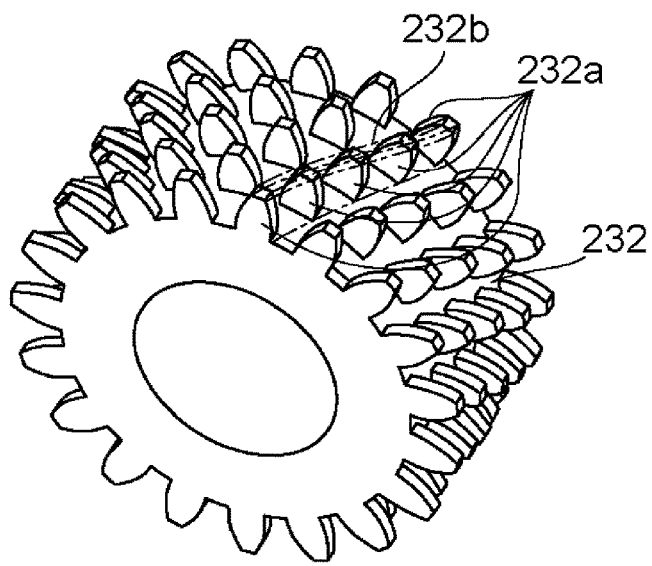

For example, a spur gear 230 having thin facewidth as shown in part (a) of FIG. 12 or a structure in which projections as shown in part (b) of FIG. 12 are arranged in a spiral profile may be used. If it is a thin spur gear 230 as shown in part (a) of FIG. 12, it can be engaged with the helical gear of the drive transmission member 81. It is conceivable that the facewidth of the spur gear 230 is 1 mm or less.

Further, in the gear 232 having the shape shown in part (b) of FIG. 12, four projections 232a are arranged obliquely with respect to the axis of the gear. These four projections 232a are considered to be the teeth 232b of the helical gear divided into four. That is, the gear 232 can be considered as one form of the helical gear. In the present application, when referring to helical gear of the cartridge, the gear in the form of the gear 232 is also included.

Further, in this structure, the inclined rib 86 is provided in the range S1 within a range of ±45° in the region opposite from the developing roller with respect to the axis of the photosensitive drum. However, this is not always necessary, and it will suffice if it is in a position where the slope 81*h* of the drive transmission member 81 inclined in the arrow N3 direction and the arrow N4 direction can be guided thereby. For example, it may be provided in a range of ±10° on the opposite side from the developing roller or it may be provided over the entire circumference of 360°.

The structure of the above cartridge is summarized below.

As shown in part (b) of FIG. 2, the coupling member (input coupling member, drum coupling, engaging member, drive input member) 64 is provided in the neighborhood of the drive-side end (first end) 62*z*1 of the photosensitive drum 62. The coupling member 64 includes a projecting driven transmission portion (drive input portion, driving force receiving portion, input coupling portion) 64*a*, and the driven transmission portion 64*a* is structured to receive the driving force from the drive transmission portion 81*e* of the driving force transmission member 1 (see FIG. 11). In this embodiment, the shape of the cross-section of the driven transmission portion 64*a* is substantially triangular, but the shape is not necessarily limited to such a shape.

Further, the cartridge B further includes a gear member (damper gear) 87 and an inclined rib 86 (inclined portion 86*a*). The gear member 64 and the inclined portion 86*a* are arranged on the drive side Bz1 of the cartridge B like the coupling member 64. That is, the coupling member 64, the inclined portion 86*a*, and the gear member 64 are arranged in the neighborhood of the side member 76. The side member 76 is a part of the frame of the cartridge and is a member constituting one side (drive side, first side) of the frame in the axial direction Z.

At least a portion of the inclined portion 86*a* is located outside (the downstream side in the direction indicated by the arrow z1) in the axial direction Z with respect to the non-driving transmission portion 64*a* (see part (b) of FIG. 2 and part (b) of FIG. 11. In other words, in the axial direction Z, at least a part of the inclined portion 86*a* is placed more remote (away from) from the non-driven side 71*z*2 of the frame of the cartridge B than the driven transmission portion 64*a*. In even other words, in the axial direction Z, at least a part of the inclined portion 86*a* is more remote from the non-driven side end (second end) 62*z*2 of the photosensitive drum than the driven transmission portion 64*a*.

At least a part of the teeth of the gear member 87 is placed outside (the downstream side in the direction indicated by the arrow z1), in the axial direction Z, of the driven transmission portion 64*a* (see part (b) of FIG. 2 and part (b) of FIG. 7. In other words, in the axial direction Z, at least a part of the teeth of the gear member 87 is more remote from the non-driven side (second side) 71*z*2 of the frame of the cartridge B than the driven transmission portion 64*a*. In other words, in the axial direction Z, at least a part of the teeth of the gear member 87 is more remote from the non-driving side end portion (second end portion) 62*z*2 of the photosensitive drum than the non-driving transmission portion 64*a*.

When the cartridge B is viewed along the axis of the photosensitive drum 62, as shown in part (a) of FIG. 7, the teeth of the gear member 87 are placed in the neighborhood of the outer peripheral surface of the photosensitive drum 62. Further, the center of the gear member 87 is placed in a range between 60 degrees and 120 degrees toward the upstream side in the rotational movement direction R of the drum 62 with respect to the line extending from the center of the photosensitive drum 62 toward the center of the developing roller. When the drive transmission member 81 rotates while the output gear portion 81*f* (see part (a) of FIG. 4 of the drive transmission member 81 is engaged with the damper gear (gear member) 87, the drive transmission member 81 approaches to the cartridge B by the force generated by the engagement of the gears. At this time, the inclined rib (inclined portion) 86*a* comes into contact with the drive transmission member 81 (slope 81*h*) (see part (b) of FIG. 10. As a result, the inclination angle of the drive transmission member 81 relative to the drum 62 is reduced, and the recess (output coupling portion) 81*e* of the drive transmission member 81 is enabled to engage with the driven transmission portion 64*a* of the cartridge B (see part (b) of FIG. 11. With such a structure, the inclined drive transmission member 81 is connected to the cartridge B, and the drive force can be transmitted from the drive transmission member 81 to the cartridge B.

In this embodiment, the coupling member 64 is used as the drive input member which receives the driving force from the drive transmission member 81.

However, the drive input member which is connected to the drive transmission member 81 to receive the driving force is not limited to the coupling member 64. A gear member capable of receiving a driving force by engaging with the gear portion 81*f* of the drive transmission member 81 may be provided on the cartridge separately from the damper gear 87.

For example, in this embodiment, the developing roller gear 36 connected to the developing roller 32 is structured to receive the driving force by way of the coupling member 64 (see part (b) of FIG. 7. However, the developing roller gear 36 may be exposed to the outside of the cartridge and then directly meshed with the gear portion 81*f* of the drive transmission member 81. That is, after the inclination angle of the drive transmission member 81 is reduced by the inclined rib 86*a*, the gear portion 81*f* of the drive transmission member 81 may be engaged with the developing roller gear 36, and the drive transmission member 81 and the cartridge may be connected so as to be capable of transmitting the driving force.

Figure 15:
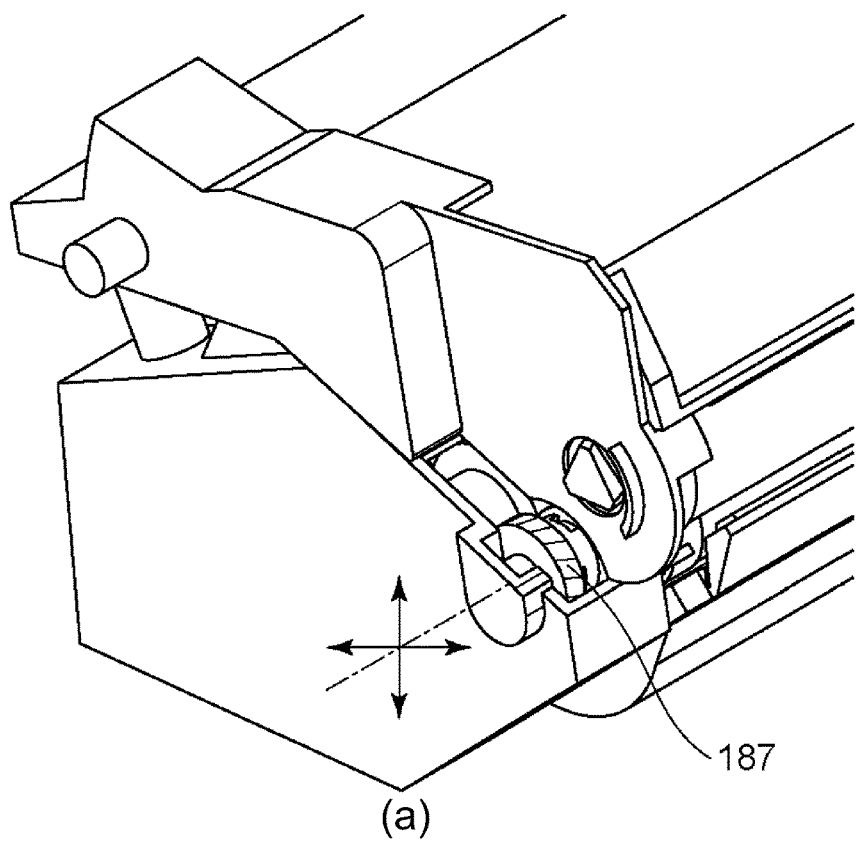
FIG. 15 is a partial perspective view of the cartridge.
Figure 15:
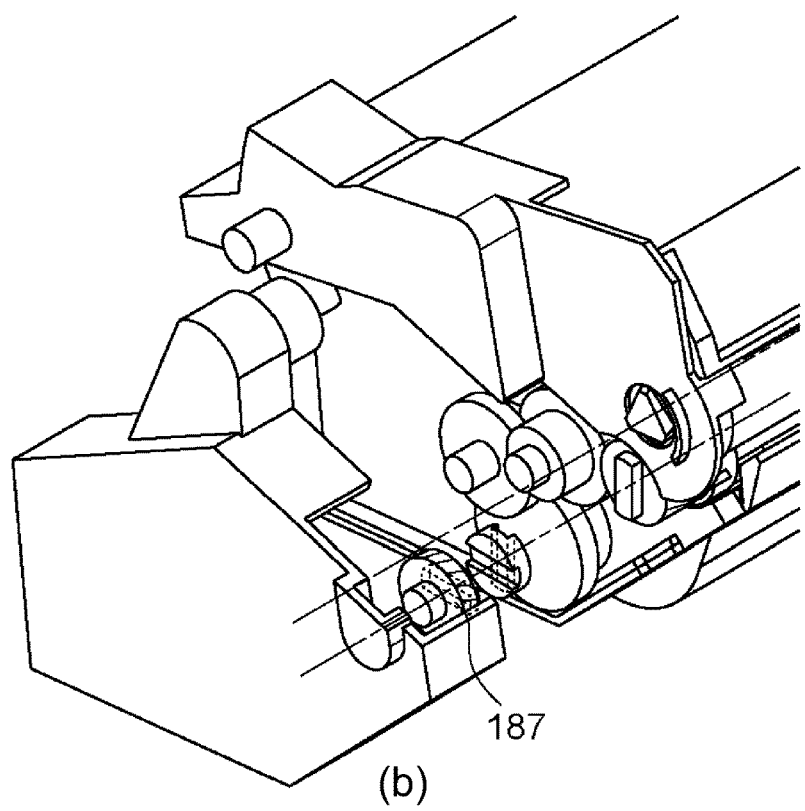

An example of the gear member of the cartridge which can receive a driving force for rotating the developing roller 32 by engaging with the gear portion 81*f* of the drive transmission member 81 in this manner is the gear member 187 shown in part (a) of FIG. 15. The gear member 187 is a member connected to the developing roller 32 so as to be capable of drive-transmission. Although the damper gear 87 is not shown in FIG. 15, it can be deemed that the damper gear 87 is placed at the same position as in FIG. 1. The structure of the cartridge in which the drive input member which receives the driving force is provided separately from the coupling member 64 will be described in Embodiment 2.

Figure 22:
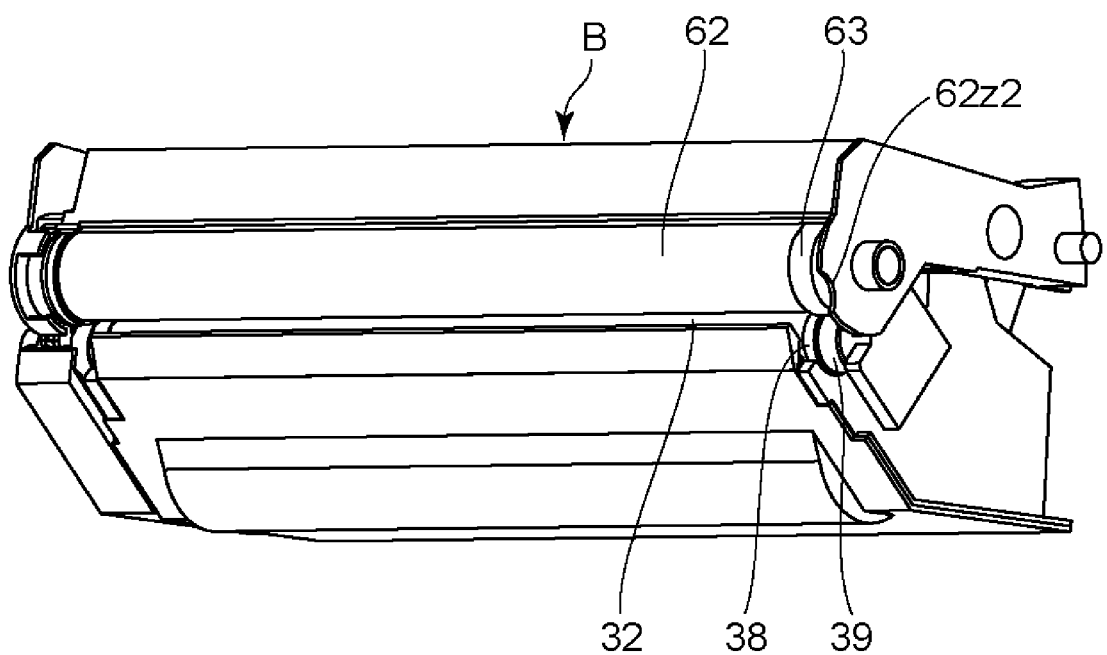
FIG. 22 is an illustration of the cartridge.

If the developing roller gear 36 (187) connected to the developing roller is structured to directly engage with the drive transmitting member 81 to receive the driving force, the driving force can be transmitted from the gear 36 (187) to the photosensitive drum 62. For example, as shown in FIG. 22, the photosensitive drum 62 and the developing roller 32 are connected through gears 39 and 63, and the driving force may be transmitted from the drive transmission member 81 to the photosensitive drum 62 by way of the developing roller 32.

That is, the gear member 36 (187) as the drive input member can be connected to the photosensitive drum 62 by way of the developing roller 32 and other gears 39 and 63 so as to be capable of drive-transmission. In such a case, the photosensitive drum 62 does not need to receive the driving force from the coupling member 64. The coupling member 64 may be used merely as an engaging member which engages with the drive transmission member 81 so that the driving force is not transmitted from the coupling member 64 toward the photosensitive drum 62. Alternatively, the coupling member 64 as the engaging member can be removed from the cartridge.

However, the coupling member 64 as the engaging member positions the drive transmission member 81 with respect to the cartridge by engaging with the recess 81e of the drive transmission member 81. From that point of view, it is further preferable to leave the engaging member which engages with the drive transmission member 81 in the cartridge.

The coupling member 64 is provided with the driven transmission portion 64a in the form of an engaging portion (projection) capable of engaging with the recess 81e (see part (c) of FIG. 2. If the coupling member 64 is merely an engaging member which does not transmit a driving force toward the photosensitive drum 62, the shape of the driven transmission portion 64a may be changed. For example, the shape of the driven transmission portion 64a can be a cylindrical projection which can be engaged with the recess 81e of the drive transmission member 81. The cylindrical engaging portion cannot receive a driving force from the drive transmitting member 81 even when engaged with the recess 81e. Therefore, the coupling member 64 does not transmit the driving force toward the photosensitive drum 62, and is merely an engaging member.

The structure of this embodiment is summarized below.

The image forming apparatus main assembly A includes the tiltable drive transmission member (drive output member) 81 capable of outputting the driving force.

On the other hand, the cartridge is provided with the photosensitive drum 62 and the damper gear (gear member) 87. The damper gear 87 is provided on the drive side of the cartridge. The damper gear 87 rotates in a state of being engaged with the gear portion 81f provided on the outer peripheral surface of the drive transmission member 81 to bring the drive transmission member closer to the cartridge (see part (b) of FIG. 9, part (b) of FIG. 10 and part (b) of FIG. 11). This is because the damper gear 87 is rotationally driven by the drive transmission member 81, so that a force F3 (see part (b) of FIG. 9 that pulls the drive transmission member 81 toward the cartridge is generated.

Further, an inclined rib (inclined portion) 86 for contacting the drive transmission member approaching the cartridge by the damper gear 87 is placed on the drive side of the cartridge (see part (b) of FIG. 9 and FIG. 84). The drive transmission member 81 moves along the inclination of the inclined rib 86, so that the inclination angle of the drive transmission member 81 changes. That is, the inclination angle of the drive transmission member 81 with respect to the photosensitive drum 62 becomes smaller. By this, the drive transmission member 81 is connected to the cartridge so that the drive can be transmitted. In this embodiment, the coupling member 64 is provided as a drive input member which receives a driving force from the drive transmission member 81 (see part (a) of FIG. 7.

In the axial direction of the photosensitive drum, at least a part of the damper gear 87 is placed relatively on the drive side with respect to the inclined rib 86 (see part (b) of FIG. 7. That is, at least a part of the damper gear 87 is on the downstream side in the direction indicated by the arrow Z1 with respect to the inclined rib 86.

In other words, in the axial direction of the photosensitive drum, at least a part of the damper gear 87 is placed more remote from the non-driving side of the cartridge than the inclined rib 86.

In the axial direction of the photosensitive drum, at least a part of the damper gear 87 is placed relatively on the drive side with respect to the driven transmission portion (driving force receiving portion) 64a of the coupling member 64 (see part (b) of FIG. 7). In other words, in the axial direction of the photosensitive drum, at least a part of the damper gear 87 is placed at a position more away from the non-driven side of the coupling member 64 than the driven transmission portion (driving force receiving portion) 64a. The damper gear 87 is placed closer to the arrow Z1 than the driven transmission portion 64a.

When the cartridge is viewed along the axis of the cartridge, the axis (center) of the damper gear 87 is placed in an angular range of 60° to 120° toward the upstream of the axis (center) of the developing roller 32 in the drum rotation direction R about the axis (center) of the drum 62. That is, comparing the line passing extending from the center of the photosensitive drum to the center of the developing roller and the line extending from the center of the photosensitive drum and passing through the center of the damper gear 87, the latter line is upstream of the former line in the rotational direction R, and the angle between the two lines is greater than 60° and less than 120°. In this embodiment, when the former line is rotated 90° upstream in the rotational direction R, it overlaps with the latter line.

The damper gear 87 can be engaged with the gear portion 81f (see FIG. 4), which is a helical gear. In this embodiment, the damper gear 87 is also a helical gear (see part (c) of FIG. 2.

The inclined rib 86 for changing the inclination angle of the drive transmission member 81 is structured so that the drive side thereof is more remote from the axis Q2 of the photosensitive drum than the non-drive side thereof (see part (b) of FIG. 7. That is, when the distance from the axis Q2 of the photosensitive drum to the inclined rib is measured along the direction perpendicular to the axis Q2, the distance increases as the distance from the non-driving side of the cartridge increases in the axial direction. In part (b) of FIG. 7, the distance between the inclined rib 86 and the axis Q2 increases toward the direction of arrow z1.

Embodiment 2

Next, Embodiment 2 will be described. The same points as in the above-described embodiment will be omitted. In particular, among the elements disclosed in this embodiment, those corresponding to the members described in the Embodiment 1 are given the same names as those of the members of the Embodiment 1, and the description will be made as to the elements different from those of the Embodiment 1.

In Embodiment 1, the position of the damper gear 87 is fixed with respect to the rotation axis Q2 of the drum 62, but in this embodiment, the axis of the damper gear 87 is movable relative to the rotation axis Q2 of the drum 62.

Figure 13:
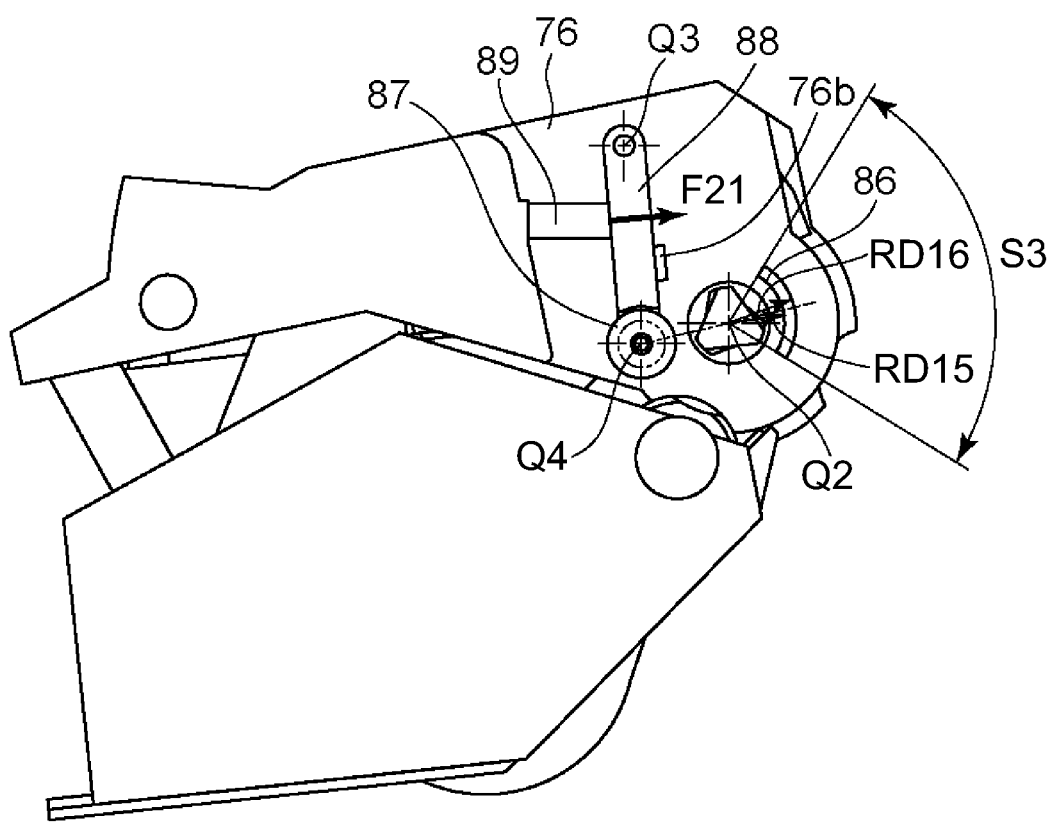
FIG. 13 is a side view of the cartridge.

FIG. 13 is a side view of the cartridge B in this embodiment. As shown in FIG. 13, a gear holder 88 is mounted to the side member 76 so as to be swingable about the rotation axis Q3. Further, a damper gear 87 is mounted to the gear holder 88 so as to be rotatable about the rotation axis Q4. Similarly to Embodiment 1, the damper gear 87 has a predetermined rotational resistance. An urging spring 89 is mounted to the side member 76, and the gear holder 88 is urged by the urging force F21. As a result, the gear holder 88 abuts on the abutting portion 76b of the side member 76. Further, the side member 76 is provided with an inclined rib 86 at a position substantially opposite from the damper gear 87 with respect to the rotation axis Q2 of the drum 62, in a range S3 of ±45°.

Figure 14:
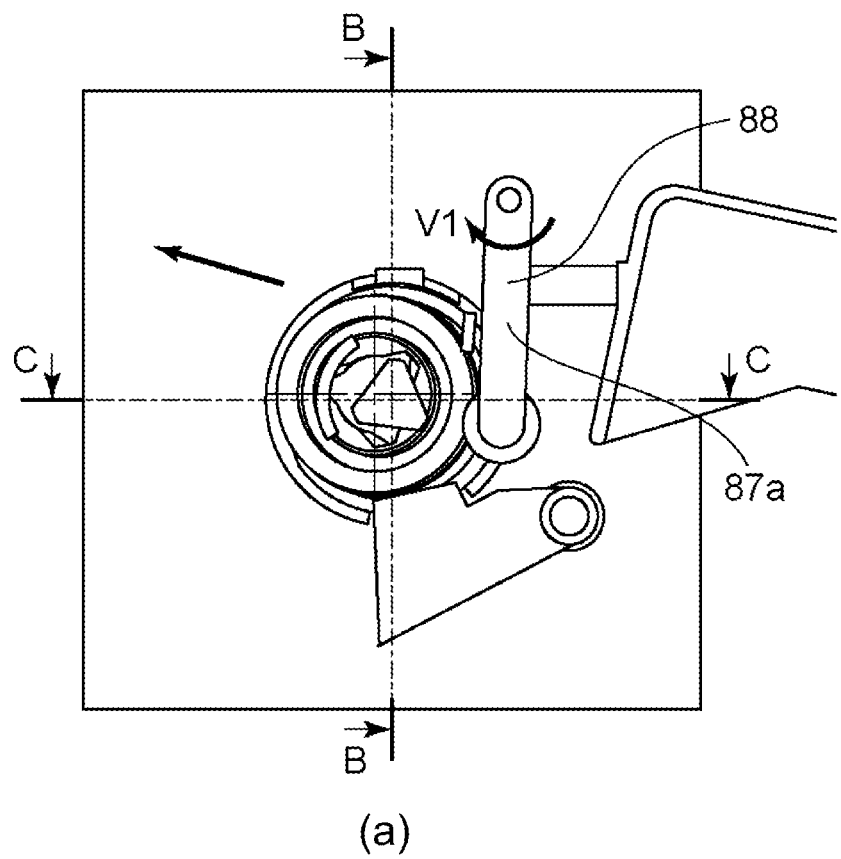
FIG. 14 is an illustration of the driving force transmission member.
Figure 14:
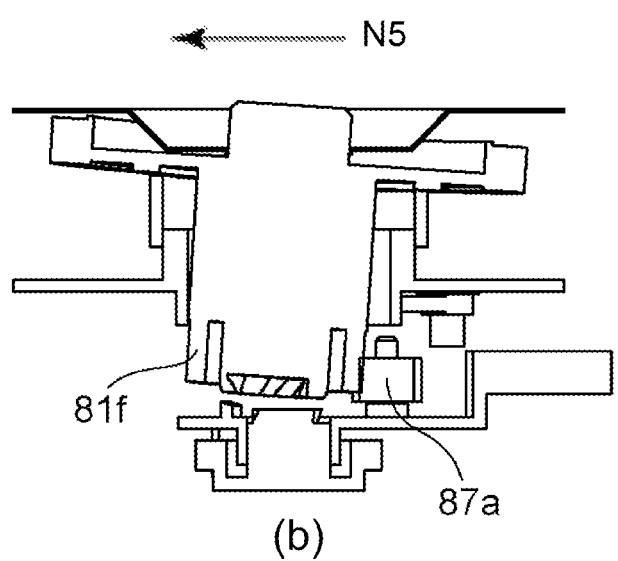

When the cartridge B is inserted into the apparatus main assembly A, the gear portion 81f of the drive transmission member 81 and the gear portion 87a of the damper gear 87 are brought into meshing engagement with each other in the region S4, as shown in FIG. 14. The drive transmission member 81 is inclined in the direction of arrow N5, and the gear holder 88 resists the urging force F21 of the urging spring 89 by the contact force F22 between the gear portion 81f and the gear portion 87a, so that it swings in the direction of arrow V1 around the rotation axis Q3. In this embodiment, the moving direction of the gear 87 is a direction crossing the axis of the gear 87. More specifically, the gear 87 can move in a direction perpendicular to its own axis.

Here, when the opening/closing door 13 is closed, the drive transmission member 81 moves by the meshing force in the thrust direction between the gear portion 81f of the drive transmission member 81 and the gear portion 87a of the damper gear 87. As a result, as in the Embodiment 1, the slope 81h of the drive transmission member 81 is guided by the inclined surface 86a of the inclined rib 86, so that the drive transmission portion 81e of the drive transmission member 81 and the non-drive transmission portion 64c of the coupling member 64 are brought into engagement with each other.

In this embodiment, the swing center Q3 of the gear holder 88 which supports the damper gear 87 is provided on the side member 76, but it is not always necessary, and it will suffice if the drum 62 can be moved relative to the rotation axis Q2. For example, as shown in FIG. 15, a gear 187 in driving connection with the developing roller 32 by an Oldham coupling may be used. With the above-described structure, the damper gear 87 can move in a direction crossing the axis thereof, as shown in part (a) of FIG. 15 and part (b) of FIG. 15. In addition, the driving force can be transmitted to the developing roller 32 by rotating the gear 187. Therefore, it becomes unnecessary to transmit the drive to the developing roller 32 by way of the gear portion 64b (see part (b) of FIG. 7 of the coupling member 64.

It is also possible to transmit the driving force received from the gear 187 to the photosensitive drum 62. When the driving force is transmitted from the gear 187 to the photosensitive drum 62, the coupling member 64 does not have to receive the driving force from the drive transmission member 81. That is, the coupling member 64 is an engaging member which simply engages with the drive transmission member 81, and it is not necessary to provide the engaging member with a driving force transmission function. Alternatively, the coupling member 64 may be completely removed from the cartridge.

Referring to FIG. 22, an example of a structure in which a gear (gear member) 187 is used instead of the coupling member 64 to receive a driving force from the drive transmission member 81 will be described, wherein FIG. 22 shows a modified example in which the drive train is partially different from this embodiment.

FIG. 22 is a perspective view of the non-driving side of the cartridge B. As shown in this Figure, a drum drive gear 39 is provided at the non-drive side end of the developing roller 32. Further, a drum driven gear 63 is provided at an end portion 62z2 on the non-driven side of the drum 62.

When the developing roller 32 is rotationally driven by the drive transmission member 81 of the apparatus main assembly A by way of the gear 187, the drive is transmitted from the drum drive gear 39 to the drum driven gear 63, and the drum 62 is rotationally driven. With this structure, it is not necessary to provide the driven transmission portion 364a of the coupling member 64, and the structure of the cartridge B can be simplified.

In any case, the gear members 87 and 187 in this embodiment can move relative to the frame of the cartridge B and the photosensitive drum in the direction crossing the rotation axis of the gear members 87 and 187. Even if the inclination angle of the drive transmission member 81 changes, the gear member (187) can move following it. As compared with Embodiment 1, the latitude in arranging the gear members can be increased, in this embodiment.

In addition, one cartridge may include both of the gear 87 shown in FIG. 13 and the gear 187 shown in FIG. 15. That is, the gear 87 for bringing the drive transmission member 81 closer to the inclined rib of the cartridge and a gear 187 for receiving a driving force for rotating the developing roller 32 and the like from the drive transmission member 81 may be provided separately. In this case, the gear 87 does not have to be structured to movable while the gear 87 can move in a direction intersecting its axis. This is because the gear 187 may be fixed at a position where it can be engaged with the drive transmission member 81 the inclination angle of which is reduced in contact with the inclined rib 86.

Embodiment 3

In the above-described embodiment, the structure in which the drive transmission member 81 is moved in the arrow H2 direction (see FIG. 8) by the meshing engagement force in the thrust direction with the damper gear 87 to engage with the coupling member 64 has been described. In this embodiment, a structure in which the drive transmission member 81 is engaged with the coupling member 64 without moving in the direction of the arrow will be described. In this embodiment as well, the same points as in the above-described embodiment will be omitted. Among the elements disclosed in this embodiment, those corresponding to the members described in the above-described embodiment are given the same names as the members in the above-mentioned embodiment, and the points different from those in the above-mentioned embodiment only will be described.

Figure 16:
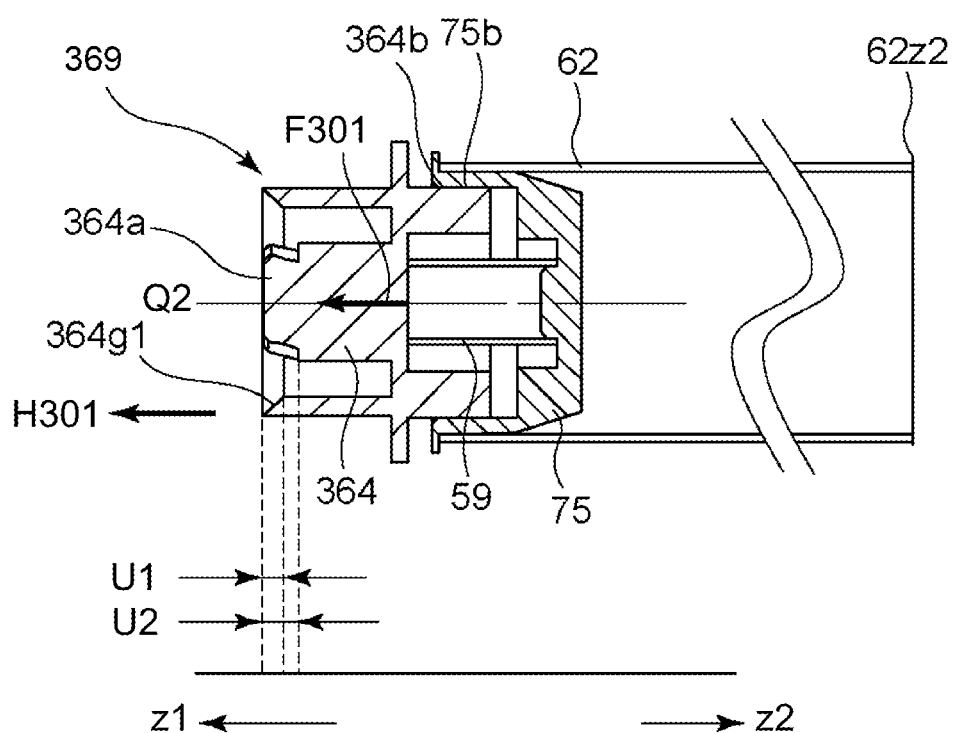
FIG. 16 is a sectional view of a photosensitive drum and the coupling member.
Figure 17:
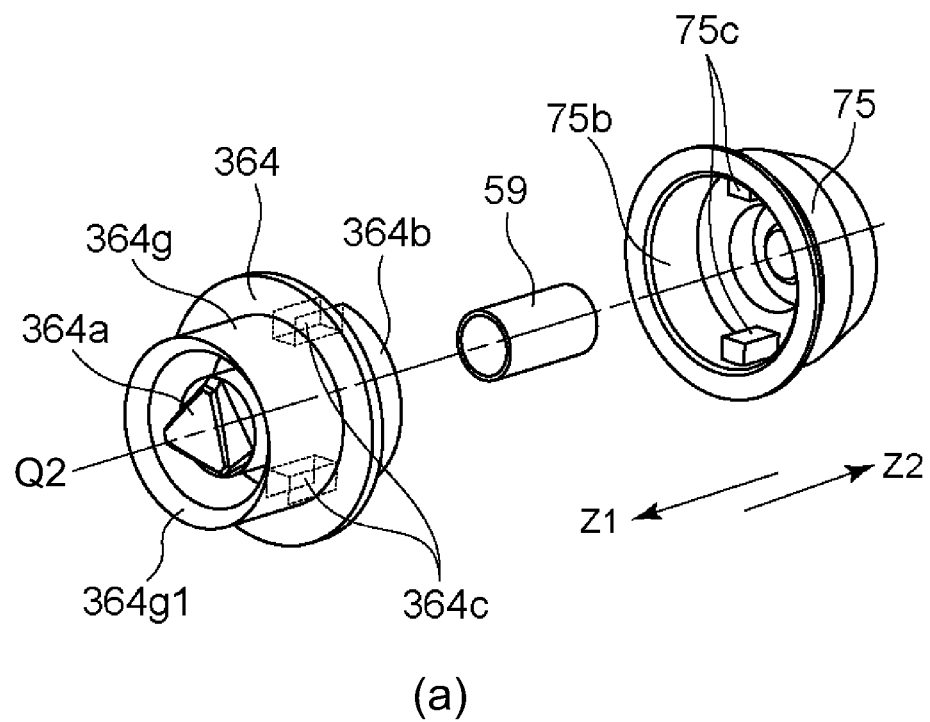
FIG. 17 is an exploded view of a ring member.
Figure 17:
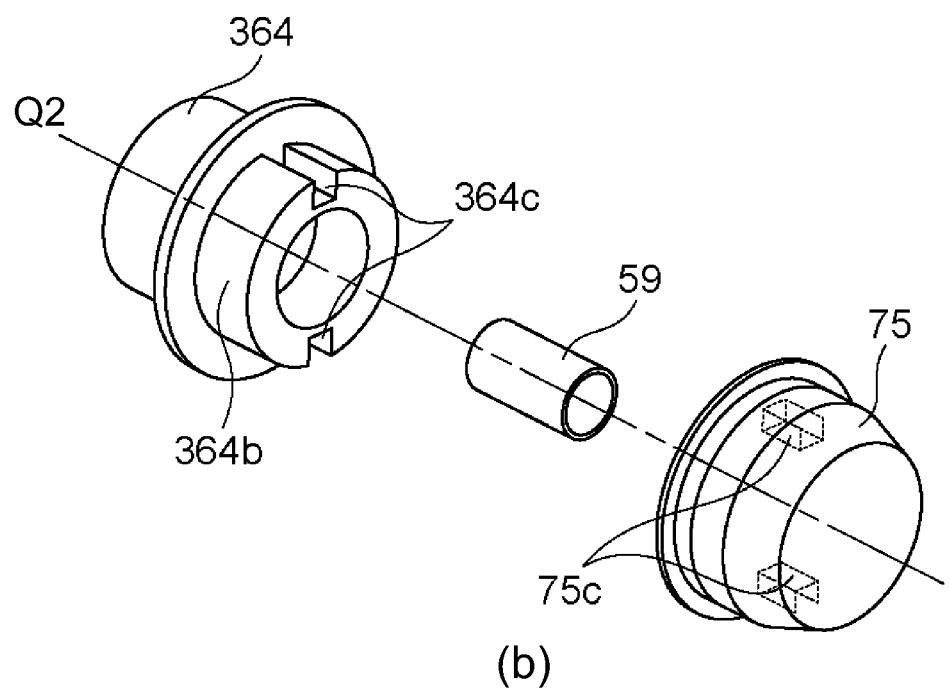

Referring first to FIGS. 16 to 17, the driving side flange unit 369 will be described. FIG. 16 is a cross-sectional view of the driving side flange unit 369. FIG. 17 is an exploded perspective view of the driving side flange unit 369.

As shown in FIG. 16, a drive-side flange member 75, a coupling member 364, and a first pressing member 59 are provided at the drive-side end of the drum 62. The drive side flange member 75 is fixed to the drum 62 by means such as press fitting or clamping. Further, in the coupling member 364, the supported portion 364b is fitted and supported by the coupling support portion 75b of the drive side flange member 75, and is movable in the rotation axis Q2 direction of the drum 62. Further, the first pressing member 59 is provided between the driving side flange member and the coupling member 364, to press the coupling member 364 in the direction of arrow H301 with the pressing force F301. The coupling member 364 is provided with the driven transmission portion (input coupling portion) 364a which engages with the drive transmission portion (output coupling portion) 81e (see FIG. 4) of the drive transmission member 81. Further, the coupling member 364 has a cylindrical portion 364g so as to surround the non driving driven side transmission portion 364a. The free end of the cylindrical portion has an inclined surface (inclined portion) 364g1. The inclined surface 364g1 is at a position away from the axis Q2 of the driven transmission portion 364a and has a tapered shape which opens outward in the longitudinal direction.

In addition, the coupling member 364 is provided with a groove-shaped drive transmission portion pair 364c recessed from the supported portion 364b. On the other hand, the coupling support portion 75b of the drive side flange member 75 is provided with a pair of driven transmission portions 75c having a projection shape which enters the pair of the drive transmission portion 364c. By this, the drive transmission portion pair 364c comes into contact with the driven transmission portion pair 75c, so that the driving force is transmitted from the coupling member 364 to the drive side flange member 75.

Subsequently, referring to Figure, the cleaning unit 60 including the drive-side flange unit 369 described above will be described.

Figure 18:
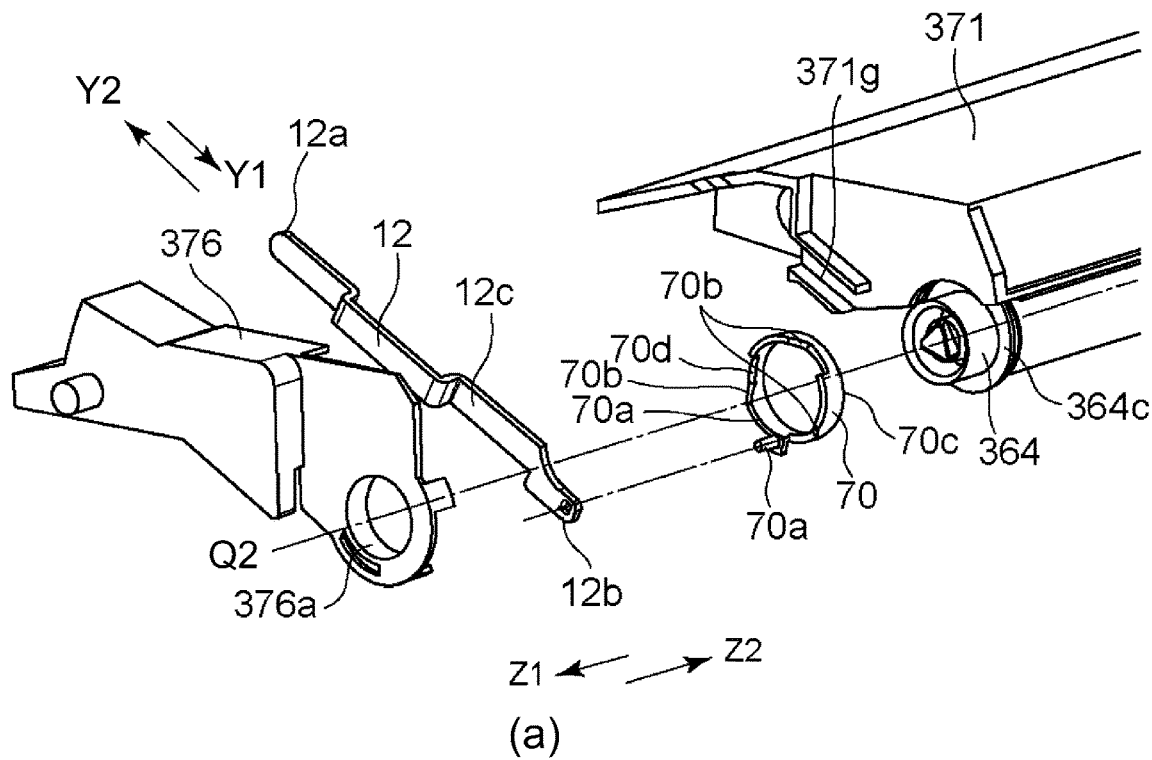
FIG. 18 is a partially exploded view of the cartridge.
Figure 18:
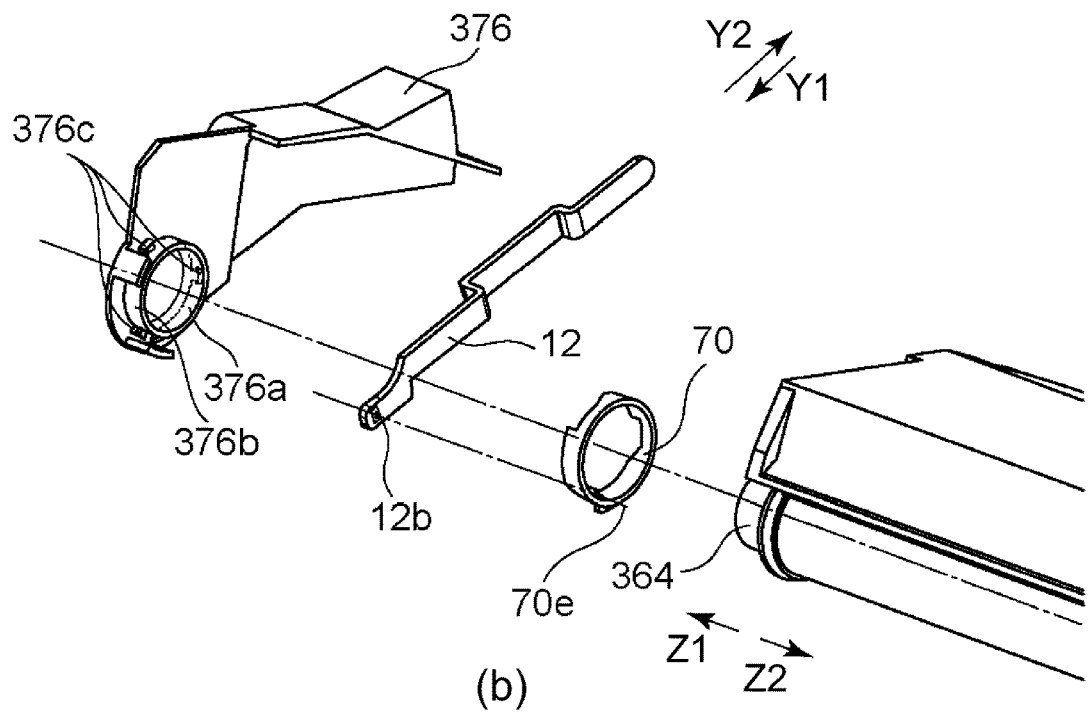

FIG. 18 is a partial perspective view illustrating the structure of the drive side of the cleaning unit 60 according to this embodiment.

As shown in FIG. 18, the side member 376 has a cylindrical inner peripheral surface 376a which supports the coupling member 364, a cylindrical outer peripheral surface 376b which supports a cam member 70 (which will be described hereinafter), and a projection 376c projecting outward from the cylindrical outer peripheral surface. Further, a lever member (operation member) 12 and a cam member 70 are provided between the driving side flange unit 369 and the side member 376.

The lever member 12 comprises an abutting portion 12a provided on one end side, an engaged portion 12b provided on the other end side, a slide supporting portion 12c connecting the abutting portion 12a and the engaged portion 12b, and the like. The cam member 70 is a ring-shaped member including a supported portion 70e which is a cylindrical inner peripheral surface. Further, the cam member 70 has an inner end surface 70c on the inner side in the longitudinal direction, a first surface 70a on the outer side in the longitudinal direction, a second surface 70d parallel with the first surface 70a and recessed inward in the longitudinal direction from the first surface 70a, and an inclined surface 70b which smoothly connects the first surface 70a and the second surface 70d is provided.

The lever member 12 is disposed such that the slide supporting portion 12c is placed between slide ribs 371g provided on the cleaning frame 371, and is supported so as to be movable in the directions of arrows Y1 and Y2 relative to the cleaning frame 371. The supported portion 70e of one of the advancing/retracting cam members 70 fitted with the cylindrical outer peripheral portion 376b of the side member 376, and is supported by the side member 376 so as to be rotatable and movable in the axis Q2 direction.

Subsequently, referring to FIGS. 18 and 19, the interrelated operation of the lever member 12, the cam member 70, and the coupling member 376 will be described.

Figure 19:
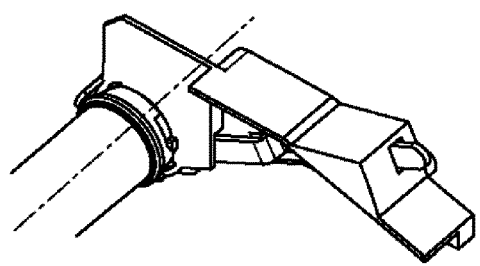
FIG. 19 is an illustration of the cartridge.
Figure 19:
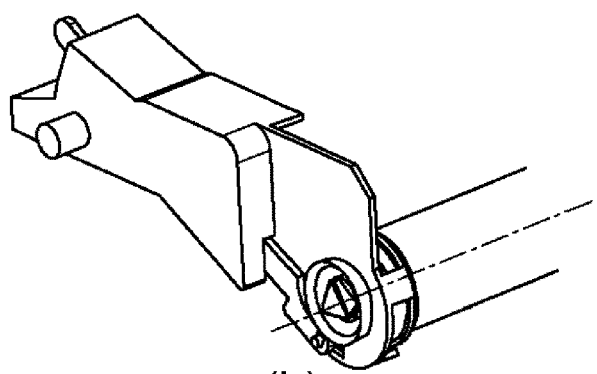
Figure 19:
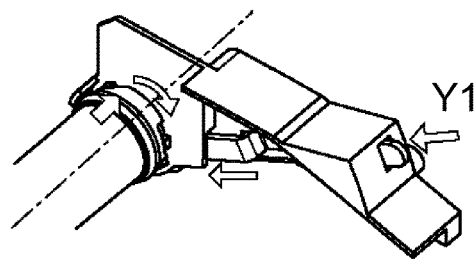
Figure 19:
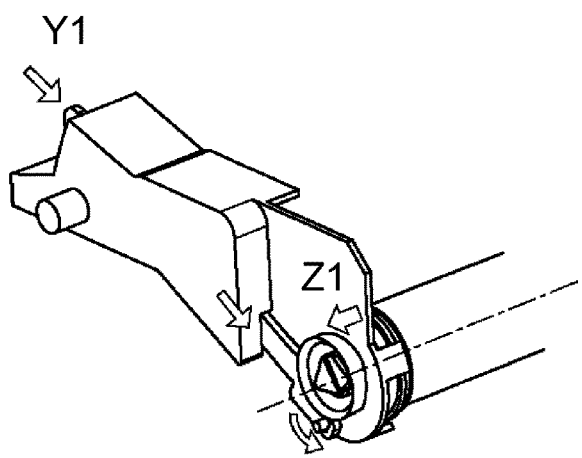
Figure 19:
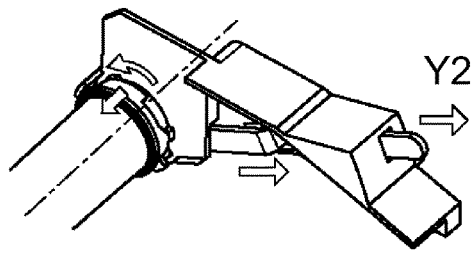
Figure 19:
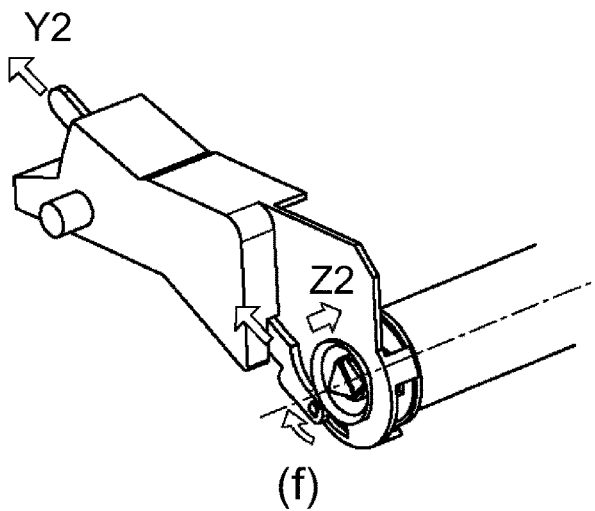

FIG. 19 is an illustration of the interrelated operation between the lever member 12 and the coupling member 364.

First, the engaged portion 12b provided at one end of the lever member 12 is engaged with the lever member engaging portion 70a of the advancing/retracting cam member 70. By this, the movement of the lever member 12 in the directions of arrows Y1 and Y2 and the rotation of the cam member 70 are interrelated. The lever member 12 is an operating member operated to move the coupling member 364 forward and backward in the axial direction.

When the user moves the lever member 12 in the direction of the arrow Y1, the effect is as follows. As a result of the movement of the arrow Y1 of the lever member 12, the cam member 70 rotates counterclockwisely in part (a) of FIG. 18 (clockwise in part (b)) of FIG. 18. Then, the portion of the cam member that contacts the projection 376c of the side member 376 moves from the first surface 70a to the second surface 70d by way of the inclined surface 70b. By this, the cam member 70 moves in the direction of arrow Z1 together with the coupling member 364 while using the urging force of the first pressing member 59 (see FIG. 16).

On the contrary, when the user moves the lever member 12 in the direction of the arrow Y2 opposite to the direction of the arrow Y1, the cam member 70 rotates in the direction opposite to that described above, and the coupling member 364 moves in the direction of arrow Z2 against the urging force of the first pressing member. In other words, the coupling member 364 moves toward the outside of the photosensitive drum, that is, in the direction in which the free end of the coupling member 364 moves away from the photosensitive drum.

As described above, the movements of the lever member 12 in the arrows Y1 and Y2 directions and the movements of the coupling member 364 in the arrows Z1 and Z2 directions are interrelated with each other by way of the cam member 70.

Figure 20:
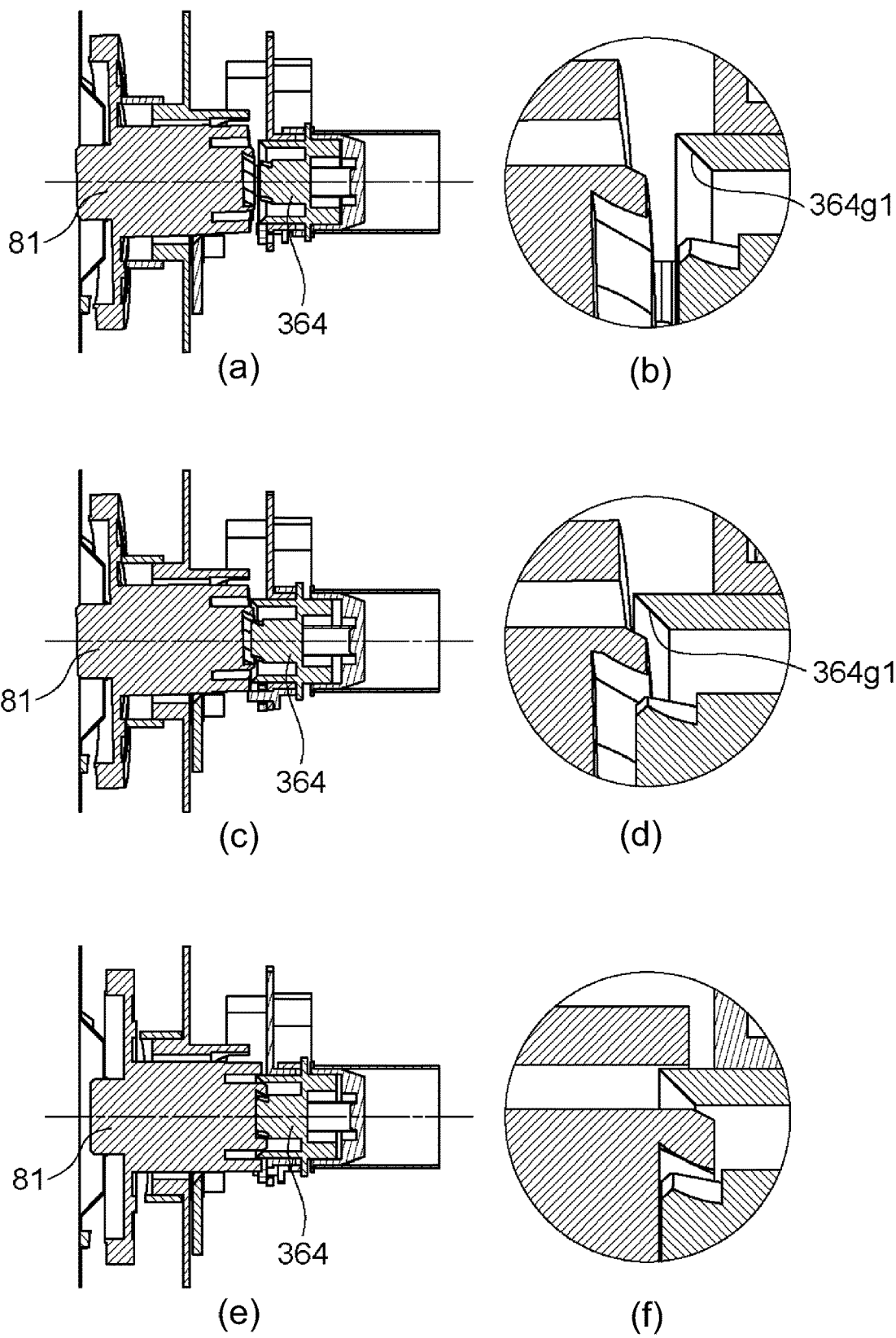
FIG. 20 is an illustration of a drive transmission member 81.

Referring to FIG. 20, a structure in which the cleaning unit 60 having the above structure is mounted in the apparatus main assembly A and the drive of the drive transmission member 81 and the coupling member 364 is connected will be described.

FIG. 20 is a sectional view illustrating how the coupling member 364 is connected to the drive transmission member 81.

First, the lever member 12 is moved in the direction of arrow Y2 before mounting the cartridge B to the apparatus main assembly A. Then, as described above, the coupling member 364 is in a state of having been moved in the direction of arrow Z2. When the cartridge B is mounted on the apparatus main assembly A in this state kept, as shown in part (a) of FIG. 20 and part (b) of FIG. 20, the coupling member 364 takes a position separated from the drive transmission member 81 in the longitudinal direction. At this time, the large gear is inclined in the arrow N1 direction as in the above-described embodiment. When the lever member 12 is moved in the direction of arrow Y1 from this state, the coupling member 364 moves in the direction of arrow Z1 shown in FIG. 18 thereby, as shown in part (c) of FIG. 20 and part (d) of FIG. 20. As a result, the inclined surface 364 approaches the slope surface 81h of the drive transmission member 81. Thereafter, the inclined surface 364 of the coupling member 364 comes into contact with the slope surface 81h of the drive transmission member 81, so that the inclination angle of the drive transmission member 81 decreases. Then, as shown in part (e) of FIG. 20 and part (f) of FIG. 20, the inclined surface 364g1 enters a slit portion 81g of the drive transmission member 81 while reducing the inclination angle of the drive transmission member 81. Finally, the recess 81e of the drive transmission member 81 and the driven transmission portion 364a are engaged with each other (see FIGS. 20E and 20F).

On the contrary, when the cartridge B is to be removed from the apparatus main assembly A, the lever member 12 is moved in the direction of the arrow Y2. Then, the coupling member 364 moves in the direction of arrow Z2, disengages from the drive transmission portion, and finally returns to the states shown in part (a) of FIG. 20 and part (b) of FIG. 20. By this, the cartridge B can be removed from the apparatus main assembly A.

As described above, according to this embodiment, by moving the coupling member 364 in the longitudinal direction (axial direction) by way of the lever member 12, the drive transmission member 81 of the apparatus main assembly A and the coupling member 364 can be engaged and disengaged relative to each other as desired.

In this embodiment, the lever member 12 is moved by the user's manual operation in the present embodiment, but an urging member such as a spring which urges the lever member 12 to move it in the direction of arrow Y2 may be provided. In addition, as shown in FIG. 21, a portion (cartridge pressing member 1) for moving the lever member 12 in the direction of the arrow Y1 may be provided on the opening/closing door of the apparatus main assembly A.

Figure 21:
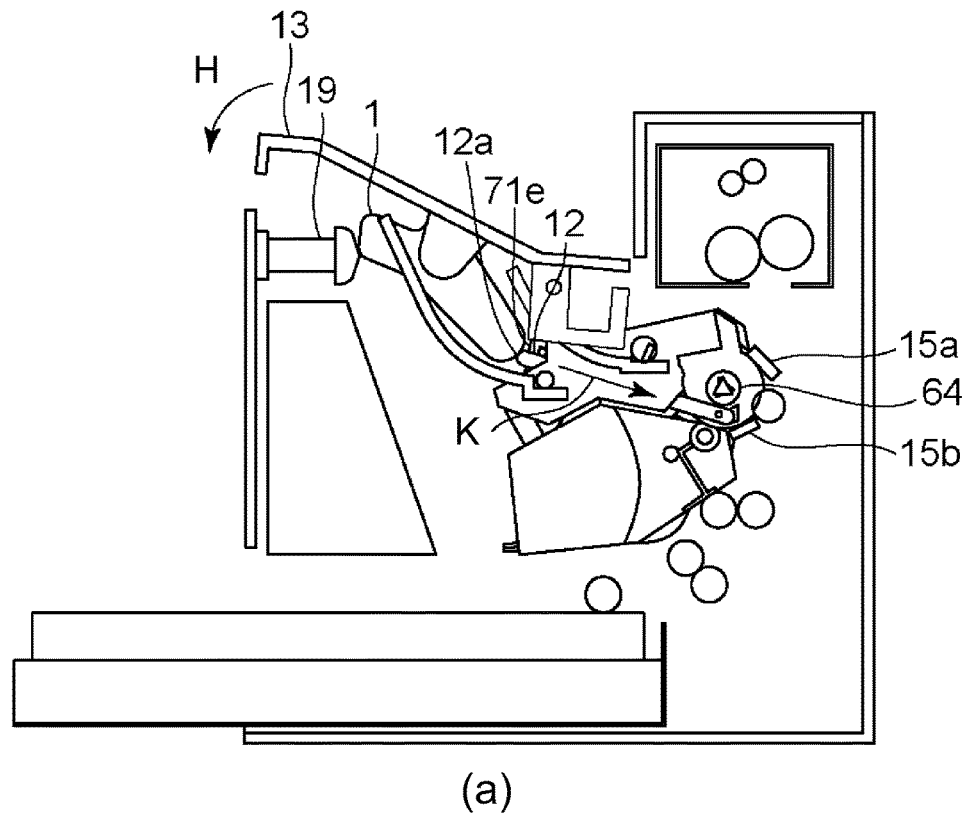
FIG. 21 is a sectional view of the image forming apparatus.
Figure 21:
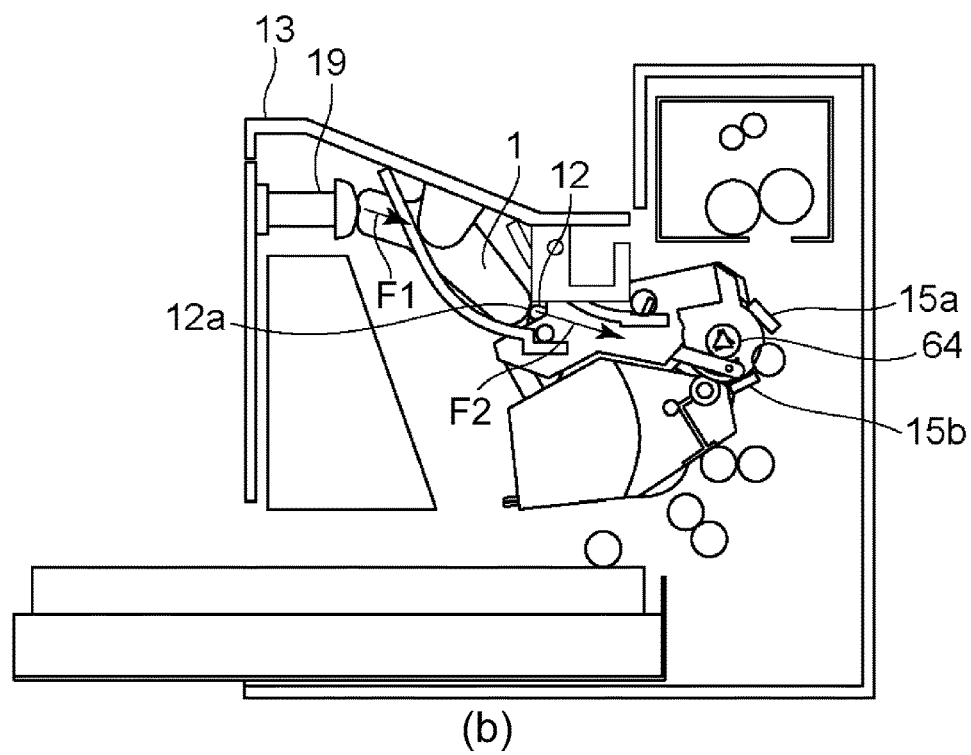

In FIG. 21, the cartridge pressing member 1 interrelated with the opening/closing door 13 presses not only the cartridge but also the lever member 12 as the opening/closing door 13 closes. With this operation, the lever member 12 moves in the direction of arrow Y2 relative to the frame of the cartridge. With such a structure, the user does not need to operate the lever member 12 when mounting/dismounting the cartridge B, so that usability is improved.

The structure of the cartridge B of this embodiment is summarized as follows.

In this embodiment, the coupling member (engagement member, movable member, advance/retract member) 364 which can be coupled with the drive transmission member 81 can advance/retract in the axial direction of the photosensitive drum. That is, as shown in FIG. 20, the coupling member 364 can move between the position retracted toward the inside of the photosensitive drum 62 and the position advanced toward the outside of the photosensitive drum 62. In this embodiment, the coupling member 364 moves linearly in parallel with the axis of the photosensitive drum, but it is not always necessary. If the moving direction of the coupling member 364 has a component in the axial direction, the coupling member 364 can be considered as moving in the axial direction.

The coupling member 364 and the photosensitive drum 62 are portions of the drum unit.

The coupling member 364 has a cylindrical portion 364g in addition to a projection as a driven transmission portion (input coupling portion) 364a, and has an inclined surface (inclined portion) 364g1 in the neighborhood of the free end of the cylindrical portion 364g (See part (a) of FIG. 17). When the coupling member 364 advances and retracts, the inclined portion 364g1 moves in the axial direction (directions of arrows z1 and z2 in part (a) of FIG. 17 together with the driven transmission portion 364a. That is, the inclined portion 364g1 and the driven transmission portion 364a move integrally.

Therefore, when the coupling member 364 moves from the retracted position to the advanced position, the inclined portion 364g1 advances toward the outside of the photosensitive drum together with the driven transmission portion 364a, that is, in the direction approaching the drive transmission member 81. With this movement, the inclined portion 364g1 comes into contact with the drive transmission member 81 to reduce the inclination angle of the drive transmission member (see part (c) of FIG. 20, part (d) of FIG. 20, part (e) of FIG. 20 and part (f) of FIG. 20). Therefore, the recess 81e of the drive transmission member 81 can be reliably engaged with the driven transmission portion 364a of the coupling member 364.

In this embodiment, the inclined portion 364g1 for reducing the inclination angle of the drive transmission member 81 is arranged in a circumferential shape so as to surround the entire circumference of the driven transmission portion 364a (see part (a) of FIG. 17. That is, the coupling member 364 has a cylindrical portion 364g which surrounds the driven transmission portion (drive input portion, drive force receiving portion), and has an inclined portion 364g1 in the neighborhood of the free end of the cylindrical portion 364g. Therefore, regardless of the phase of the coupling member 364, the inclined portion 364g1 certainly comes into contact with the drive transmission member 81.

However, the structure is not limited to such a structure, and a structure in which the inclined portion 364g1 is arranged only in a specific portion can be considered. For example, if the coupling member 364 is held so as to have a predetermined phase when the coupling member 364 is stopped, the inclined portion 364g1 can be placed at a specific position where it can come into contact with the drive transmission member 81.

Further, in this embodiment, the inclined portion 364g1 is placed at a position overlapping with the driven transmission portion 364a in the axial direction. That is, as shown in part (a) of FIG. 16, when the inclined portion 364g1 and the driven transmission portion 364a are projected on a straight line parallel to the axis Q2, the projection area U1 of the inclined portion 364g1 and the projected area U2 of the driven transmission portion 364a overlap each other at least partially. However, similarly to the Embodiment 1, the inclined portion 364a1 of this embodiment may be placed outside the driven transmission portion 364a in the axial direction (the arrow z1 side shown in part (a) of FIG. 16. That is, the inclined portion 364g1 may be placed at a position more remote from the end portion 62z2 on the non-driven side of the photosensitive drum 62 than the driven transmission portion 364a.

The cartridge B further includes the lever member as an operating member for moving the coupling member 364. The end of the lever member 12 projects rearwardly of the cartridge (FIG. 21). In the rear side of the cartridge B, the lever member 12 moves toward the front of the cartridge by receiving an external force. With this movement, the coupling member 364 moves from the retracted position to the advanced position.

The structure of this embodiment is summarized below.

The image forming apparatus main assembly A includes a tiltable drive transmission member (drive output member) 81 capable of outputting a driving force (see FIGS. 3 and 4).

On the other hand, the cartridge has a photosensitive drum 62 and a coupling member 364 (see FIGS. 3 and 18).

The coupling member 364 is a drive input member disposed near the drive-side end (first end) of the photosensitive drum and is connected to the photosensitive drum so that the driving force can be transmitted toward the photosensitive drum. In addition, the coupling member 364 is a movable member which can move in the axial direction of the photosensitive drum (see FIG. 19).

The coupling member 364 includes the driven drive transmission member (driving force receiving portion, engaging member) 364e engaged with the recess (output coupling portion) 81e (FIG. 4) provided at the free end of the drive transmission member 81 to receive the driving force (part (a) of FIG. 17). The coupling member 364 is an engaging member which can engage with the drive transmission member 81.

The driven transmission portion 364e is a projection having a shape corresponding to the recess 81e (part (a) of FIG. 17). The driven transmission portion 364e is extended along the axes Q2 of the coupling member and the photosensitive drum 62. That is, the driven transmission portion 364e is placed on the axis Q2.

In addition, the coupling member 364 has the inclined portion 364g1. The inclined portion 364g1 is a member which can be integrally moved with the driven transmission portion 364e. That is, when the coupling member 364 moves in the axial directions Z1 and Z2, the driven transmission portion 364e and the inclined portion 364e move together in the axial directions Z1 and Z2 (see FIG. 19). Similarly, when the coupling member 364 is rotationally driven, the inclined portion 364g1 and the driven transmission portion 364e rotate together.

In this embodiment, the inclined portion 364g1 is placed at the edge of the cylindrical portion 364g.

The inclined portion 364e is located more remote from the axis of the coupling member 364 than the driven transmission portion 364e (FIG. 16 and part (a) of FIG. 17).

When the coupling member 364 moves toward the drive transmission member 81, the inclined portion 364g1 reduces the inclination angle of the drive transmission member 81 by contacting the drive transmission member 81. By this, the driven transmission portion 364e can enter the inside of the recess 81e of the drive transmission member 81 (see FIG. 20). That is, the coupling member 364 of the cartridge becomes connectable with the drive transmission member 81.

In order to change the inclination angle of the drive transmission member 81, the inclined portion 364g of the coupling member 364 is as follows. When the distance measured from the axis of the photosensitive drum to the inclined portion 364g along the direction perpendicular to the axis increases (becomes longer) as the distance from the non-driving side increases. As shown in FIG. 16, the left side of the inclined portion 364g1 is located more remote with respect to the axis Q2 than the right side of the inclined portion 364g1. Here, the left side of FIG. 16 is the drive side of the cartridge, and the right side is the non-drive side of the cartridge.

That is, the inclined portion 364g1 is more away from the axis Q2 as it is away from the non-driving side end portion (second end portion) 62z2 of the photosensitive drum 62 (see FIG. 16).

In this embodiment, the coupling member 364 can be considered as being a pressing member (urging member) on the cartridge side which presses and urges the drive transmission member 81 by the inclined portion 364g1 to reduce the inclination angle of the drive transmission member 81.

The coupling member 364 performs two functions, namely a drive input member for receiving a driving force from the drive output member 81, and a pressing member which presses the drive output member 81. However, the coupling member 364 does not necessarily have to perform two functions, and, for example, a structure in which the coupling member 364 serves only as the pressing member can be considered. In such a case, a drive input member may be additionally provided on the cartridge. That is, as described above referring to FIG. 15 and so on, it will suffice if the cartridge B has a gear member 187 which is engageable with the gear portion 81f (see FIG. 4) provided on the outer peripheral surface of the drive output member 81. The method of connecting the gear member 187 with the photosensitive drum 62 so as to be capable of drive-transmission is as described above referring to FIG. 22 and so on.

In this embodiment, when the gear member 187 is provided on the cartridge, the gear member 187 does not need to be movable in the direction perpendicular to the axis thereof. This is because the inclination angle of the drive output member 81 is reduced by contacting the inclined portion 364g1, and it is sufficient to dispose the gear member at a position where it can engage with the drive output member 81 in the state thereof.

When the photosensitive drum 62 is rotated by the driving force received by the gear member 187, the driven transmission portion 364e of the coupling member 364 does not need to receive the driving force from the drive transmission member 81. That is, it is also possible to omit the driven transmission portion 364e from the coupling member 364 as the pressing member. However, the drive transmission portion 364e also functions as an engagement portion for positioning the drive transmission member 81 relative to the cartridge by engaging with the recess 81e (see FIG. 4) of the drive transmission member 81. Therefore, it is preferable that the coupling member 364 as the pressing member is provided with the driven transmission portion 364e as the engaging portion. In order to structure the driven transmission portion 364e as a mere engaging portion which engages with the drive transmission member 81 but does not receive the driving force, the shape of the driven engagement portion 364e may be changed. For example, if the shape of the driven transmission portion 364e is changed to a cylindrical projection, the driven transmission portion 364e is a mere engaging portion which does not receive a driving force even when engaged with the recess 81e of the drive transmission member 81.

It is also conceivable that the cartridge has both the coupling member 364 and the gear member 187 as the drive input member.

Embodiment 4

In this embodiment, the drive transmission member 481 and the coupling member 464 are coupled by pushing down a pressing member (main assembly side pressing member, main body side urging member) 412 which is a member for inclining the drive transmission member (drive output member) 481.

Figure 23:
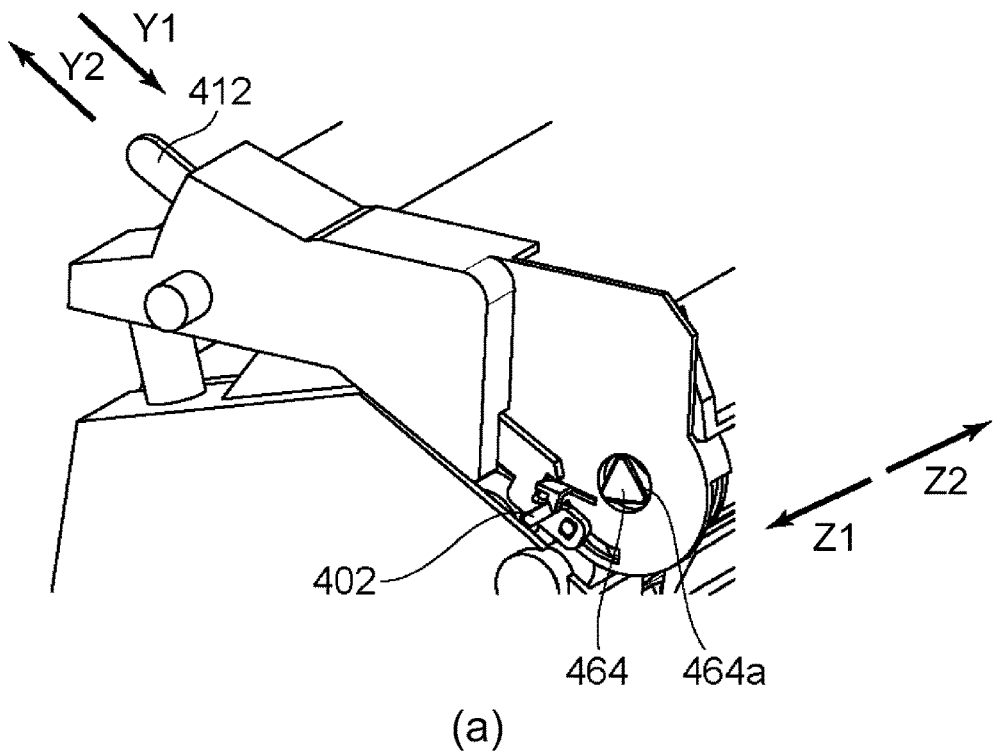
In FIG. 23, part (a) is a perspective view of the cartridge, and part (b) is an enlarged view of the cartridge.
Figure 23:
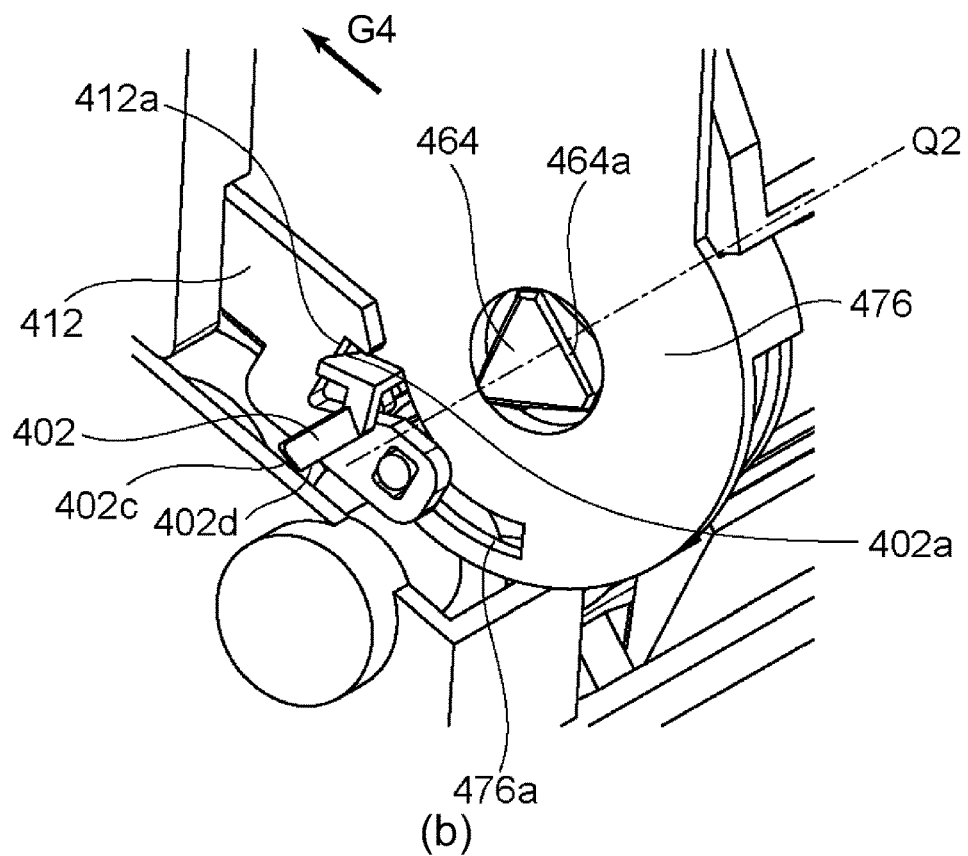
Figure 24:
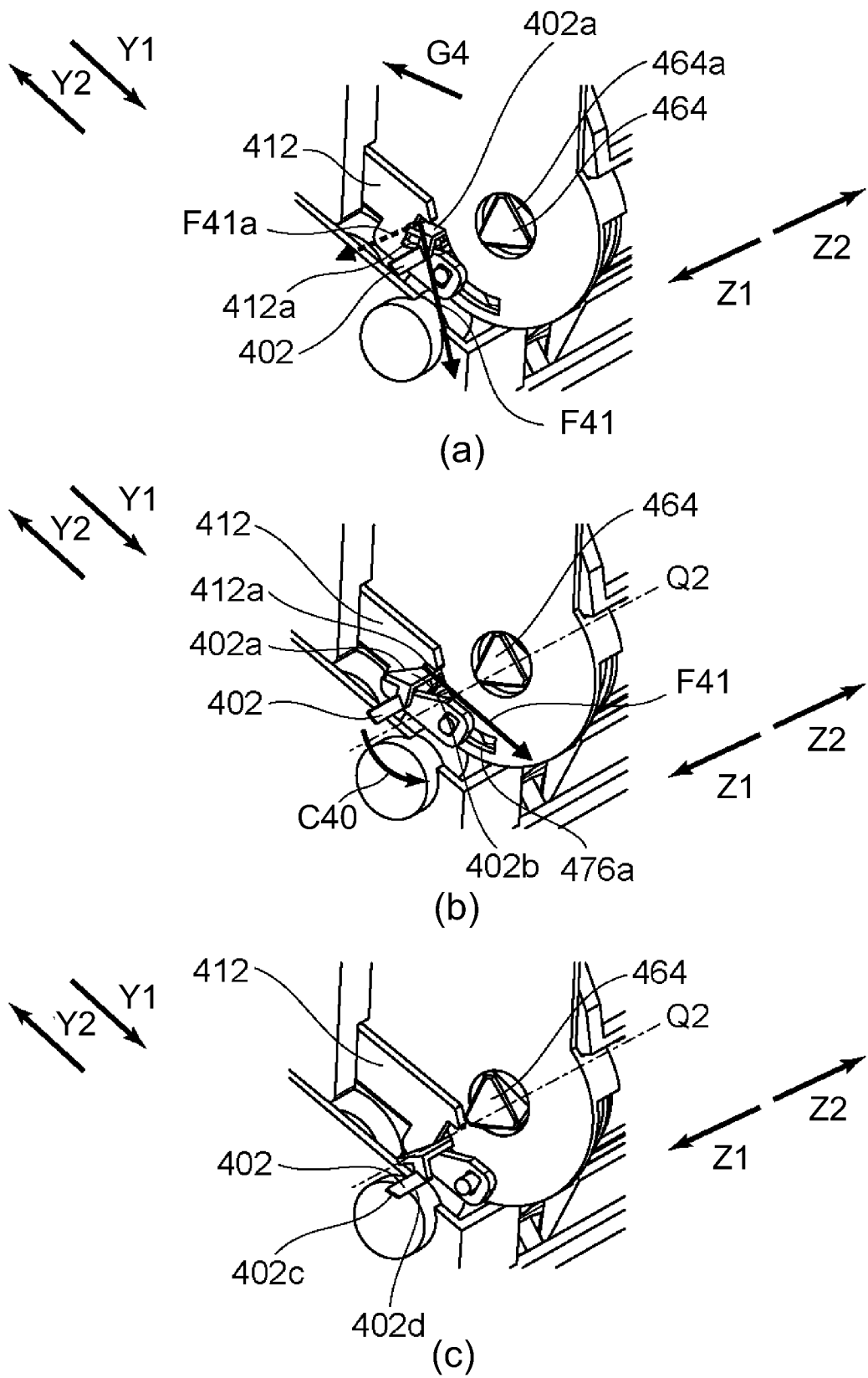
FIG. 24 is an enlarged view of the coupling member.

Part (a) of FIG. 23 is a perspective view of the cartridge in this embodiment. Part (b) of FIG. 23 and FIG. 24 are enlarged views of the neighborhood of the coupling member 464 of FIG. 23. Part (a) of FIG. 24 shows a state in which the lever member 412 has most been moved in the direction of arrow Y2. Part (b) of FIG. 24 shows the attitude when the lever member 412 is moved in the direction of arrow Y1 from this state, and part (c) of FIG. 24 shows the attitude when the lever member 412 is further moved in the direction of arrow Y1 from the state.

By the same structure as in FIG. 18 in the above-described embodiment, the movements of the lever member 412 and the coupling member 464 are linked. That is, when the lever member 412 is moved in the direction of arrow Y1, the coupling member 464 moves in the direction of arrow Z1, and when the lever member 412 is moved in the direction of arrow Y2, the coupling member 464 moves in the direction of arrow Z2. A chamfered portion (inclined portion) 464a is provided at the free end of the coupling member 464.

Further, in this embodiment, the operations of the lever member 412 and the push-down member (cartridge-side pressing member, cartridge-side urging member) 402 are also interrelated. As shown in part (b) of FIG. 23, a side member 476 is provided with a circumferential slit 476a having a center at the rotation axis Q2 of the drum, and the push-down member 402 provided in the slit 476a so as to be rotationally movable along the slit 476a. Further, the push-down member 402 is urged in the direction of arrow G4 by a spring (not shown). On the other hand, the lever member 412 is provided with a guide portion 412a, which is in contact with the first guided portion 402a of the push-down member 402.

Here, the lever member 412 is moved in the direction of arrow Y1 in the state shown in part (a) of FIG. 24. The push-down member 402 is urged in the direction of the arrow G4, and therefore, the first guided portion 402a receives the contact force F41. Since the first guided portion 402a is tapered, the contact force F41 has a component force F41a in the direction of arrow Z1. As a result, the push-down member 402 is guided by the guide portion 412a of the lever member 412 at the first guided portion 402a, and moves in the direction of the arrow Z1. As a result, the state shown in part (b) of FIG. 24 is reached. At this timing, the coupling member 464 is not moving from the position shown in part (a) of FIG. 24.

In addition, when the lever member 412 is moved in the direction of the arrow Y1, the second guided portion 402b receives the contact force F42. The second guided portion 402b is not a tapered surface unlike the first guided portion 402a, and therefore, the contact force F42 does not have a component force in the direction of arrow Z1. As a result, the guide portion 412a of the lever member 412 guides the second guided portion 402b of the push-down member 402, so that the push-down member 402 rotates along the slit 476a in the direction of arrow C40 about the rotation axis Q2 of the drum 62.

Simultaneously with or after the movement of the push-down member 402 in the C40 direction, the coupling member 464 moves in the direction of arrow Z1 by the same mechanism as in the above-described embodiment, and as a result, the state shown in Figure (c) is reached. In this embodiment, the coupling member 464 and the push-down member 402 can be controlled at any given timing, by guiding the coupling member 464 using the cam member 70 (see FIG. 18) and by guiding the push-down member 402 using the lever member 412.

Figure 25:
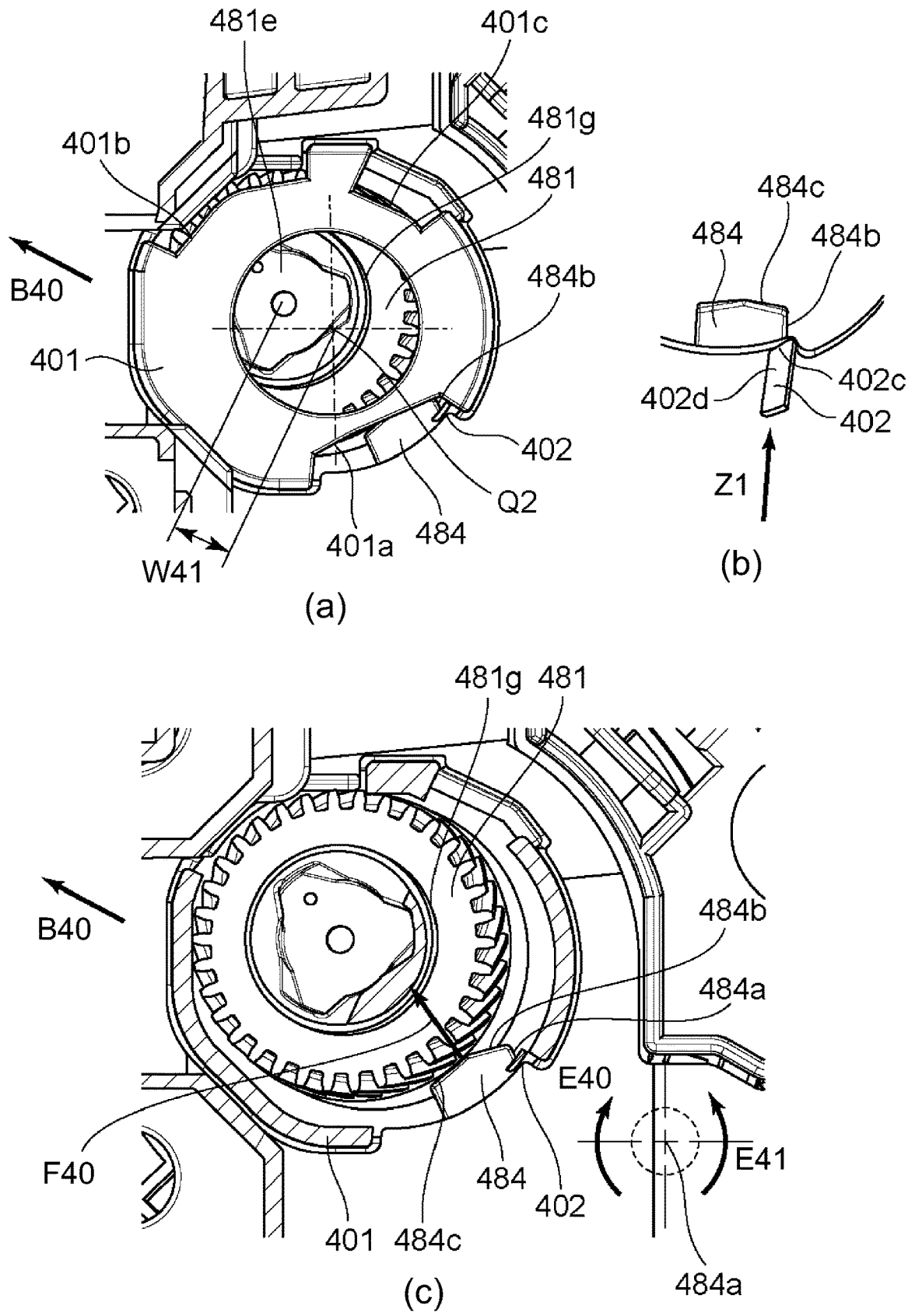
FIG. 25 is an illustration of the drive transmission member.
Figure 85:
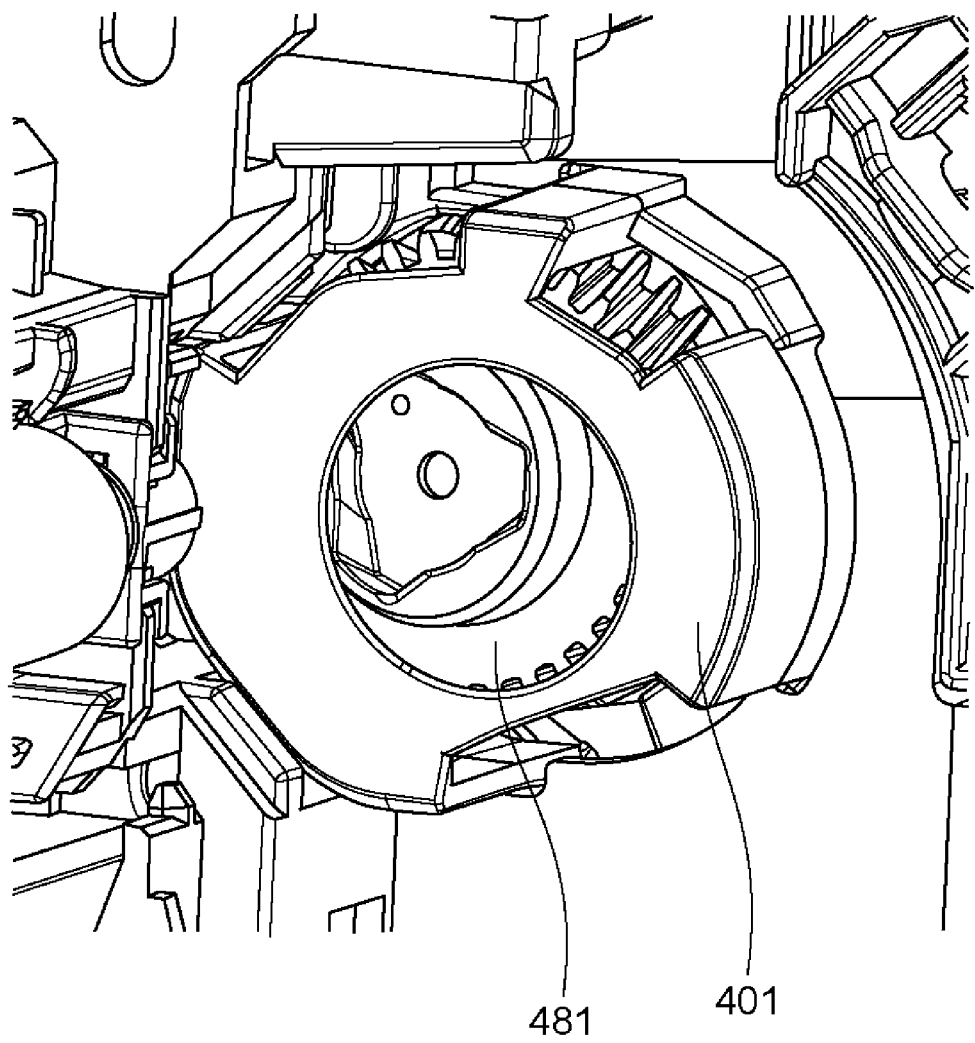
FIG. 85 is an illustration of the drive transmission member and the cover member.

Next, the structure of the drive transmission member 481 according to this embodiment will be described. FIG. 85 and part (a) of FIG. 25 are side views showing the appearance of the drive transmission portion of the apparatus main assembly A in this embodiment, and part (c) of FIG. 25 is a cross-sectional view showing the support structure of the drive transmission member 481 inside the cover member 401. As shown in FIG. 85, in this embodiment, the drive transmission member 481 is partially covered with the cover member 401. This is to protect the drive transmission member 481 so that the user does not touch the drive transmission member 481.

As shown in part (c) of FIG. 25, as in the above-described embodiment, the pressing member 484 is urged in the direction of arrow E40 about the rotation axis 484a by an urging spring (not shown). Therefore, the drive transmission member 481 is urged by the pressing member 484 by the contact force F40 to be inclined in the direction of the arrow B40. As shown in part (a) of FIG. 25, in this embodiment, the drive transmission member 481 is covered with a cover member 401. The cover member 401 has three cut-away portions, namely the cut-away portion 401a, cut-away portions 401b, and cut-away portions 401c. This is to uncover a portion of the drive transmission member 481 through the cover member 401. That is, in the drive transmission member 481, the portion necessary for performing the function is uncovered through the cover member 401.

Next, the engagement operation between the drive transmission member 481 and the coupling member 464 will be described. FIG. 25 shows a state immediately after the cartridge B is mounted on the apparatus main assembly A. For simplicity, FIG. 25(a) and part (c) of FIG. 25 show only the push-down member 412 for the cartridge B. Further, part (b) of FIG. 25 shows only the push-down member 402 and the pressing member 484. In this state, as described above, the drive transmission member 481 is inclined in the direction of the arrow B40, and therefore, the recess drive transmission portion 481e provided at the free end is off-set by the amount of misalignment W41 with respect to the axis Q2 of the drum 62.

In this embodiment, as described in the above-described embodiment, the opening/closing door 13 is equipped with a mechanism for pressing the lever member 412. In FIG. 21, the lever member 12 pressed by the pressing member 1 of the opening/closing door 13 corresponds to the lever member 412 in this embodiment. When the opening/closing door 13 is operated to move the lever member 412 of the cartridge B in the direction of arrow Y1 as described referring to FIG. 24, the push-down member moves in the direction of arrow Z1. Then, as shown in part (b) of FIG. 25, when the push-down member 402 moves in the direction of arrow Z1, the free end portion 402c comes into contact with the end portion 484b of the pressing member 484. Since the free end portion 402c of the push-down member 402 is tapered, the pressing member 484 rotates about the axis 484a in the direction of arrow E41 shown in part (c) of FIG. 25 to reach the state shown in part (b) of FIG. 26. As a result, as shown in part (a) of FIG. 26, the drive transmission member 481 is tilted in the direction of arrow B41 with the misalignment amount W42.

Figure 27:
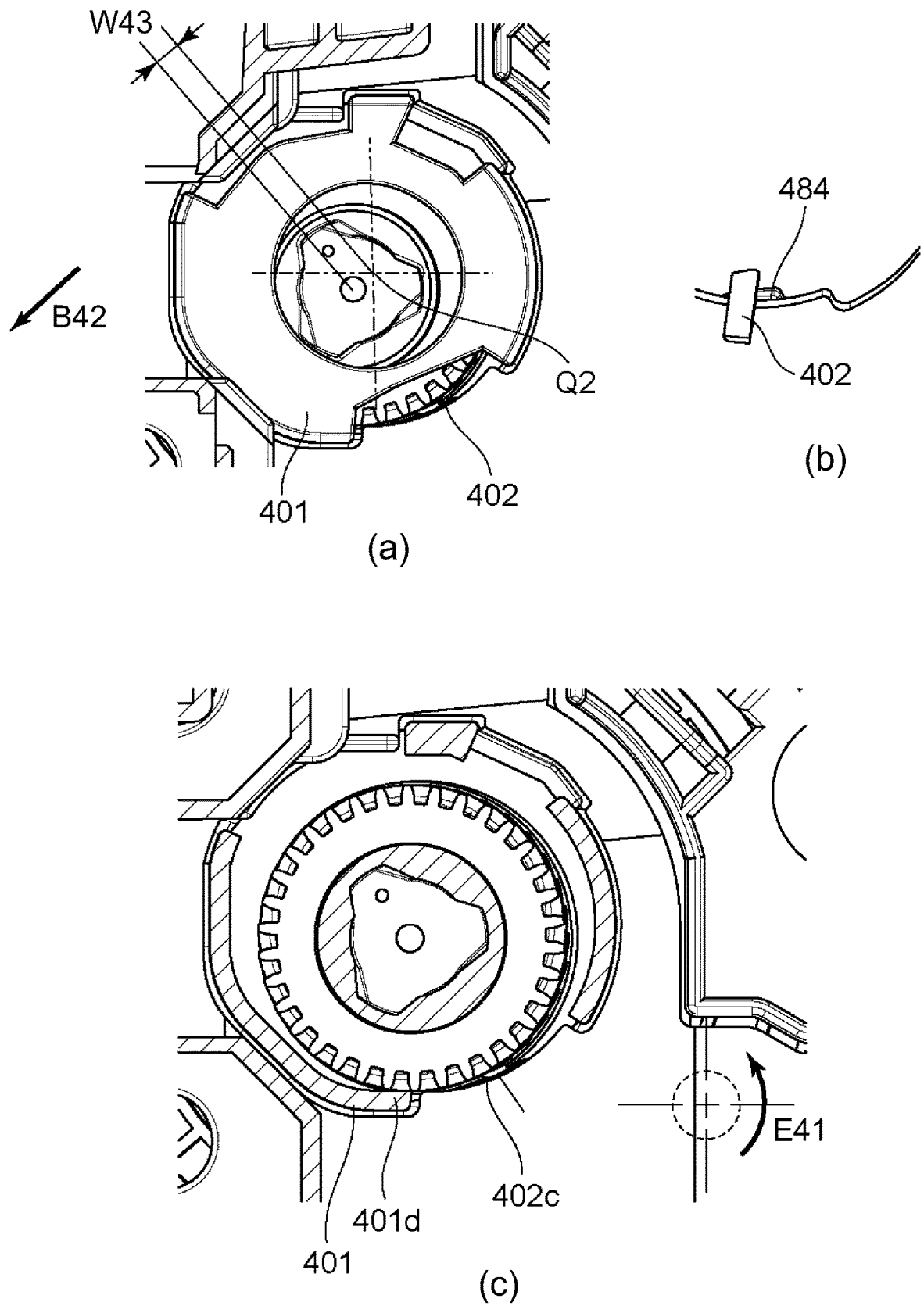
FIG. 27 is an illustration of a drive transmission member.

When the opening/closing door 13 is further closed from here, the lever member 412 further moves in the direction of arrow Y1 (see FIG. 24), and the push-down member rotates around the axis Q2 of the drum in the direction of arrow C40. Therefore, the pressing member 484 further rotates in the direction of arrow E41 to reach the state shown in part (b) of FIG. 27. As a result, the drive transmission member 481 is tilted in the direction of arrow B42 with the misalignment amount W43 as shown in FIG. 27. Here, at the same time, the coupling member moves in the Z1 direction (see FIG. 24) and comes into contact with a chamfered portion 464a as shown in part (a) of FIG. 28. When the coupling member 464 further moves in the direction of arrow Z1 from here, the coupling member 464 is inserted into the drive transmission portion (output coupling portion, recess) 481e of the drive transmission member 481 as shown in part (b) of FIG. 28, and is engaged therewith.

Figure 29:
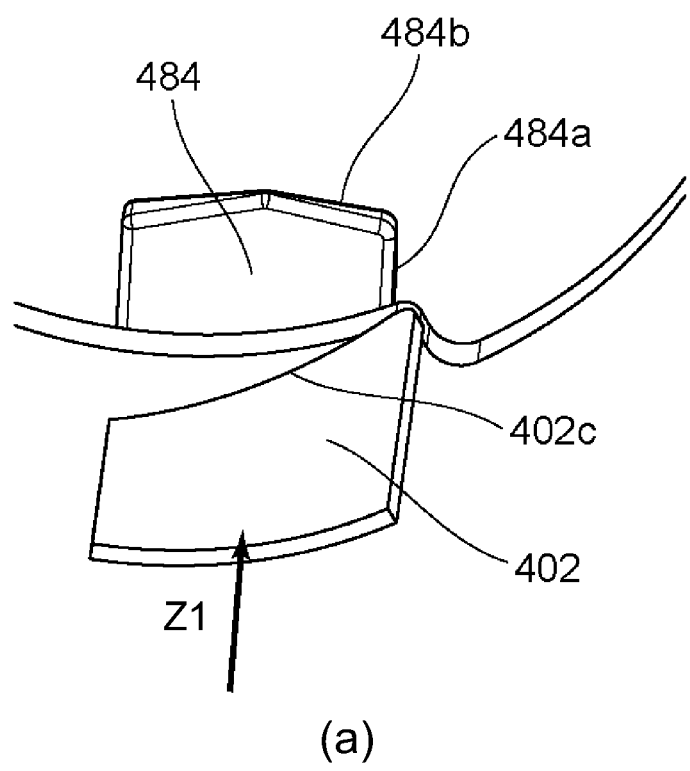
FIG. 29 is an illustration of a pressing member.
Figure 29:
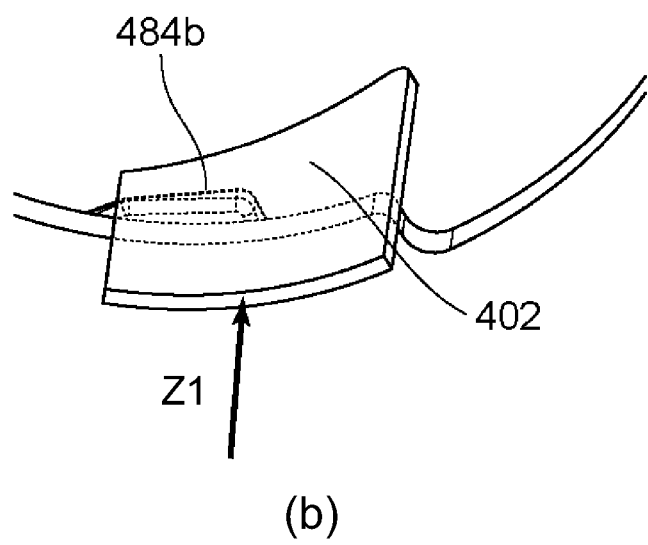

In this embodiment, the push-down member 402 performs a combination of a straight motion as a first motion and a rotary motion as a second motion, but these motions are not limited to the structures described in this embodiment, and can be combined arbitrarily. In addition, it is not always necessary to perform both straight motion and rotary motion. It will suffice if down the pressing member 484 is pushed down (rotated in the direction of arrow E41). For example, as shown in FIG. 29, by enlarging the taper shape 402c, the pressing member 484 can be pushed down only by the advancing/retracting movement in the Z1 direction.

Figure 30:
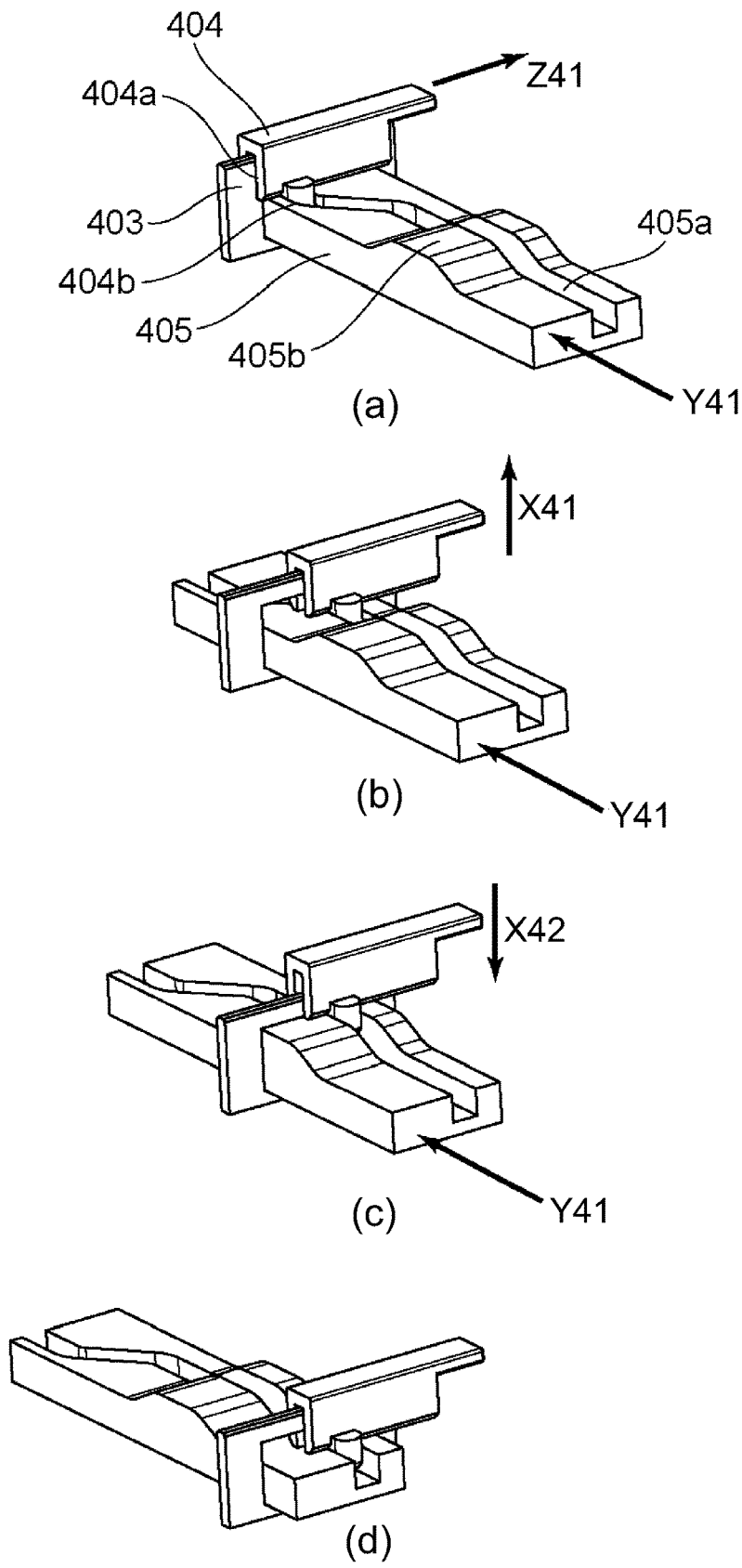
FIG. 30 is an illustration of operation of an acting member.
Figure 31:
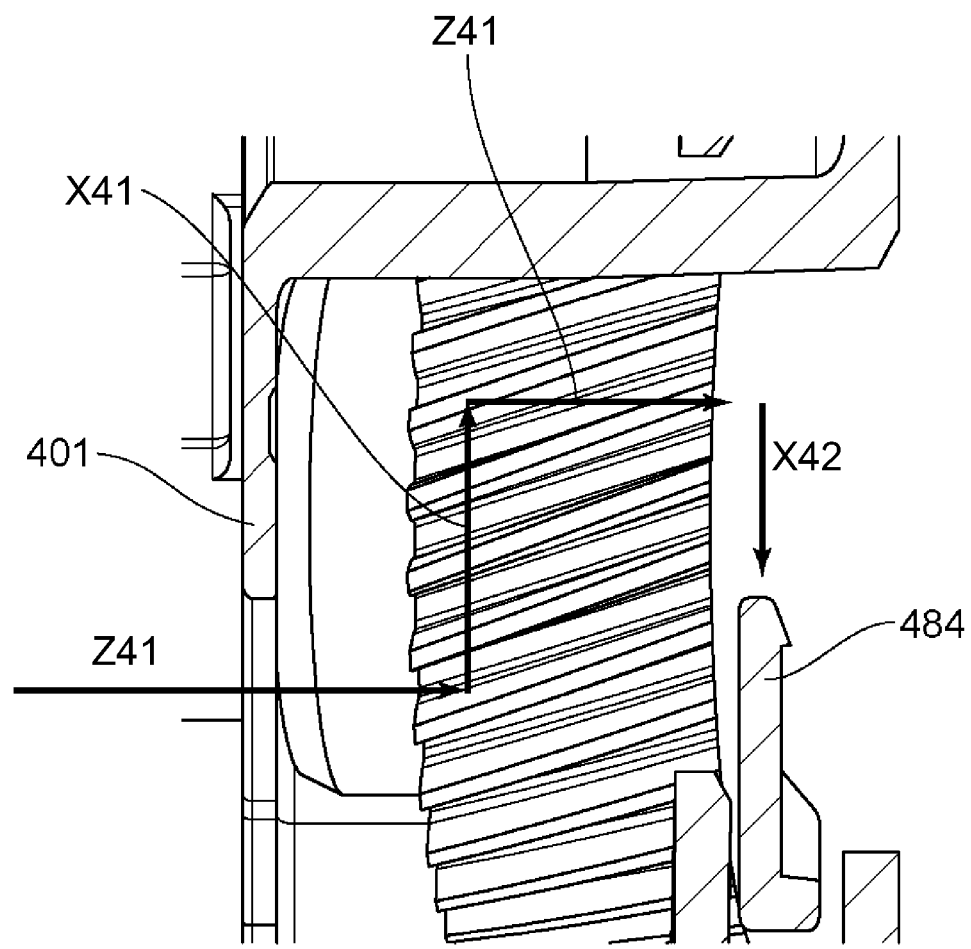
FIG. 31 is an illustration of operation of a push-down member.
Figure 86:
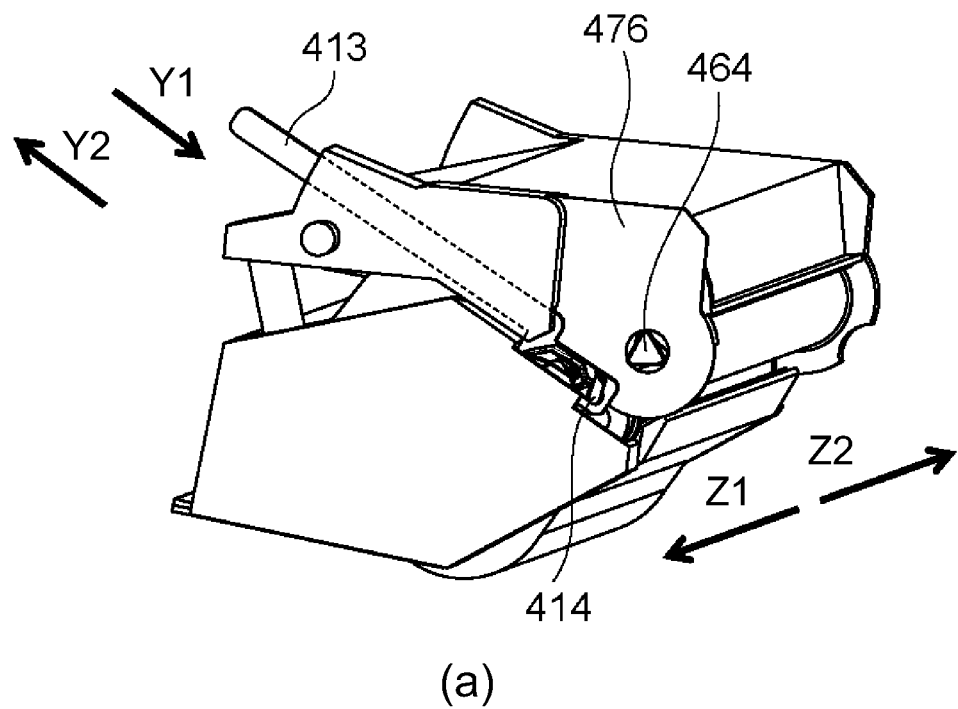
FIG. 86 is an illustration of the cartridge.
Figure 86:
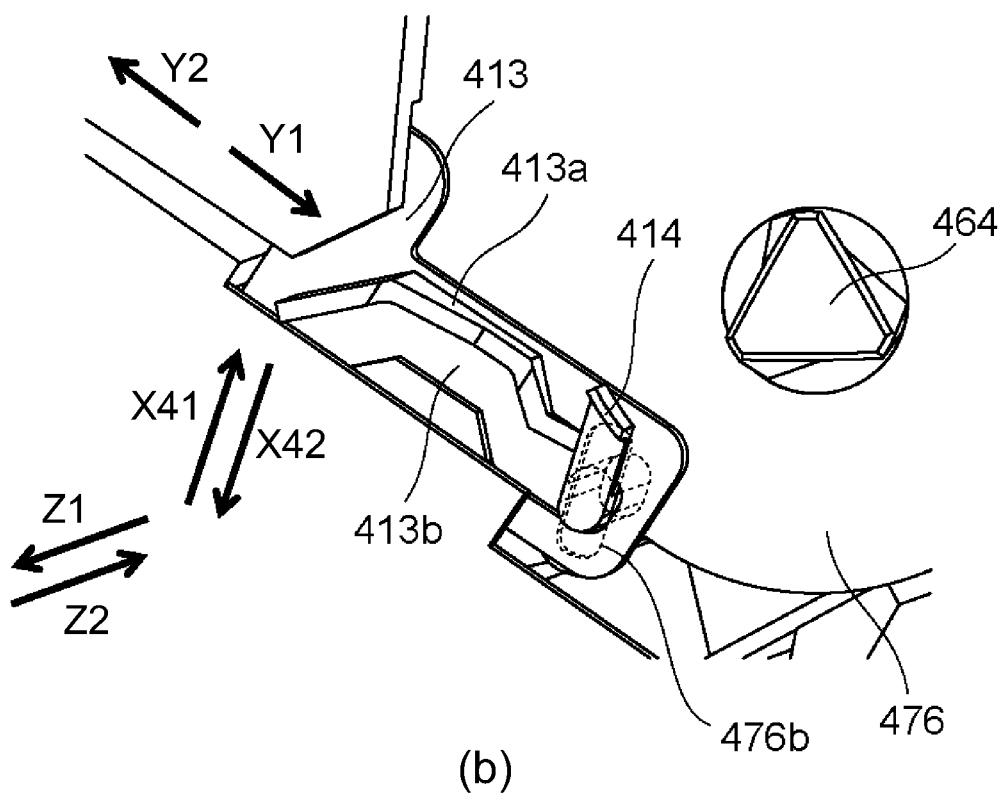
Figure 87:
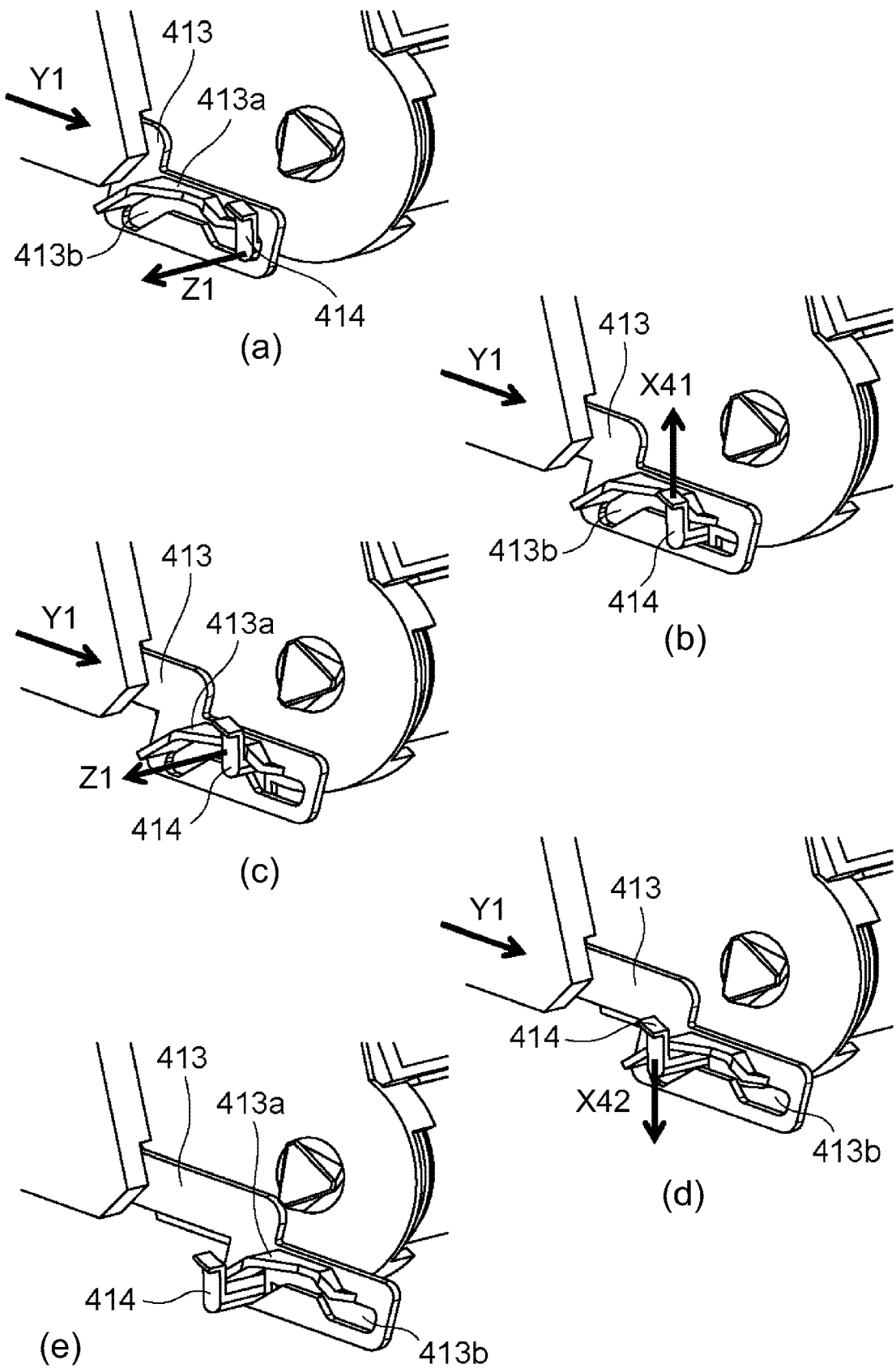
FIG. 87 is a partial view of the cartridge.
Figure 88:
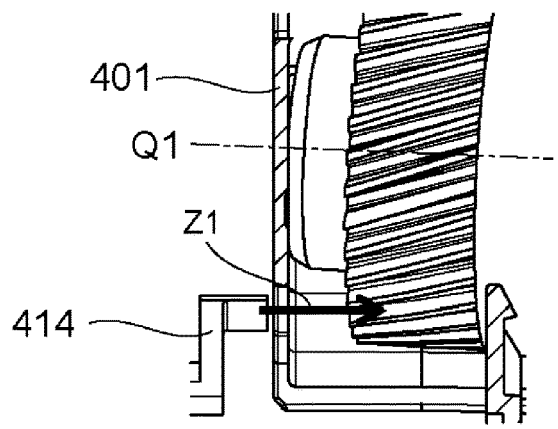
FIG. 88 is an illustration of the drive transmission member and the push-down member.
Figure 88:
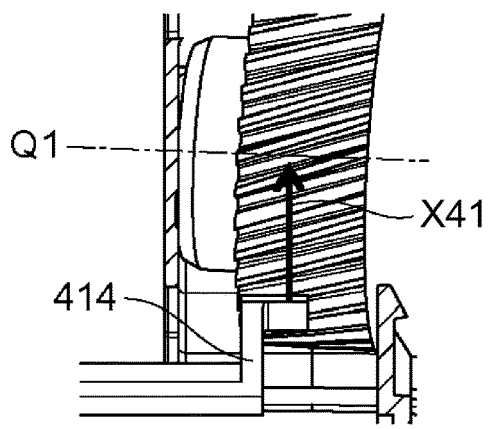
Figure 88:
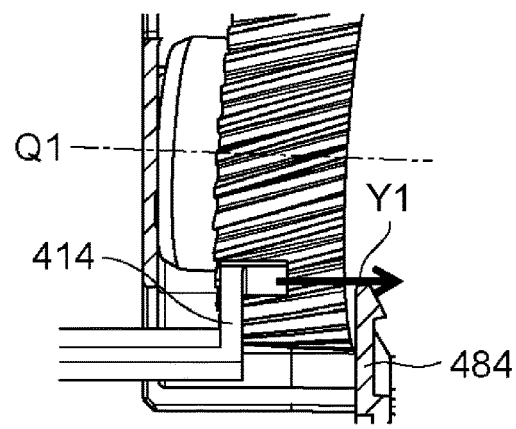
Figure 88:
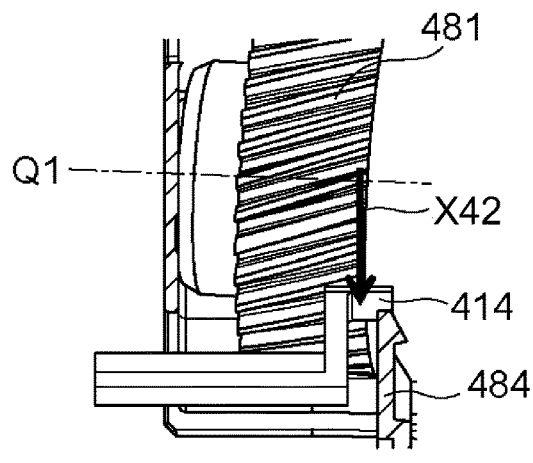
Figure 88:
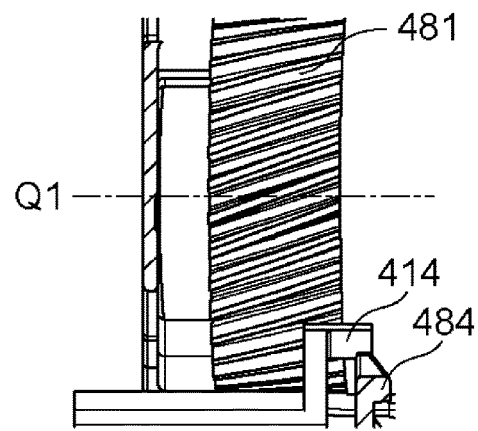

For example, by employing the structure shown in FIG. 30, the operating member 404 can be moved forward (moved in the Z41 direction), lifted (moved in the X41 direction), and lowered (in the X42 direction) relative to the guide rail 403 which is a fixed member. In this example, a slit portion 404*a* of the operating member 404 is guided by a rail portion 403 of the guide rail 403. In addition, a guided boss 404*b* of the operating member is guided by a cam groove 405*a* of the slide guide 405. Further, a bottom portion 404*c* of the operating member 404 is guided by a top surface 405*b* of the slide guide 405. By properly combining these mechanisms, the push-down member 402 can be made to perform crank-like movements such as forward, upward, forward, and downward as shown in FIG. 31. By this, the pressing member 484 can be pushed down while avoiding the cover member 401, without providing the tapered shape at the free end. Hereinafter, an example of a cartridge capable of pushing down the pressing member 484 only by a straight operation using the structure as shown in FIG. 30 will be shown. Part (a) of FIG. 86 is a perspective view of a cartridge having this mechanism, and part (b) of FIG. 86 is an enlarged view of the neighborhood of the coupling member 464. As shown in part (b) of FIG. 86, the side member 476 is provided with a holding hole 476*b*, in which the push-down member 414 is supported so as to be movable in the arrow X41 direction, the arrow X42 direction, the arrow Z1 direction, and the arrow Z2 direction. In addition, the push-down member 414 is urged in the direction of arrow Z2 by a spring (not shown). On the other hand, the lever member 413 is mounted on the cartridge B so as to be slidable in the direction of arrow Y1 and the direction of arrow Y2. The lever member 413 is provided with a guide rib 413*a* which is a cam for moving the push down member 414 in the arrow Z1 direction and the arrow Z2 direction, and a guide slit 413*b* which is a cam for moving the push-down member 414 in the arrow X41 direction and the arrow X42 direction. Next, referring to FIGS. 87 and 88, a behavior in which the push-down member 414 operates to push the pressing member 484 down will be described. Part (a) of FIG. 87 to part (e) of FIG. 87 show the movement of the push-down member 414 when the lever member 413 is gradually slid in the direction of the arrow Y1 in chronological order. Part (a) of FIG. 88 to part (e) of FIG. 88 are sectional views corresponding to part (a) of FIG. 87 to part (e) of FIG. 87, respectively. When the lever member 413 is slid in the direction of arrow Y1 from the states shown in part (a) of FIG. 87 and part (a) of FIG. 88, the push-down member 414 is guided by the guide rib 413*a* and moves in the direction of arrow Z1 and passes under the cover member 401 to reach the state of part (b) of FIG. 87 and part (b) of FIG. 88. When the lever member 413 is further slid in the direction of arrow Y1 from this state, the push-down member 414 is guided by the guide slit 413*b* and moves in the direction of arrow X41 to reach the states shown in part (c) of FIG. 87 and part (c) of FIG. 88. When the lever member 413 is slid further in the direction of the arrow Y1, the push-down member 414 is guided by the guide rib 413*a*, moves in the direction of the arrow Z1 and rides on the pressing member 484 to reach the state of part (d) of FIG. 87 and part (d) of FIG. 88. When the lever member 413 is slid further in the direction of the arrow Y1, the push-down member 414 is guided by the guide slit 413*b* and moves in the direction of the arrow X42, and the pressing member is pushed down to reach the state of part (e) of FIG. 87 and part (e) of FIG. 88.

Finally, this embodiment is summarized as follows.

The main assembly of the image forming apparatus includes a drive transmission member (drive output member) 481 structured to output a driving force and a pressing member (urging member, main assembly side pressing member) 484 for tilting the drive transmission member by urging the drive transmission member (part (a) of FIG. 25).

The cartridge B includes a photosensitive drum 62 and a push-down member (urging member) 402 which is a cartridge side pressing member structured to press the apparatus main assembly side pressing member (see part (a) of FIG. 2 and FIG. 23). The photosensitive drum 62 is placed in the front part of the cartridge, and a part thereof is uncovered. The front side of the cartridge B is the left side in part (a) of FIG. 2 and the right side in part (a) of FIG. 23.

The push-down member 402 is placed in front of the cartridge together with the photosensitive drum 62 (see part (a) of FIG. 23). Further, it is placed on the drive side of the cartridge in the axial direction of the photosensitive drum 62. The drive side of the cartridge is the downstream side in the direction indicated by the arrow Z1 in FIG. 23, and is the side on which the coupling member 464 is placed on the cartridge. That is, the coupling member 464 and the push-down member 402 are arranged on the same side.

Figure 28:
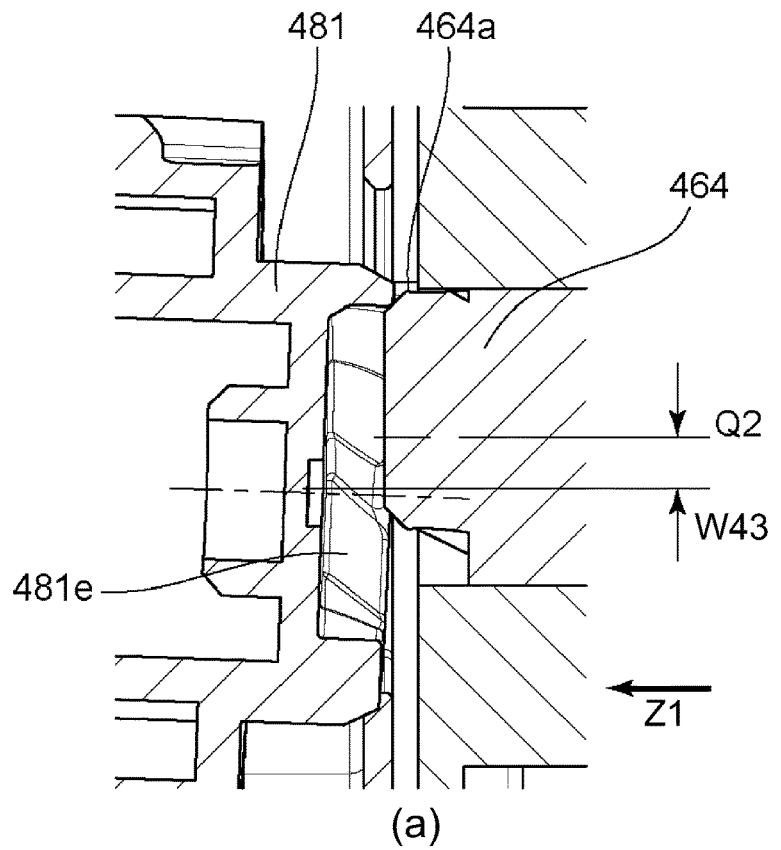
FIG. 28 is a sectional view of the drive transmission member and the cartridge.
Figure 28:
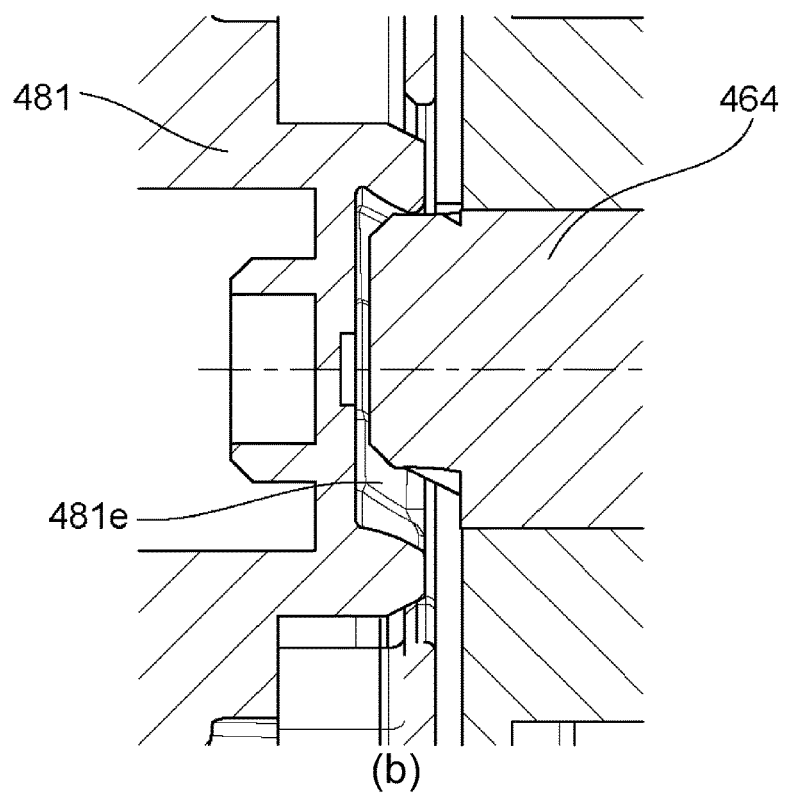

The push-down member 402 on the cartridge side is structured to change the inclination angle of the drive transmission member by pressing and urging the pressing member 484 on the apparatus main assembly side (see part (a) of FIG. 27 and part (b) of FIG. 28).

That is, when the push-down member 402 acts on the pressing member 484 on the device main body side, the inclination angle of the drive transmission member 481 relative to the photosensitive drum 62 becomes smaller (see part (b) of FIG. 28.

By reducing the inclination angle, the drive transmission member 481 can be connected to the cartridge. In this embodiment, the coupling member (engagement member) 464 is provided adjacent to the end of the photosensitive drum (see FIG. 23). By the coupling member 464 advancing toward the drive transmission member 481 in the axial direction of the cartridge, it engages and connects with the recess (output coupling portion) 481*e* provided at the free end of the drive transmission member (see part (b) of FIG. 28). By this, the drive transmission member and the cartridge are connected so that the drive can be transmitted.

More specifically, the coupling member 464 moves in the axial direction from the retracted position (part (a) of FIG. 28) in which it is retracted toward the inside of the photosensitive drum to the advanced position (part (a) of FIG. 28) in which it is advanced toward the outside of the photosensitive drum. The coupling member 464 does not necessarily have to move parallel to the axis of the photosensitive drum, nor does it have to move linearly. If the direction of the movement of the coupling member 464 has an axial component, it can engage with the drive transmission member 481.

The means for connecting the drive transmission member 481 and the cartridge 60 to enable the drive transmission is not limited to the coupling member 464 which is movable forward and backward. For example, it is conceivable that in place of the coupling member 464, a gear member 187 is connected to the developing roller, and the gear member 187 is connected to a drive transmission member 481 the inclination angle of which is reduced by the push-down member 402, as shown in FIG. 15. That is, by providing the cartridge with a gear member which is capable of meshing engagement with the gear portion provided on the outer peripheral portion of the drive transmission member 481, the drive transmission member and the cartridge B are connected so as to be capable of the drive transmission. The driving force received by the gear member 187 may be transmitted to the photosensitive drum 62 by way of another gear 39, 63 (see FIG. 22) provided inside the cartridge. In such a case, the gear member of the cartridge is the drive input member. In addition, in this case, the gear member 187 (FIG. 15) does not need to be movable in the direction crossing the axis thereof. This is because it will suffice if the gear member 187 is placed at a position where it can engage with the drive transmission member 481 having a reduced inclination angle.

If the cartridge includes a gear member as a drive input member, the coupling member 464 does not have to receive a driving force from the drive transmission member. The coupling member 464 may be made a mere engaging member that only engages with the drive transmission member 481 so that the engaging member does not transmit the driving force to the photosensitive drum 62. Or, the coupling member 464 may be omitted from the cartridge. However, it is preferable that there is provided an engaging member which can engage with the drive transmission member 481 adjacent to the end of the photosensitive drum 62 because the position of the drive transmission member can be determined by the engaging member.

Further, the cartridge may have two drive input members, namely a gear member and a coupling member.

In this embodiment, the push-down member 402 operates when the lever member (operation member) 412 (part (a) of FIG. 23) receives an external force from the outside of the cartridge. That is, the lever member 412 projects from the frame (casing) of the cartridge at the rear side of the cartridge (left side in FIG. 23). Therefore, the lever member 412 can receive the external force by contact with the pressing member 1 provided on the door 13 of the apparatus main assembly, similarly to the lever member 12 shown in part (b) of FIG. 21y the external force, the end of the lever member 412 moves toward the front of the cartridge. As the lever member 412 moves, the push-down member 402 operates.

Further, the lever member (operating member) 412 is an operating member for not only operating the push-down member 412 but also operating the coupling member 464.

The lever member 412 is structured to start the operation of the push-down member 402 before the operation of the coupling member 464. It is possible that the coupling member 464 is connected to the drive transmission member 481 after the inclination angle of the drive transmission member 481 is reduced by the push-down member 402.

In this embodiment, the push-down member 402 and the coupling member 464 are operated by one lever member 412, but a lever member (operation member) may be provided for each of the push-down member 412 and the coupling member 464. For example, in an embodiment which will be described hereinafter with FIG. 63, a cartridge includes two operating members (lever members) 905 and 812. In this manner, the two operating members can be employed.

It is desirable that the push-down member 402 performs a plurality of operations including the following operations so as to be capable of pressing the pressing member of the apparatus main assembly.

It is desirable that the push-down member 402 performs the first operation of moving in the axial direction Z1 of the photosensitive drum 62 (see part (a) of FIG. 25 to approach the pressing member. At this time, the push-down member does not necessarily have to move in parallel with the axial direction, and does not have to move rectilinearly. It will suffice if the direction in which the push-down member moves in the first operation includes a component in the axial direction.

Figure 26:
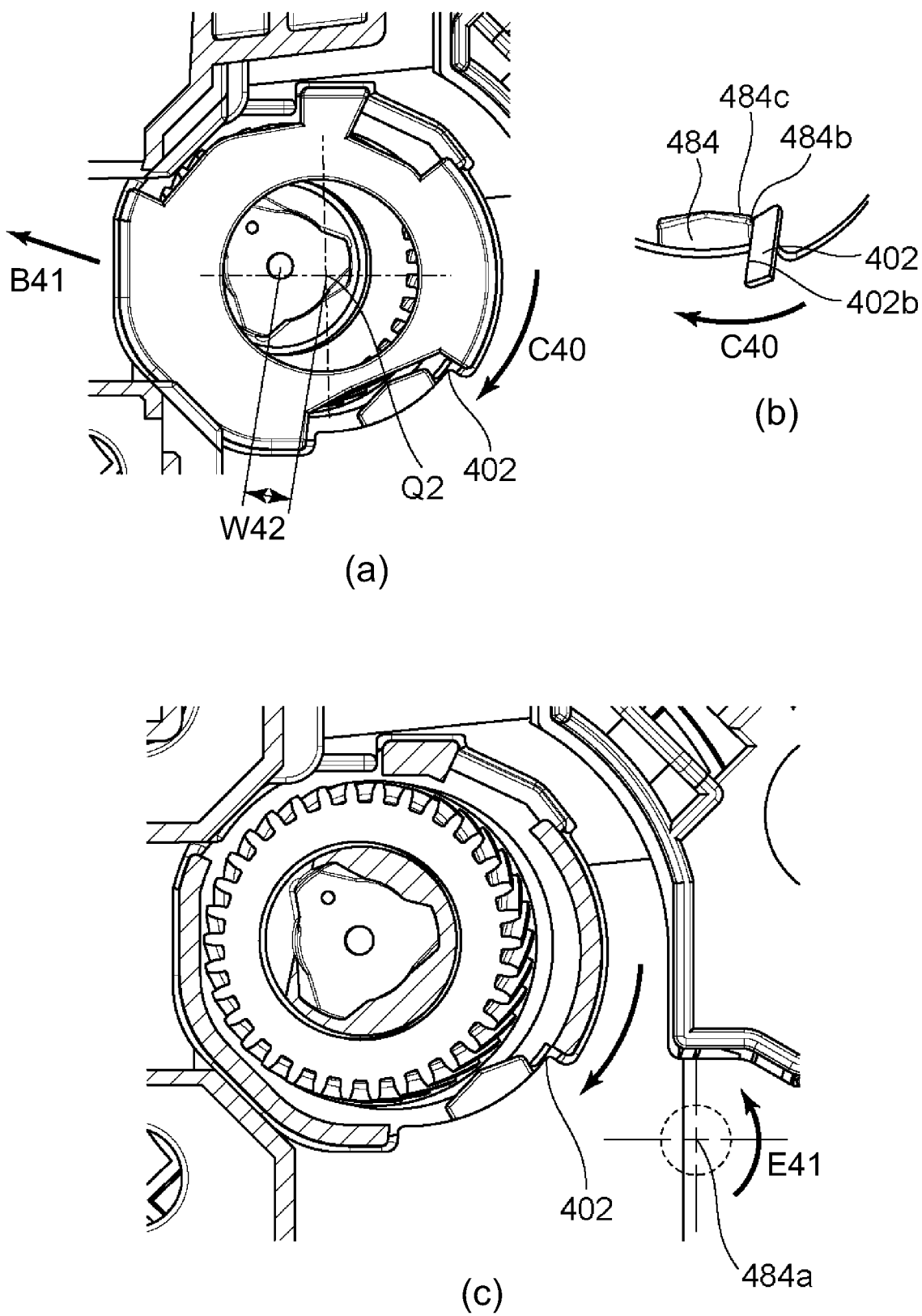
FIG. 26 is an illustration of the drive transmission member.

It is desirable that after this first operation, the push-down member 402 performs a second operation of moving in a direction different from the direction Z1 of the first operation (Figure (a)). Part (b) of FIG. 26 shows an example in which the push-down member moves in the C40 direction crossing the axial direction. By combining a plurality of operations, the push-down member 402 can easily perform the appropriate movement of the pressing member 484 of the apparatus main assembly side.

The push-down member 402, the lever member 412, and the like shown in this embodiment may be separated from the cartridge to provide an attachment which can be mounted to the image forming apparatus main assembly separately from the cartridge. An example of such an attachment will be described in Embodiment 5 below.

Embodiment 5

Next, embodiment 4 will be descried in which the pressing member 484 is pushed down using a removable attachment for the device main assembly A.

The attachment is a unit which can be mounted separately from the cartridge B. In this embodiment, the attachment is a member for acting on the drive transmission member provided in the apparatus main assembly A, and is mountable to the apparatus main assembly A by the user.

Figure 32:
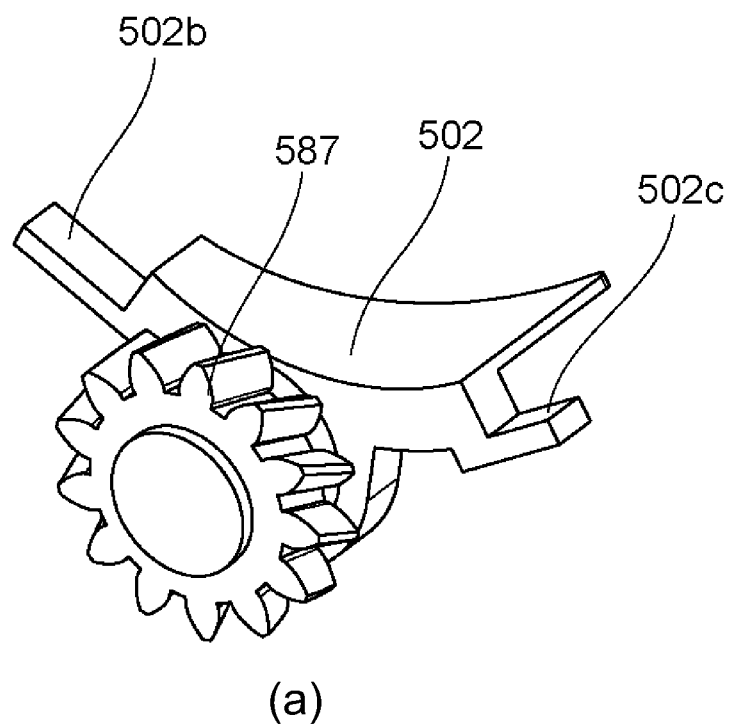
FIG. 32 is a perspective view illustrating an attachment.
Figure 32:
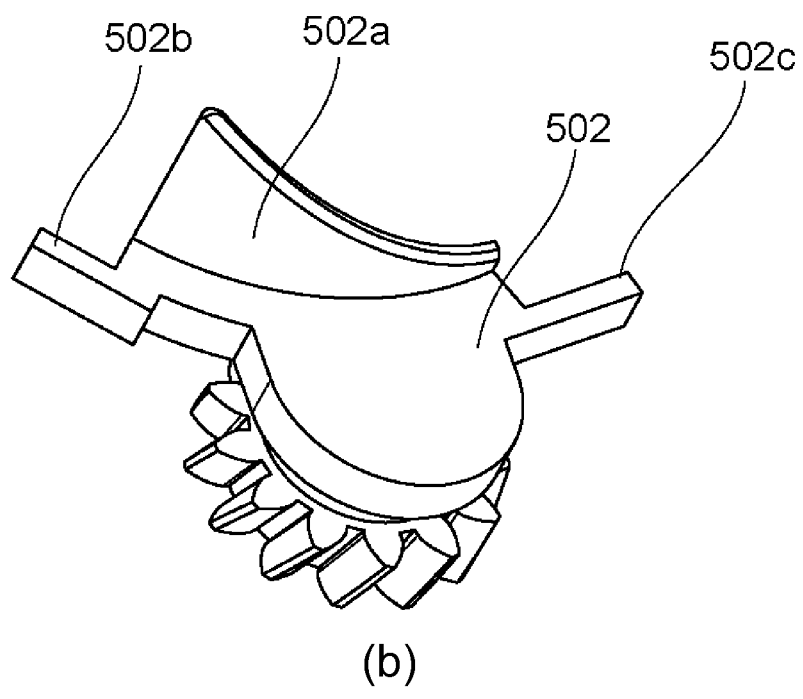
Figure 89:
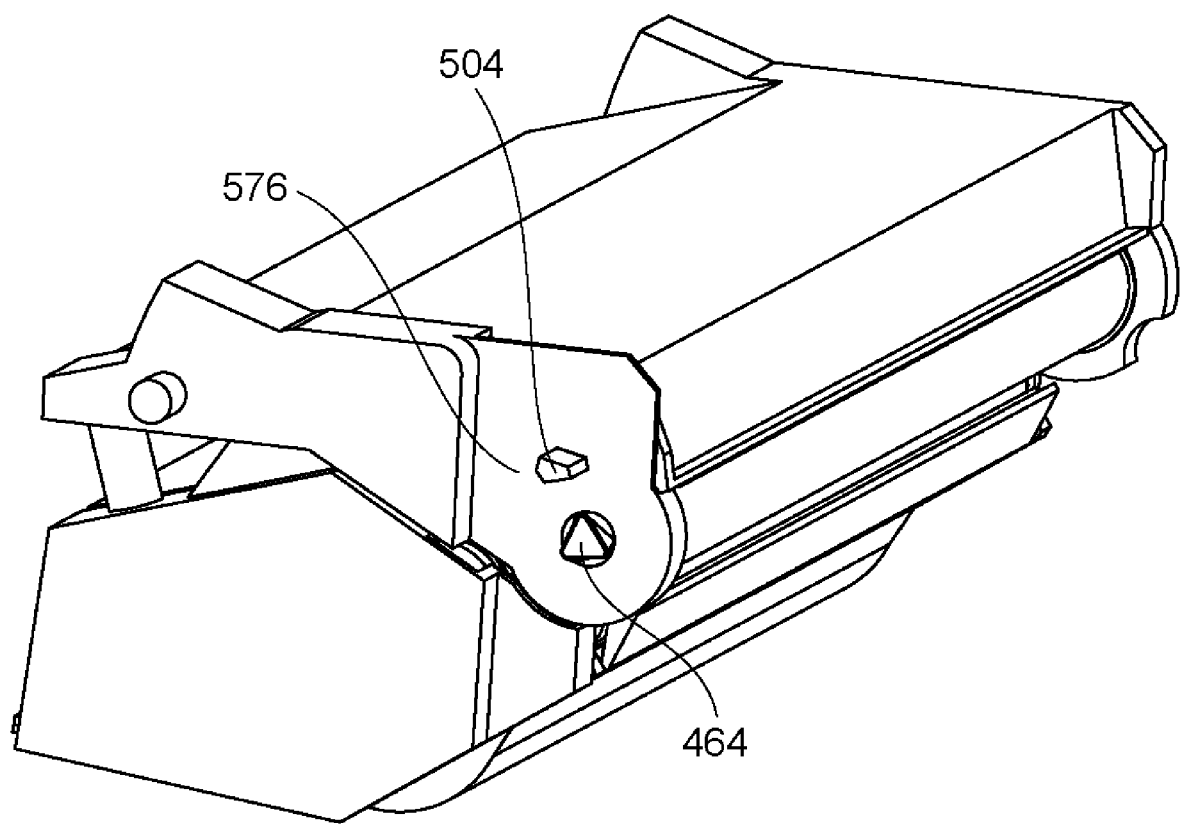
FIG. 89 is an illustration of the cartridge.

FIG. 32 is a perspective view of the attachment member 502 according to this embodiment. The attachment member 502 has a push-down surface 502a, and is provided with a damper gear 587 rotatably mounted to the attachment member 502. As in the Embodiment 1, the damper gear 587 has a predetermined rotational resistance. FIG. 89 is a perspective view of the cartridge B in this embodiment. A projecting portion is provided in the neighborhood of the coupling member 464 of the cover member 576.

Figure 33:
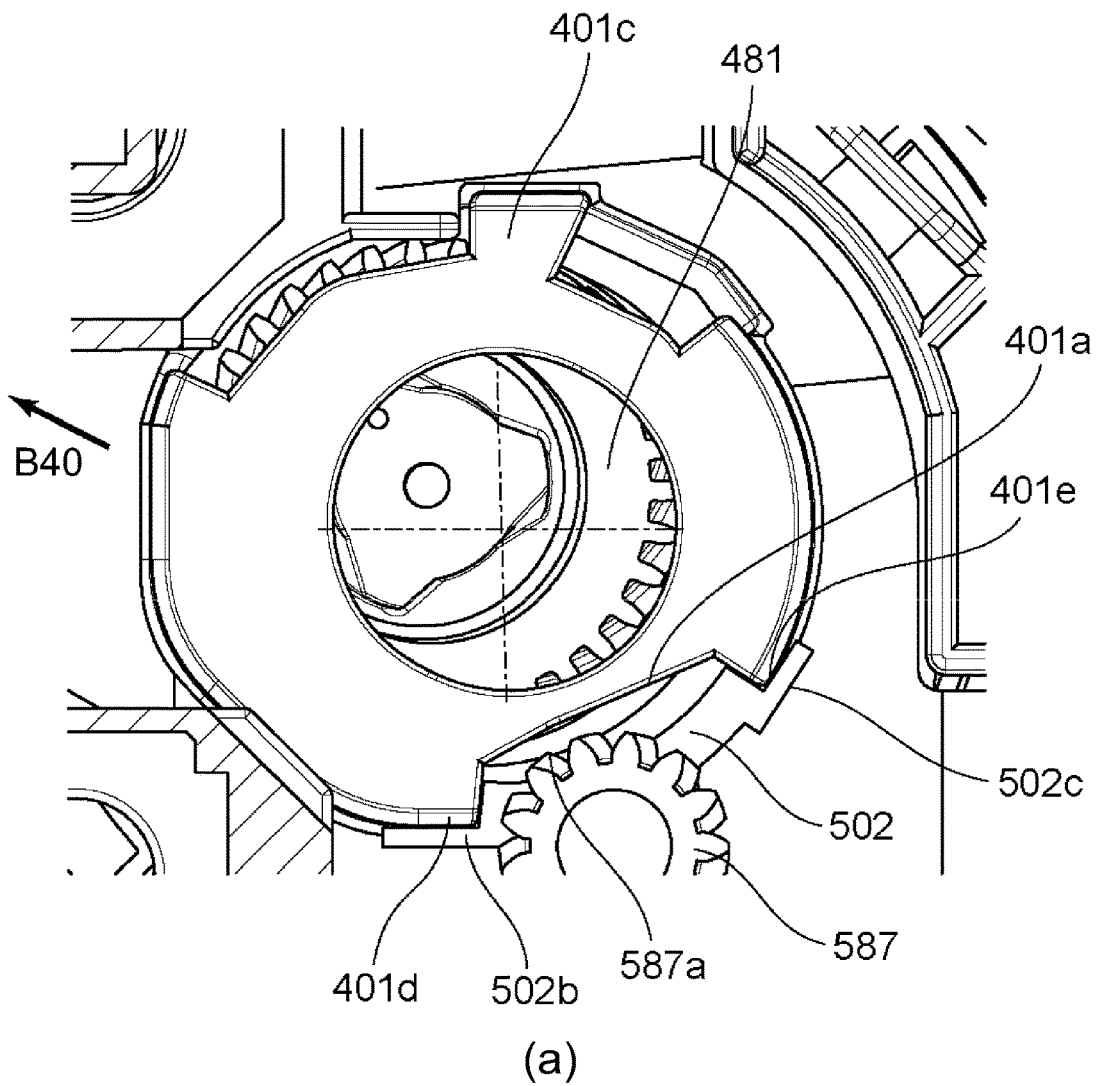
FIG. 33 is an illustration of the drive transmission member and the attachment.
Figure 33:
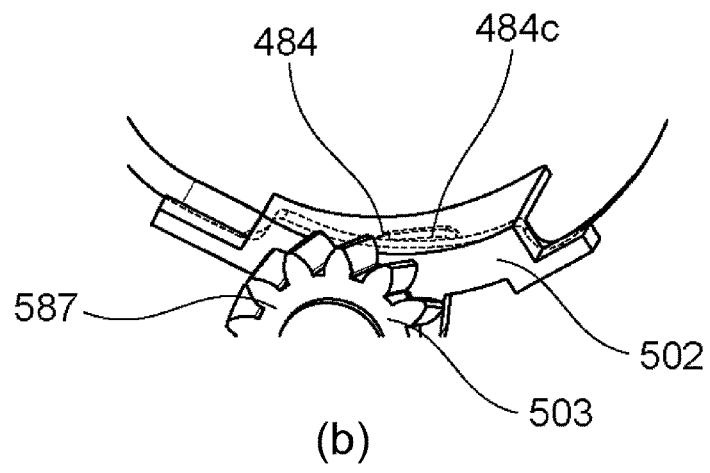
Figure 34:
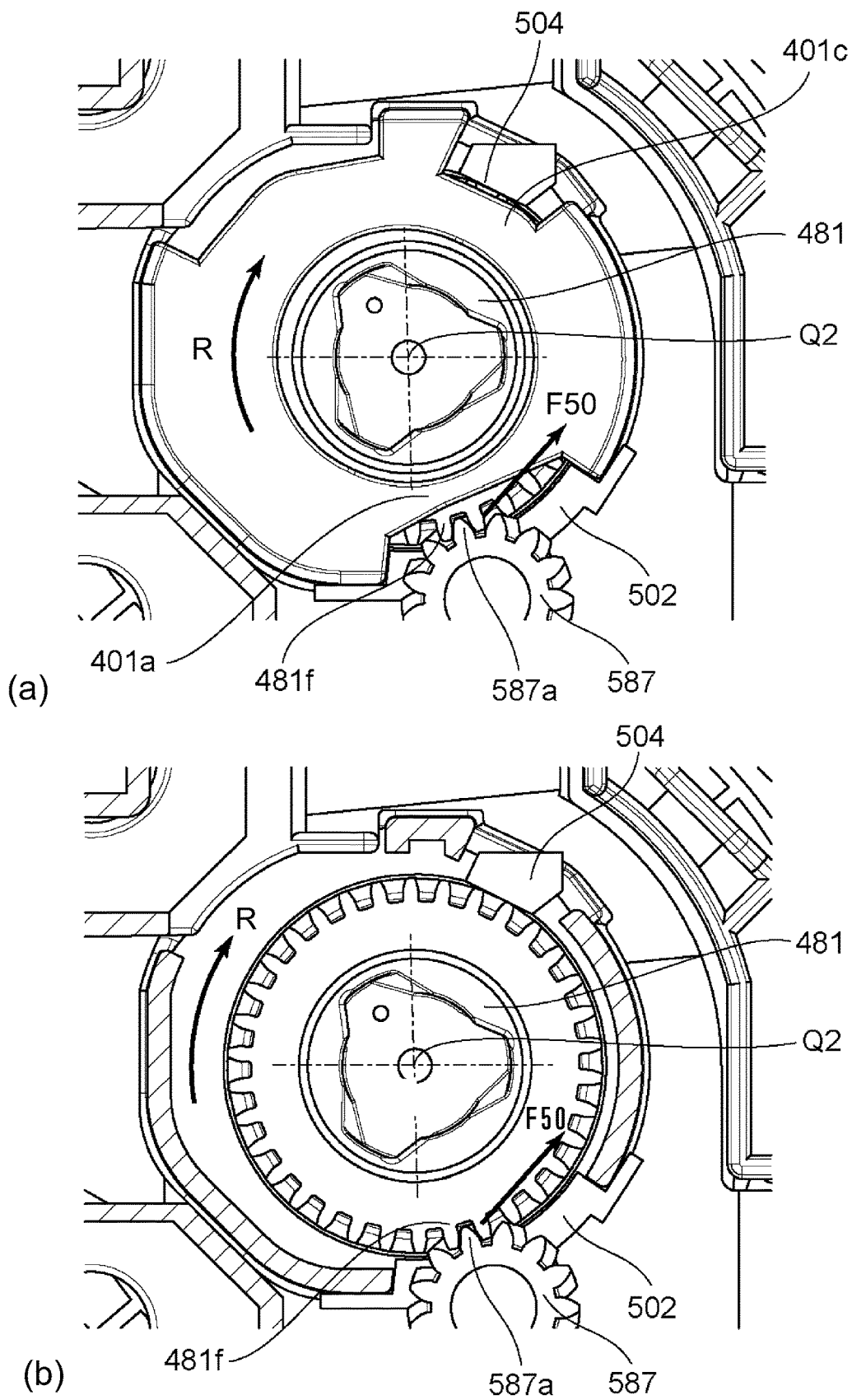
FIG. 34 is an illustration of the drive transmission member.

FIG. 33 shows a state in which the opening/closing door 13 of the apparatus main assembly A is opened, and the attachment member 502 is mounted to the cut-away portion 401a of the cover member 401. Similarly to part (b) of FIG. 27 in the Embodiment 4, the push-down surface 502a of the attachment member 502 pushes down the pressing member 484. In this state, since the opening/closing door 13 is open, the drive transmission member 481 maintains the state of being inclined in the direction of the arrow B40 irrespective of the attitude of the pressing member, as described above in the Embodiment 1. Here, when the cartridge B is inserted into the apparatus main assembly A and the opening/closing door 13 is closed, the inclination of the drive transmission member 481 is released as shown in FIG. 34, and the gear portion 481f is brought into meshing engagement with the gear portion 587a of the damper gear 587. In addition, the projecting portion 504 provided on the cartridge B is placed inside the cut-away portion 401c of the cover member 401.

Here, when the drive is applied and the drive transmission member 481 rotates in the arrow R direction, the drive transmission member 481 is brought into contact with the projection by the meshing force F50 between the gear portions in the direction perpendicular to the axial direction of the photosensitive drum, so that the attitude becomes substantially perpendicular to the rotation axis Q2 of the drum. That is, the projecting portion 504 is the inclined portion (contact portion) which is inclined so as to reduce the inclination angle of the drive transmission member 481 when it comes into contact with the drive transmission member 481, as in the case of the inclined rib 86 (see FIG. 84) in Embodiment 1.

Simultaneously with the reduction of the inclination angle of the drive transmission member 481, the drive transmission member moves in the longitudinal direction, that is, in the frontward direction of the sheet of the drawing of FIG. 34 by a meshing thrust force between the gears (F3 in FIG. 9) as described in the Embodiment 1. As a result, the drive transmission portion 481e of the drive transmission member 481 and the coupling member 464 are brought into engagement with each other.

In this embodiment, in order to make the drive transmission member 481 substantially coaxial with the axis Q2 of the drum, the projecting portion (inclined portion) 504 is placed in the cut-away portion 401c of the cover member 401, but it is not inevitable. For example, as described in the Embodiment 4, it will suffice if the chamfered portion 464a (part (a) of FIG. 28 is provided at the free end of the coupling member 464.

In this embodiment, the damper gear 587 is provided on the attachment member 502 in order to attract the drive transmission member 481 to the coupling member 464 in the longitudinal direction, but it is not inevitable. As shown in the Embodiment 1, it may be provided on the cartridge B. In addition, it may be provided the position of the cut-away portion 401c instead of the cut-away portion 401a of the cover member 401. In such a case as well, the cartridge B may be provided with the damper gear 587, or the damper gear 587 may be provided on another attachment other than the attachment member 502.

In the case that the damper gear 587 is provided on the cartridge B, the drive transmission member does not necessarily have to be engaged with the coupling member 464. It is also possible to drive the cartridge B by using the driving force received by the damper gear 587 as it is. Alternatively, the damper gear may not be provided, and the cartridge may be provided with the lever member 412 to advance and retract the coupling member 464 as in the above-described embodiment.

In this embodiment, the push-down surface 502a of the attachment is a portion corresponding to the pressing member 402 (see FIGS. 23 and 24) of the cartridge of embodiment 4. The push-down surface 502a is a contact portion structured to come into contact with the pressing member 484 to move the pressing member 484. The push-down surface 502a moves the pressing member 484 away from the drive transmission member 481 and fixes it at that position. By this, the drive transmission member 481 becomes not pressed by the pressing member 484, or the pressing force is reduced, so that the inclination angle of the drive transmission member 481 is reduced. As a result, the drive transmission member 481 becomes connectable with the cartridge to transmit the drive. In this embodiment, the push-down surface 502a is an immovable portion in the attachment, but if the pressing member 484 can be moved in contact with the pressing member 484, the push-down surface 502a can be made movable.

In addition, the push-down surface 502a may be structured to move in interrelation with the opening and closing of the door 13 of the apparatus main assembly A in the same manner as the push-down member of Embodiment 4. In such a case, the push-down surface 502a may be changed to the push-down member of the Embodiment 4, and the lever member 412 and the slit 476a described in Embodiment 4 may also be provided on the attachment. That is, the side member (part (b) of FIG. 23) described in the Embodiment 4 and each member supported by the side member 476 (part (b) of FIG. 23) are separated from the other portions of the cartridge, and they are formed into an attachment.

The reason for changing the inclination of the drive transmission member by using the attachment as in this embodiment is considered as follows, for example. As described above, depending on the structure of the cartridge, it may be easier to mounted and/or dismount the cartridge by inclining the drive transmission member when mounting and/or dismounting the cartridge. In view of this, the image forming apparatus main assembly employs a structure in which the drive transmission member is intentionally tilted. Then, in each of the above-described embodiments, the inclination of the drive transmission member is reduced as the cartridge is being mounted.

However, In the case that cartridges having different structures can be selectively mounted to the main assembly of the apparatus, it may be unnecessary to incline the drive transmission member at the time of mounting/dismounting the cartridge depending on the type of cartridge. Therefore, when only a cartridge which does not particularly require the inclination of the drive transmission member is used, it may be desirable to cease the inclination of the drive transmission member or reduce the inclination angle. In such a case, the user can change the inclination angle of the drive transmission member by mounting the attachment as in this embodiment to the image forming apparatus main assembly. The user may mount the cartridge to the apparatus main assembly after mounting the attachment to the apparatus main assembly.

It is preferable that the attachment is removable from the apparatus main assembly A. That is, when the drive transmission member needs to be tilted again, by removing the attachment by the user, the drive transmission member becomes tiltable as before.

The attachment shown in FIG. 32 and the cartridge shown in FIG. 89 are both mounting units which can be mounted to the main assembly of the apparatus. A combination including an attachment and a cartridge will be referred to as a mounting kit (mounting unit kits). The mounting kit is a kit including a plurality of units which can be mounted to the image forming apparatus main assembly.

Embodiment 6

Next, another embodiment in which the coupling is engaged with the apparatus main assembly A by using a removable attachment will be described. In the above-described Embodiment 5, the attachment which acts on the pressing member on the main assembly side which presses the drive transmission member has been described, but in this embodiment, the attachment which directly acts on the drive transmission member will be described.

Figure 35:
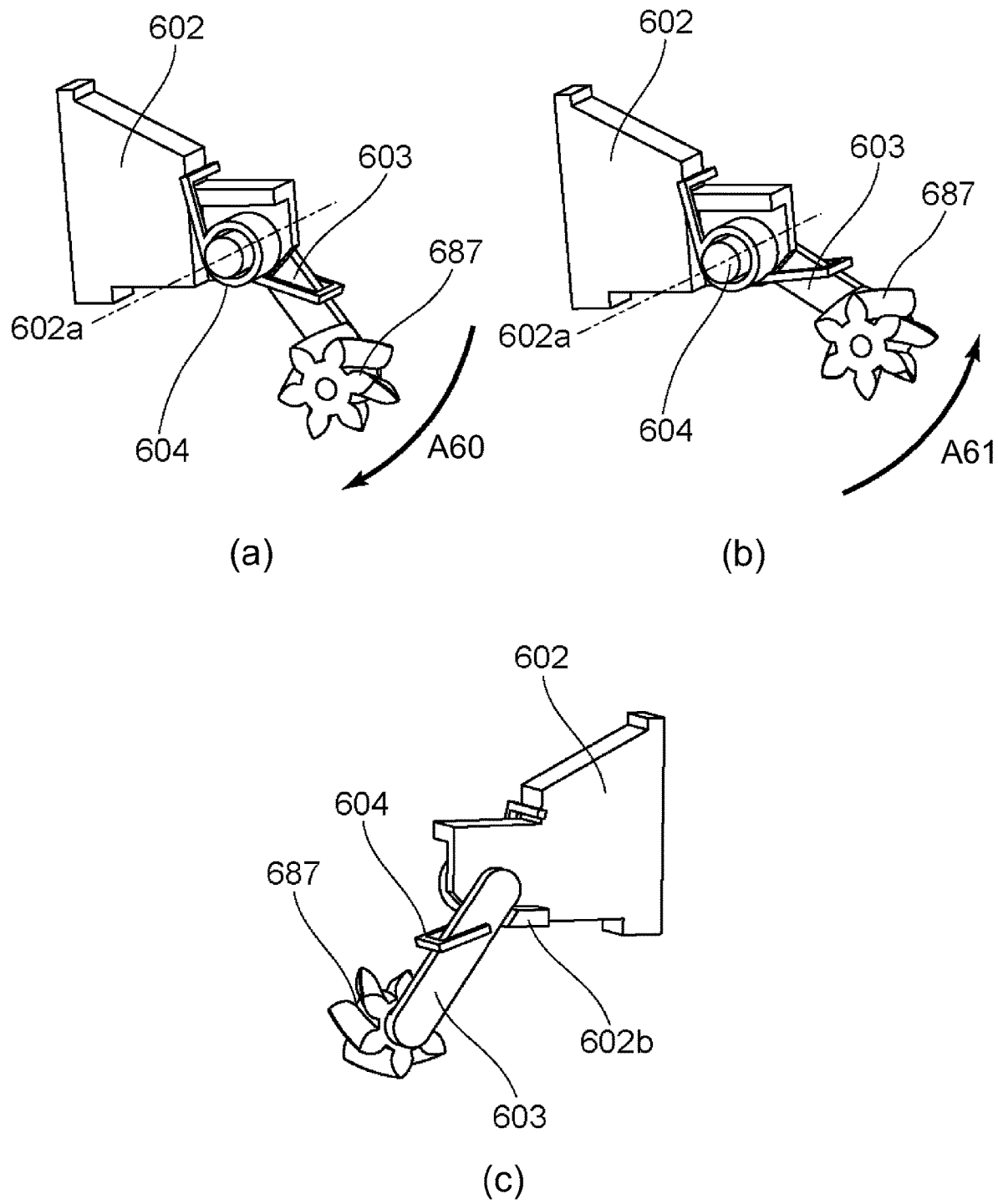
FIG. 35 is a perspective view of the attachment.

FIG. 35 is a perspective view of an attachment member 602 in this embodiment. As shown in part (a) of FIG. 35, the attachment member 602 is provided with a movable arm 603 which is rotatable about the axis 602a, and a free end thereof is provided with a damper gear 687. Similarly to the above-described embodiment, the damper gear 687 has a predetermined rotational resistance. An urging spring 604, which is a torsion coil spring, is mounted in alignment with the axis 602a, and the movable arm 603 is urged in the direction of arrow A60. As shown in part (c) of FIG. 35, the attitude of the movable arm 603 is determined by abutting the abutting portion 602b of the attachment member 602. As shown in part (b) of FIG. 35, the movable arm 603, is rotatable in the direction of arrow A61 against the urging force of the urging spring 604, together with the damper gear 687 provided at the free end.

Figure 90:
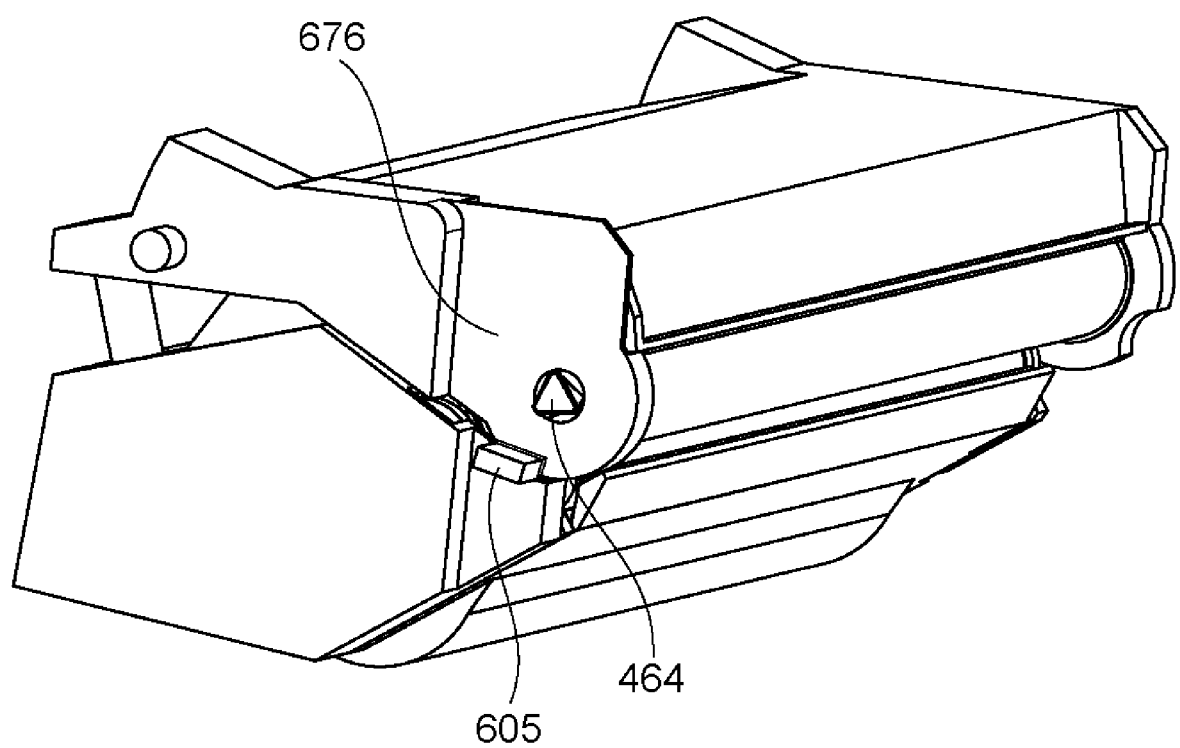
FIG. 90 is an illustration of the cartridge.

That is, the damper gear 687 is movably supported by the movable arm 606 in the attachment, and the position of the axis of the damper gear 687 is structured to be movable. FIG. 90 is a perspective view of the cartridge B in this embodiment. A projecting portion 605 is provided in the neighborhood of the coupling member 464 of the cover member 676.

Figure 36:
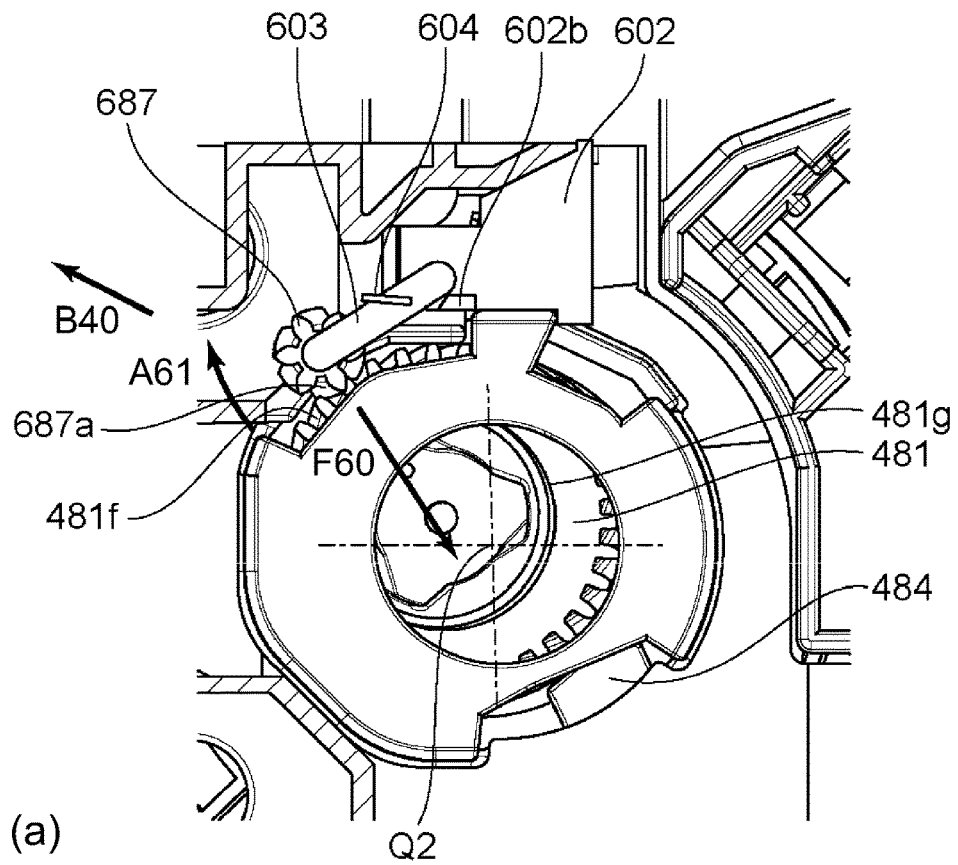
FIG. 36 is an illustration of the attachment and the drive transmission member.
Figure 36:
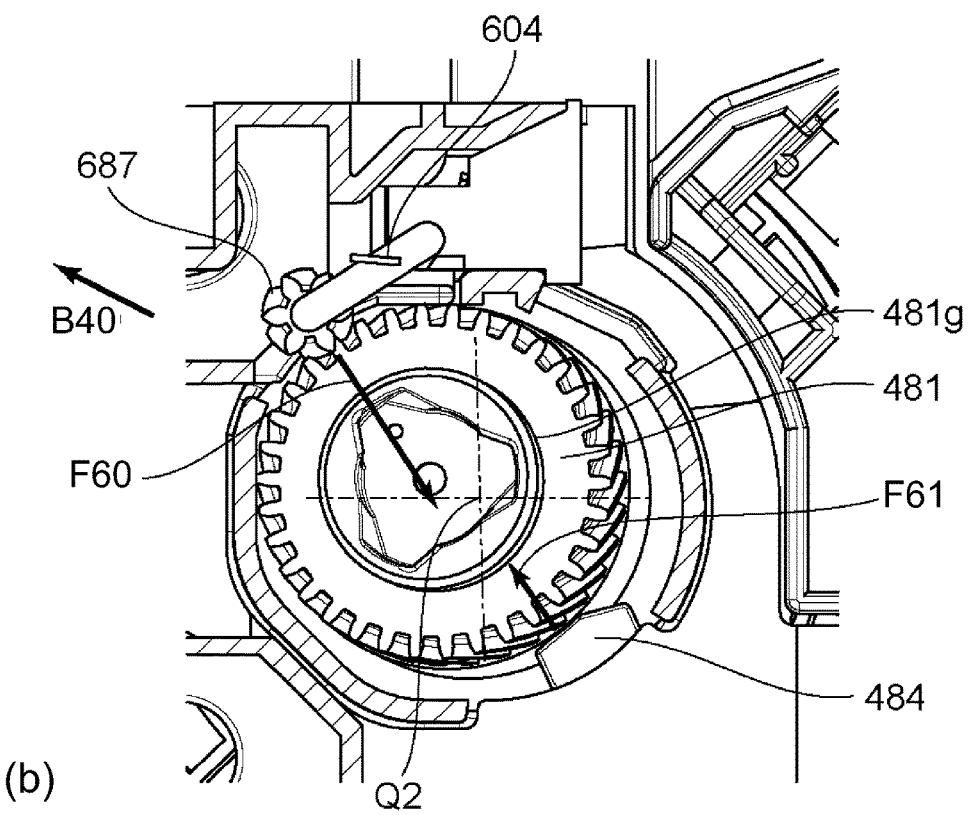

FIG. 36 shows a state in which the opening/closing door 13 is opened and the attachment member 602 is mounted to the apparatus main assembly A. As described above, in the state that the opening/closing door 13 is open, the drive transmission member 481 maintains a state of being inclined in the direction of arrow B40. Therefore, when the attachment member 602 is mounted, the damper gear 687 contacts the gear portion 481f of the drive transmission member 481, and the movable arm of the attachment member 602 is in a state that it has rotated in the direction of the arrow A61. On the other hand, the drive transmission member 481 receives the contact force F60 from the damper gear 687 by the urging force of the urging spring 604. The urging spring is selected so that the contact force F60 is sufficiently larger than the contact force F61 received by the drive transmission member by the pressing member 484.

Figure 37:
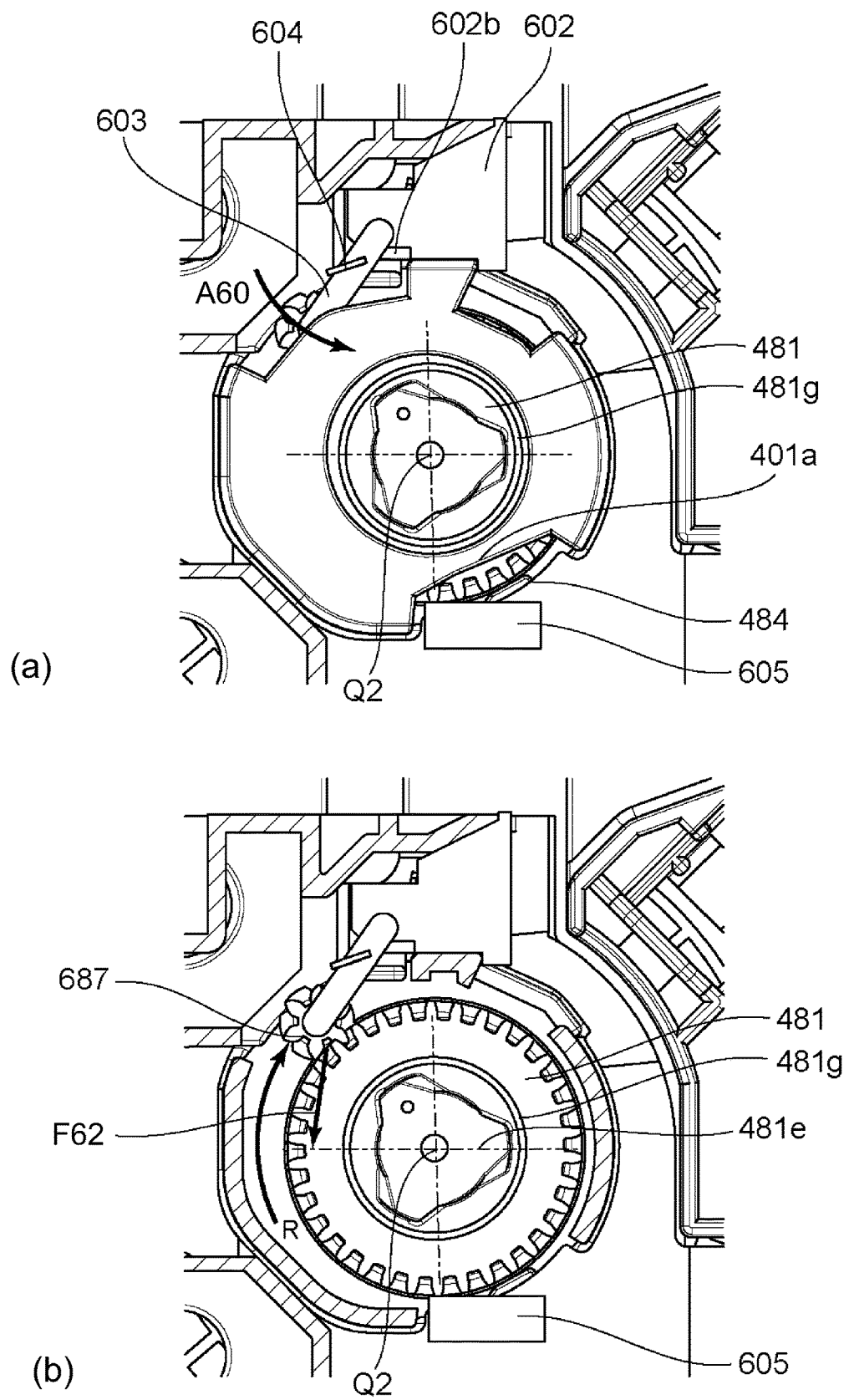
FIG. 37 is an illustration of the attachment and the drive transmission member.

Here, the cartridge B is inserted into the apparatus main assembly A, and then the opening/closing door 13 is closed. In FIG. 36, the contact force F60 received by the drive transmission member 481 from the damper gear 687 is larger than the contact force F61 received from the pressing member 484, and therefore, as shown in FIG. 37, the movable arm 603 rotates in the direction of arrow A60 until it abuts the abutting portion 602b. As a result, the tilting of the drive transmission member 481 is released. That is, by the damper gear 687 pressing and urging the drive transmission member 481, the inclination angle of the drive transmission member 481 decreases. In this embodiment, the damper gear 687 is a pressing member (biasing member) which changes the inclination angle of the drive transmission member by applying a force to the drive transmission member 481. More specifically, the damper gear 687 reduces the inclination angle of the drive transmission member 481 relative to the photosensitive drum of the cartridge when the cartridge is mounted.

In addition, the projecting portion (inclined portion) 605 provided on the cartridge B is placed inside the cut-away portion 401a of the cover member 401.

When the drive is applied and the drive transmission member 481 rotates in the direction of the arrow R, the drive transmission member 481 comes into contact with the projection due to the meshing force F62 between the gear portions in the direction perpendicular to the axial direction of the photosensitive drum, with the result that the attitude becomes substantially perpendicular to the rotation axis Q2 of the drum. At the same time, as described in the Embodiment 1, the drive transmission member moves in the longitudinal direction, that is, in the front direction of the paper surface in FIG. 37, due to the meshing thrust force between the gears (F3 in FIG. 9). As a result, the drive transmission portion 481e of the drive transmission member 481 and the coupling member 464 are engaged with each other.

In this embodiment as well, the projecting portion 605 is provided in the cut-away portion 401a of the cover member 401 in order to make the drive transmission member 481 substantially coaxial with the axis Q2 of the drum, but it is not always necessary. For example, a chamfered portion 464a (part (a) of FIG. 28 may be provided at the free end of the coupling member 464, as described in the Embodiment 4.

Figure 38:
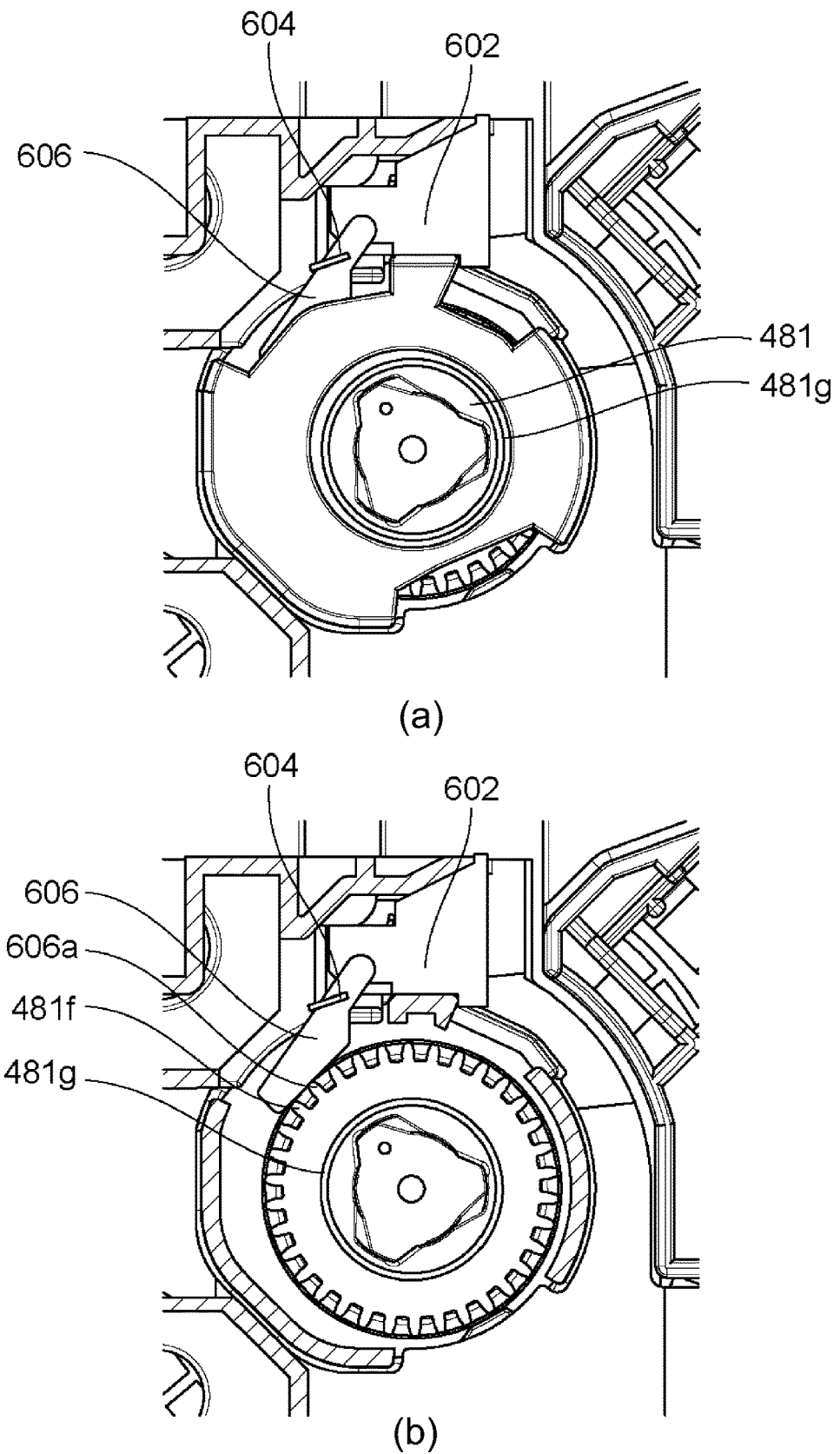
FIG. 38 is an illustration of the attachment and the drive transmission member.

Further, in this embodiment, the damper gear 687 is provided on the attachment member 602 in order to attract the drive transmission member 481 to the coupling member 464 in the longitudinal direction, but it is not inevitable. As shown in FIG. 38, the acting portion 606a of the movable arm 606 may be directly contacted with the drive transmission member 481. In this case, the movable arm 606 functions as a pressing member which presses the drive transmission member 481.

As a result, the drive transmission member 481 and the coupling member 464 can be engaged with each other by providing the damper gear 687 at another location as described in the above-described embodiment or by moving the coupling member 464 forwardly and backwardly.

Figure 91:
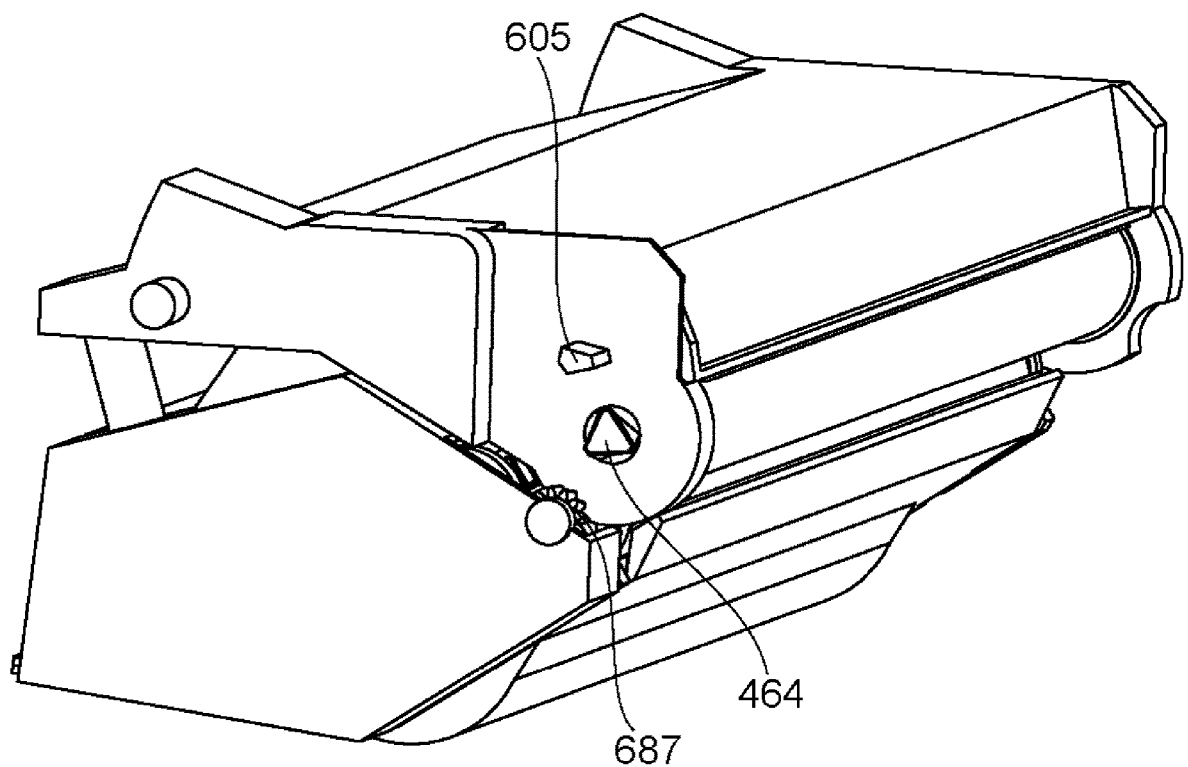
FIG. 91 is an illustration of the cartridge.

For example, the cartridge B shown in FIG. 91 includes a damper gear 687 and a projecting portion (inclined portion) 605 in the neighborhood of the coupling member 464. Here, the damper gear 687 and the projecting portion 505 are provided at such positions that become the same as the damper gear 587 and the projecting portion 504, respectively shown in FIG. 34 in the above-described embodiment at the time when the cartridge B is mounted on the apparatus main assembly A. Therefore, as in the above-described embodiment (see FIG. 34), the drive transmission member 481 is contacted with the projecting portion 605 by the meshing force F50, and becomes in an attitude substantially coaxial with the rotation axis Q2 of the drum.

At the same time, as described in the Embodiment 1, the drive transmission member moves in the longitudinal direction, that is, in the frontwardly of the drawing surface in FIG. 34 due to the meshing thrust force between the gears (F3 in FIG. 9). Therefore, the drive transmission member 481 and the coupling member 464 can be engaged with each other. In FIG. 38, the acting portion 606a of the movable arm 606 is brought into contact with the gear portion 481f of the drive transmission member 481, but the same effect can be provided by contacting the acting portion 606a with the cylindrical portion 481g.

As described above, in this embodiment, the user of the image forming apparatus mounts the attachment member to the apparatus main assembly A in advance, and then mounts the cartridge B to the apparatus main assembly A. By this, the attachment can assist the connection between the drive transmission member and the cartridge.

That is, by the attachment, the inclination angle of the drive transmission member 481 is changed, or by the attachment, the drive transmission member 481 is made closer to the cartridge. By this, the drive transmission member 481 can be connected to the coupling member or gear member provided on the cartridge to perform drive transmission.

As shown in this embodiment, the attachment, instead of the cartridge, may have a structure to be used to connect the drive transmission member to the cartridge.

Embodiment 7

Embodiment 7 will be described. In this embodiment as well, the same points as in the above-described embodiment will be omitted. Among the elements disclosed in this embodiment, those corresponding to the members described in the above-described embodiment are given the same names as the members in the above-mentioned embodiment, and only the points which are different from those in the above-mentioned embodiment will be described.

Figure 39:
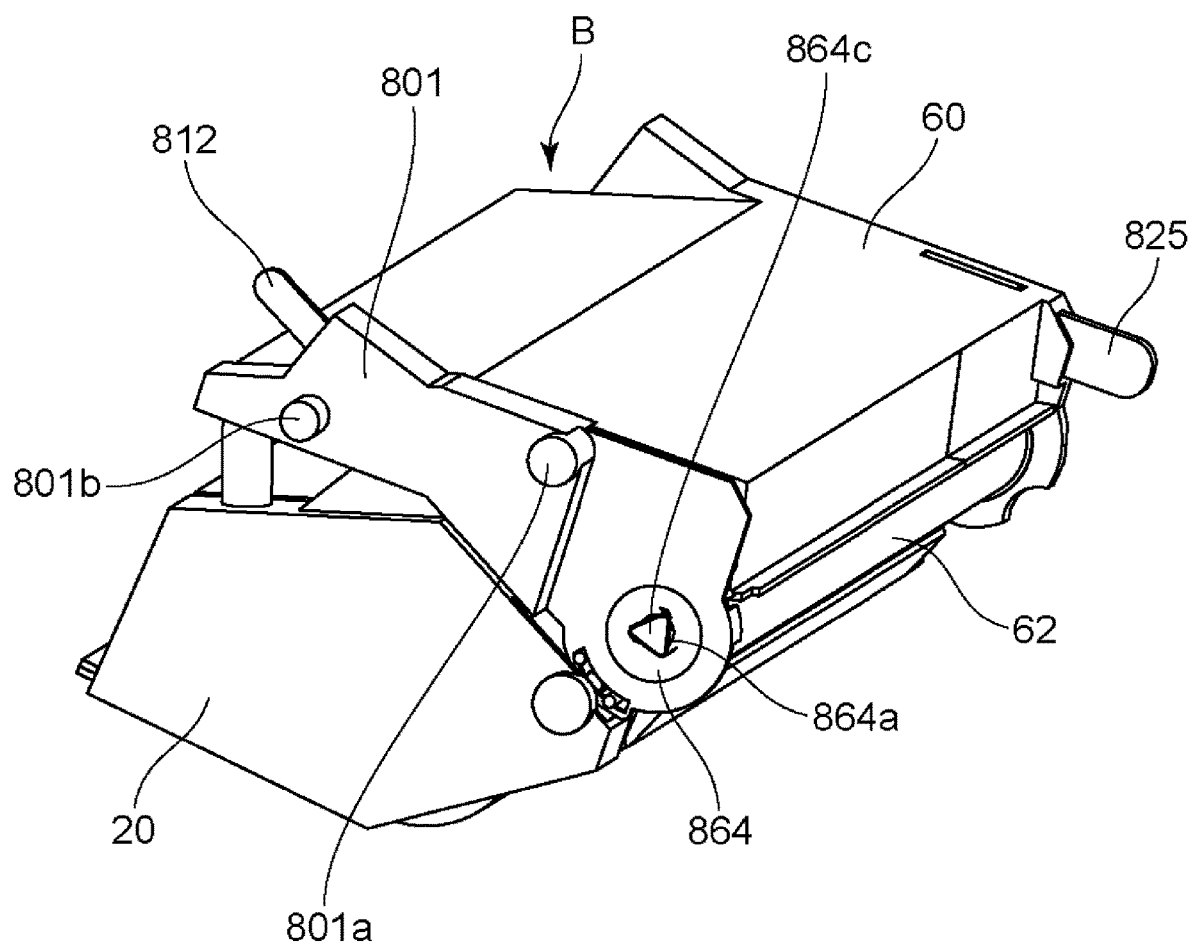
FIG. 39 is a perspective view of the process cartridge.

FIG. 39 is a perspective view of a process cartridge B of this embodiment. As shown in the Figure, a side member 801 is provided on the drive side of the cleaning unit 60, and the side member 801 is provided with a drive-side first positioning projection 801a and a drive-side second positioning projection 801b. In addition, a lever member 812 as an operating member is provided. A coupling member 864 as an advancement/retraction member (movable member) is provided at the end of the drum 62, and an end of the coupling member 864 is provided with a projection (driven transmission portion 864a) which enters the recess of the drive transmission member 81 of the apparatus main assembly A to receive the drive.

On the other hand, a second lever member 825 as a movable member is provided on the non-driving side.

Figure 40:
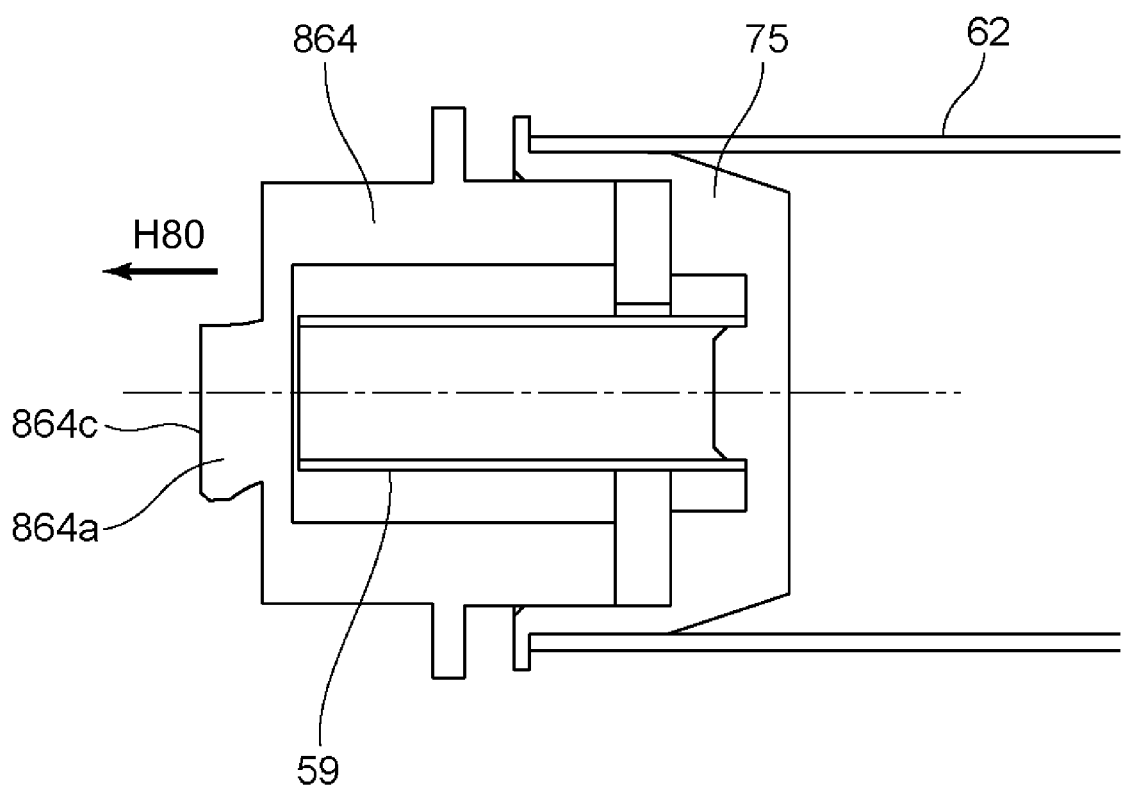
FIG. 40 is a section of the drum drive transmission portion.

FIG. 40 is a sectional view illustrating the structure of the drive transmission portion of the drum 62. As shown in the Figure, a drive side flange member 75, a coupling member 864, and a first pressing member 59 are provided at the drive side end portion. With this structure, the coupling member 864 can move in the direction opposite to the arrow H80 direction in the drawing while being pressed in the direction of the arrow H80 in the Figure (See also FIGS. 16 and 17).

Figure 41:
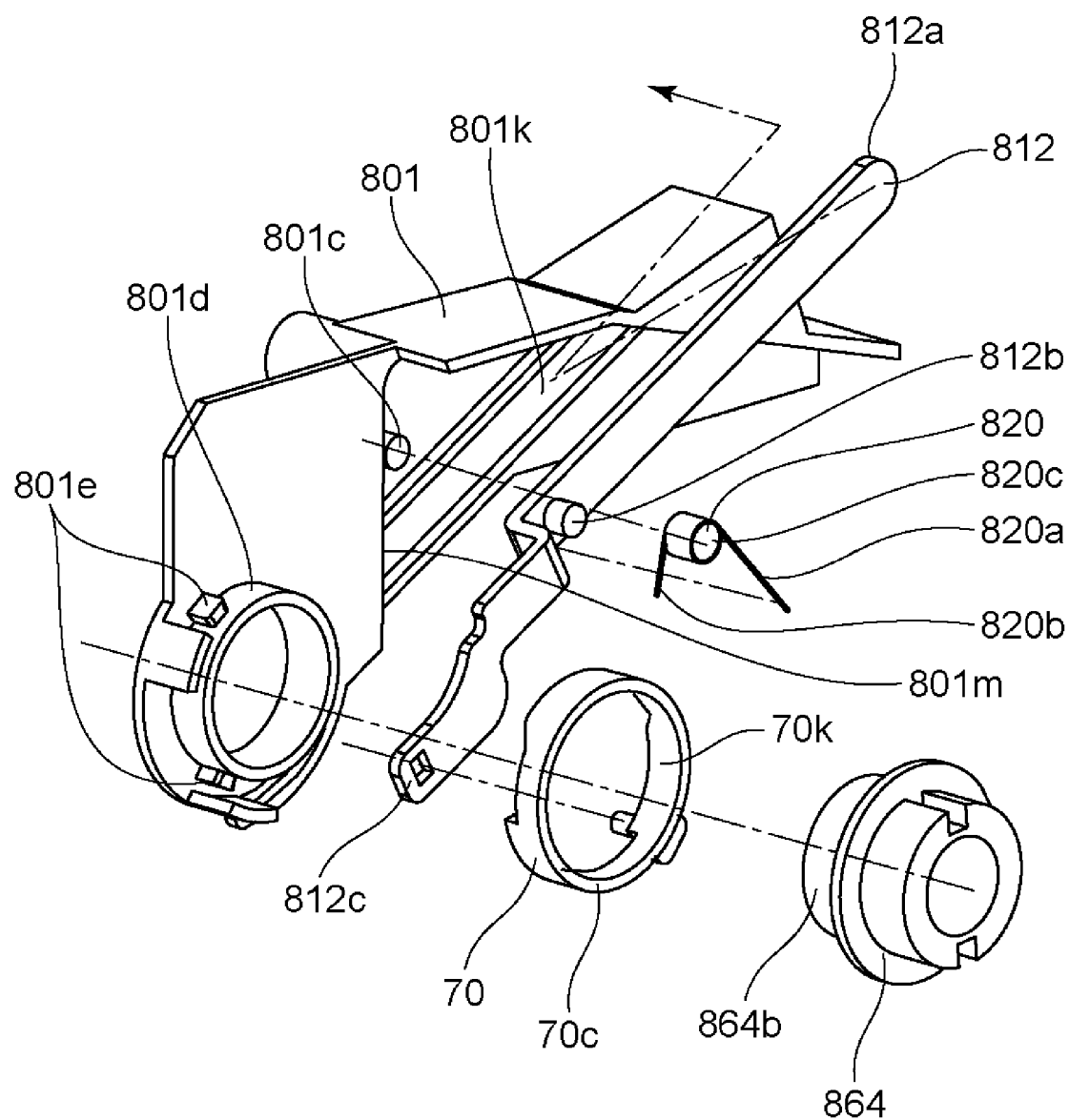
FIG. 41 is a perspective view of a periphery of a side member.
Figure 42:
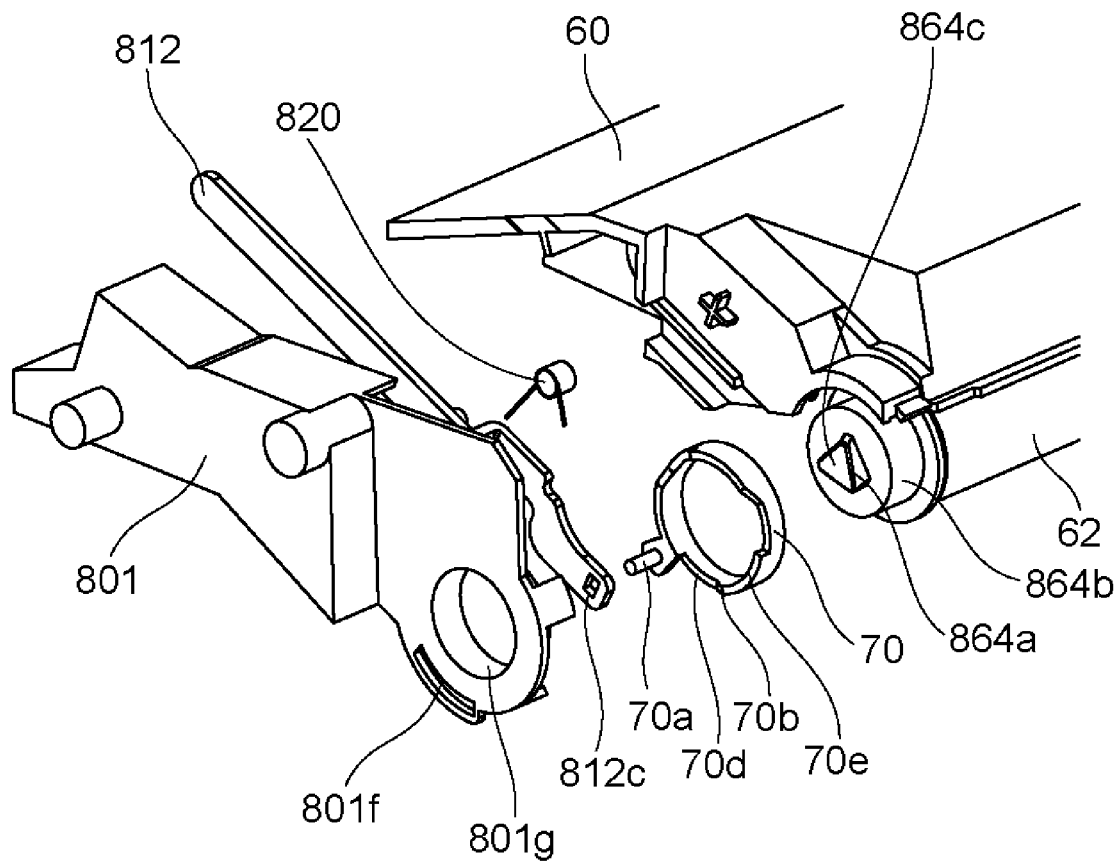
FIG. 42 is a perspective view of the periphery of the side member.
Figure 43:
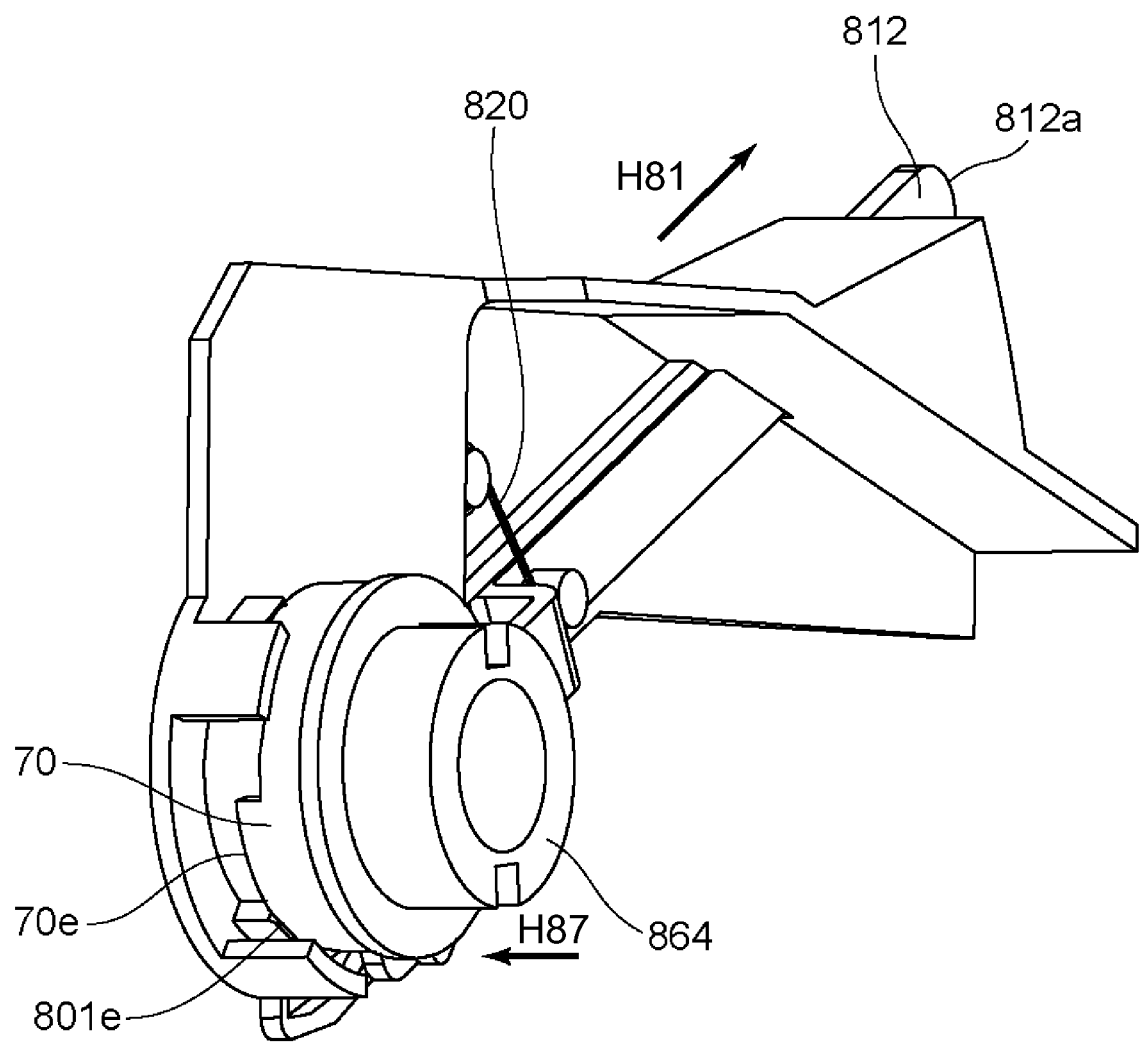
FIG. 43 is a perspective view of the periphery of the side member.

Referring to FIGS. 41 to 43, the advancing/retracting structure of the coupling member 864 will be described. FIGS. 41 to 43 are perspective views around the side member 801. In the Figure, some parts are omitted for better illustration.

As shown in the Figure, a lever member (operating member) 812 is assembled to the rail portion 801k of the side member 801. A coil portion 820c of a first urging member 820 is inserted into a fixing projection 801c of the side member 801, and a first urging end 820a thereof is in contact with an urged projection 812b of the lever member 812. A second urging end 820b of the first urging member 820 is in contact with a wall surface 801m of the side member 801. With this structure, the side member 801 is supported so as to be movable in the direction of arrow H81 and the opposite direction while, being urged in the direction of arrow H81 in FIG. 43.

The inner peripheral surface 70k of the cam member 70 is slidably fitted around the cylindrical outer peripheral surface 801d of the side member 801. The lever member engaging portion 70a of the cam member 70 is engaged with the engaging hole 812c of the lever member 812 and with is in the guide hole 801f of the side member 801. With this structure, the cam member 70 is rotatable and movable relative to the cylindrical outer peripheral surface 801d in accordance with the movement of the lever member 812.

A sliding cylindrical portion 864b of the coupling member 864 is slidably inserted into the sliding portion 801g of the side member 801.

Figure 44:
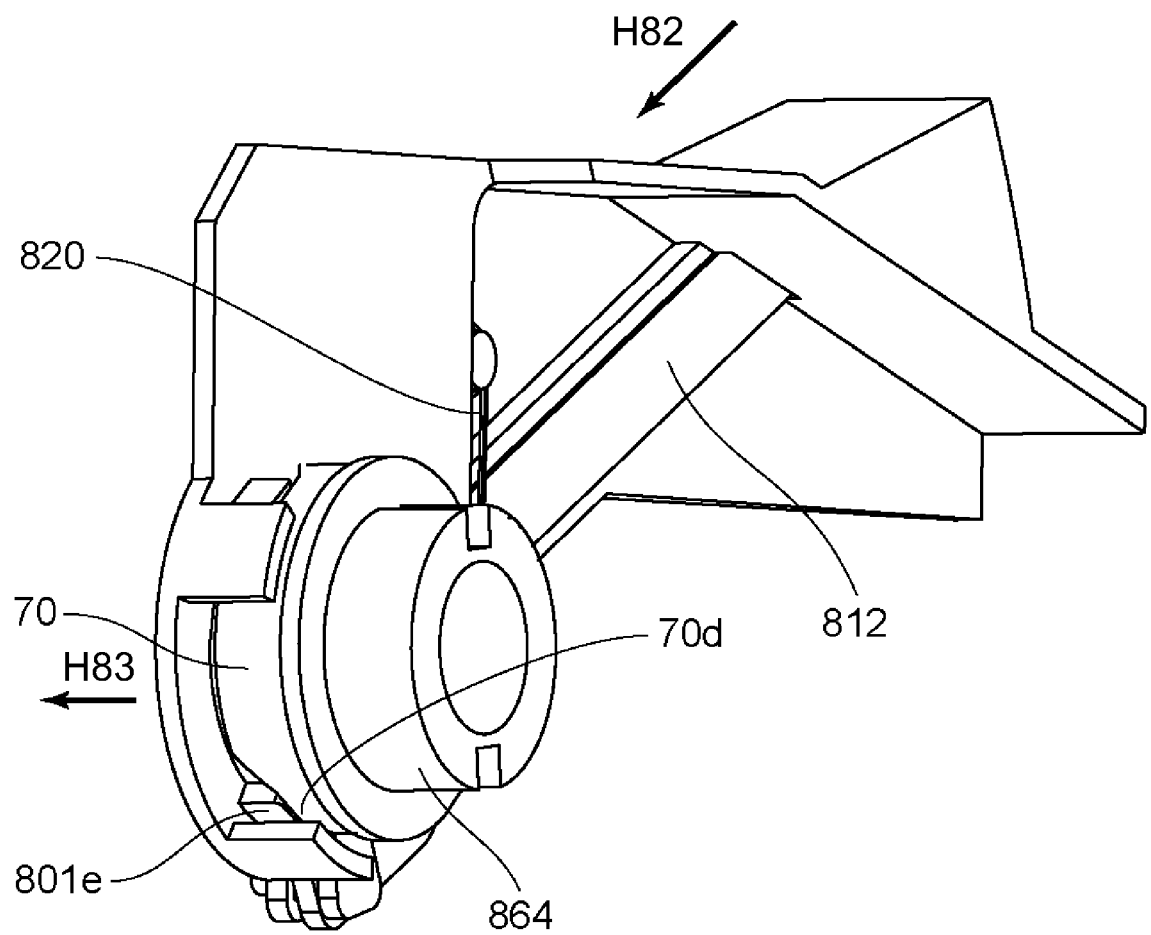
FIG. 44 is a perspective view of the periphery of the side member.

Referring to FIGS. 43 and 44, The operation of the cam member 70 will be described. The side member 801 is provided with a projection 801e (see FIG. 41). In addition, the cam member 70 has first surfaces 70e (three locations) on the outer side in the longitudinal direction, second surfaces 70d (three locations) which are parallel to the first surface 70e and which are recessed inward in the longitudinal direction from the first surface 70e, and inclined surfaces 70b (three locations) which smoothly connect the first surfaces 70e and the second surfaces 70d with each other (see FIG. 42).

FIG. 43 shows a normal state (free state) in which no external force is applied to the lever member 812. The lever member 812 has been moved in the direction of arrow H81 in the Figure by the force of the first urging member 820. At this time, the cam member 70 is in the phase shown in the Figure. Since the coupling member 864 is urged in the direction of arrow H87 in the drawing (see FIG. 40), the first surface 70e of the cam member 70 contacts the projection 801e of the side member 801 while receiving the urging force in the direction of arrow H87.

FIG. 44 shows the state after the lever member 812 is pushed. As shown in the Figure, when a force is applied to the contact portion 812a (see FIG. 43) of the lever member 812 in the direction of arrow H82 in the drawing, the lever member 812 moves in the direction of arrow H82 in the drawing. In accordance with this operation, the cam member 70 rotates to change the phase, so that the second surface 70d comes into contact with the projection 801e of the side member 801. Therefore, the cam member moves in the direction of arrow H83 in the Figure relative to the free state (state in FIG. 43). As a result, the coupling member 864 projects toward the drive side (in the direction of arrow H83 in the Figure).

When the external force acting on the lever member 812 disappears, the lever member 812 moves in the direction of arrow H81 in FIG. 43 by the urging force of the first urging member 820. As a result, it returns to the free state, and the coupling member 864 moves to the non-driving side.

Figure 45:
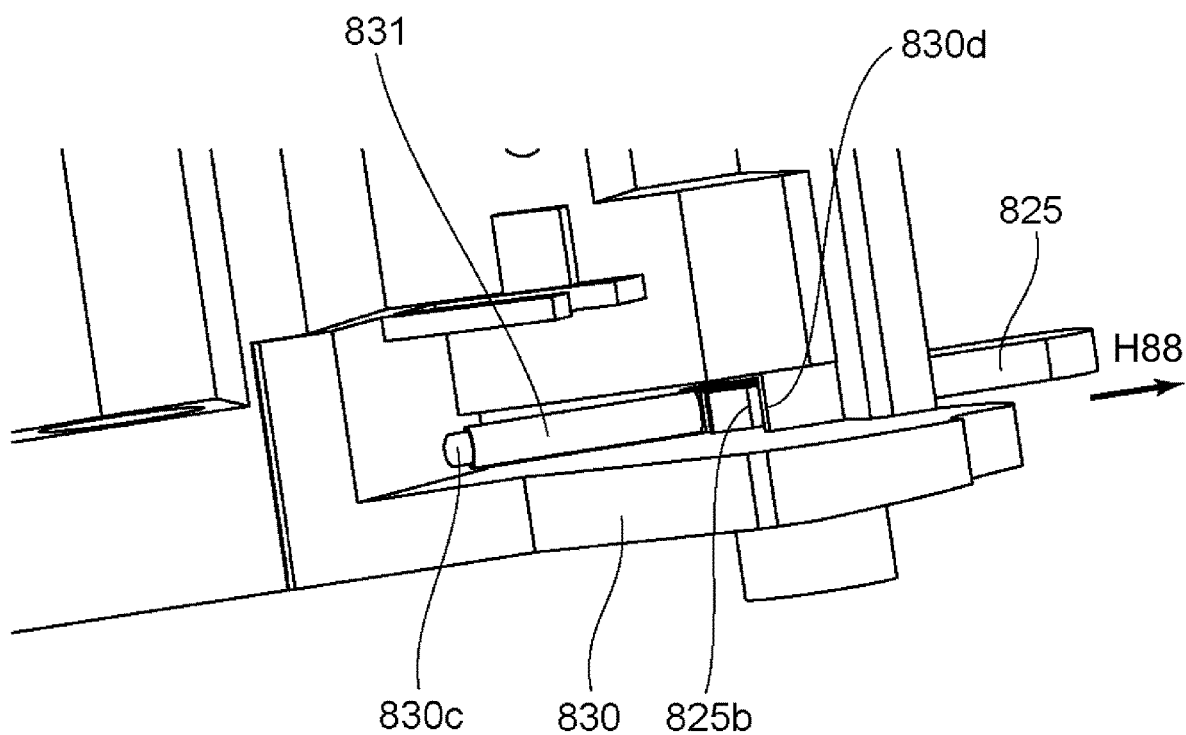
FIG. 45 is a perspective view around a second lever member.
Figure 46:
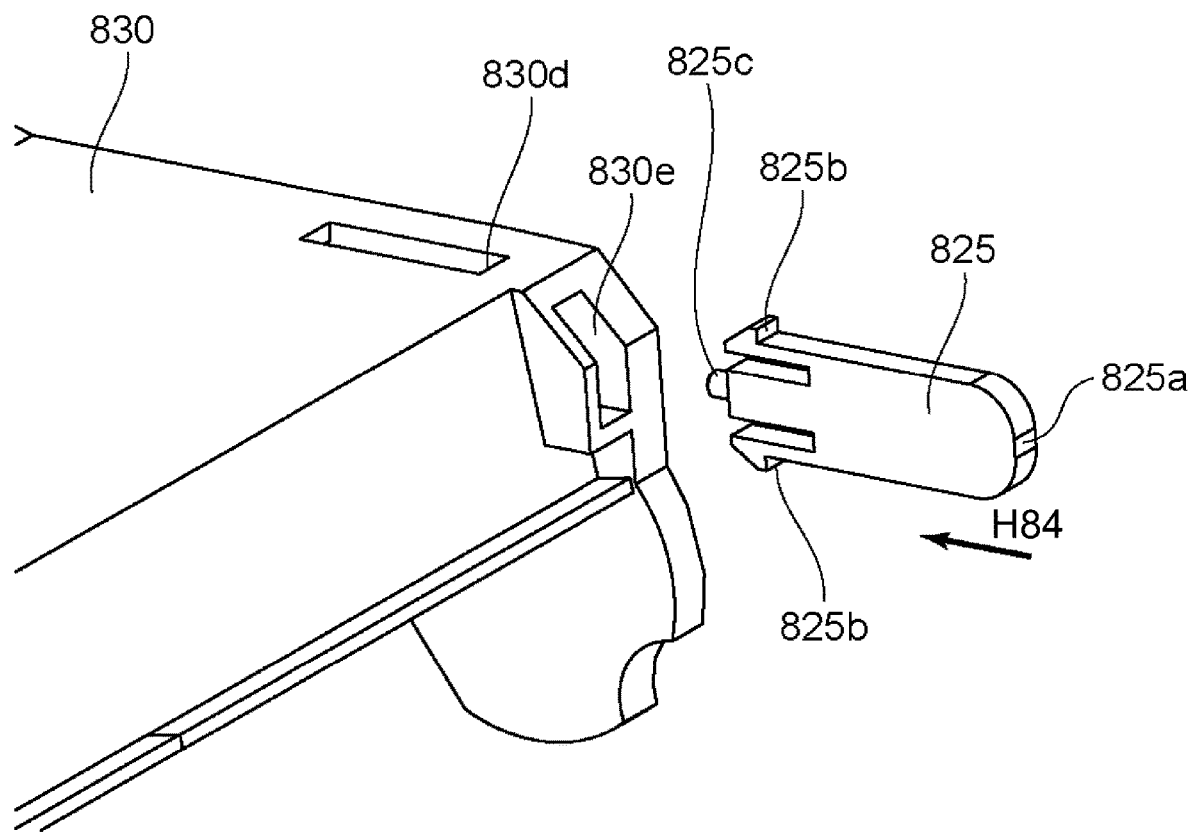
FIG. 46 is a perspective view of the periphery of the second lever member.

Referring to FIGS. 45 and 46, the structure around the second lever member 825 will be described. FIGS. 45 and 46 are perspective views around the second lever member 825. In the Figure, some parts are omitted for better illustration.

As shown in the Figure, the second lever member 825 is provided with a contact portion 825a, a locking portion 825b, and a projection 825c. The cleaning frame 830 as the first frame which rotatably supports the drum 62 is provided with a frame projection 830c, a locking surface 830d, and a lever opening 830e.

As shown in FIG. 46, the second lever member 825 is mounted through the lever opening 830e of the cleaning frame 830 in the direction of arrow H84 in the drawing. After mounting, as shown in FIG. 45, the locking portion 825b of the second lever member contacts the locking surface 830d of the cleaning frame 830, so that the second lever member 825 is prevented from disengagement. A second pressing member is provided on between the projection 825c of the second lever member 825 and the frame projection 830c of the cleaning frame 830. By this, the second lever member 825 is movably supported in the direction of arrow H88 and in the opposite direction thereto while being urged in the direction of arrow H88 in FIG. 45.

Referring to FIGS. 47 to 58, the mounting of the cartridge B to the apparatus main assembly A will be described. FIGS. 47 to 58 are perspective views illustrating the apparatus main assembly A and the mounting of the cartridge B. In the Figure, some parts are omitted for better illustration.

Figure 47:
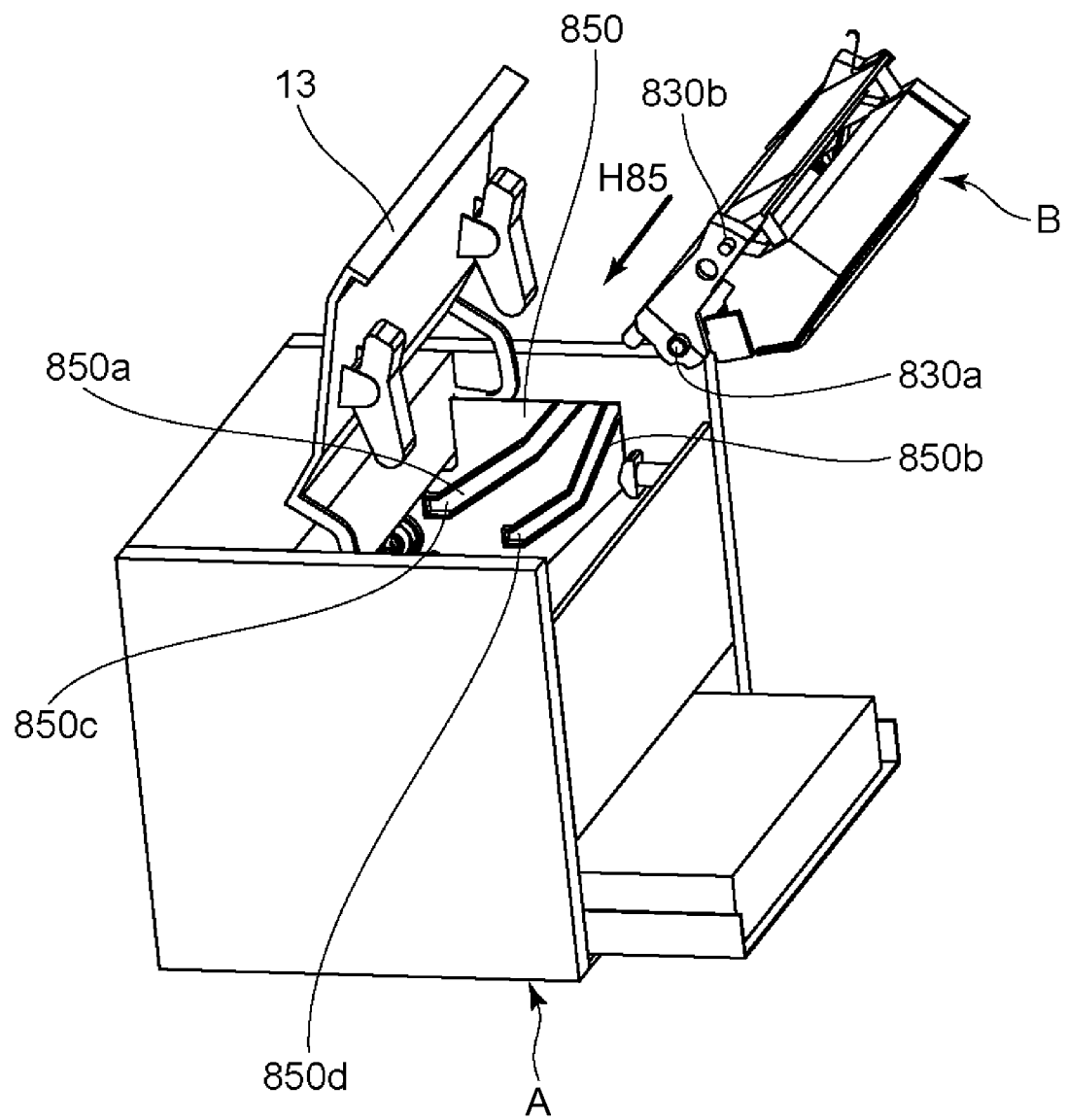
FIG. 47 is a perspective view of an apparatus main assembly and the process cartridge.
Figure 48:
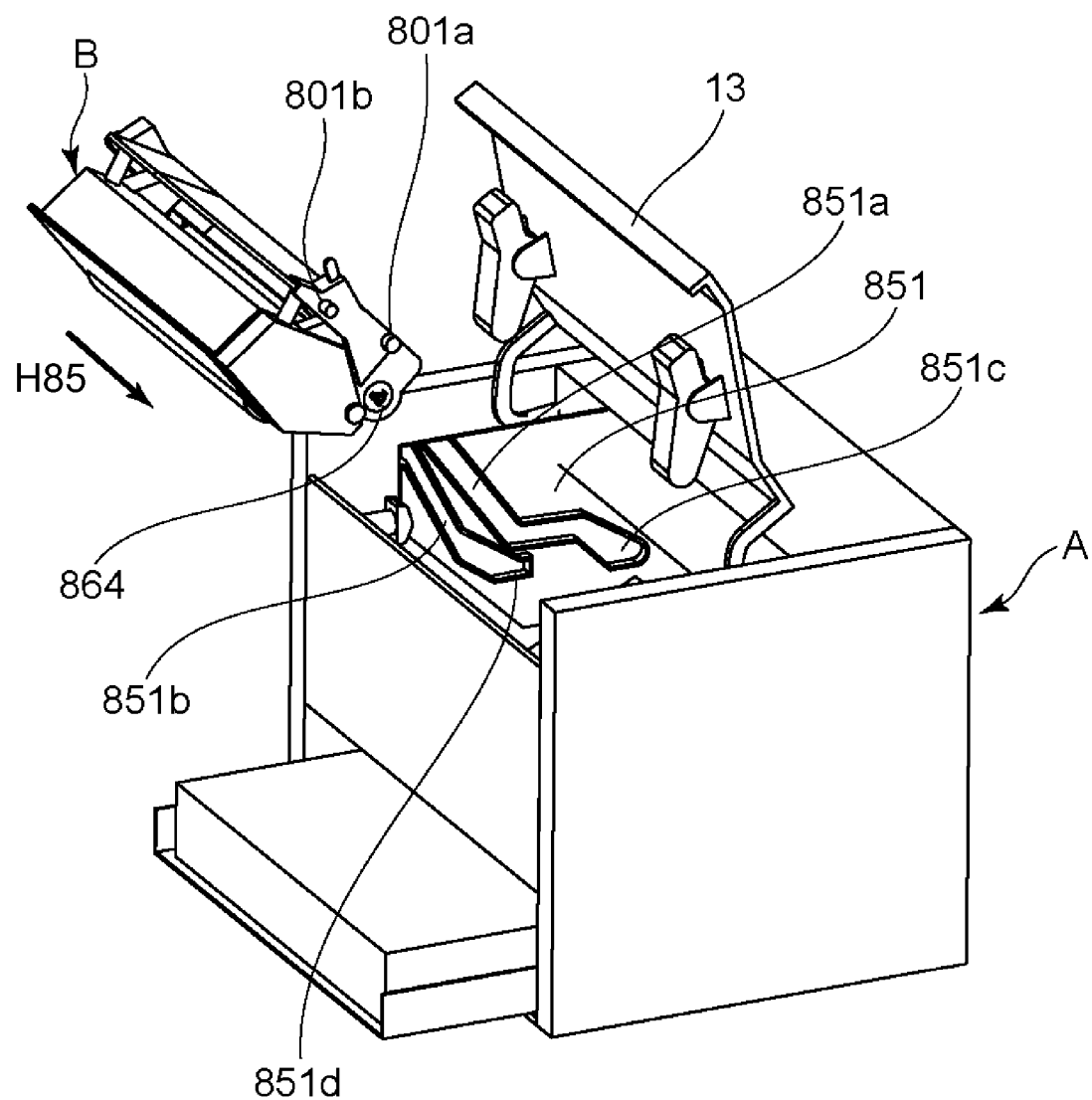
FIG. 48 is a perspective view of the apparatus main assembly and the process cartridge.

Referring to FIGS. 47 and 48, the structure of mounting the cartridge B to the apparatus main assembly A will be described. FIGS. 47 and 48 are perspective views in a state in which the opening/closing door 13 of the apparatus main assembly A is opened.

As shown in FIG. 47, a drive-side side plate 850 is provided on the drive side part of the apparatus main assembly A. The drive-side side plate 850 is provided with a drive-side first guide portion 850a and a drive-side second guide portion 850b, a terminal end portion of the drive-side first guide portion 850a is provided with a drive-side first positioning portion 850c; and a terminal end of the drive-side second guide portion 850b is provided with a drive-side second positioning portion 850d On the other hand, on the non-driving side of the cartridge B, there are provided a non-driving side first positioning projection 830a and a non-driving side second positioning projection 830b.

As shown in FIG. 48, a non-driving side plate 851 is provided on the non-driving side of the apparatus main assembly A. The non-driving side plate 851 is provided with a non-driving side first guide portion 851a and a non-driving side second guide portion 851b. A non-driving side first positioning portion 851c is provided at the terminal portion of the non-driving side first guide portion 851a, and a non-driving side second positioning portion 851d is provided at the terminal portion of the non-driving side second guide portion 851b. On the other hand, the drive side of the cartridge B is provided with a drive-side first positioning projection 801a and a drive-side second positioning projection 801b.

In order to mount the cartridge B on the apparatus main assembly A, the drive-side first positioning projection 801a and the drive-side second positioning projection 801b of the cartridge B are mounted to the drive-side first guide portion 850a and the drive-side second guide portion 850b of the apparatus main assembly A, respectively so as to be moved along the guide portions. Similarly, the non-driving side first positioning projection 830a and the non-driving side second positioning projection 830b of the cartridge B are mounted to the non-driving side first guide portion 851a and the non-driving side second guide portion 851b of the apparatus main assembly A, respectively so as to be moved along the guide portions.

When the cartridge is mounted at a position for image formation (see FIG. 57), the drive-side first positioning projection 801a and the drive-side second positioning projection 801b of the cartridge B are placed at the drive-side first positioning portion 850c and the drive-side second positioning portion 850d of the apparatus main assembly A, respectively. Similarly, the non-driving side first positioning projection 830a and the non-driving side second positioning projection 830b of the cartridge B are placed at the non-driving side first positioning portion 851c and the non-driving side second positioning portion 851d of the apparatus main assembly A, respectively.

Figure 49:
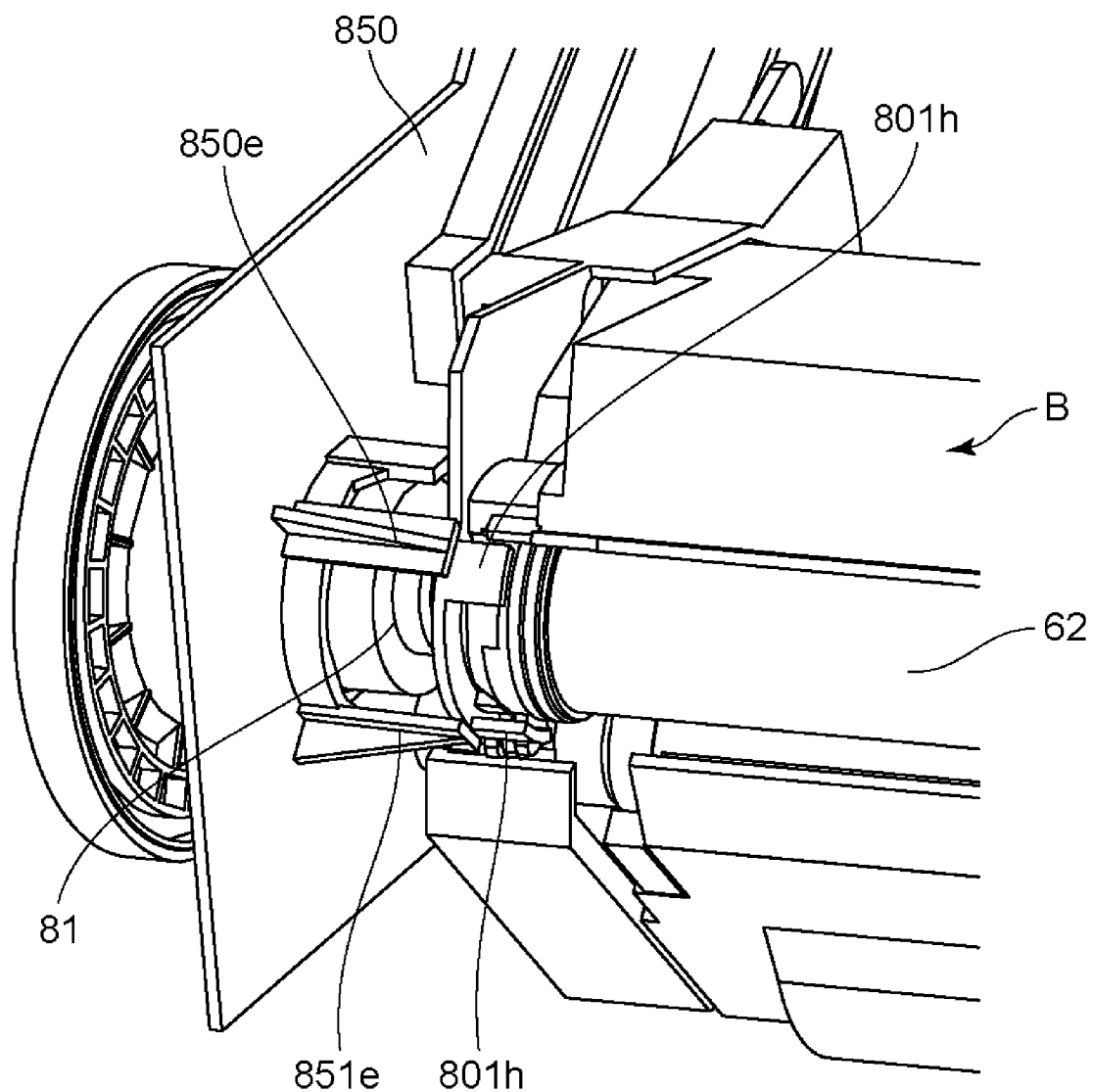
FIG. 49 is a perspective view of the periphery of the drive transmission member.

FIG. 49 is a view around the drive transmission member 81 of the apparatus main assembly A to which the cartridge B has been mounted. The positioned contact portion 801h of the cartridge B contacts the positioning contact portion 850e of the drive-side side plate 850, and the positions of the apparatus main assembly A and the cartridge B are determined.

Figure 50:
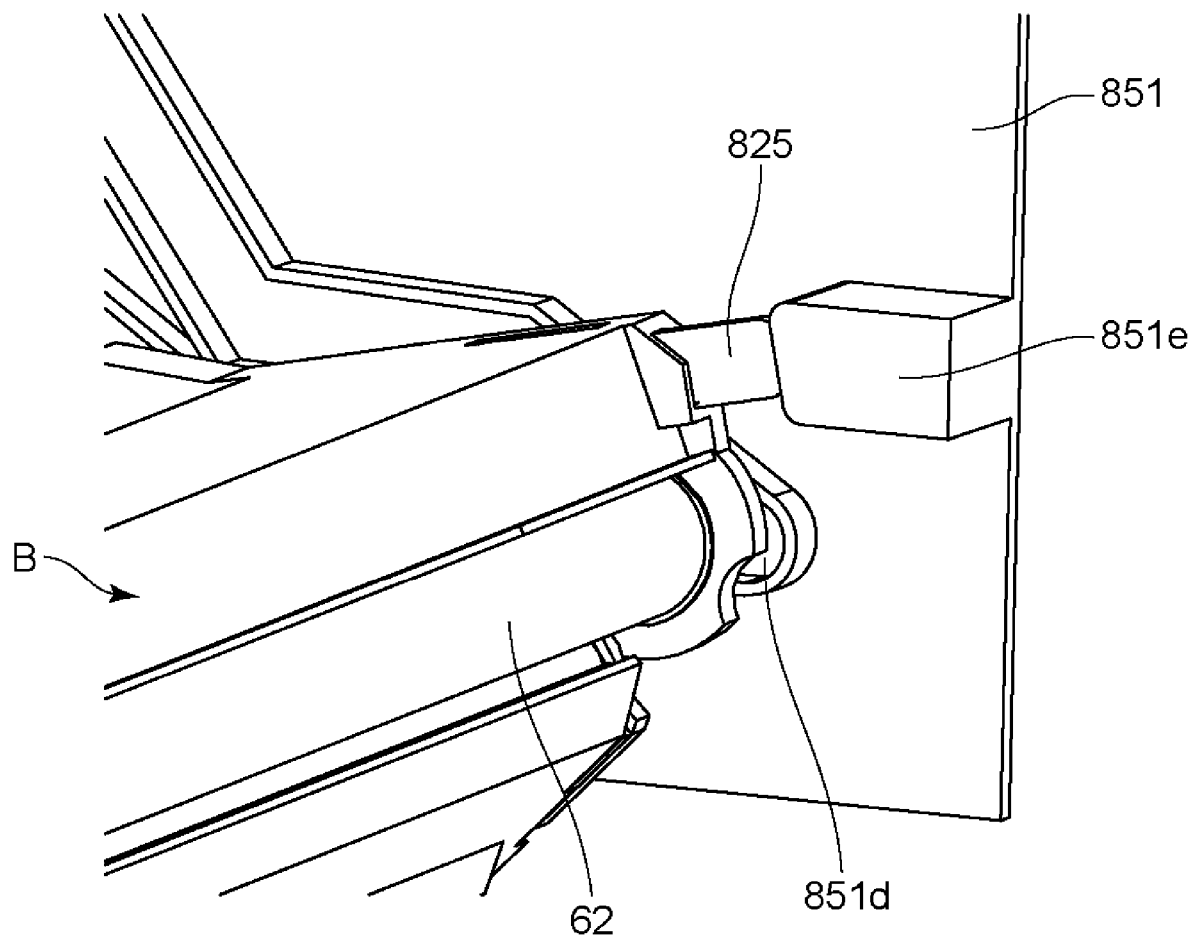
FIG. 50 is a perspective view around the second lever member.

FIG. 50 shows a state of the non-driving side of the apparatus main assembly A in which the cartridge B has been mounted. As shown in the Figure, the contact portion 825a of the second lever member 825 of the cartridge B is in contact with the contacted portion 851e of the non-driving side plate 851. Therefore, the non-driving side first positioning projection 830a and the non-driving side second positioning projection 830b of the cartridge B are not yet mounted up to the non-driving side first positioning portion 851c and the non-driving side second positioning portion 851d of the apparatus main assembly A, respectively.

Figure 51:
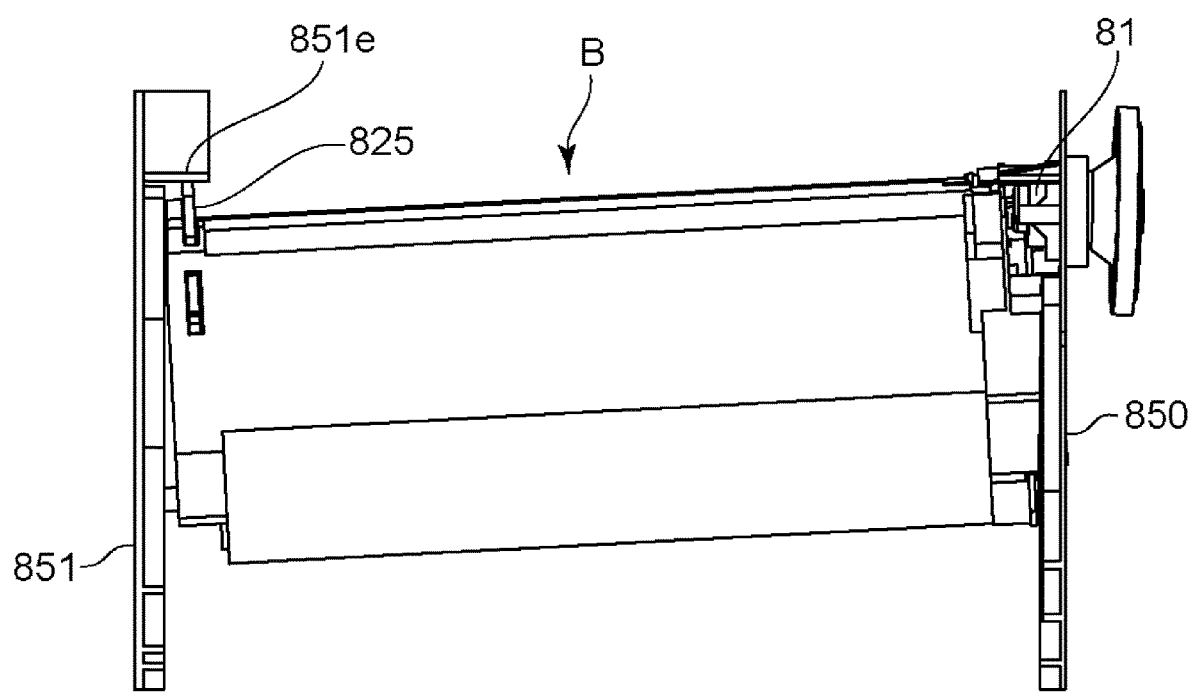
FIG. 51 is a view of the apparatus main assembly and the process cartridge as viewed from above.

FIG. 51 shows this state as viewed from the top of the apparatus main assembly A. As shown in the Figure, the drive side of the cartridge B almost reaches the inner side of the apparatus main assembly A. On the other hand, the non-driving side does not reach the inner side of the apparatus main assembly A. Therefore, the rotation axis of the drum 62 of the cartridge B is mounted in a state of being tilted relative to the rotation axis of the drum 62 which extends when the cartridge B is mounted on the apparatus main assembly A at the mounting position (see FIG. 57) for image formation.

Figure 52:
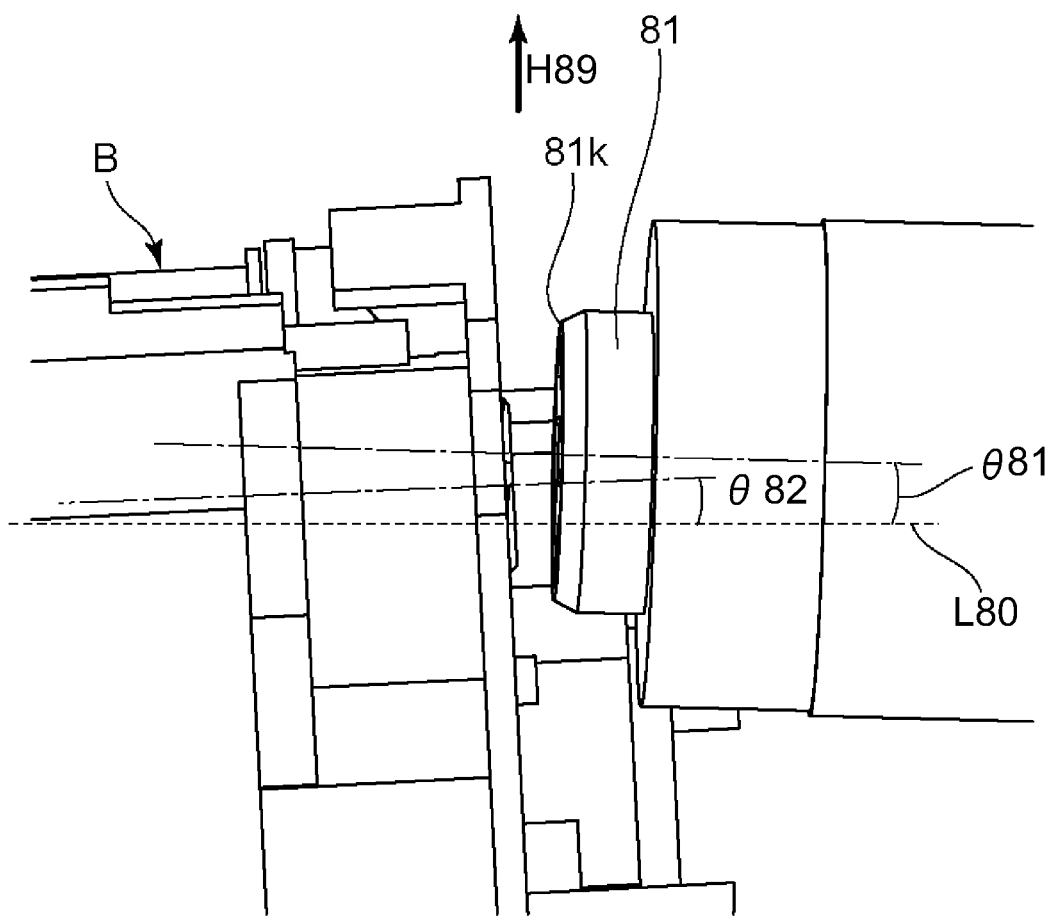
FIG. 52 is a perspective view of the periphery of the drive transmission member.

The state around the drive transmission member 81 at this time is shown in FIG. 52. The broken line L80 in the Figure indicates the direction of the rotation axis of the drum 62 when the cartridge B is mounted in the apparatus main assembly A at a position (see FIG. 57) for image formation.

As shown in the Figure, the drive transmission member 81 is tilted, and therefore, it is tilted by $\Theta 81°$ with respect to the broken line L80 in the Figure, and the free end surface 81k thereof (see also FIG. 4) is shifted in the direction of arrow H89 in the Figure. On the other hand, the cartridge B is tilted by $\Theta 82°$ relative to the broken line L80 in the drawing, and the free end surface 864c of the driven transmission portion of the coupling member 864 is also shifted in the direction of the arrow H89 in the drawing (see FIG. 39).

Figure 53:
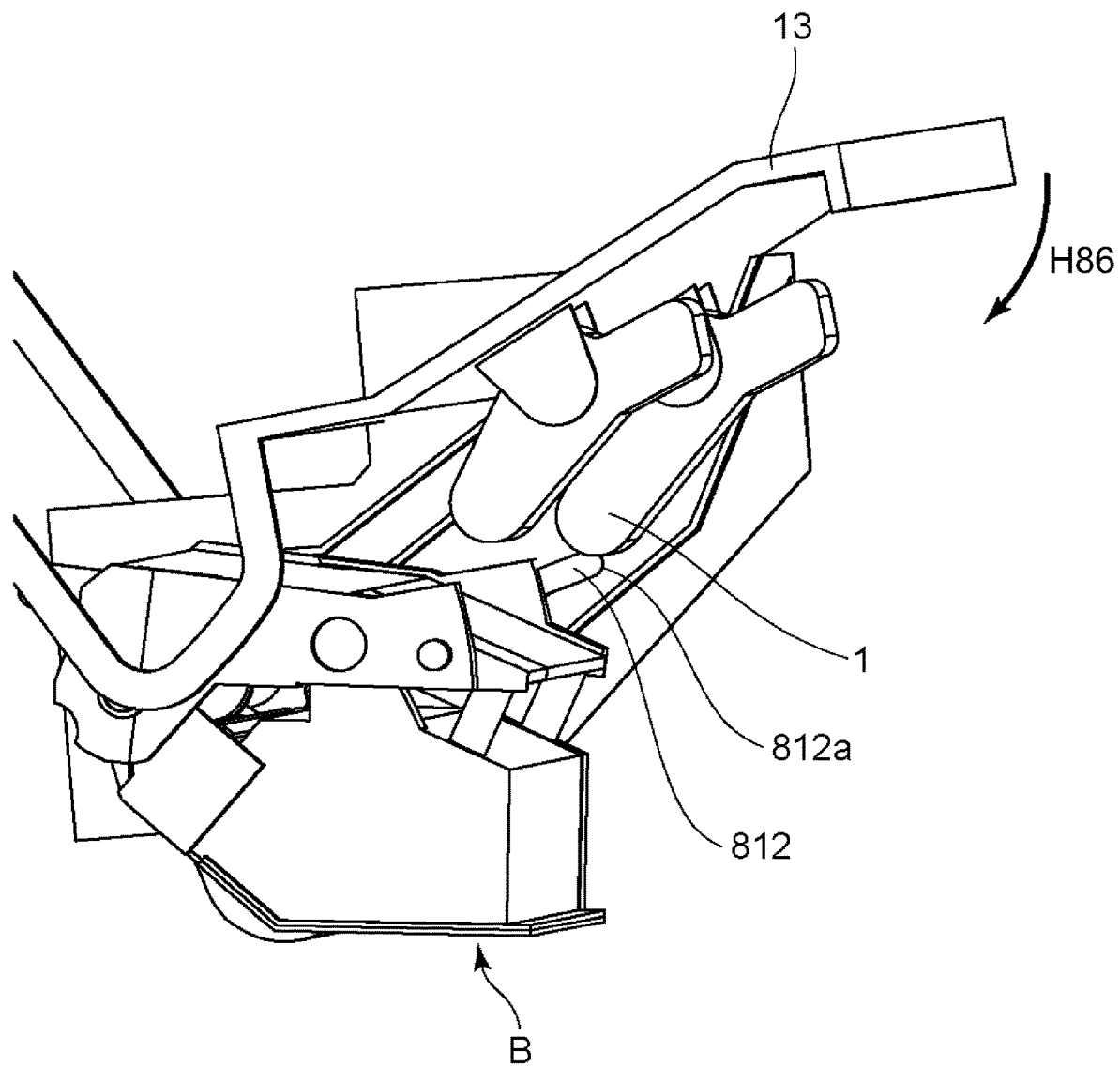
FIG. 53 is a perspective view of the apparatus main assembly and the process cartridge.

FIG. 53 shows the behavior in which the opening/closing door 13 of the apparatus main assembly A is closed in this state. When the opening/closing door 13 is closed in the direction of arrow H86 in the drawing, the drive side cartridge pressing member 1 provided on the opening/closing door is brought into contact with the contact portion 812a of the lever member 812. Further, when the opening/closing door 13 is closed, the cartridge pressing member 1 on the drive side pushes the lever member 812. At this time, as described above, the coupling member 864 of the cartridge B pops out toward the drive side.

Figure 54:
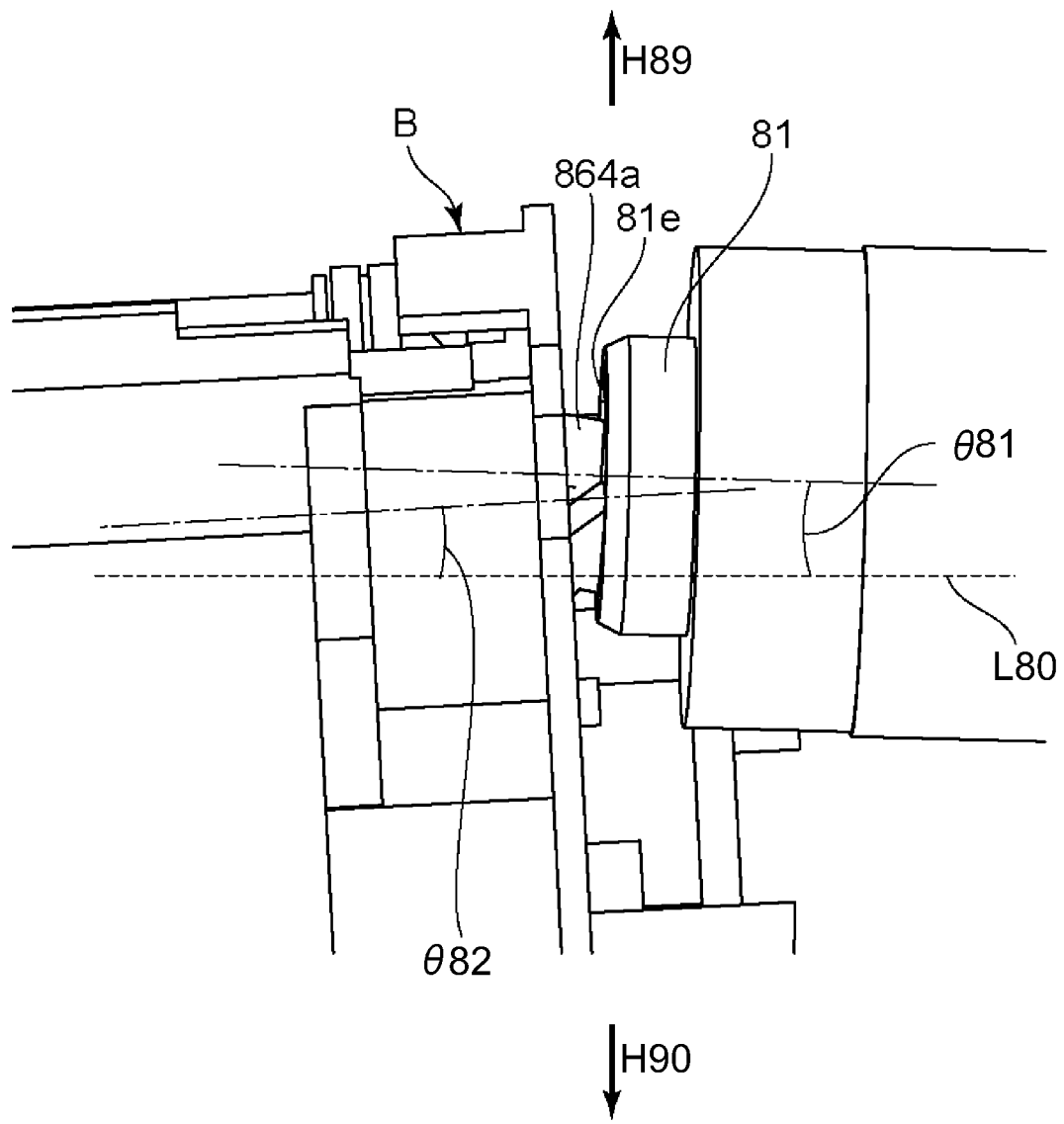
FIG. 54 is a perspective view of the periphery of the drive transmission member.

FIG. 54 shows the state in which the coupling member 864 projects toward the drive side. As described above, both the free end surface 81k of the drive transmission member 81 and the free end surface 864c of the driven transmission portion of the coupling member 864 are deviated in the direction of arrow H89 in the drawing. Therefore, the positional deviation between the driven transmission portion 864a of the coupling member 864 and the drive transmission portion 81e of the drive transmission member 81 (see also FIG. 4) in the direction perpendicular to the axial direction of the photosensitive drum (direction perpendicular to L80) decreases. For this reason, the projecting front end surface of the driven transmission portion 864c enters the drive transmission portion 81e.

Figure 55:
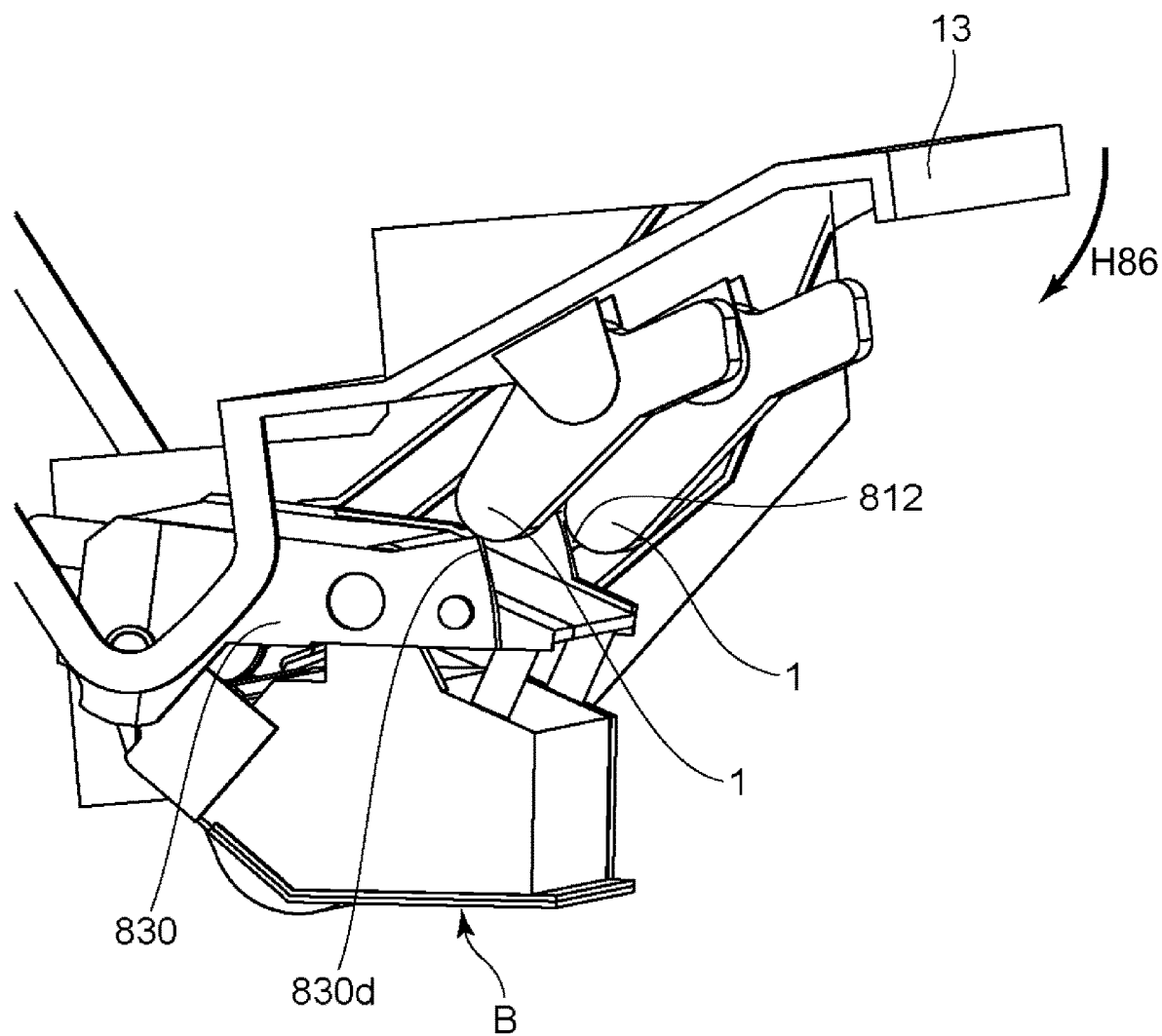
FIG. 55 is a perspective view of the apparatus main assembly and the process cartridge.
Figure 56:
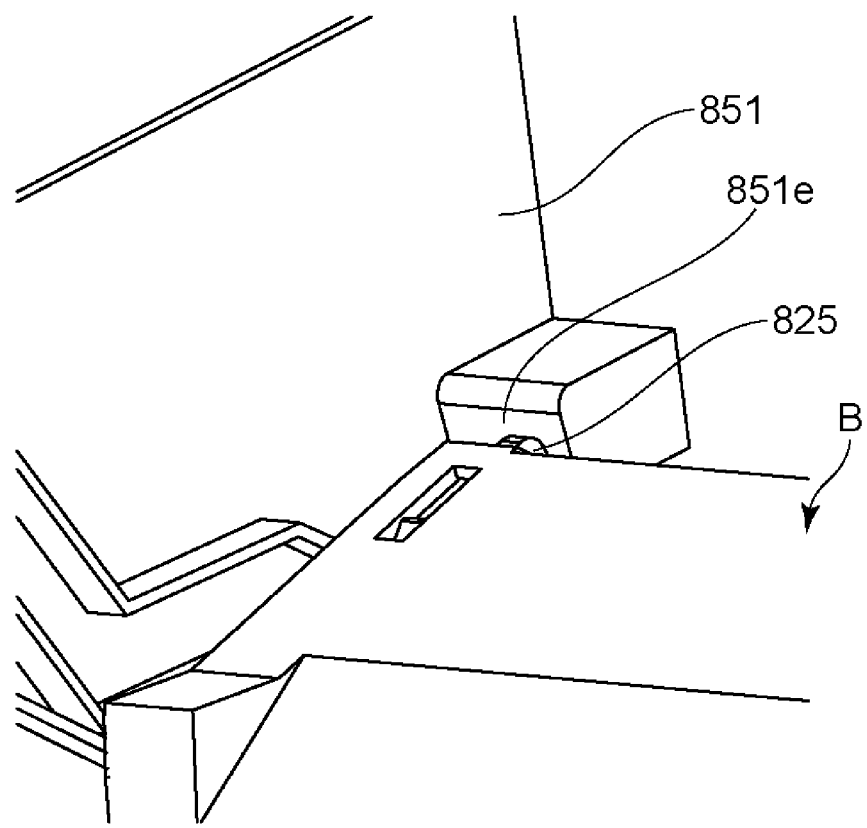
FIG. 56 is a perspective view of the periphery of the second lever member.

Referring to FIGS. 55 and 56, A state in which the opening/closing door 13 is further closed in this state will be described. As shown in the Figure, the cartridge pressing member 1 on the driving side pushes the lever member 812 completely. On the other hand, the cartridge pressing member 1 on the non-driving side starts pressing the pressing portion 830d of the cleaning member 830. When the opening/closing door 13 is closed further, the non-driving side of the cartridge B is pressed by the cartridge pressing member 1 on the driving side. FIG. 56 shows the state of the device main assembly A and the cartridge B on the non-driving side at this time. When the cartridge B is pressed, a pressing force acts on the second lever member 825 which is in contact with the contacted portion 851e of the non-driving side plate 851, so that the second pressing member 831 (see FIG. 45) contracts, and the second pressing member 831 enters the cleaning frame 830. Therefore, the non-driving side of the cartridge B is being mounted to the apparatus main assembly A.

When the opening/closing door 13 is completely closed, the non-driving side first positioning projection 830a and the non-driving side second positioning projection 830b of the cartridge B become placed in the non-driving side first positioning portion 851c and the non-driving side second positioning portion 851d of the apparatus main assembly A, respectively.

On the other hand, the drive side end of the cartridge B is affected by the operation of the non-drive side of the cartridge B in the process of further closing the opening/closing door from the state of FIG. 55, so that it inclines in the arrow H90 direction in the FIG. 54. At this time, since the popped out free end surface 864c of the driven transmission portion is in a state of entering the drive transmission portion 81e, the drive transmission member 81 also inclines in the direction of arrow H90 in the Figure together with the drive transmission portion free end surface 864c.

Figure 57:
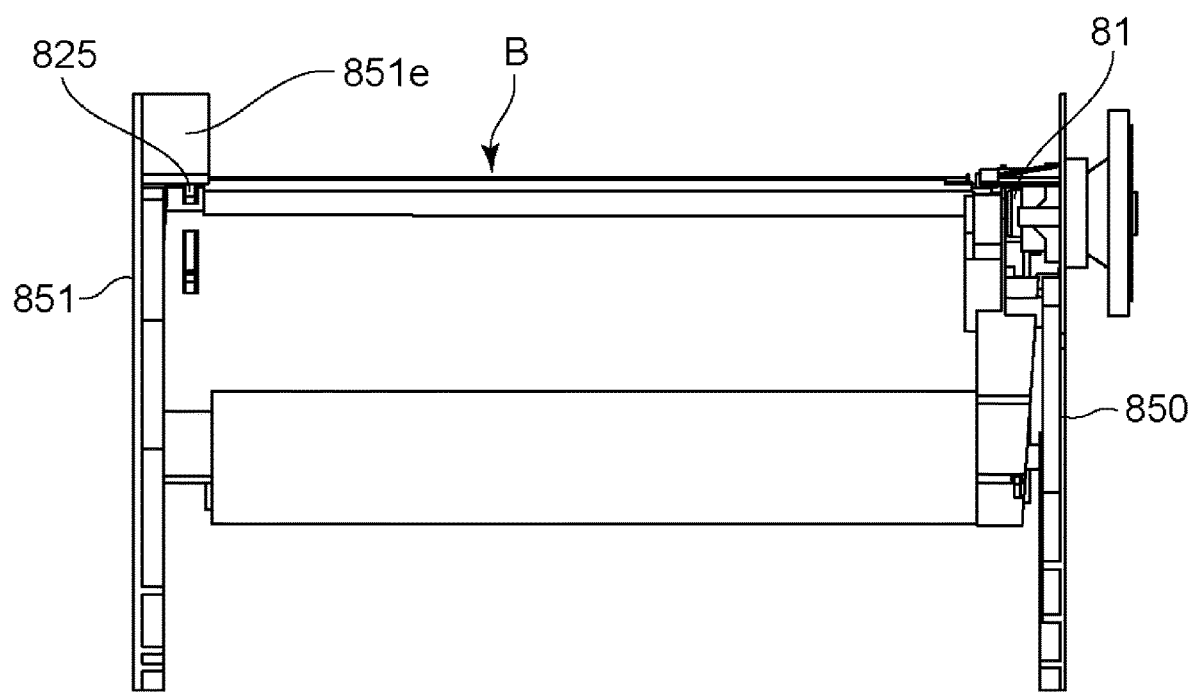
FIG. 57 is a view of the apparatus main assembly and the process cartridge as viewed from above.
Figure 58:
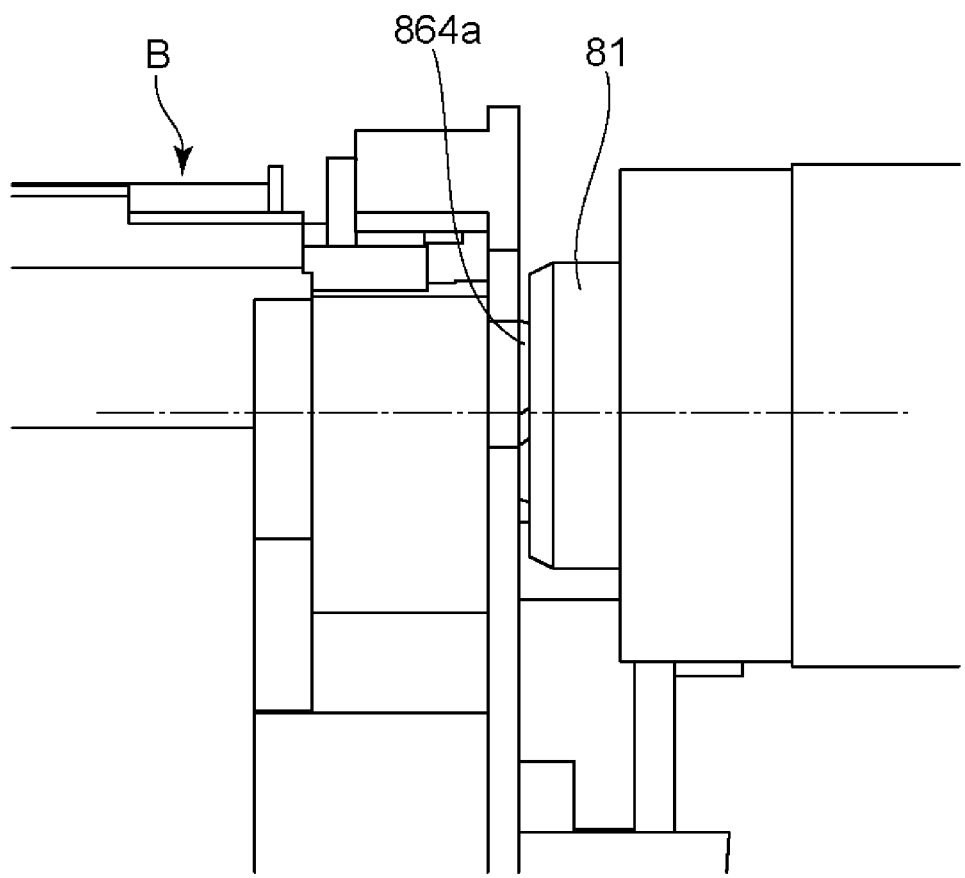
FIG. 58 is a perspective view of the periphery of the drive transmission member.

When the opening/closing door 13 is completely closed in this manner, the cartridge B is positioned with respect to the apparatus main assembly A at a position for image formation (see FIG. 57). When the drive transmission member 81 of the apparatus main assembly A is rotationally driven in this state, the drive transmission portion 81e of the drive transmission member 81 and the driven transmission portion 864a of the coupling member 864 are engaged with each other to transmit the drive to the cartridge B.

In this embodiment, the cartridge pressing member 1 of the device main assembly A is structured to press the cartridge B against the device main assembly A by receiving the pressing force of the pressing spring 19 of the device main assembly A when the opening/closing door 13 is closed. However, the present invention is not limited to such a structure.

At this time, if the drive transmission portion 81e and the driven transmission portion 864a have the above-mentioned twisted projection-recess configurations, the drive transmission portion 81e and the driven transmission portion 864a attract each other, so that stable drive transmission is accomplished.

When the cartridge B is taken out from the apparatus main assembly A, the above-mentioned operation is reversed. When the opening/closing door 13 is opened, the non-driving side of the cartridge B is displaced from the image forming position by the action of the second lever member 825, and the state becomes as shown in FIG. 54. When the opening/closing door 13 is further opened, the lever member 812 returns, and the coupling member 864 is pulled toward the cartridge B side (state in FIG. 52). After the opening/closing door 13 is completely opened, the cartridge B is taken out.

Figure 59:
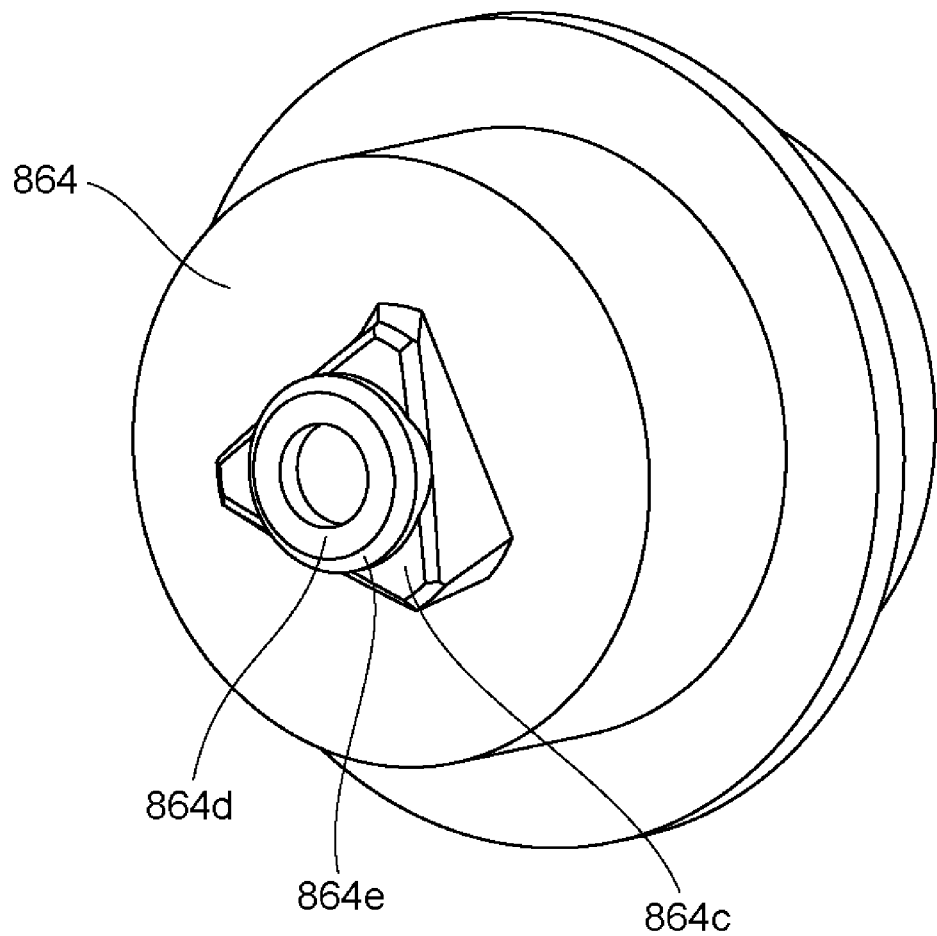
FIG. 59 is a perspective view of the coupling member.

As shown in FIG. 59, if a guide projection 864d having a smaller outer shape than the driven transmission portion 864a is provided at the free end of the driven transmission portion 864a of the coupling member 864, it is easy to enter the drive transmission portion 81e of the drive transmission member 81, when the coupling member 864 pops out. In addition, if an inclined portion 864e is provided at the free end of the guide projection 864d, it is further easier to enter.

Figure 60:
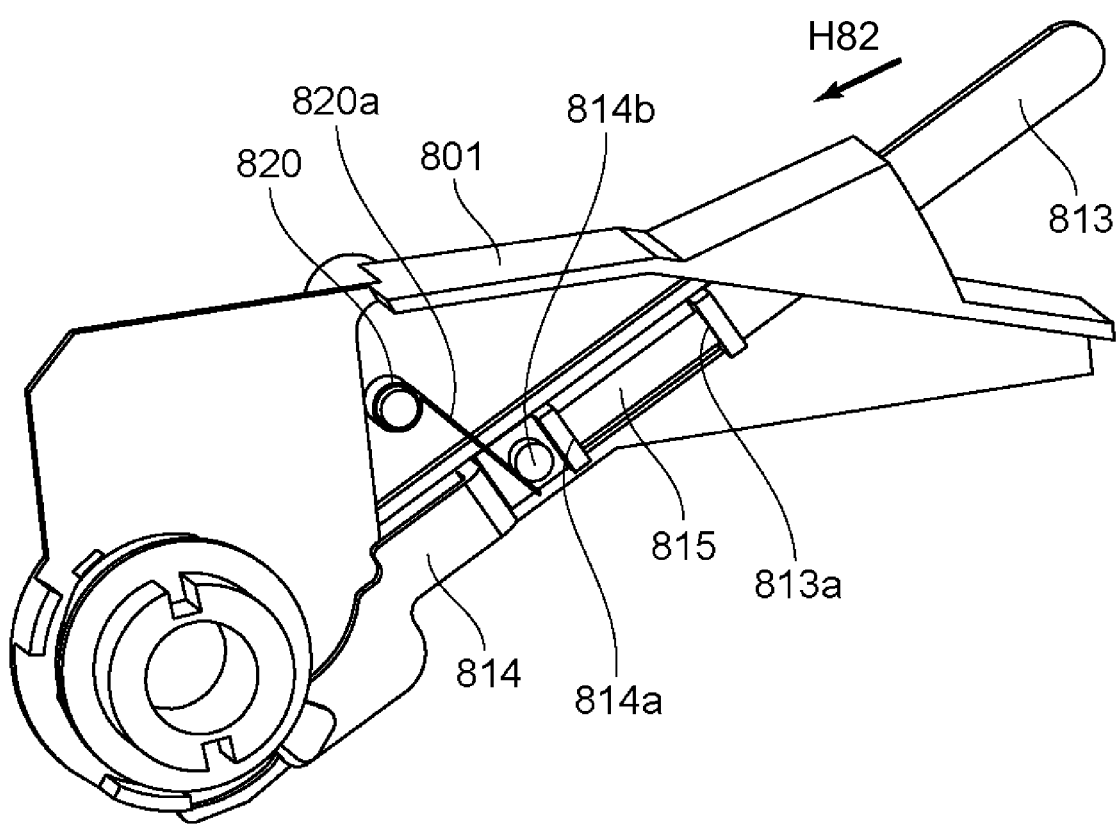
FIG. 60 is an illustration of a modified example of a lever member.
Figure 61:
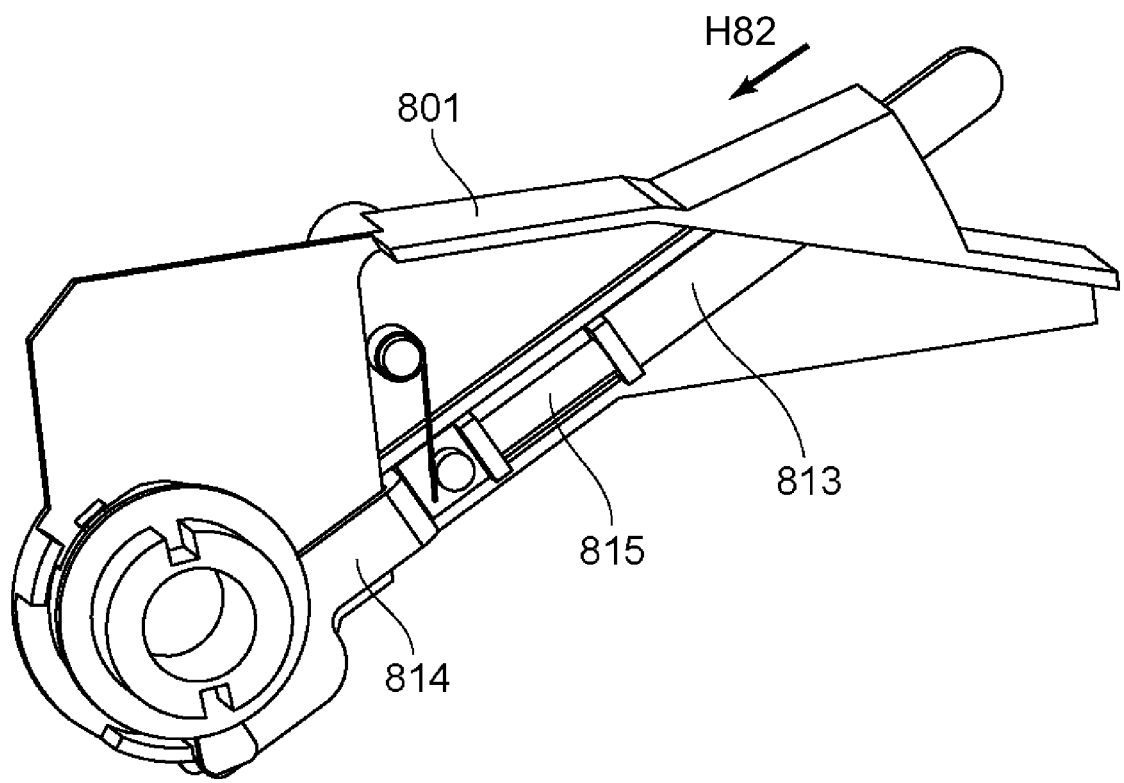
FIG. 61 is an illustration of the modified example of the lever member.
Figure 62:
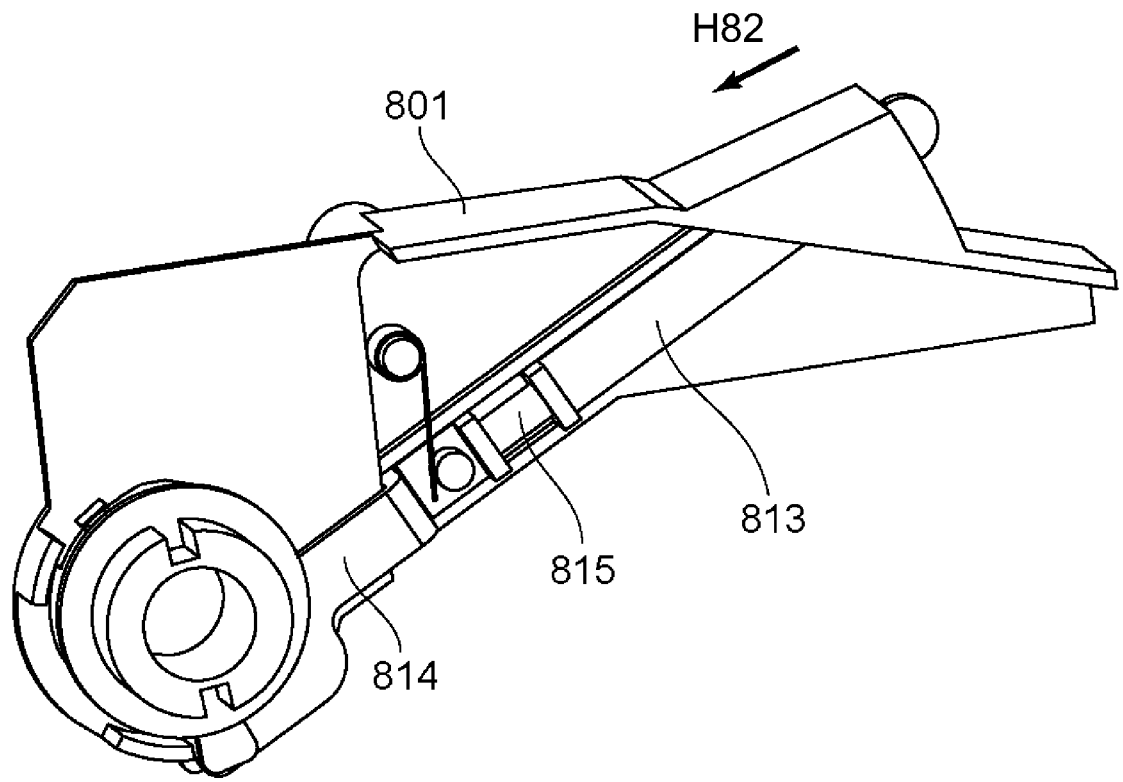
FIG. 62 is an illustration of the modified example of the lever member.

Referring to FIGS. 60 to 62, A modified example in which the structure of the lever member is partially changed will be described. As shown in the Figure, the side member 801 is provided with a third lever member 813 and a fourth lever member 814 so as to be movable in the direction of arrow H82 in the drawing and in the opposite direction thereto. The third lever member 813 and the fourth lever member 814 correspond to a structure in which the first lever member 812 (see FIG. 41) is divided into two parts.

The first urging end 820a of the first urging member 820 is in contact with the urging projection 814b of the fourth lever member 814. A second urging member 815 is provided between the third lever member 813 and the fourth lever member 814, and opposite ends thereof are in contact with the pressure receiving portion 813a of the third lever member 813 and with the pressure receiving portion 814a of the fourth lever member 814, respectively. FIG. 60 shows a free state in which no external force is exerted to the third lever member 813.

With this structure, when the opening/closing door 13 of the apparatus main assembly A is closed, the third lever member 813 is pushed by the cartridge pressing member 1 as described above.

When the third lever member 813 is pushed in the direction of arrow H82 in the Figure, the second urging member 815 is pushed in the direction of the arrow H82 while being compressed. FIG. 61 shows a state in which the fourth lever member 814 is fully pushed and the cam member 70 is fully rotated.

When the opening/closing door 13 is further closed from this state, the second urging member (elastic member, spring) 815 is compressed by the amount corresponding to the amount through which the third lever member 813 is pushed in, so that the movement of the opening/closing door 13 is not hindered.

By employing this structure, the latitude in designing the position of the third lever member 813 and the position of the cartridge pressing member 1 of the apparatus main assembly A is increased. The reason is that, the second urging member 815, which is an elastic member, is deformable, and therefore, even if the arrangement relationship and dimensions of the third lever member 813 and the device main assembly A change, the change can be absorbed by deformation of the second urging member 815.

In this manner, it is also preferable to provide an elastic member (second urging member 815) between the coupling member 864 and the operating member (lever member 813) for operating the coupling member (engagement member) 864. The structure in which the elastic member is provided between the operating member and the object operated by the operating member may also be employed in the other embodiments which are described in the foregoing and which will be described hereinafter.

In the above-described embodiments, the plurality of lever members 812, 825, 813, and 314 are referred to as the first, second, third, and fourth lever members, respectively. When a plurality of lever members are referred to separately in this manner, they may be referred to as the first, second, third, fourth lever members, and so on in no particular order for convenience. The same applies to the description of other embodiments.

In this embodiment, the cartridge B can receive the driving force by engaging the coupling member 864 which can advance and retract, with the drive transmission member 81 of the apparatus main assembly A. However, as described above, the drive transmission member 81 is provided with the gear portion (output gear portion) 81f (see FIG. 4). Therefore, if the cartridge B includes a gear member which can engage with the gear portion 81f to receive the driving force, the cartridge B can also receive the driving force from the gear portion 81f provided on the outer peripheral portion of the drive transmission member 81. As an example of the gear included in the cartridge B, there is a gear 187 shown in FIG. 15 as described above. For example, the gear 187 is connected to the developing roller 32 so as to be capable of drive transmission. Then, as shown in FIG. 22, if the developing roller 32 and the photosensitive drum 62 are connected so that the driving force can be transmitted by the gear train, both of the developing roller 32 and the photosensitive drum 62 can be driven by the driving force inputted from the gear portion 81f.

That is, the coupling member 864 in this embodiment has two functions of (1) reducing the inclination angle of the drive transmission member 81 and (2) receiving the driving force from the drive transmission member 81 through the engagement with the drive transmission member 81. However, the functions of the former and the latter do not necessarily have to be achieved by a single member. The coupling member 864 may be changed to a structure in which the coupling member 864 is a mere advancement/retraction member or a mere engaging member which engages with the drive transmission member 81 but does not receive drive transmission from the drive transmission member 81.

The structure of this embodiment is summarized below.

The apparatus main assembly A includes a drive transmission member (drive output member) 81 capable of outputting a driving force and capable of tilting.

The cartridge includes the photosensitive drum 62, the coupling member (engagement member) 864, and the second lever member 825.

The second lever member 825 is a movable member which is movably supported by the frame body (casing) of the cartridge, and functions as a positioning member for determining the position of the cartridge B inside the apparatus main assembly A by contacting the apparatus main assembly A. The second lever member 825 is disposed in the front part of the cartridge B and on the non-driving side of the cartridge B. The second lever 825 projects frontwardly of the cartridge and can be moved so as to retract toward the rear side of the cartridge. The second lever member is urged toward the projecting position (see FIG. 39) by the second pressing member 831 (FIG. 45), which is an elastic member (spring).

In FIG. 51, the second lever member 825 determines the position of the cartridge in the state in which the cartridge B is tilted relative to the apparatus main assembly A. On the other hand, in FIG. 57, the position of the cartridge is determined in the state in which the inclination angle of the cartridge B is reduced by the retraction of the second lever member 825 to the rear of the cartridge.

One of the positions of the cartridges B in FIGS. 51 and 57 may be referred to as a first cartridge position, and the other may be referred to as a second cartridge position. Similarly, one of the positions of the second lever members in FIGS. 51 and 57 may be referred to as a first positioning member position, and the other may be referred to as a second positioning member position or the like.

The position of the cartridge shown in FIG. 57 is a regular mounting position for image forming operation. FIG. 51 shows a position in which the cartridge B is inclined relative to the mounting position. That is, as the second lever member 825 moves, the cartridge B changes the inclination angle relative to the apparatus main assembly A.

The coupling member 864 is an engaging member which engages with the drive transmission member 81. The coupling member 864 is a movable member arranged near the end of the photosensitive drum, and constitutes a drum unit together with the photosensitive drum 62.

When the cartridge B is in the attitude shown in FIG. 51, by the coupling member 864 advancing in the axial direction toward the drive transmission member 81, the coupling member 864 is brought into contact with the drive transmission member 81 (see FIG. 54). In this state, when the second lever member 825 retracts to the rear of the cartridge, the cartridge B moves to the mounting position shown in FIG. 57. Along with this, the drive transmission member 81 is moved by the coupling member 864 so as to change its inclination angle (see FIG. 58).

As a result, the drive transmission member 81 and the cartridge B reach the normal attitude and position for image forming operation, and both are connected so as to be capable of drive transmission.

The second lever member 825 projects frontwardly of the cartridge and toward the downstream in the mounting direction of the cartridge (see FIG. 39). Further, the second lever member 825 can be retracted and moved to the rear of the cartridge and upstream in the mounting direction by contacting the apparatus main assembly A (see FIG. 57).

Further, the cartridge B has a first lever member 812 as an operating member for advancing and retracting the coupling 864. A part of the first lever member 812 projects at the rear side of the cartridge, similarly to the operating member of another embodiment described in the foregoing (see FIG. 39). Therefore, when the door 13 (see FIG. 21) of the apparatus main assembly is closed, the coupling member 864 can be moved to the advanced position by receiving an external force from the door 13. The lever member 21 shown in FIG. 21 corresponds to the first lever member 812 in this embodiment.

As described above, the second lever member 825 is placed on the non-driving side opposite to the driving side on which the coupling member 864 is provided. However, it is also possible to place the movable positioning member for determining the position of the cartridge on the drive side. Such an example will be described hereinafter in Embodiment 9.

Further, in this embodiment, the cartridge is provided with the movable positioning member (second lever member 825) for determining the position of the cartridge inside the main assembly of the apparatus. However, the positioning member (second lever member 825) may be separated from the cartridge and is structured as an attachment so as to be mounted to the apparatus main assembly A separately from the cartridge. In such a case, the cartridge B is positioned by the positioning member of the attachment mounted to the apparatus main assembly A. Further, by movement of the positioning member to the attachment, the position of the cartridge inside the apparatus main assembly A is changed.

Embodiment 8

Embodiment 8 will be described. In the description of this embodiment as well, the same points as in the above-described embodiment will be omitted. Among the elements disclosed in this embodiment, those corresponding to the elements described in the above-described embodiment are assigned the same names as the members of the above-mentioned embodiment, and only the points different from those of the above-mentioned embodiment will be described.

Figure 63:
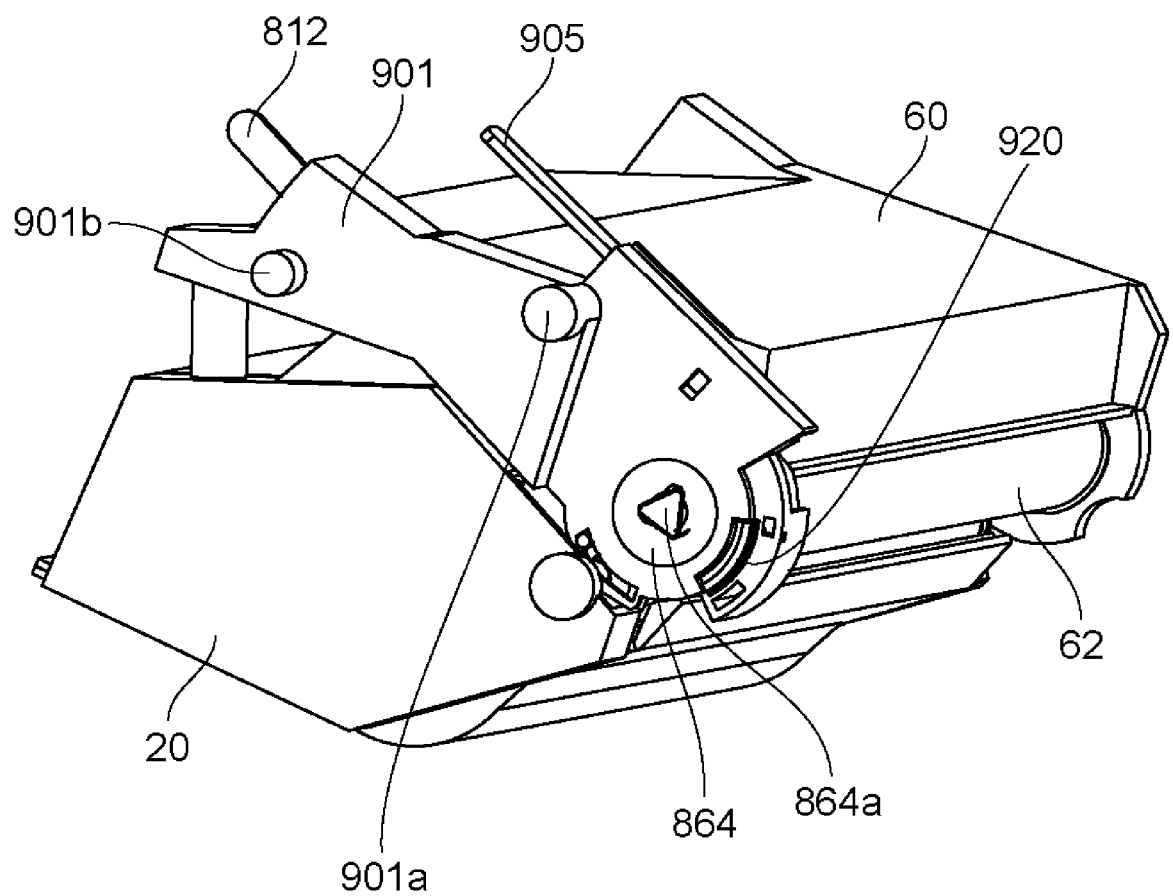
FIG. 63 is a perspective view of the process cartridge.

FIG. 63 is a perspective view of the process cartridge B of this embodiment. A side member 901 is provided on the drive side of the cleaning unit 60, and the side member 901 is provided with a drive-side first positioning projection 901a and a drive-side second positioning projection 901b. In addition, a lever member 812, a third lever member 905, and an advancement/retraction member 920 are provided. Although the details will be described hereinafter, the third lever member 905 is an operating member operated to operate the advancement/retraction member 920.

A coupling member 864 is provided at the end of the drum 62, and a driven transmission portion 864a for receiving the drive from the drive transmission member 81 of the apparatus main assembly A is provided at the end of the coupling member 864. The structure of the lever member 812 and the coupling member 864 is the same as that of Embodiment 7.

Figure 64:
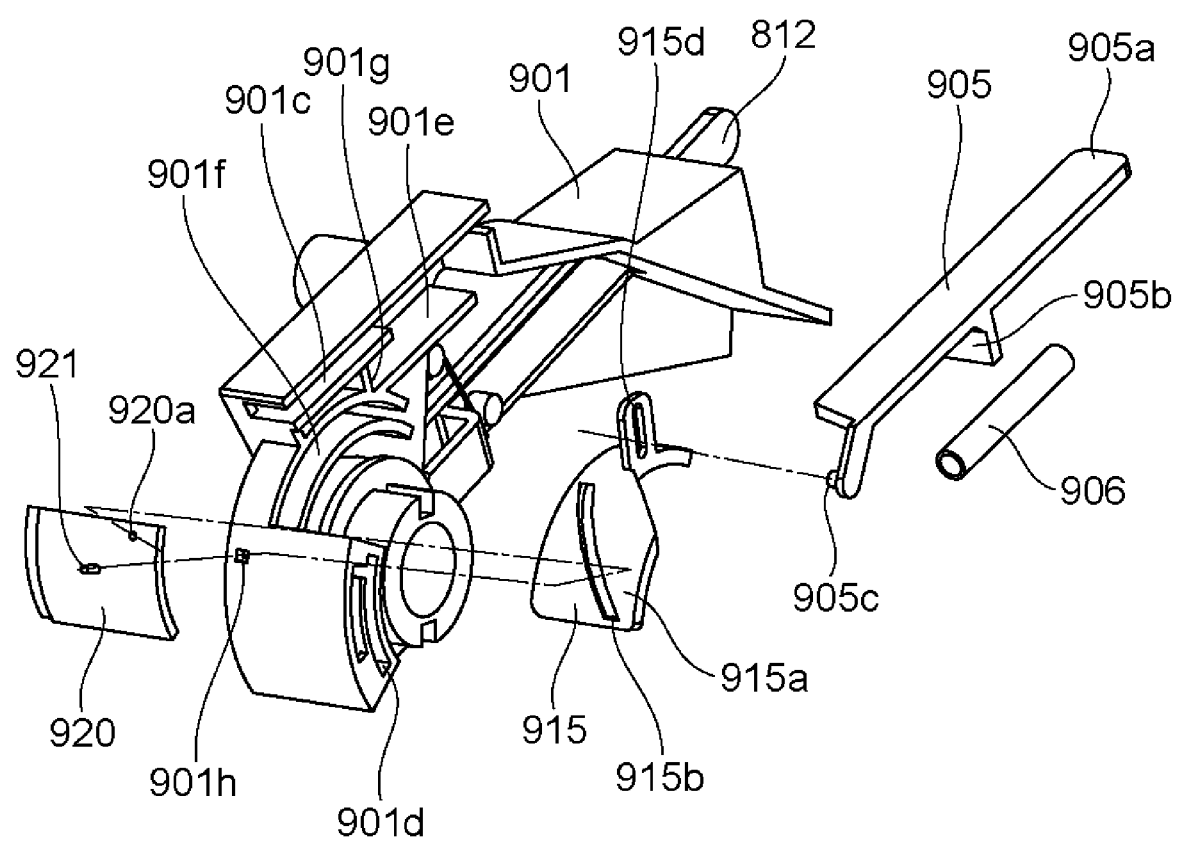
FIG. 64 is a perspective view of a periphery of an advancement/retraction member.
Figure 65:
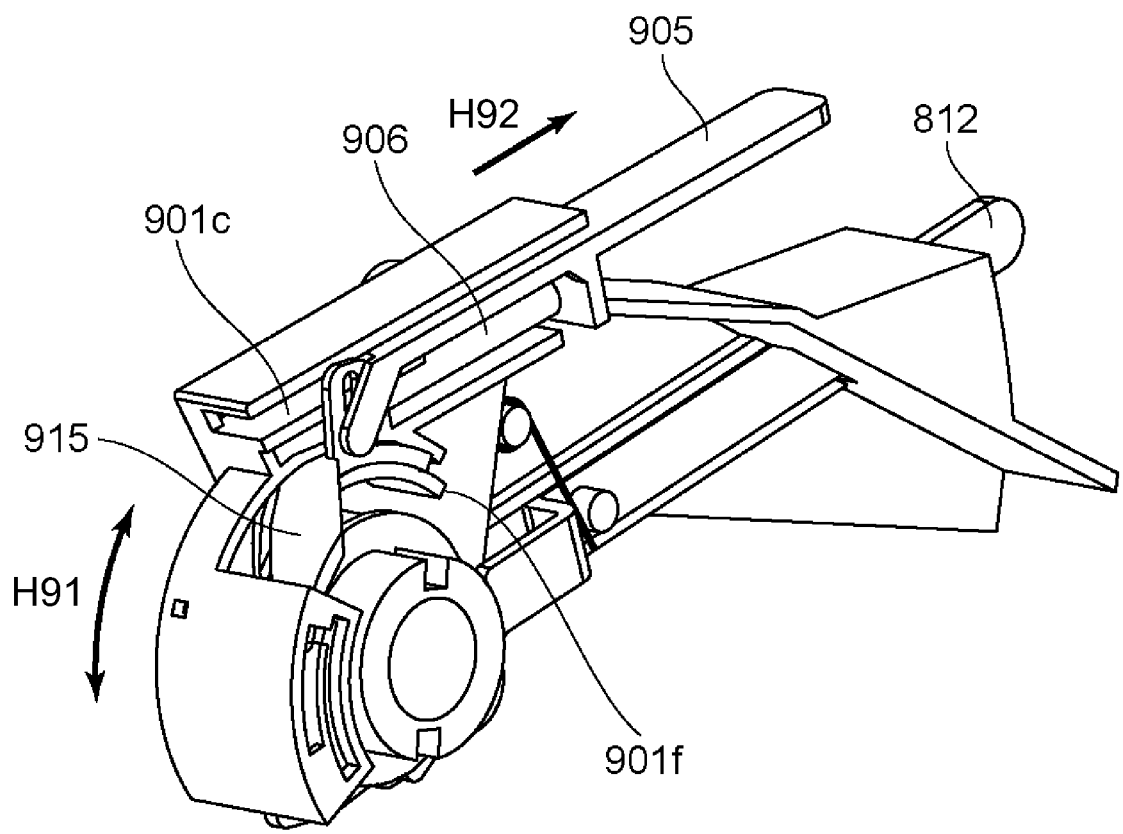
FIG. 65 is a perspective view of the periphery of the advancement/retraction member.

Referring to FIGS. 64 and 65, A structure around the advancement/retraction member 920 will be described. FIGS. 64 and 65 are perspective views around the advancement/retraction member 920. In the Figures, some parts are omitted for the sake of better illustration.

As shown in the Figure, a sliding portion 915a of a cam member 915 is slidably inserted into a first sliding portion 901f of the side member 901. The third lever member 905 is slidably inserted into the second slide portion 901c of the side member 901. The engaging projection 905c of the third lever member 905 is engaged with the engaging hole 915d of the cam member 915.

The advancement/retraction member 920 is slidably inserted into the third slide portion 901d of the side member 901 from the left side of the side member 901 in FIG. 64. In addition, the cam pin 921 is press-fitted into the fixing hole 920a of the advancement/retraction member 920 by way of the through hole 901h of the side member 901 to be fixed there. The rear end of the cam pin 921 slidably penetrates into the cam groove 915b of the cam member 915 (see FIG. 66).

The third urging member 906 is disposed at the urging member supporting portion 901e of the side member 901, and the opposite ends thereof are mounted to the contact wall 901g of the side member 901 and the urging wall 905b of the third lever member 905, respectively. It is in contact.

With these structures, the third lever member 905 is urged in the direction of arrow H92 in FIG. 65 and is supported movably in the direction of arrow H92 and the opposite direction. In addition, with these structures, the cam member 915 is rotatably supported in the direction of arrow H91 in FIG. 65 in accordance with the movement of the third lever member 905 in the direction of arrow H92 and the opposite direction.

Figure 66:
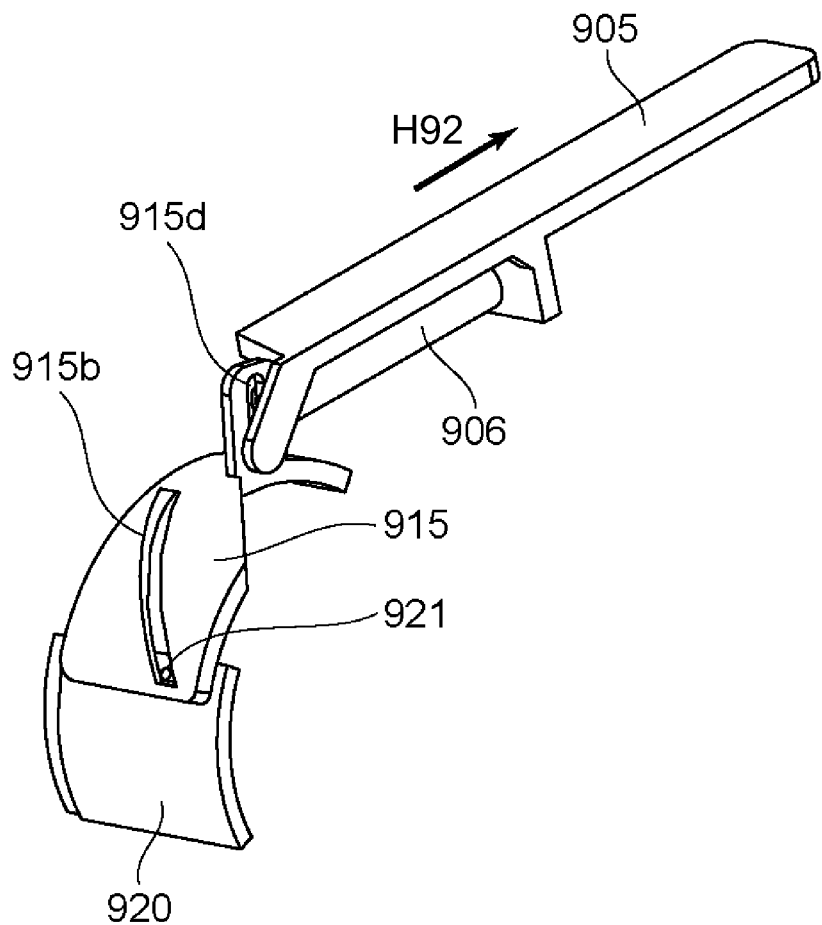
FIG. 66 is a perspective view of the advancement/retraction member structure.
Figure 67:
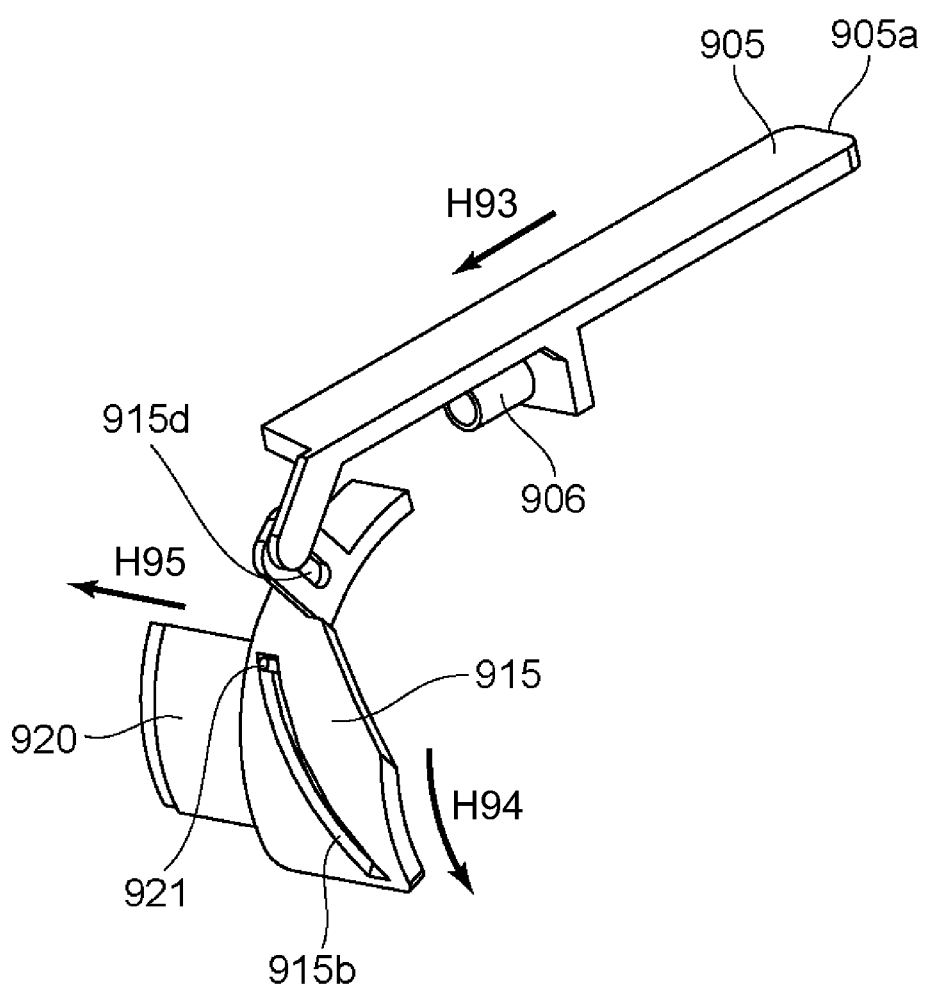
FIG. 67 is a perspective view of the advancement/retraction member structure.

FIGS. 66 and 67 illustrate operation of the advancement/retraction member 920 and the third lever member 905. FIGS. 66 and 67 are perspective views of the advancement/retraction member 920 and the third lever member 905. In the Figure, some parts are omitted for better illustration.

FIG. 66 shows a state of a natural state (free state) in which an external force is not applied to the third lever member 905. The third lever member 905 is moved in the direction of arrow H92 in the Figure by the force of the third urging member 906. At this time, the cam member 915 and the advancement/retraction member 920 are in the phases shown in the Figure, and the advancement/retraction member 920 is in the retracted position.

FIG. 67 shows a state after the third lever member 905 is pushed. As shown in the Figure, when a force is applied to the contact portion 905a of the third lever member 905 in the direction of arrow H93 in the Figure, the third lever member 905 moves in the direction of arrow H93 in the Figure. In accordance with this operation, the cam member 915 rotates in the direction of arrow H94 in the Figure.

Although the advancement/retraction member 920 is engaged with the cam member 915 by way of the cam pin 921, the advancement/retraction member 920 cannot move in the direction of arrow H91 in FIG. 65, as shown in FIGS. 64 and 65. Therefore, as shown in FIG. 67, as the cam member 915 rotates in the direction of arrow H94 in the Figure, the cam pin 921 slides in the cam groove 915b, so that the advancement/retraction member 920 moves in the direction of arrow H95 in the Figure. Then, it moves to the advance position.

Figure 68:
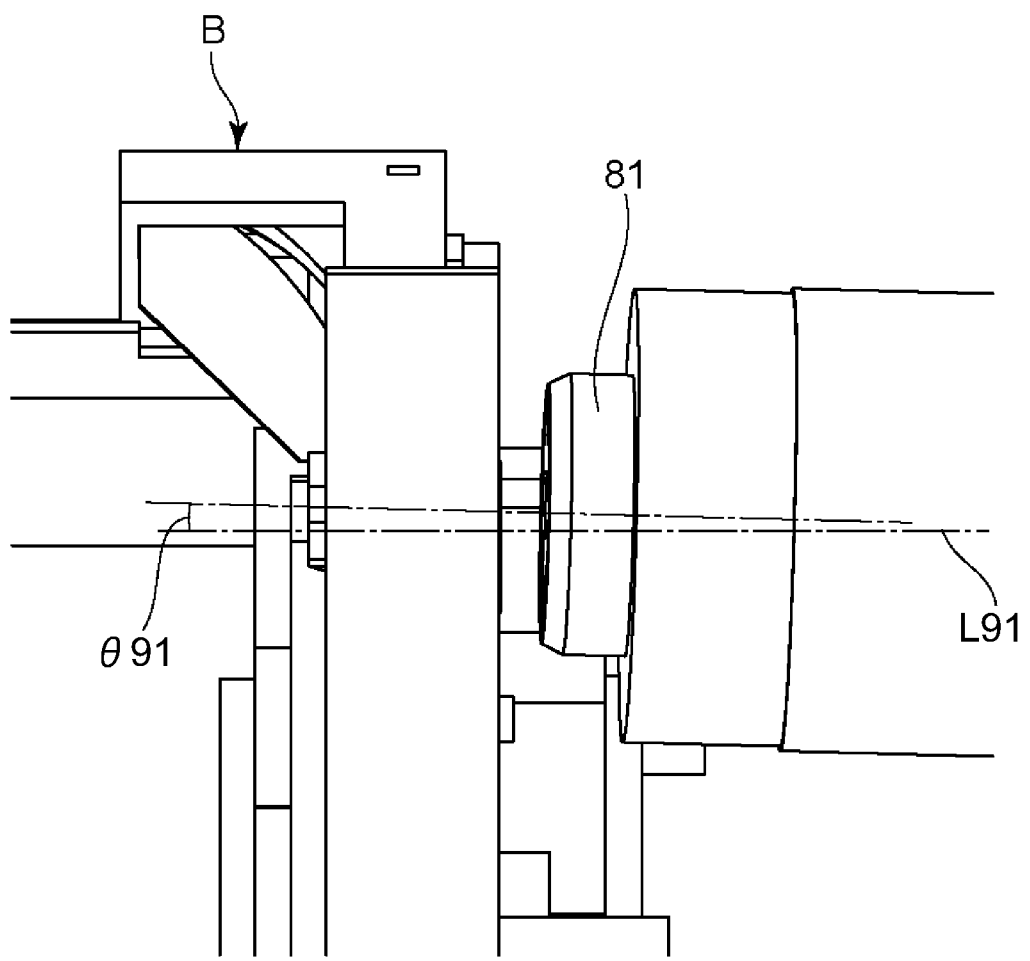
FIG. 68 is a view of the periphery of the drive transmission member as viewed from above.

FIG. 68 shows a state in which the opening/closing door 13 of the apparatus main assembly A is opened and the cartridge B is mounted up to a position for image forming operation (image formation). In the Figure, reference sign L91 indicates the direction of the rotation axis of the drum 62 of the cartridge B at the position for image forming operation (image formation).

As shown in the Figure, the drive transmission member 81 of the apparatus main assembly A is tilted by $\Theta 91°$ relative to the axis L9.

Figure 69:
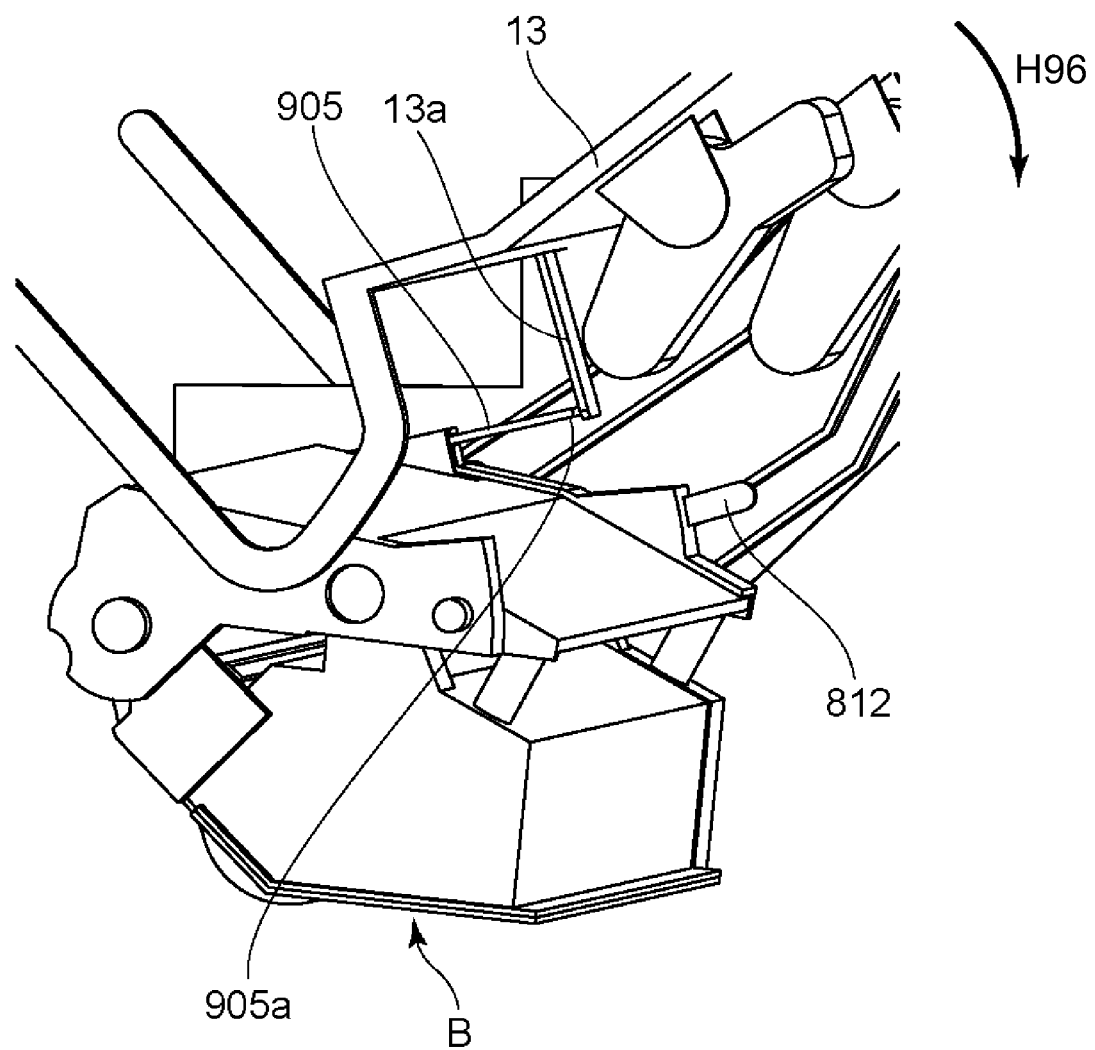
FIG. 69 is a perspective view of the apparatus main assembly and the process cartridge.
Figure 70:
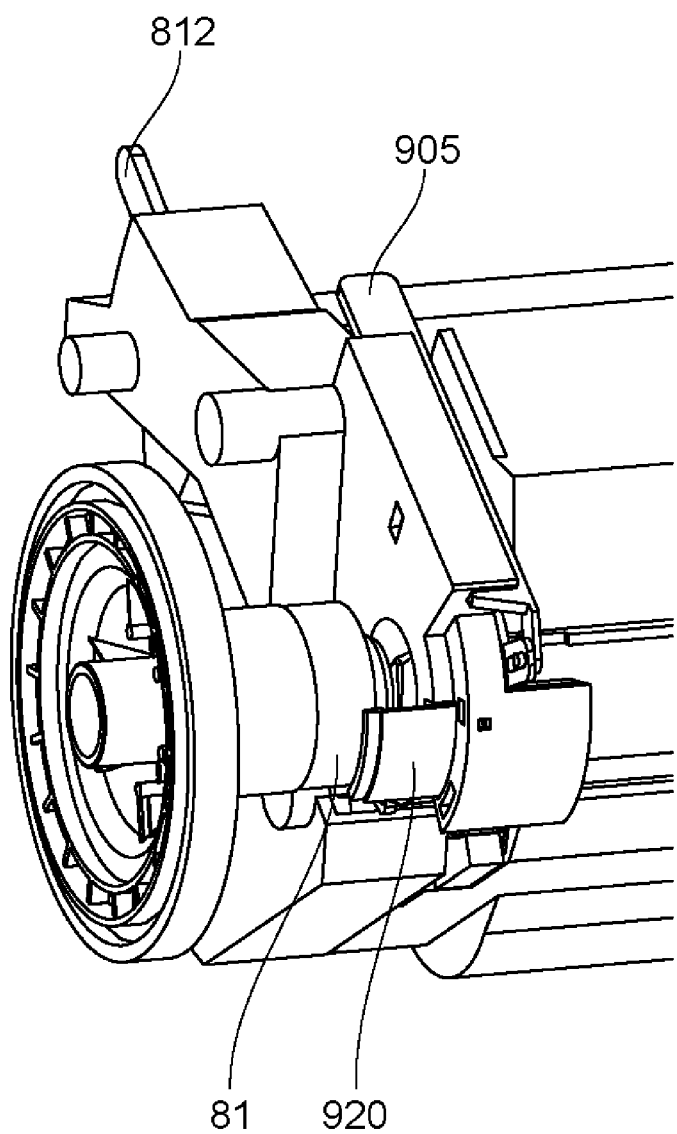
FIG. 70 is a perspective view of the periphery of the advancement/retraction member.

FIG. 69 shows the behavior in which the opening/closing door 13 of the apparatus main assembly A is closed in this state. When the opening/closing door 13 is closed in the direction of arrow H96 in the drawing, the cartridge pressing portion 13a provided on the opening/closing door 13 comes into contact with the contact portion 905a of the third lever member 905. When the opening/closing door 13 is closed further, the cartridge pressing portion 13a pushes the third lever member 905. At this time, as described above, the advancement/retraction member 920 of the cartridge B moves to the advanced position and pops out toward the drive side (see FIG. 70).

Figure 71:
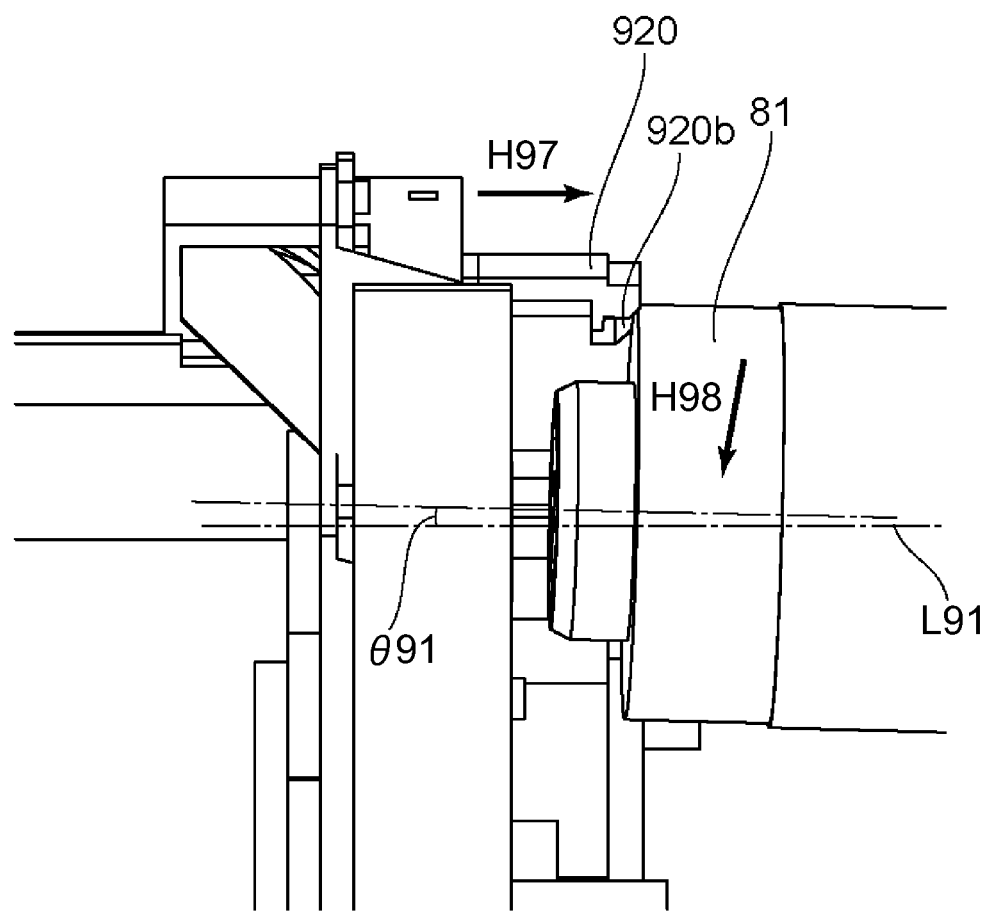
FIG. 71 is a view of the periphery of the drive transmission member as viewed from above.
Figure 72:
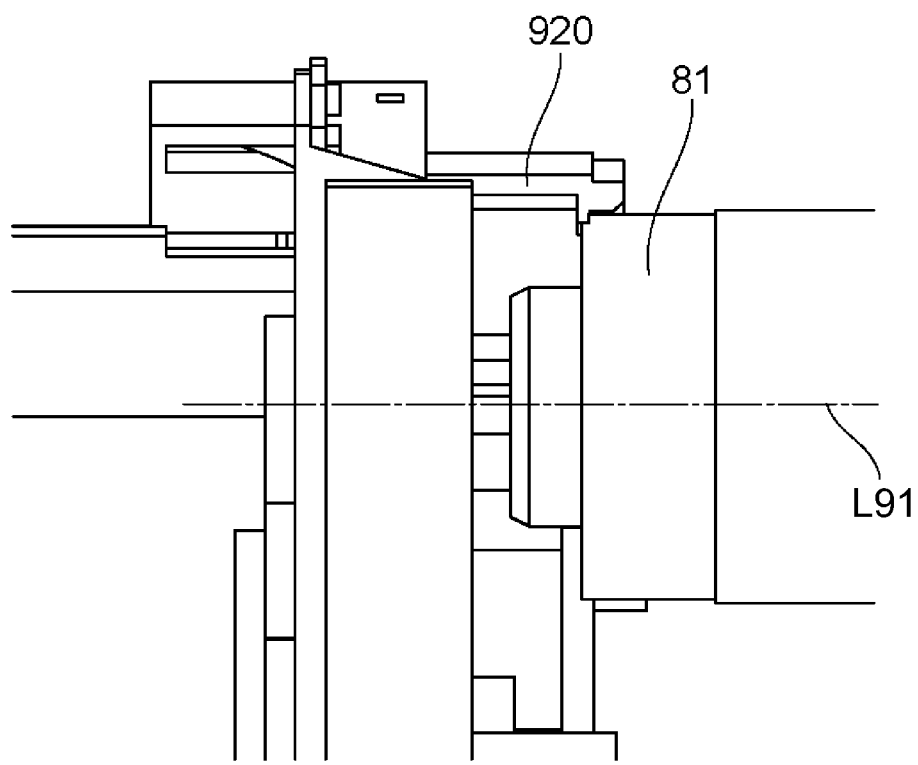
FIG. 72 is a view of the periphery of the drive transmission member as viewed from above.

FIG. 71 shows how the coupling member 864 moves to the drive side. As the opening/closing door 13 is closed, the third lever member 905 is pushed, and the advancement/retraction member 920 moves in the direction of arrow H97 in the drawing as shown in the Figure. At this time, the inclined portion 920b of the advancement/retraction member 920 comes into contact with the drive transmission member 81 of the apparatus main assembly A. When the advancement/retraction member 920 moves further, the inclined portion 920b presses the drive transmission member 81, the drive transmission member tilts in the direction of arrow H98 in the Figure, so that the angle θ91 decreases. Then, as shown in FIG. 72, the rotation axis of the drive transmission member 81 is close to being coaxial with L91.

Figure 73:
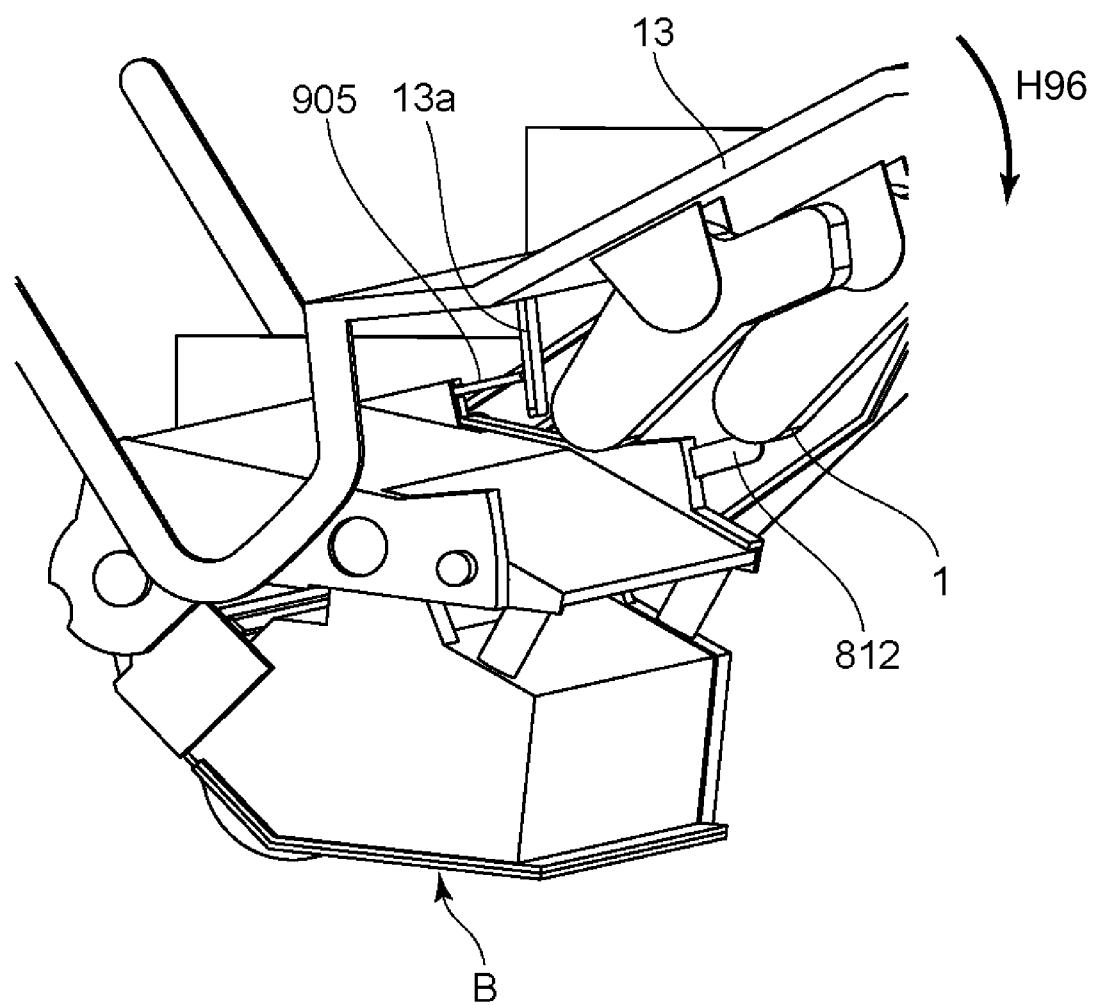
FIG. 73 is a perspective view of the apparatus main assembly and the process cartridge.

FIG. 73 shows how the opening/closing door 13 is closed. As shown in the Figure, the cartridge pressing member 1 provided on the opening/closing door 13 start pressing the lever member 812 at the timing when the third lever member 905 is pushed and the drive transmission member 81 becomes close to be coaxial with the rotation axis L91. When the lever member 812 is further pushed in, the coupling member 864 of the cartridge B pops out at the drive side as described in Embodiment 7.

Figure 74:
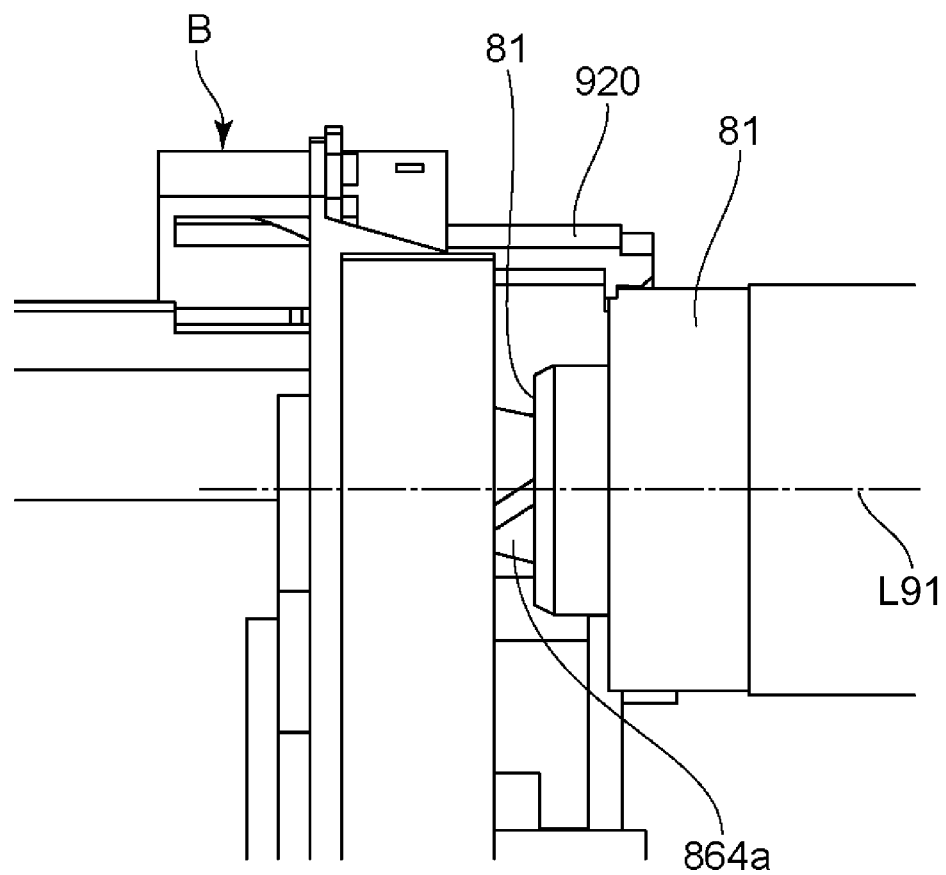
FIG. 74 is a view of the periphery of the drive transmission member as viewed from above.

FIG. 74 shows a state around the drive transmission member 81 when the opening/closing door 13 is completely closed.

As shown in the Figure, the driven transmission portion 864a of the coupling member 864 projects toward the drive transmission member 81 substantially coaxial with the L91, and the free end surface 864c of the driven transmission portion (FIG. 40) is the drive transmission portion 81e enters the drive transmission portion 81e (see FIG. 4). Alternatively, the free end surface 864c of the driven transmission portion comes into contact with the free end surface 81k (see FIG. 4).

When the drive transmission member 81 of the apparatus main assembly A is rotationally driven with the free end surface 864c of the driven transmission portion being in the drive transmission portion 81e, the drive transmission portion 81e of the drive transmission member 81 and the transmission portion 864a of the coupling member 864 are engaged with each other so that the drive is transmitted to the cartridge B.

First in a state in which the free end surface 864c of the driven transmission portion is in contact with the free end surface 81*k*, the drive transmission member 81 of the apparatus main assembly A is rotationally driven. When the drive transmission portion 81*e* of the drive transmission member 81 and the driven transmission portion 864*a* of the coupling member 864 become in phase with each other, the driven transmission portion free end surface 864*c* enters the drive transmission portion 81*e*. When the drive transmission member 81 is rotationally driven further, the drive transmission portion 81*e* and the driven transmission portion 864*a* are engaged with each other to transmit the drive to the cartridge B.

At this time, if the drive transmission portion 81*a* and the driven transmission portion 864*a* have the above-mentioned twisted projection-recess shapes, the drive transmission portion 81*a* and the driven transmission portion 864*a* are attracted to each other, so that stable drive transmission can be accomplished.

When the cartridge B is taken out of the apparatus main assembly A, the above-mentioned operation is reversed. When the opening/closing door 13 is opened, the lever member 812 returns and the coupling member 864 is pulled toward the cartridge B side (state in FIG. 72). When the opening/closing door 13 is further opened, the third lever member 905 returns, and the advancement/retraction member 920 is pulled toward the cartridge B side and is placed at the retracted position (state in FIG. 68). After the opening/closing door 13 is completely opened, the cartridge B is taken out.

In this embodiment, the cartridge pressing member 1 of the device main assembly A is structured to press the cartridge B against the device main assembly A by receiving the pressing force of the pressing spring 19 of the device main assembly A when the opening/closing door 13 is closed. However, this structure is not inevitable to the present invention.

Figure 75:
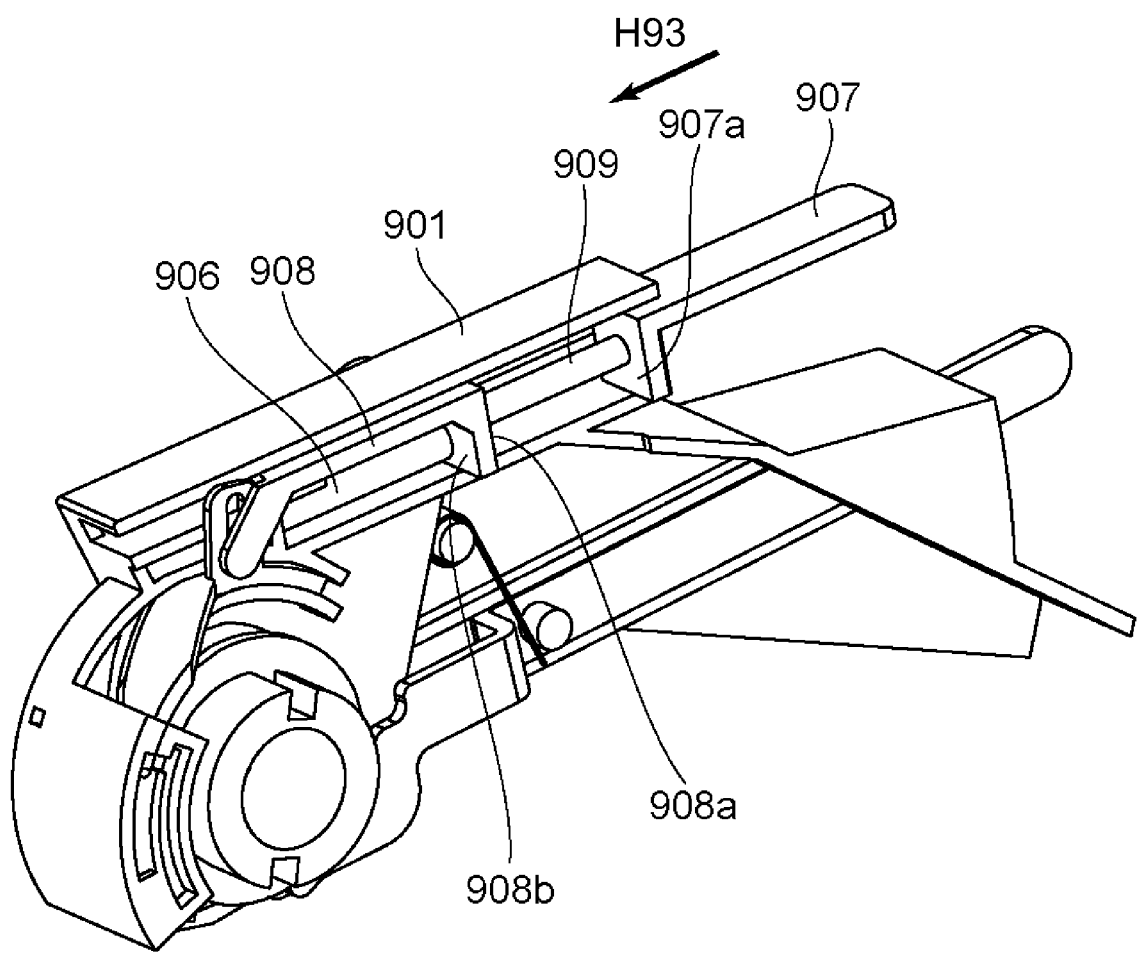
FIG. 75 is an illustration of a modified example in which the structure of the lever member is partially changed.
Figure 76:
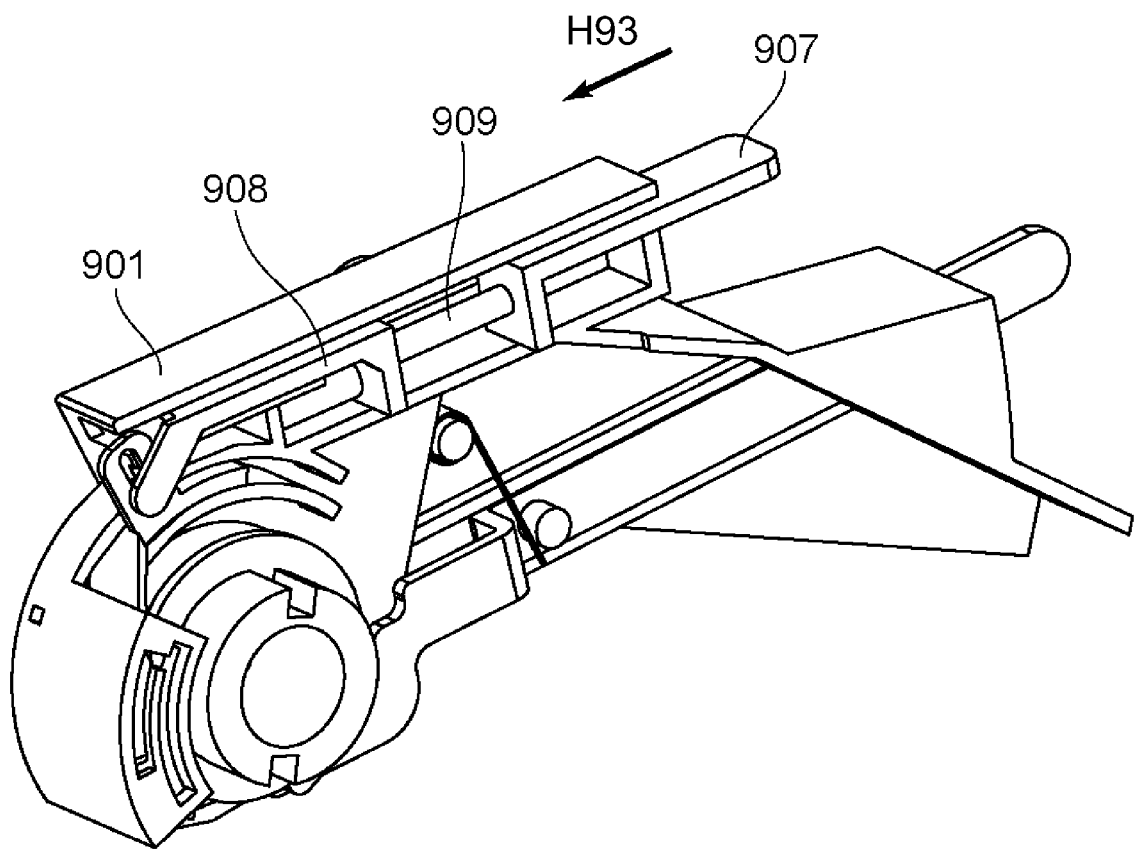
FIG. 76 is an illustration of a modified example in which the structure of the lever member is partially changed.
Figure 77:
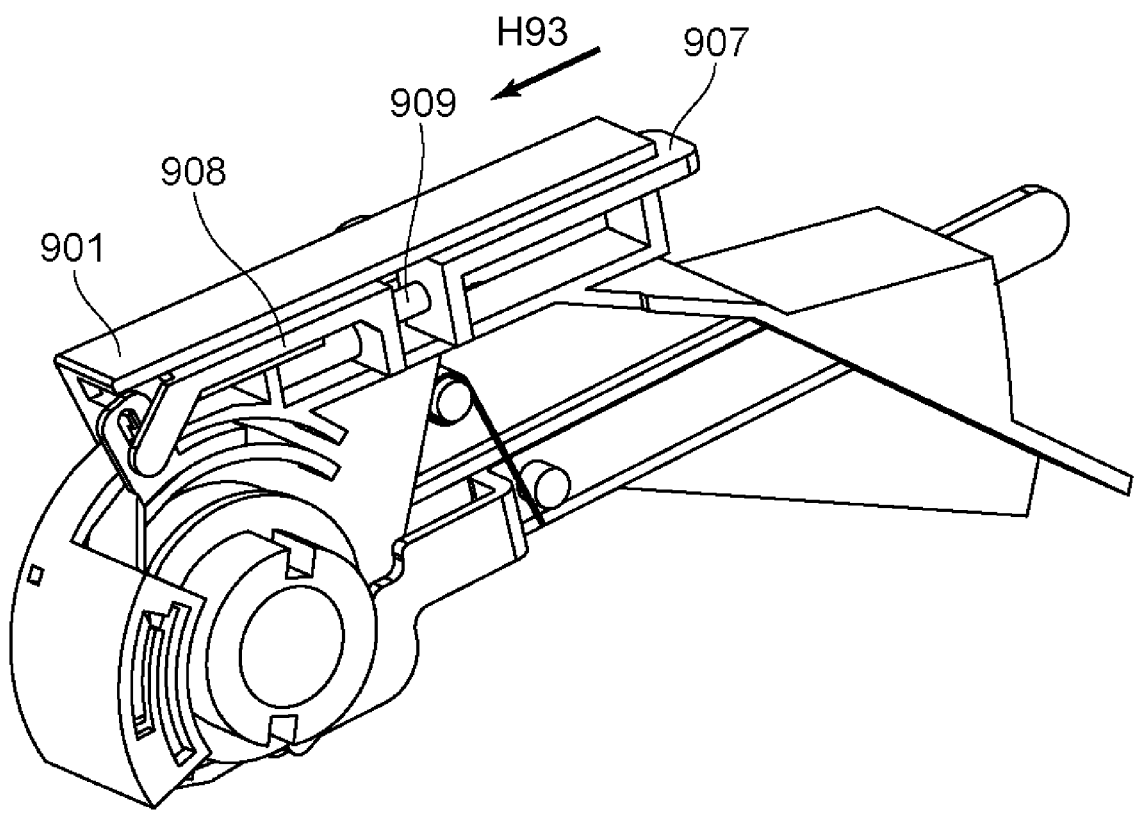
FIG. 77 is an illustration of a modified example in which the structure of the lever member is partially changed.

In FIGS. 75 to 77, a modified example in which the structure of the third lever member is partially modified will be described. This modification is effective for the structure in which when the movement of the cylindrical cam 83 (see part (b) of FIG. 5 and part (b) of FIG. 6) in the direction of arrow H2 shown in part (b) of FIG. 5 is carried out immediately before the completion of the closing of the opening/closing door 13 of the apparatus main assembly A.

As shown in FIG. 75, the side member 901 is provided with the fourth lever member 907 and the fifth lever member 908 so as to be movable in the direction of arrow H93 and in the opposite direction in the Figure. The fourth lever member 907 and the fifth lever member 908 correspond to a structure in which the third lever member 905 is separated into two parts.

Between the fourth lever member 907 and the fifth lever member 908, a fourth urging member 909 is provided, opposite ends of which are contacted with a pressure receiving portion 907*a* of the fourth lever member 907 and a pressure receiving portion 908*a* of the fifth lever member 908, respectively. FIG. 75 shows a free state in which no external force acts on the fourth lever member 907. The third urging member 906 is in contact with an urging wall 908*b* of the fifth lever member 908.

In this structure, when the opening/closing door 13 of the apparatus main assembly A is closed, the fourth lever member 907 is pushed in by the cartridge pressing member 1 as described above.

When the fourth lever member 907 is pushed in the direction of arrow H93 in the Figure, the fifth lever member 908 is pushed in the direction of arrow H93, while the fourth urging member 909 is compressed.

FIG. 76 shows a state in which the advancement/retraction member 920 has moved to the drive side in the process of the fifth lever member 908 being pushed and is in contact with the drive transmission member 81 of the apparatus main assembly A (state of FIG. 71). The cylindrical cam 83 has not yet moved in the direction of arrow H2 shown in part (b) of FIG. 5, and therefore, the drive transmission member 81 cannot tilt. For this reason, the advancement/retraction member 920 cannot move to the driving side from the position shown in FIG. 71. Therefore, the fifth lever member 908 cannot move either.

When the opening/closing door 13 is further closed from this state, the fourth urging member 909 is compressed by the amount corresponding to the amount through which the fourth lever member 907 is pushed in (see FIG. 77). Therefore, the movement of the opening/closing door 13 is not hindered.

When the opening/closing door 13 is closed completely, the cylindrical cam 83 moves in the direction of arrow H2 shown in part (b) of FIG. 5, so that the drive transmission member 81 becomes tiltable. At this time, the cam member 915 rotates by the pressing force of the compressed fourth urging member 909, so that the advancement/retraction member 920 moves to the drive side. The drive transmission member 81 is tilted by the advancement/retraction member 920, and therefore, the rotation axis of the drive transmission member 81 becomes close to being coaxial with L91 (state in FIG. 72).

The advancement and retraction of the coupling member 864 will be described. Before the cylindrical cam 83 moves in the direction of arrow H2 shown in part (b) of FIG. 5, the free end surface 864*c* of the driven transmission portion of the coupling member 864 abuts to the free end surface 81*k* of the inclined drive transmission member 81 even when the cam member 70 becomes in the phase shown in FIG. 44. For this reason, the coupling member 864 does not pop out.

When the opening/closing door 13 is completely closed, the rotation axis of the drive transmission member 81 becomes close to be coaxial with L91 due to the action of the advancement/retraction member 920 described above. At this time, the free end surface 864*c* of the driven transmission portion of the coupling member 864 is entered into the drive transmission portion 81*e* by the pressing force of the compressed first urging member 59 (see FIG. 40). Or, the free end surface 864*c* of the driven transmission portion is brought into contact with the free end surface 81*k*.

The operation when the drive transmission member 81 of the apparatus main assembly A is rotationally driven is as described above.

In this embodiment, a structure in which two cam members (cam member 70, cam member 915) are driven by two lever members (lever member 812, third lever member 905) has been described. The two lever members and the two cam members may be collectively referred to as an operation mechanism. Since the two cams are operably connected with the coupling member 364 and with the advancement/retraction member 920, respectively, the operating mechanism can move the coupling member 864 and the advancement/retraction member 920 at the respective appropriate timings, by operating each lever member.

The operating mechanism does not always have to have two levers and two cam members. For example, the operating mechanism may be structured to drive two cam members with one lever. In such a case, one lever and two cams may be appropriately connected so that the two cams are operated at appropriate timings by the operation of one lever. Alternatively, the operating mechanism may have a structure including one cam member acting on both the coupling member and the advancement/retraction member, and one lever acting on the one cam member. In this case, the cam member may be structured so that the coupling member and the advancement/retraction member are interlocked so as to operate at appropriate timings, when the cam member is operated. In any case, it will suffice if the operating mechanism is structured so that the coupling member 864 and the advancement/retraction member 920 can be moved at appropriate timings. Such an example will be described hereinafter.

The following is a summary of this embodiment.

The apparatus main assembly A includes a drive transmission member (drive output member) 81. On the other hand, the cartridge B includes a coupling member (engagement member) 864 and an advancement/retraction member 920.

Both the advancement/retraction member 920 and the coupling member 864 are movable members which can move in the axial direction of the photosensitive drum. The coupling member 864 is provided at the end of the photosensitive drum 62 and constitutes a drum unit together with the photosensitive drum 62. On the other hand, the advancement/retraction member 920 is movably supported by the side member 901 which is the frame (casing) of the cartridge (see FIG. 64). The advancement/retraction member 920 is a movable member provided outside the photosensitive drum (outside the drum unit).

Both the advancement/retraction member 920 and the coupling member 864 are provided in the front part of the cartridge on the drive side of the cartridge.

The advancement/retraction member 920 is structured to move toward the drive transmission member 81 and change the inclination angle of the drive transmission member 81 by contacting the drive transmission member 81. That is, the advancement/retraction member 920 is a pressing member which presses the drive transmission member 81 so as to decrease the inclination angle thereof (see FIGS. 71 and 72). When the coupling member 864 is going to engage with the drive transmission member 81 having a reduced inclination angle, they can be engaged with each other (see FIG. 74).

In this embodiment, the advancement/retraction member 920 moves linearly in parallel with the axis of the photosensitive drum, but the moving direction is not inevitably limited to this. If the advancement/retraction member 920 has an axial component in the moving direction, it can be considered that the advancement/retraction member 920 is moving in the axial direction. A modified example in which the advancement/retraction member 920 moves in the axial direction with rotational motion will be described hereinafter with reference to Embodiment 8-4.

In this embodiment, the coupling member 864 is used as the driving force receiving member (driving input member) for receiving the driving force. However, it is the same as the above-described embodiment that the gear member cartridge capable of engaging with the drive transmission member 81 having a reduced inclination angle may be provided. That is, the drive input member is not limited to the coupling but may be a gear. Like the gear member 187 shown in part (a) of FIG. 15, the gear member 187 exposed to the cartridge may be provided, and this may be engaged with the gear portion provided on the outer peripheral surface of the drive transmission member 81.

In this embodiment, the cartridge has the lever member 812 as an operating member for moving the coupling member 864, and the lever member 905 is provided as an operating member for moving the advancement/retraction member 920. One of these operating members may be referred to as a first operating member, and the other may be referred to as a second operating member.

Each operating member is structured to move forward of the cartridge by receiving an external force from the outside of the cartridge. More specifically, these operating members operate the coupling member 864 and/or the advancement/retraction member 920 by being moved by receiving a force from the device main assembly when the door 13 of the device main assembly A is closed.

Further, a part of the structure of this embodiment can be separated from the cartridge to form into an attachment as in Embodiments 5 and 6. For example, the advancement/retraction member 920, the lever member 905 and the cam member 915 for operating the member, and the side member 901 or the like supporting these members (920, 905, 915) are separated from the cartridge and formed into an attachment which can be mounted to the apparatus main assembly A.

The coupling member and the gear member of the cartridge may be connected with the drive transmission member having an inclination angle reduced by the advancement/retraction member 920 of the attachment, so that the drive transmission can be performed.

Embodiment 8-2

In Embodiment 8-2, the structure is such that the advancement/retraction member 920 and the coupling member 864 is advanced and retracted by the action of one lever (operating member). In this embodiment as well, the same points as in the above-described embodiments will be omitted. Among the elements disclosed in these embodiments, those corresponding to the elements described in the above-described embodiments are assigned with the same names as the members of the above-described embodiments, and only the points different from those of the above-mentioned embodiments will be described.

Figure 92:
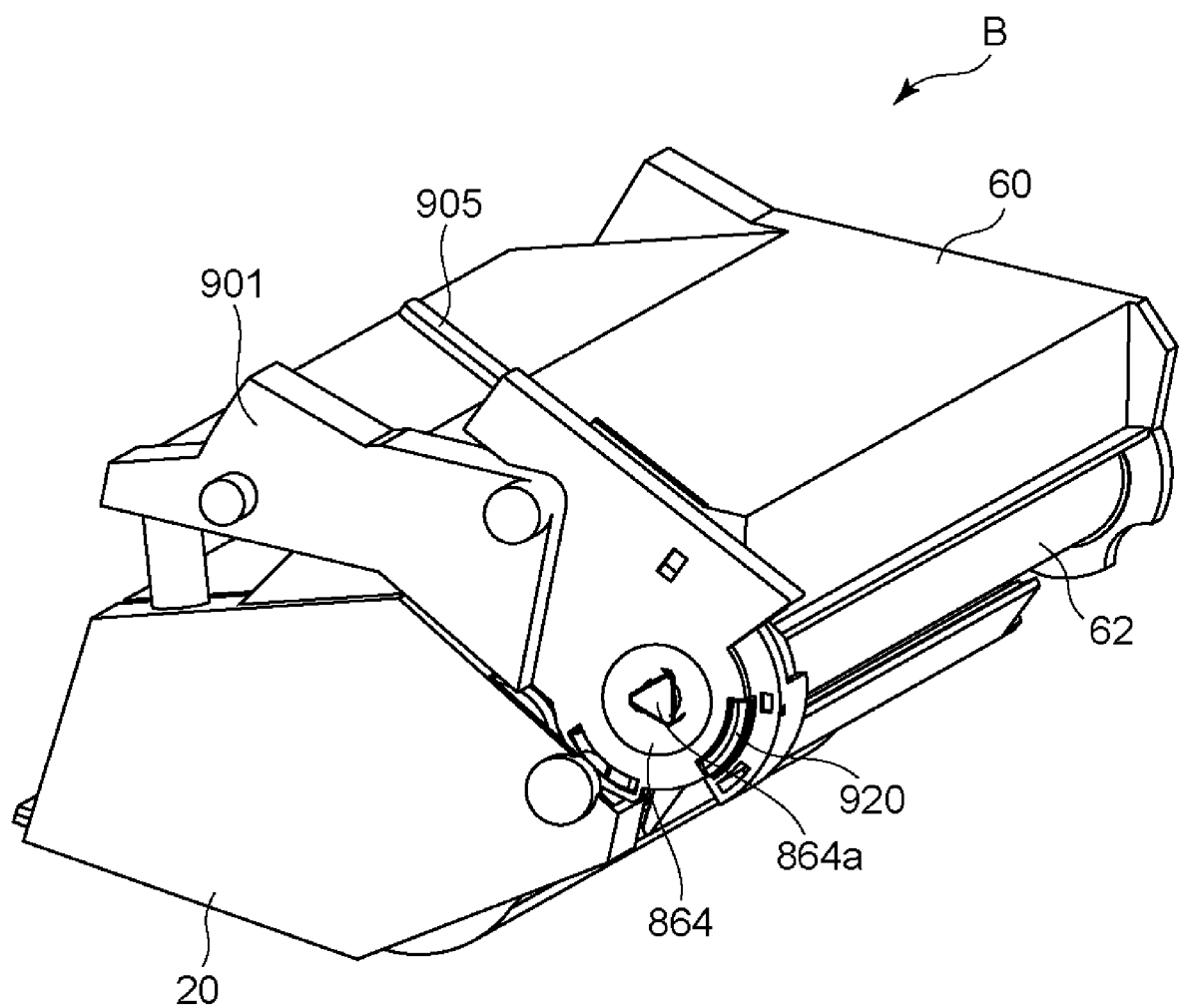
FIG. 92 is a perspective view of the process cartridge.

FIG. 92 is a perspective view of the process cartridge B of this embodiment.

A coupling member 864 is provided at the end of the drum 62, and a driven transmission portion 864a for receiving the drive from the drive transmission member 81 of the apparatus main assembly A is provided at the end of the coupling member 864. A side member 901 is provided on the drive side of the cleaning unit 60. The side member 901 is provided with a third lever member 905 and an advancement/retraction member 920. Although the details will be described hereinafter, the third lever member 905 is an operating member for operating the advancement/retraction member 920 and the coupling member 864.

Figure 93:
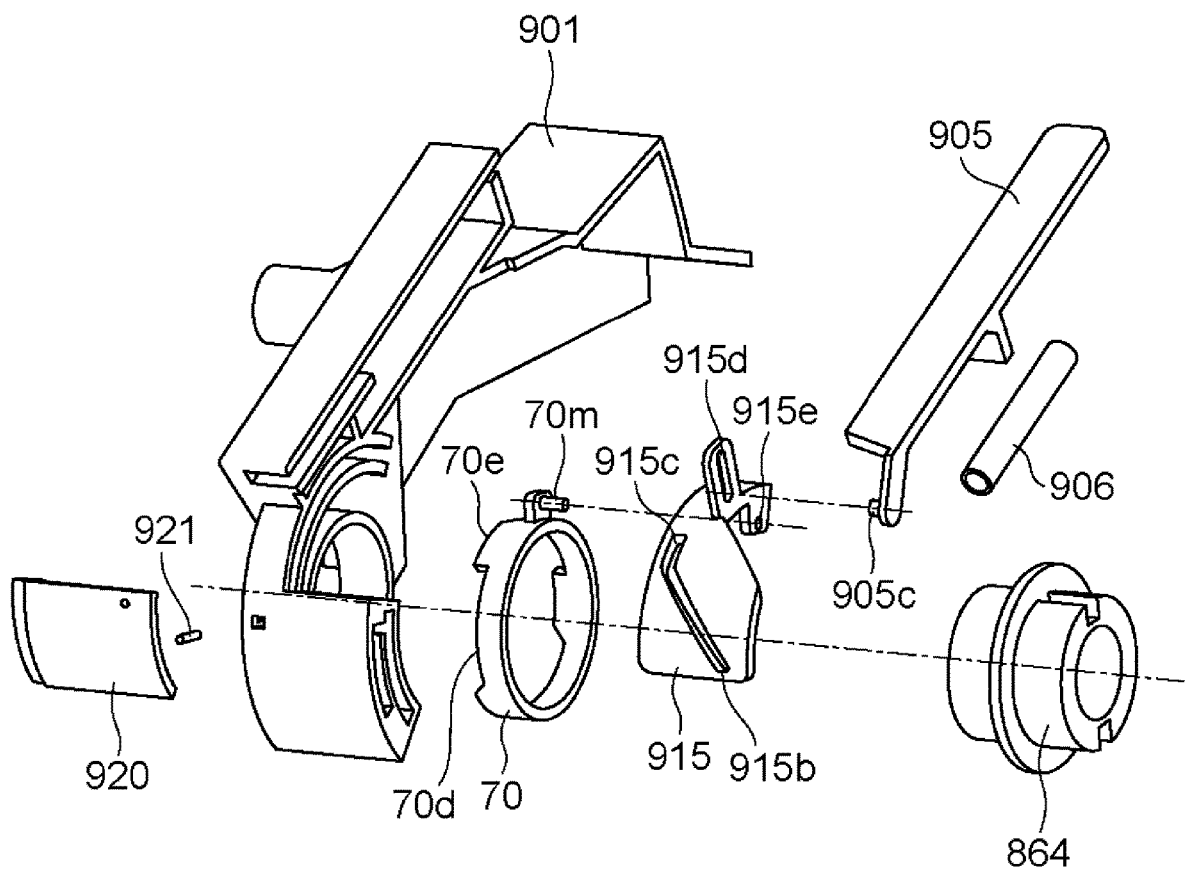
FIG. 93 is a perspective view of the advancement/retraction member and the periphery of the coupling member.
Figure 94:
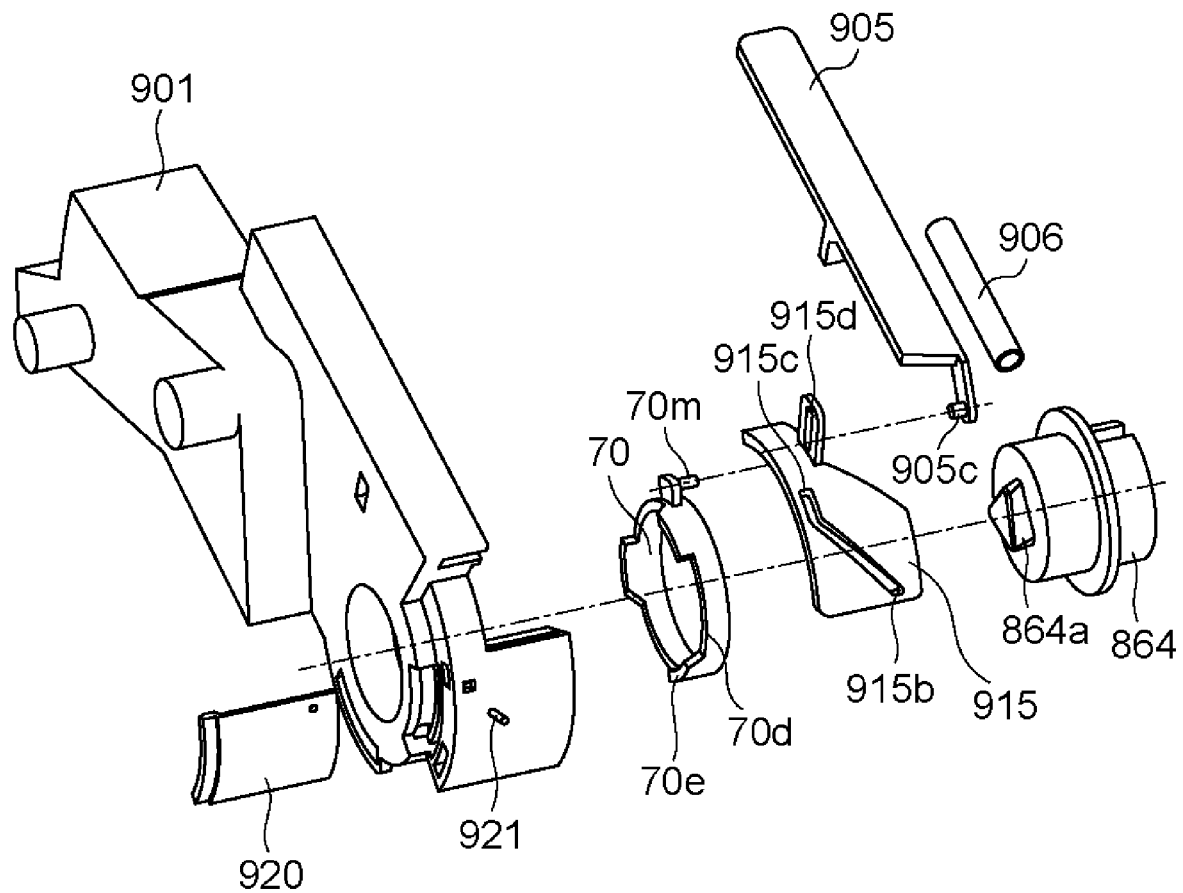
FIG. 94 is a perspective view of the advancement/retraction member and the periphery of the coupling member.
Figure 95:
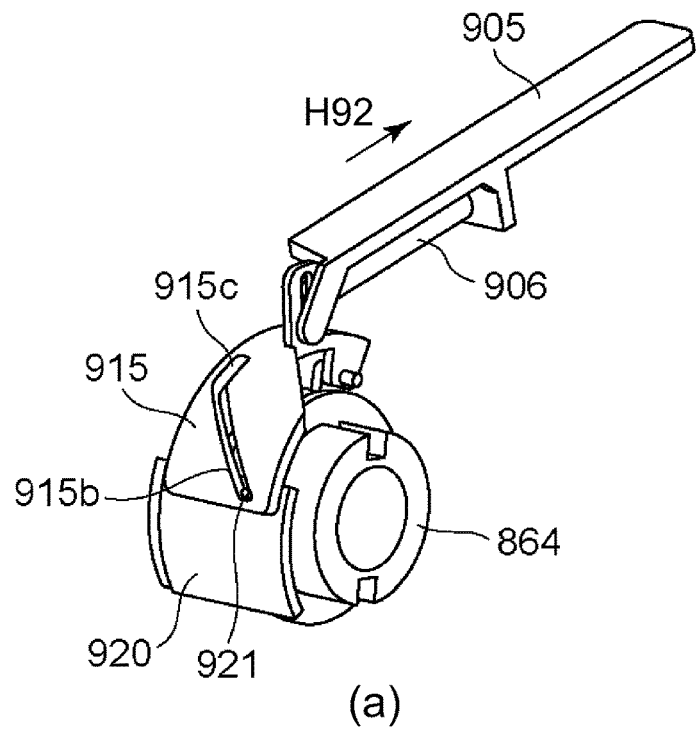
FIG. 95 is a perspective view of the advancement/retraction member and the periphery of the coupling member.
Figure 95:
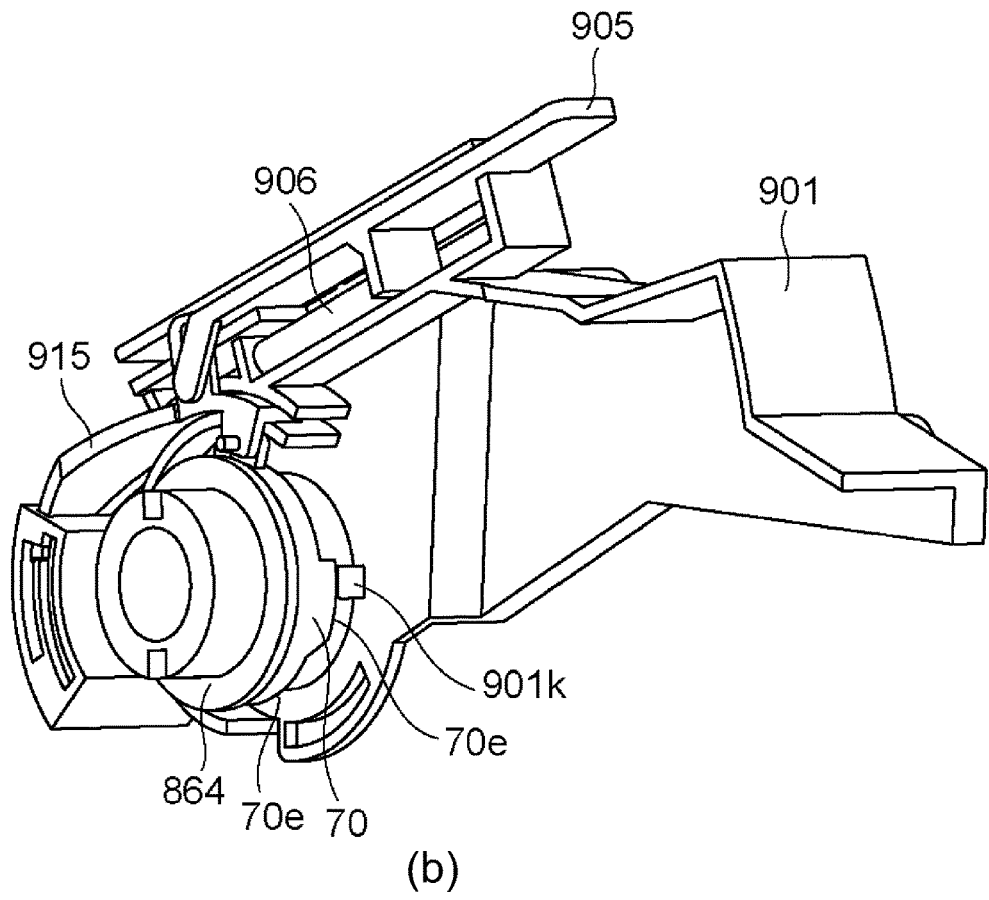

Referring to FIGS. 93, 94 and 95, the structures around the advancement/retraction member 920 and the coupling member 864 will be described. FIGS. 93, 94, and 95 are perspective views of the advancement/retraction member 920 and the coupling member 864. In the Figures, some parts are omitted for the sake of better illustration.

As shown in FIGS. 93 and 94, an engaging projection 70m is provided on the outer peripheral portion of the cam member 70. In addition, the cam member 915 is provided with a cam groove 915b, a second cam groove 915c and an engaging hole 915e. The engaging projection 70m of the cam member 70 is rotatably inserted into the engaging hole 915e of the cam member 915 (see also FIG. 95). The assembly of the other members is as described in Embodiment 8 and 7.

With these structures, the third lever member 905 is movably supported in the direction of arrow H92 and the opposite direction while being urged in the direction of arrow H92 in FIG. 95. Further, with these structures, the cam member 915 is supported so as to be rotatable in the direction of arrow H91 in FIG. 95 in accordance with the movement of the third lever member 905 in the direction of arrow H92 and the opposite direction thereto. Furthermore, the cam member 70 is supported so as to be rotatable in the direction of arrow H91 in FIG. 95 in accordance with the rotation of the cam member 915 by engagement between the engaging projection 70m and the engaging hole 915e.

Figure 96:
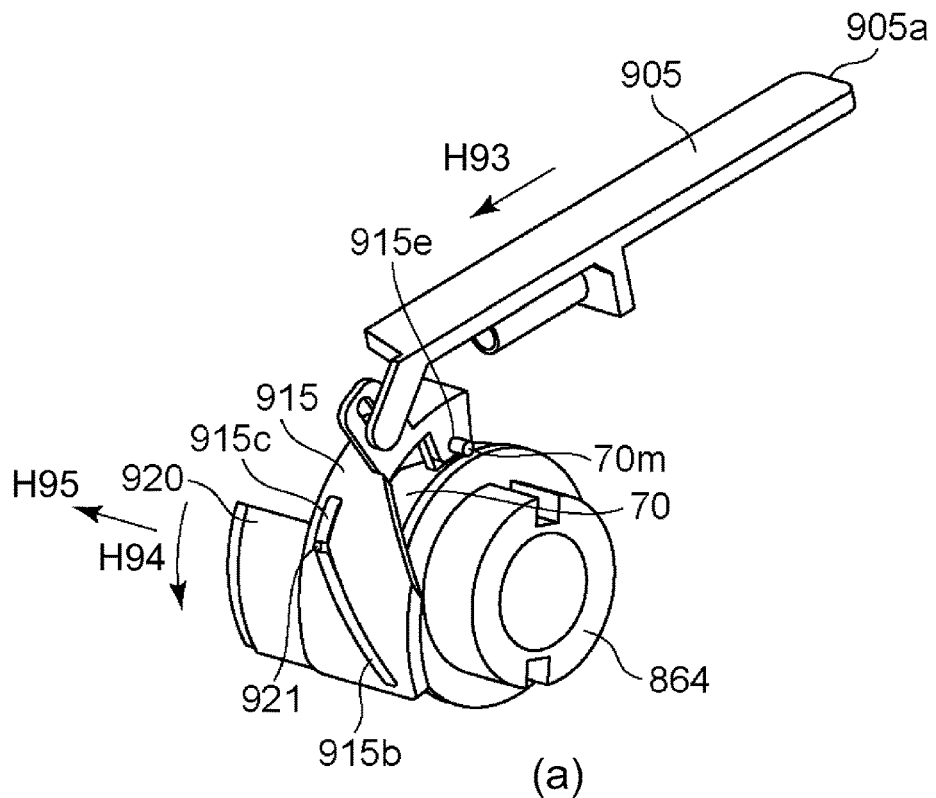
FIG. 96 is an operation illustration of the advancement/retraction member, the coupling member, and the third lever member.
Figure 96:
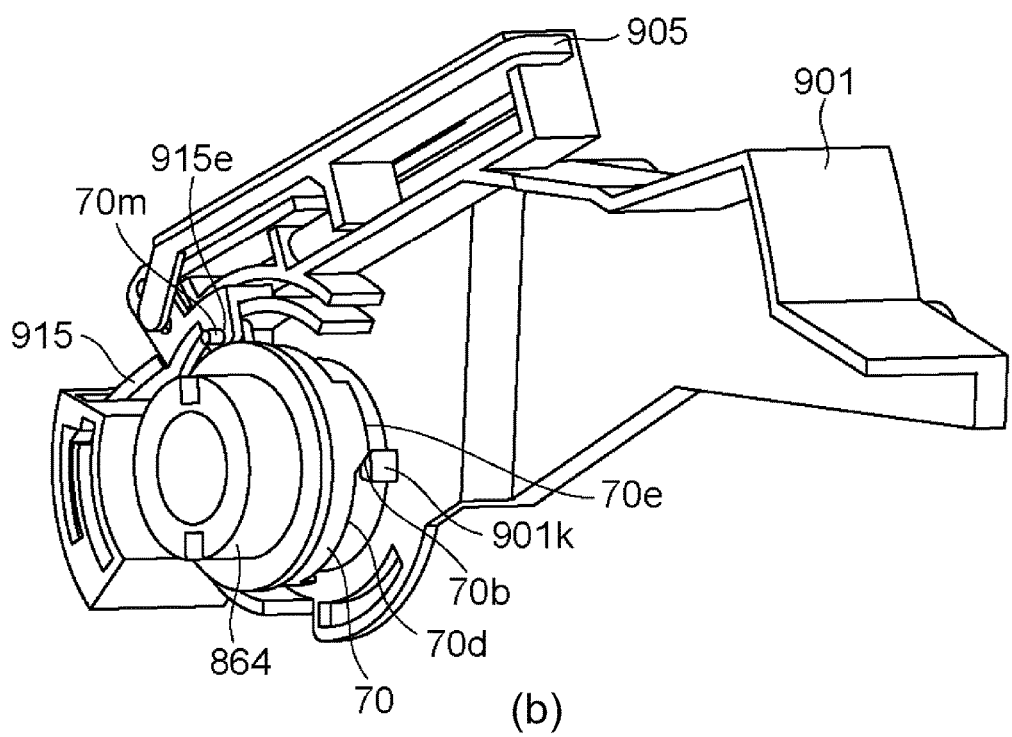
Figure 97:
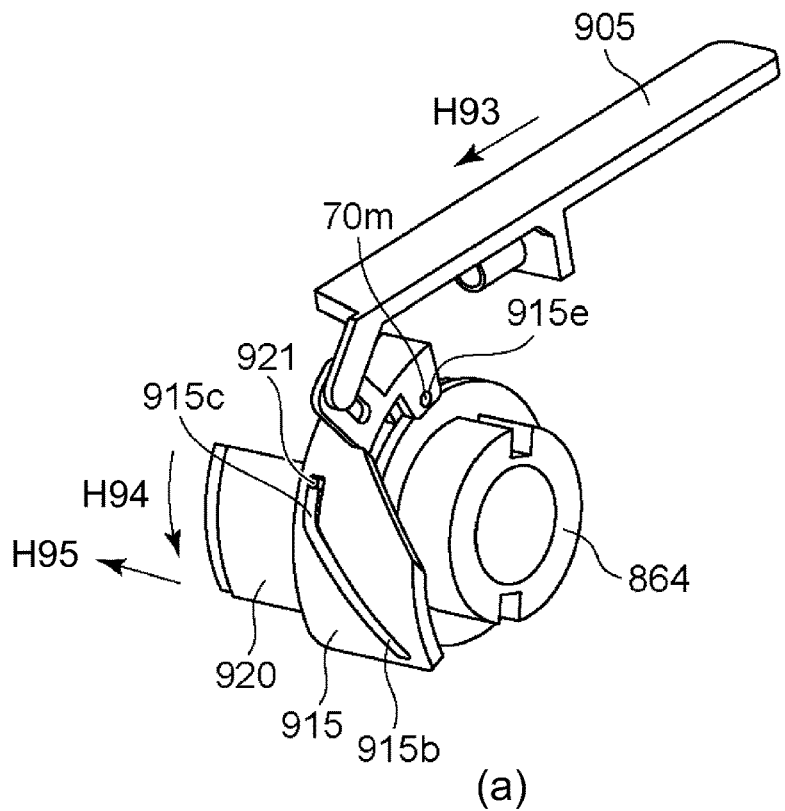
FIG. 97 is an operation illustration of the advancement/retraction member, the coupling member, and the third lever member.
Figure 97:
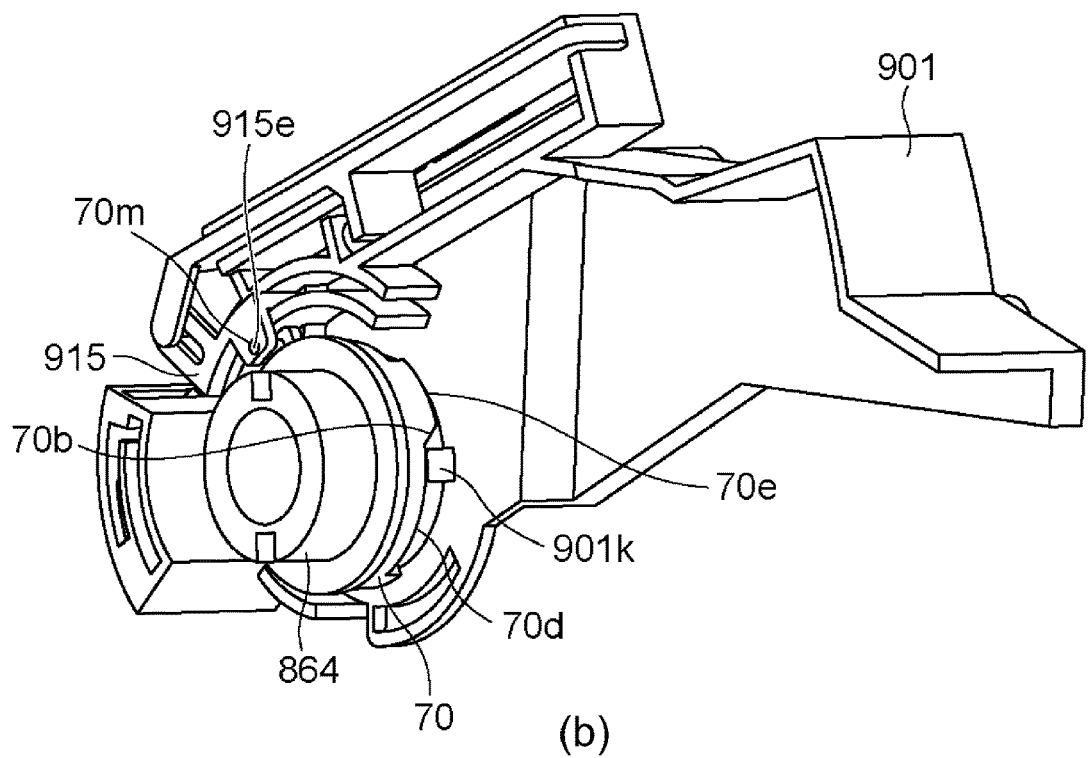
Figure 98:
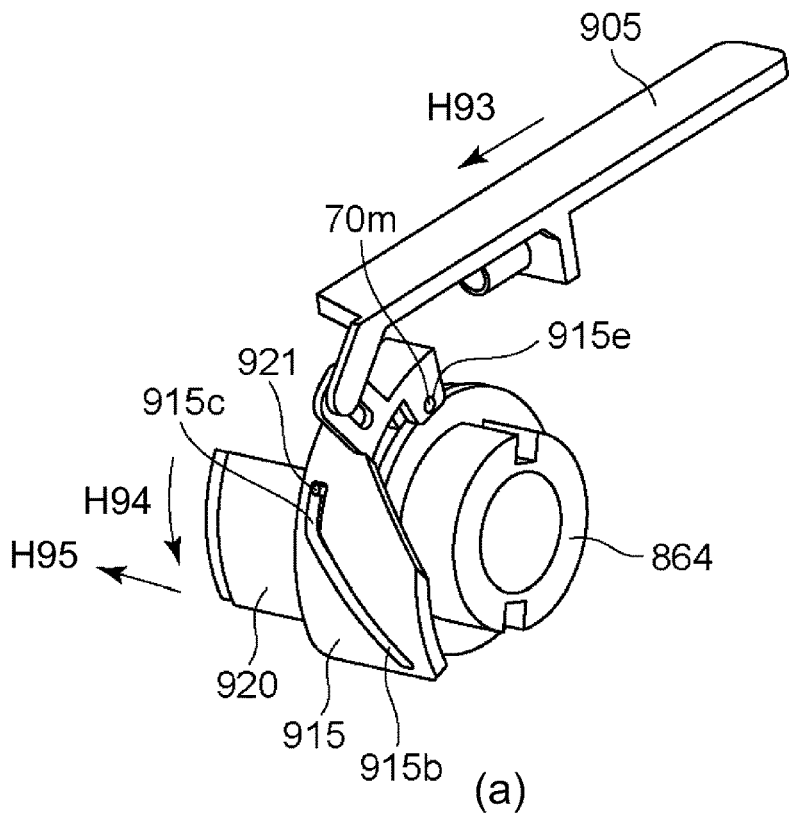
FIG. 98 is an operation illustration of the advancement/retraction member, the coupling member, and the third lever member.
Figure 98:
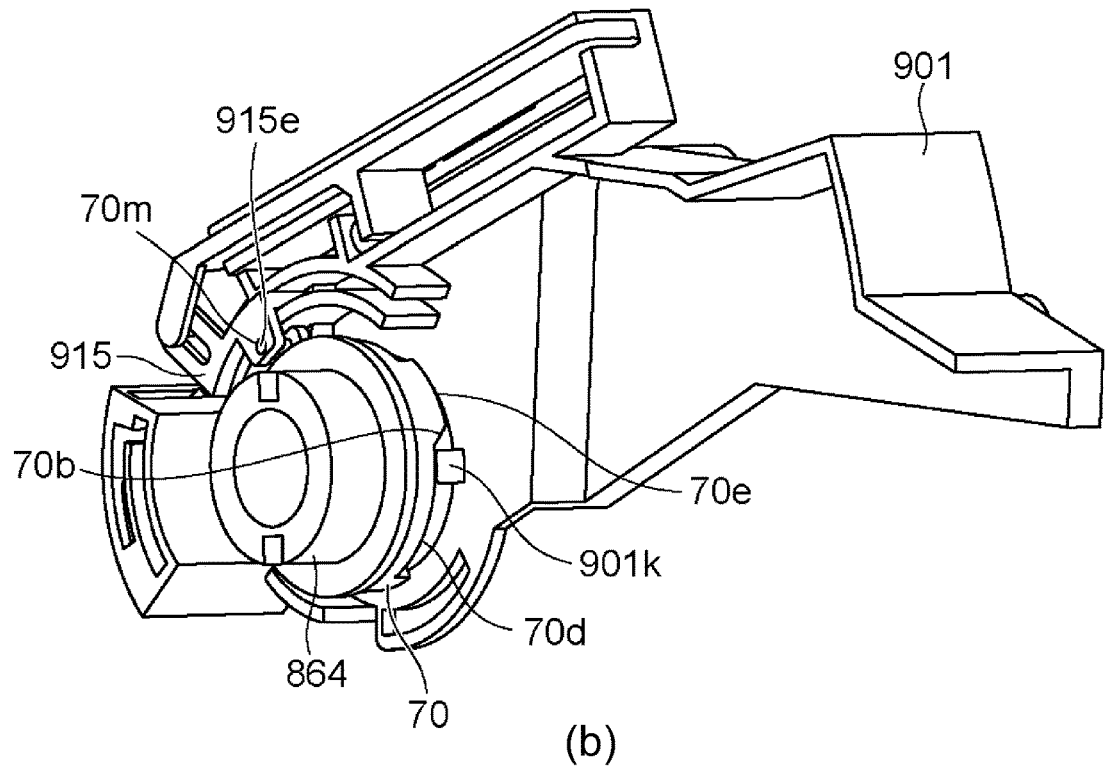

Referring to FIGS. 96 to 98, The operations of the advancement/retraction member 920, the coupling member 864, and the third lever member 905 will be described. FIGS. 96 to 98 are perspective views of the advancement/retraction member 920, the coupling member 864, and the third lever member 905. In the Figure, some parts are omitted for better illustration.

Part (a) of FIG. 96 and part (b) of FIG. 96 show a state of a natural state (free state) in which no external force is applied to the third lever member 905. The third lever member 905 is moved in the direction of arrow H92 in the Figure by the force of the third urging member 906. At this time, the cam member 915 and the advancement/retraction member 920 are in the retracted positions shown in the Figure. Further, as shown in 95 (b), the coupling member 864 is moved to the non-driving side because the first surface 70e of the cam member 70 is in contact with the projection 901k of the side member 901 (see also FIG. 43).

Part (a) of FIG. 97 and part (b) of FIG. 97 show a state when the third lever member 905 is pushed. As shown in the Figures, when a force is applied to the contact portion 905a of the third lever member 905 in the direction of arrow H93 in the Figure, the third lever member 905 moves in the direction of arrow H93 in the Figure. In accordance with this operation, the cam member 915 rotates in the direction of arrow H94 in the Figure.

The advancement/retraction member 920 is engaged with the cam groove 915b of the cam member 915 by way of the cam pin 921. As the cam member 915 rotates in the direction of arrow H94 in the Figure, the cam pin slides in the cam groove 915b, so that the advancement/retraction member 920 moves in the direction of arrow H95 in the drawing. Then, when the cam pin 921 slides to the end in the cam groove 915b, the advancement/retraction member 920 moves to the advanced position (position in part (a) of FIG. 98.

The state of the coupling member 864 at this time will be described. Since the engaging projection 70m of the cam member 70 and the engaging hole 915e of the cam member 915 are engaged with each other, the cam member 70 rotates in the direction of arrow H94 in the Figure as the cam member 915 rotates as described above. At this time, as shown in part (b) of FIG. 97, the first surface 70e of the cam member 70 continues to be in contact with the projection 901k of the side member 901, it remains in a state of being moved to the non-driving side.

Part (a) of FIG. 98 and part (b) of FIG. 98 shows the state when the third lever member 905 is further pushed in. As shown in the Figure, when the third lever member 905 is further pushed in, the cam member 915 further rotates in the direction of arrow H94 in the Figure of part (a) of FIG. 98. At this time, the cam pin 921 slides in the second cam groove 915c of the cam member 915. As shown in part (a) of FIG. 98, since the second cam groove 915c is not inclined relative to the direction of arrow H95 in the Figure, the advancement/retraction member 920 remains at the advanced position even if the cam member 915 rotates.

The state of the coupling member 864 at this time will be described. As the cam member 915 further rotates, the cam member 70 also rotates further in the direction of arrow H94 in the drawing. At this time, as shown in part (b) of FIG. 98, the surface of the cam member 70 which abuts on the projection 901k of the side member 901 changes from the first surface 70e to the second surface 70d by way of the inclined surface 70b. In this process, the coupling member 864 changes from the state of being moved to the non-driving side to the state of projecting toward the driving side (See also FIG. 44).

As described above, when the third lever member 905 is pushed in, the advancement/retraction member 920 first moves to the advance position, and then the coupling member 864 projects to the drive side.

Figure 99:
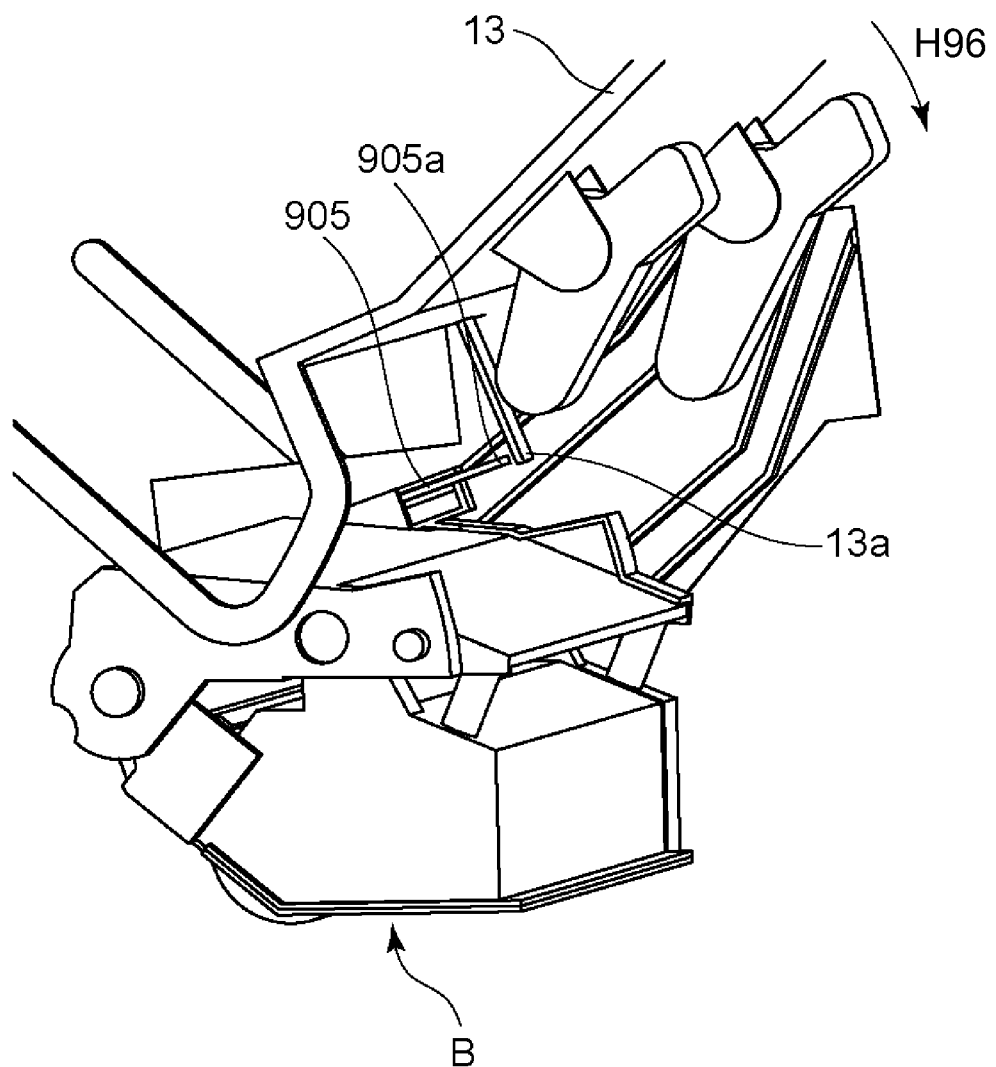
FIG. 99 is an illustration of mounting the process cartridge.

FIG. 99 is a perspective view illustrating a state in which the process cartridge B of this embodiment is mounted to the apparatus main assembly. As shown in the Figure, when the process cartridge B is mounted to the apparatus main assembly and the opening/closing door 13 is closed, the cartridge pressing portion 13a provided on the opening/closing door 13 comes into contact with the contact portion 905a of the third lever member 905. Further, when the opening/closing door 13 is closed, the cartridge pressing portion 13a pushes the third lever member 905.

Thereafter, the advancement/retraction member 920 moves to the advanced position as described above. At this time, as described in the Embodiment 8, the rotation axis of the drive transmission member 81 and the rotation axis of the drum 62 become close to be coaxial with each other (see FIGS. 71 and 72). When the opening/closing door 13 is closed further, the coupling member 864 projects toward the drive side as described above. At this time, as described in the Embodiment 8 (see FIG. 74), the driven transmission portion 864a of the coupling member 864 pops out toward the drive transmission member 81, the free end surface 864c (FIG. 40) of the driven transmission portion enters the drive transmission portion 81e (see FIG. 4). Or, the free end surface 864c of the driven transmission portion comes into contact with the free end surface 81k (see FIG. 4). The operation when the drive transmission member 81 of the apparatus main assembly A is rotationally driven after the opening/closing door 13 is closed is as described above. In this embodiment, the structure is such that, when the third lever member 905, which is an operating member, receives an external force, the advancement/retraction member 920 first moves, and then the coupling member 864 starts moving.

Embodiment 8-3

In Embodiment 8-3, another structure in which the advancement/retraction member 920 and the coupling member 864 is advanced and retracted by the action of one lever will be described. In this embodiment as well, the same points as in the above-described embodiment will be omitted. Among the elements disclosed in this embodiment, those corresponding to the elements described in the above-described embodiment are assigned with the same names as the members of the above-mentioned embodiment, and Only the points different from those in the above-mentioned embodiment will be described.

Figure 100:
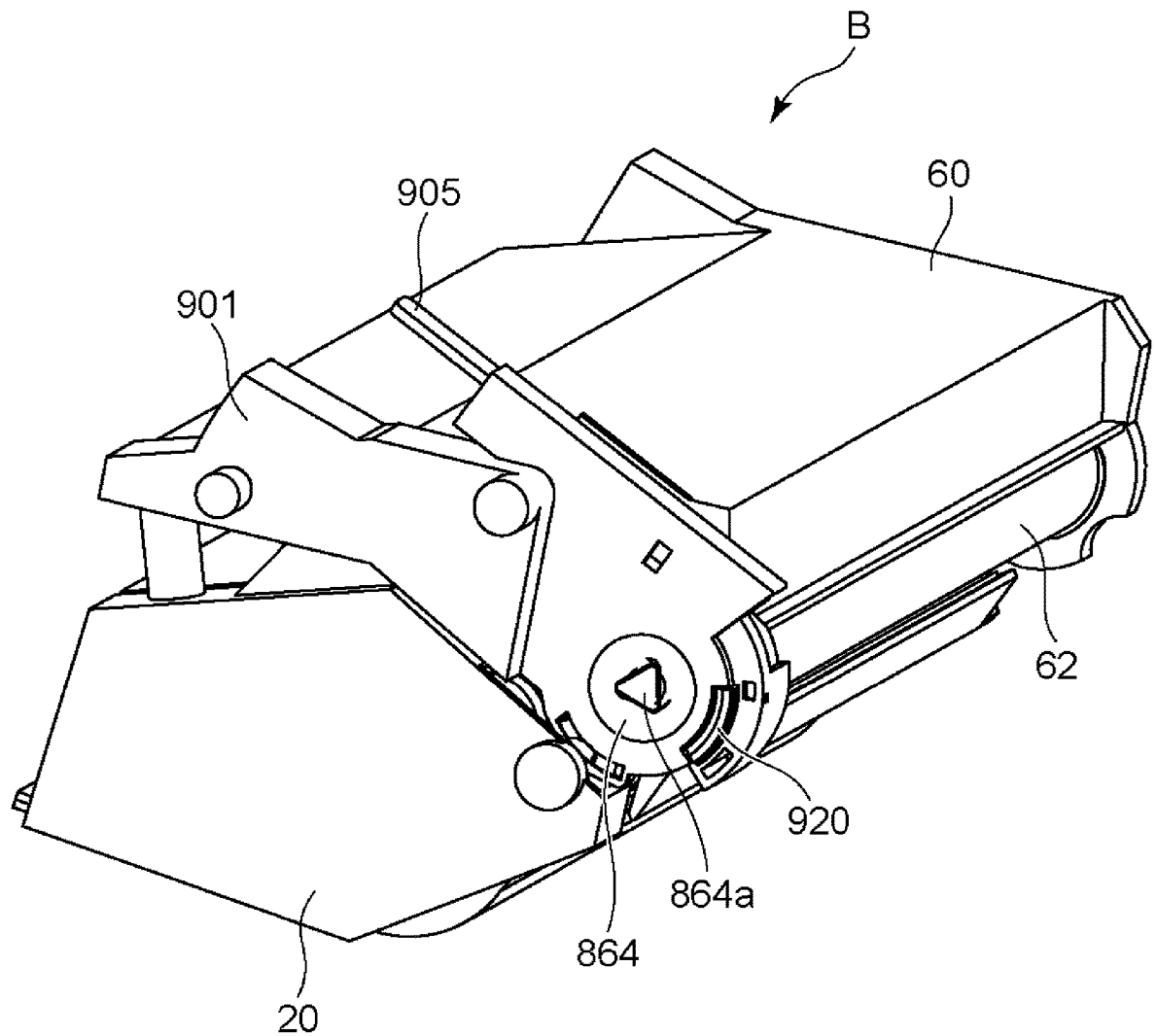
FIG. 100 is a perspective view of the process cartridge.

FIG. 100 is a perspective view of the process cartridge B of this embodiment.

A coupling member 864 is provided at the end of the drum 62, and a projection as a driven transmission portion 864a for receiving the drive from the drive transmission member 81 of the apparatus main assembly A is provided at the end of the coupling member 864. A side member 901 is provided on the drive side of the cleaning unit 60. The side member 901 is provided with a third lever member 905 and an advancement/retraction member 920. Although the details will be described hereinafter, the third lever member is an operating member for operating the advancement/retraction member 920 and the coupling member 864.

Figure 101:
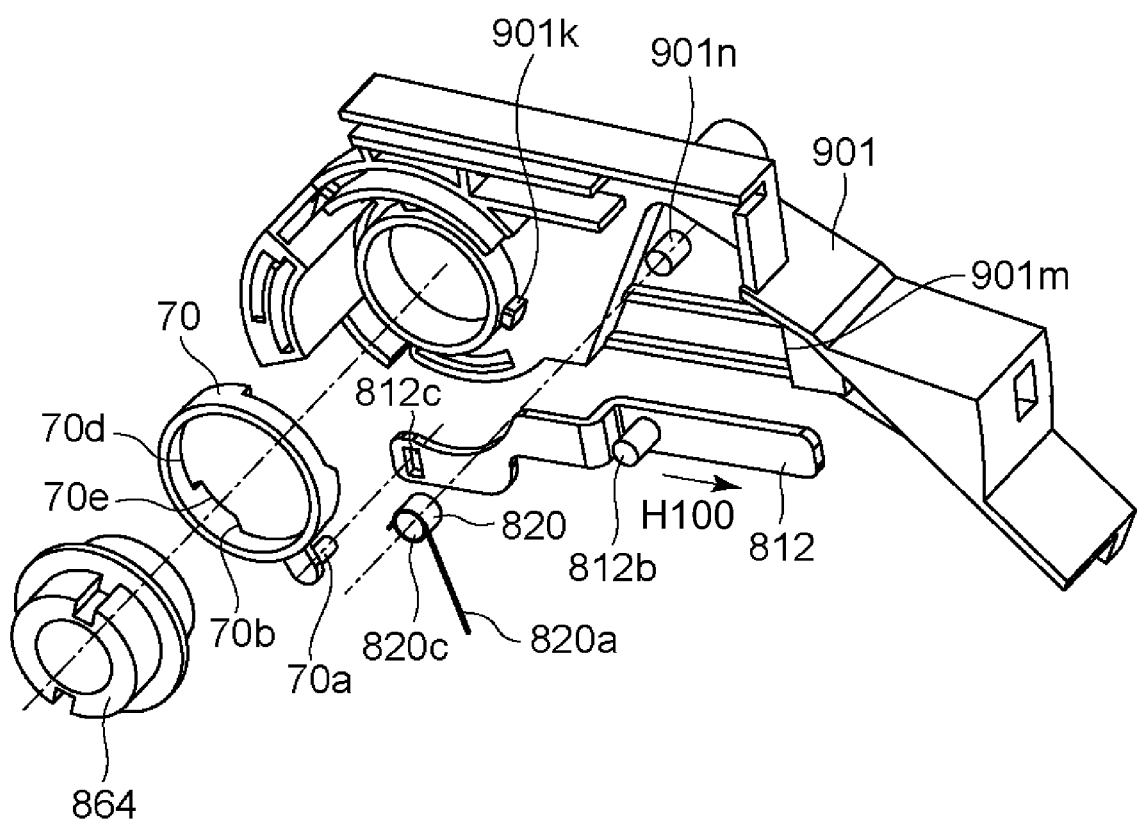
FIG. 101 is a perspective view of the advancement/retraction member and the periphery of the coupling member.
Figure 102:
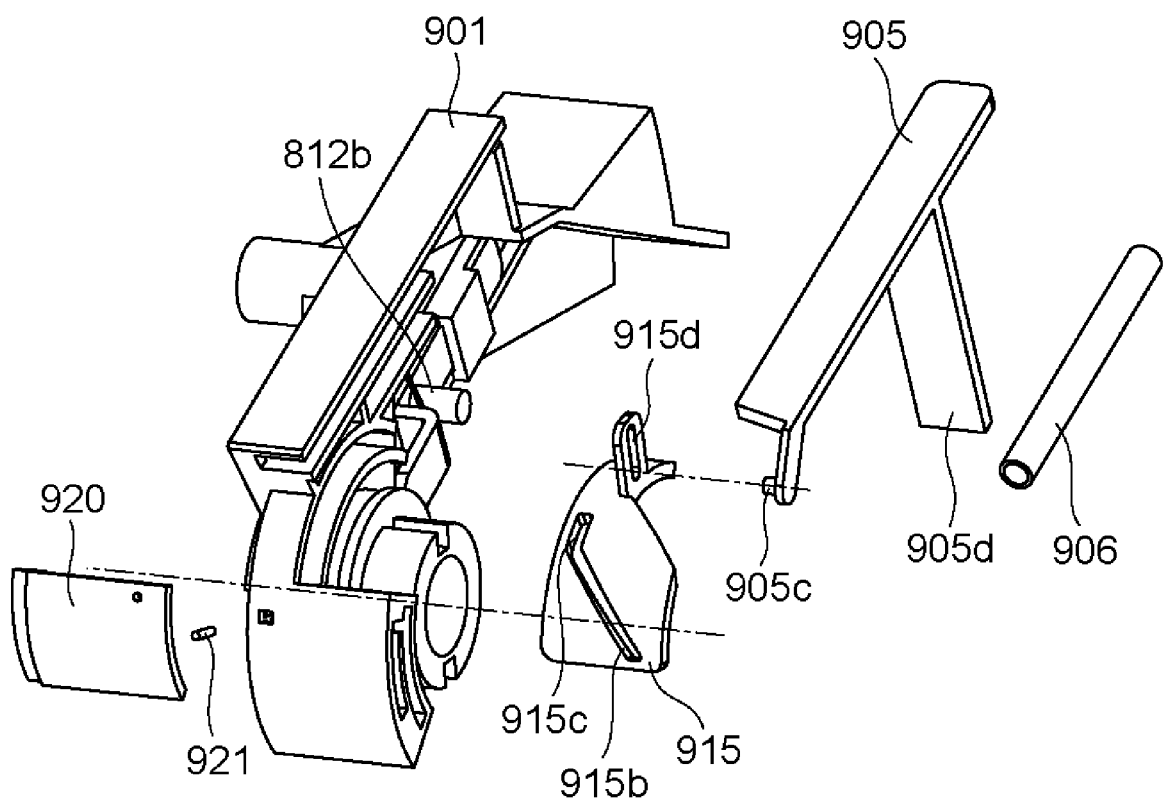
FIG. 102 is a perspective view of the advancement/retraction member and the periphery of the coupling member.

Referring to FIGS. 101 and 102, The structures around the advancement/retraction member 920 and the coupling member will be described. FIGS. 101 and 102 are perspective views of the advancement/retraction member 920 and the coupling member 864. In these Figures, some portions are omitted for the sake of better illustration.

As shown in FIG. 101, the lever member 812 is assembled through the slit portion 901m of the side member 901. In addition, the coil portion 820c of the first urging member 820 is inserted into the fixing projection 901n of the side member 901, and a first urging end 820a is in contact with the urged projection 812b of the lever member 812. With this structure, the lever member 812 is provided so as to be slidable in the direction opposite to the arrow H100 direction in the Figure while being urged in the direction of the arrow H100 in the Figure. In addition, the lever member engaging portion 70a of the cam member 70 is engaged with the engaging hole 812c of the lever member 812. With this structure, the cam member 70 can rotate and move in accordance with the movement of the lever member 812 in the direction of arrow H100 in the Figure.

In the cartridge B of this embodiment, the lever member 812 is additionally provided as compared with the cartridge described in embodiment 8-2. The third lever member 905 can operate the coupling member by way of the lever member 812. Therefore, unlike the above-described 8th embodiment, in this embodiment, the lever member 812 is not exposed to the outside of the cartridge and does not directly receive an external force from the apparatus main assembly A. Instead, a force is received from the third lever member 905 inside the cartridge.

After assembling the lever member 812 and the cam member 70, the third lever member 905, the cam member 915 including the cam groove 915b and the second cam groove 915c, and the like are assembled, as shown in FIG. 102. The structure is the same as that of the Embodiment 8. Further, as shown in FIG. 102, the third lever member 905 of this embodiment is provided with a lever contact portion 905d.

Figure 103:
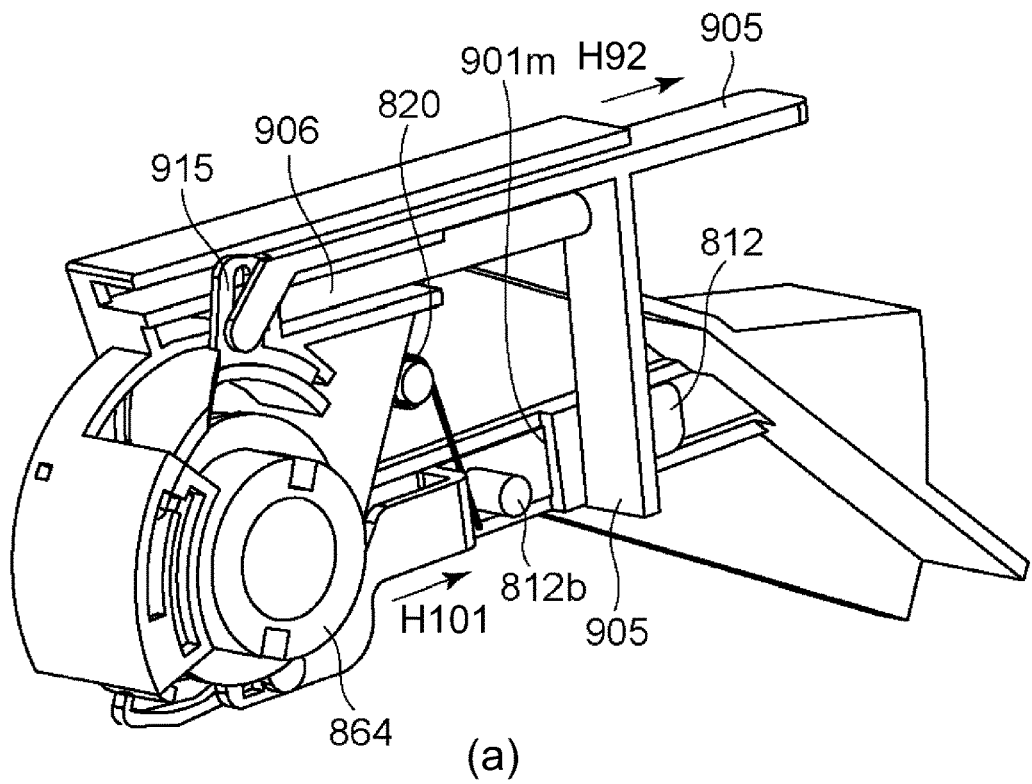
FIG. 103 is an operation illustration of the advancement/retraction member, the coupling member, and the third lever member.
Figure 103:
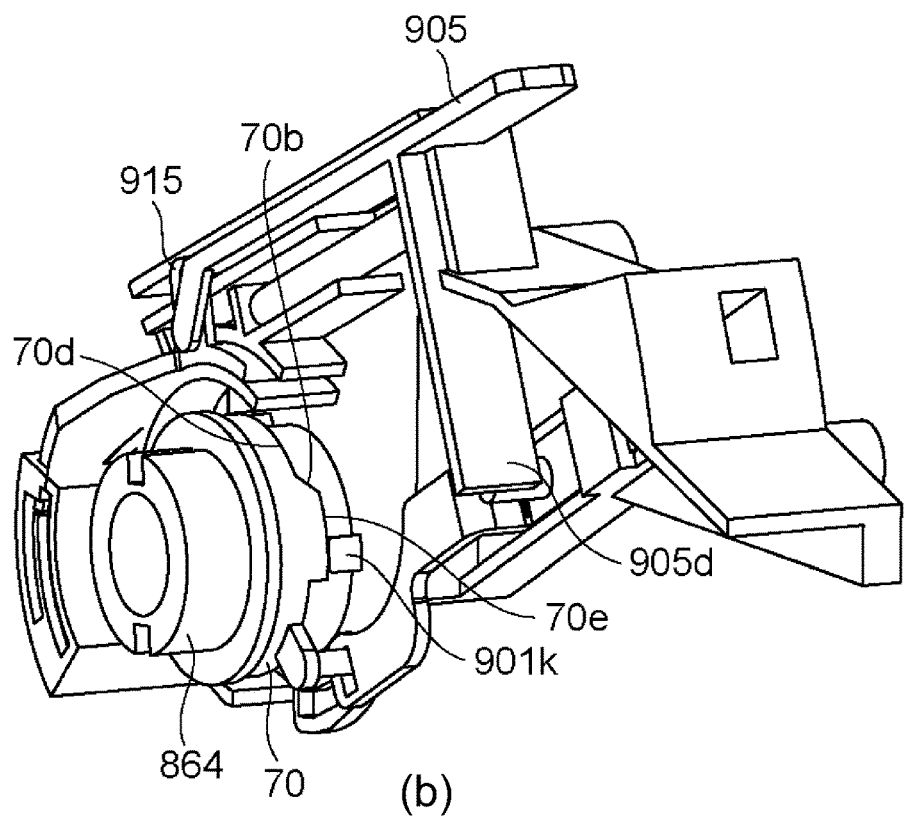
Figure 104:
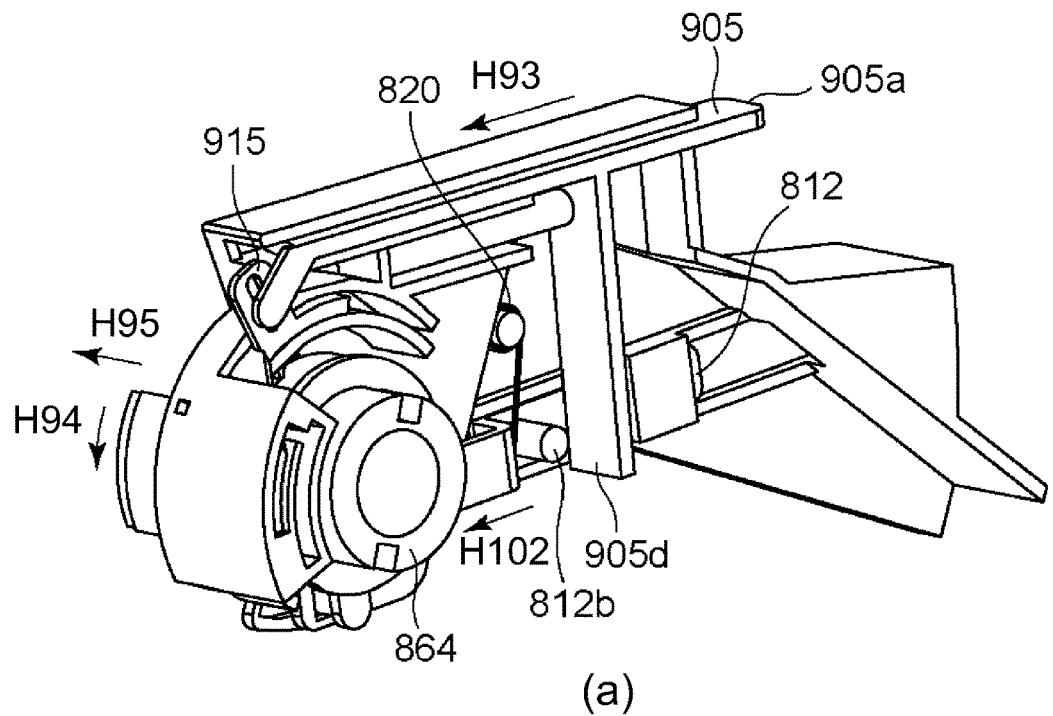
FIG. 104 is an operation illustration of the advancement/retraction member, the coupling member, and the third lever member.
Figure 104:
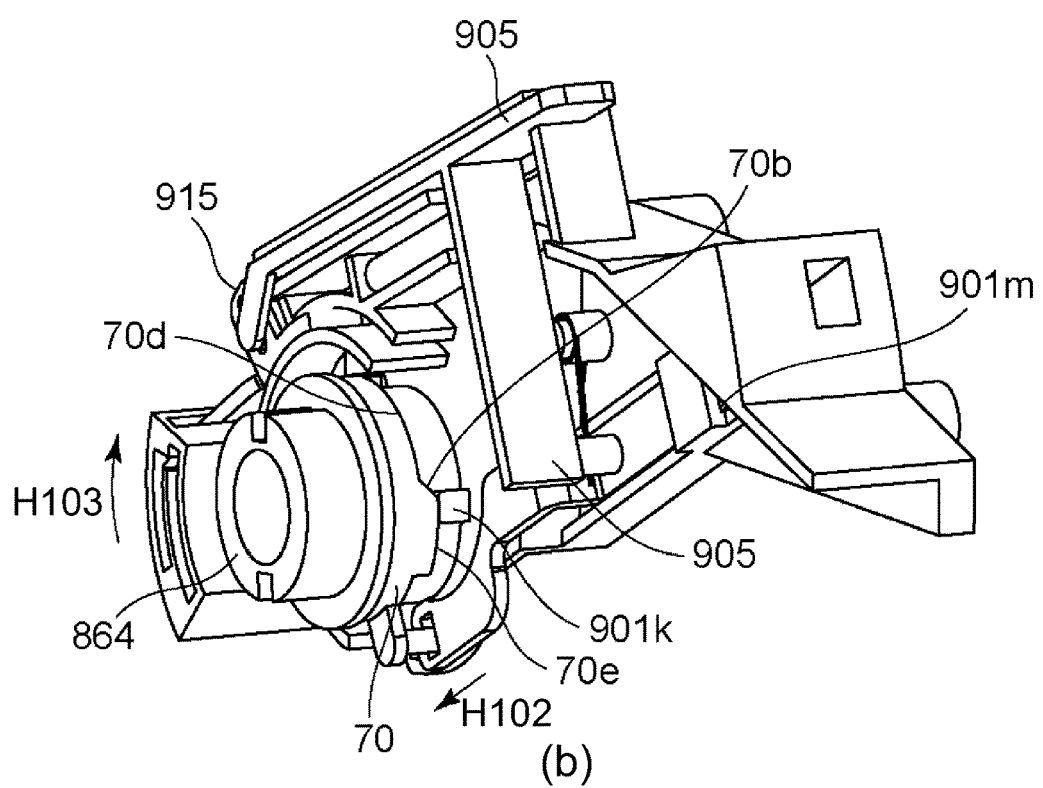
Figure 105:
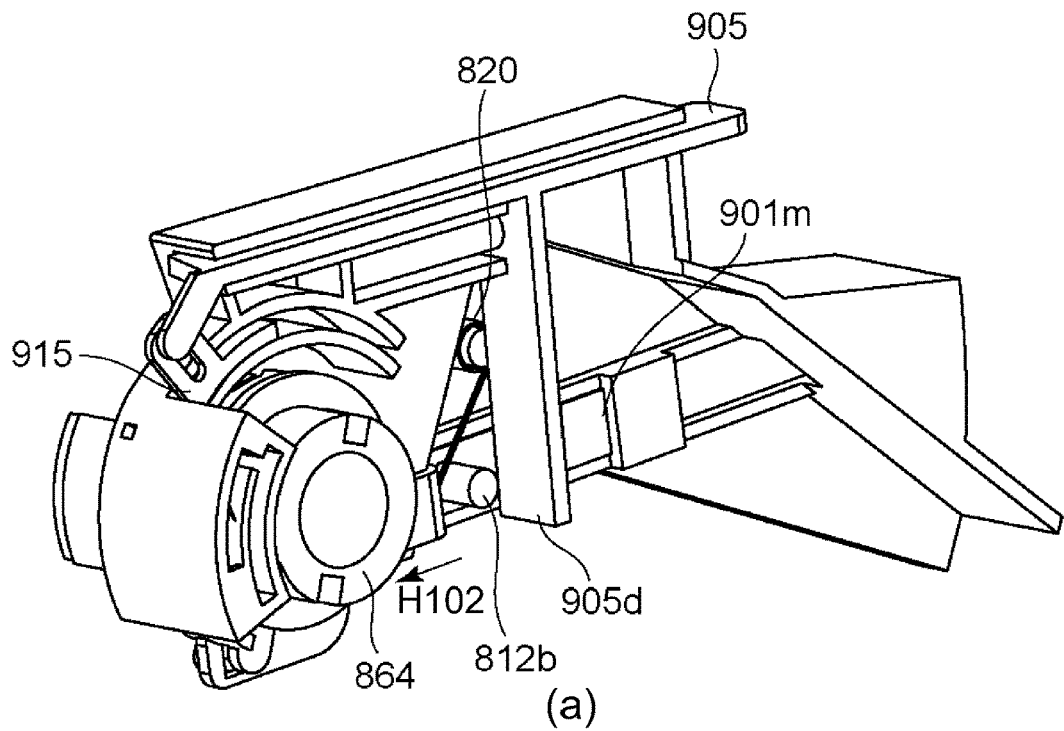
FIG. 105 is an operation illustration of the advancement/retraction member, the coupling member, and the third lever member.
Figure 105:
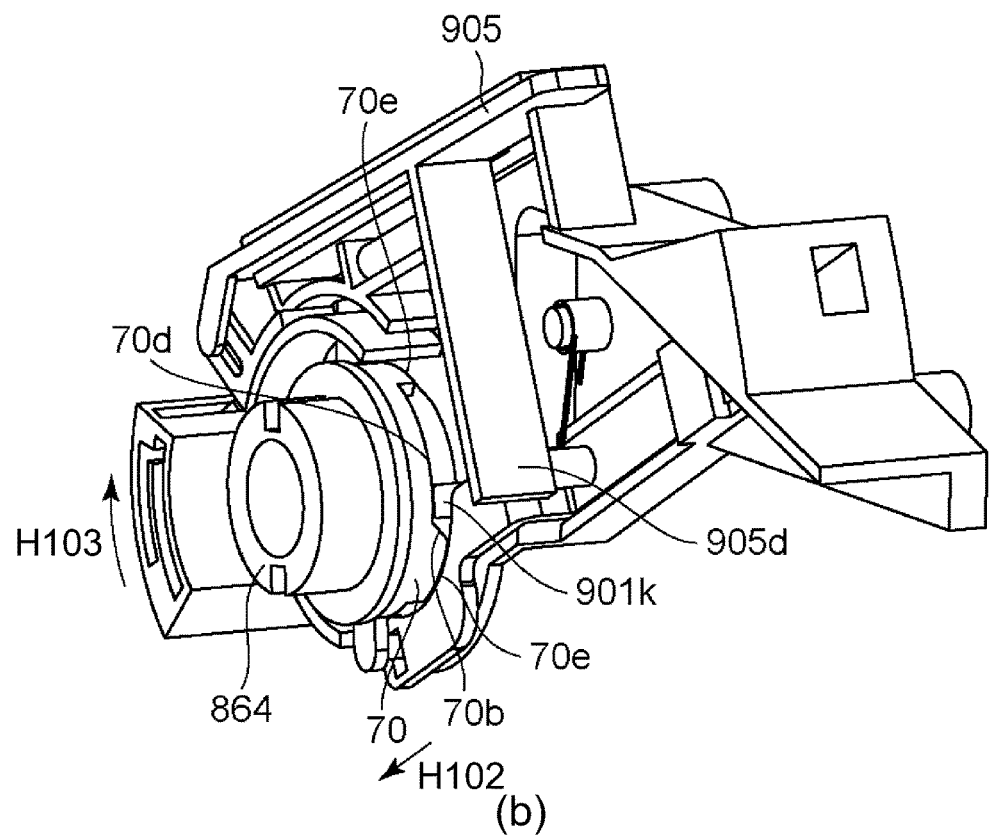

Referring to FIGS. 103 to 105, The operations of the advancement/retraction member 920, the coupling member 864, and the third lever member 905 will be described. FIGS. 103 to 105 are perspective views of the advancement/retraction member 920, the coupling member 864, and the third lever member 905. In the Figure, some parts are omitted for better illustration.

Part (a) of FIG. 103 and part (b) of FIG. 103 show a natural state (free state) in which no external force is applied to the third lever member 905. The third lever member 905 is moved in the direction of arrow H92 in the Figure by the force of the third urging member 906. At this time, the cam member 915 and the advancement/retraction member 920 are in the retracted positions. Further, as shown in Figure (a), the lever member 812 is moved in the direction of arrow H101 in the Figure by the force from the first urging member 820. At this time, the coupling member 864 is moved to the non-driving side because the first surface 70e of the cam member 70 is in contact with the projection 901k of the side member 901 (see also FIG. 43).

Part (a) of FIG. 104 and part (b) of FIG. 104 show a state when the third lever member 905 is pushed. As shown in the Figure, when a force is applied to the contact portion 905a of the third lever member 905 in the direction of arrow H93 in the Figure, the third lever member 905 is moved in the direction of arrow H93 in the Figure. In accordance with this operation, the cam member 915 rotates in the direction of arrow H94 in the Figure. As described above, the advancement/retraction member 920 moves in the direction of arrow H95 in part (a) of FIG. 104 due to the engagement between the cam pin 921 and the cam groove 915b. Then, when the cam pin 921 slides to the end in the cam groove 915b, the advancement/retraction member 920 moves to the advanced position (see part (a) of FIG. 97. On the other hand, during the movement of the third lever member 905, the lever contact portion 905d of the third lever member 905 comes into contact with the urged projection 812b of the lever member 812. By this contact, the lever member 812 is moved in the direction of arrow H102 in part (a) of FIG. 104 and part (b) of FIG. 104. In accordance with this operation, the cam member 70 rotates in the direction of arrow H103 in part (b) of FIG. 104. As shown in part (b) of FIG. 104, since the first surface 70e of the cam member 70 and the projection 901k of the side member 901 are in contact with each other, the coupling member 864 is still in the non-driving side. As described above, in the state of part (a) of FIG. 104 and part (b) of FIG. 104, the advancement/retraction member 920 is in the advanced position, and the coupling member 864 is in the non-driving side.

Part (a) of FIG. 105 and part (b) of FIG. 105 show the state when the third lever member 905 is pushed in further. As shown in the Figure, when the third lever member 905 is further pushed in, the cam pin slides in the second cam groove 915c of the cam member 915 as described above, and therefore, the advancement/retraction member 920 remains in the advanced position (See Figure (a)).

The state of the coupling member 864 at this time will be described. As the third lever member 905 is further pushed in, the lever member 812 further moves in the direction of arrow H102 in the Figure. In accordance with this operation, the cam member 70 also rotates in the direction of arrow H103 in part (b) of FIG. 105. At this time, as shown in part (b) of FIG. 105, the surface of the cam member 70 which contacts the projection 901k of the side member 901 changes from the first surface 70e to the second surface 70d by way of the inclined surface 70b. In this process, the coupling member 864 changes from the state of being moved to the non-driving side to the state of projecting to the driving side (See also FIG. 44). As described above, when the third lever member 905 is pushed in, the advancement/retraction member 920 is first moved to the advance position, and thereafter the coupling member 864 projects toward the drive side.

Figure 106:
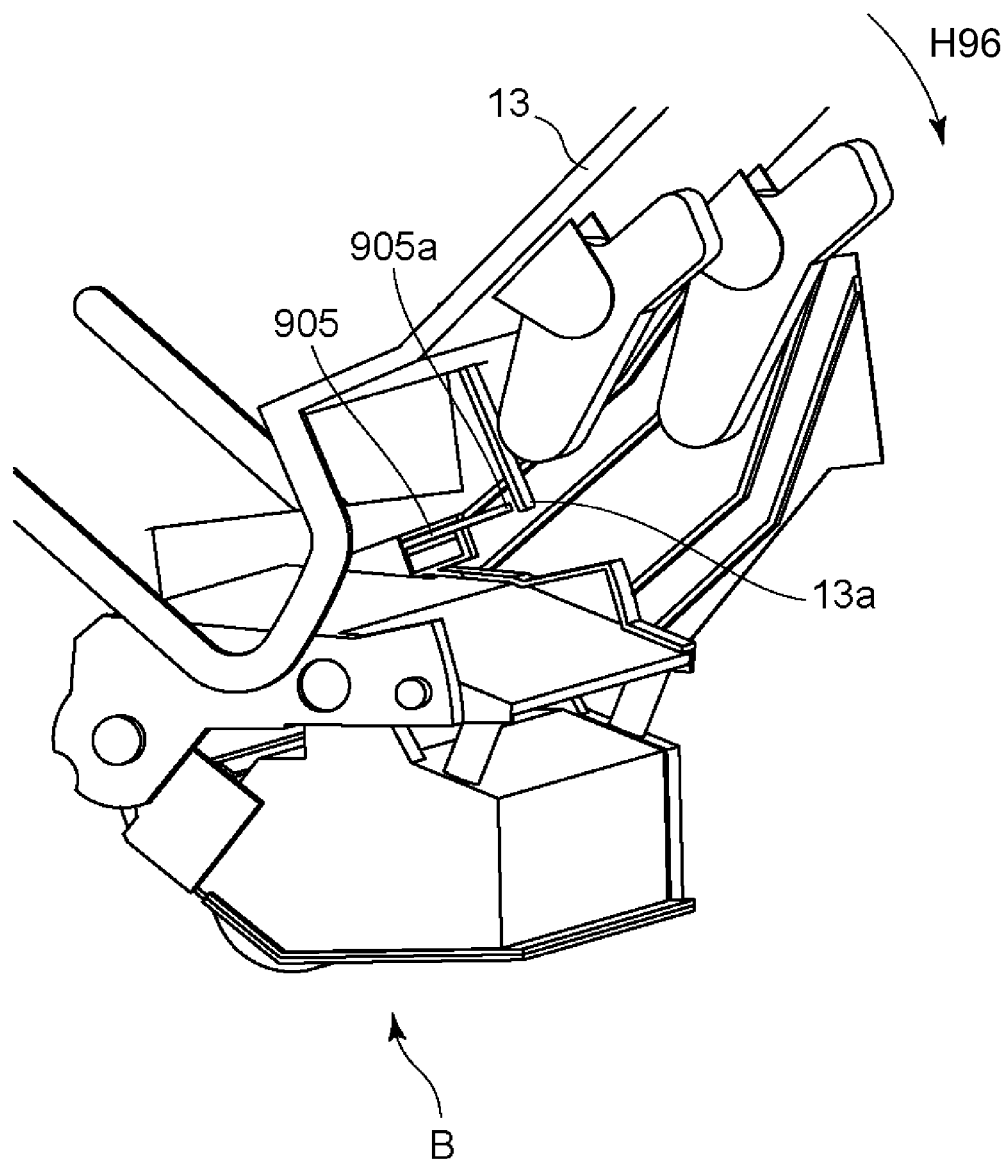
FIG. 106 is an illustration of mounting the process cartridge.

FIG. 106 is a perspective view illustrating a state in which the process cartridge B of this embodiment is mounted to the main assembly of the apparatus. As shown in the Figure, when the process cartridge B is mounted to the apparatus main assembly and the opening/closing door 13 is closed, the cartridge pressing portion 13a provided on the opening/closing door 13 comes into contact with the contact portion 905a of the third lever member 905. When the opening/closing door 13 is closed further, the cartridge pressing portion 13a pushes the third lever member 905.

Thereafter, the advancement/retraction member 920 moves to the advanced position as described above. At this time, as described in the Embodiment 8, the rotation axis of the drive transmission member 81 and the rotation axis of the drum 62 become close to be coaxial (see FIGS. 71 and 72). When the opening/closing door 13 is closed further, the coupling member 864 projects toward the drive side as described above. At this time, as described in the Embodiment 8 (see FIG. 74), the driven transmission portion 864a of the coupling member 864 projects toward the drive transmission member 81, and the free end surface 864c (FIG. 40) of the driven transmission portion enters the drive transmission portion 81e (see FIG. 4). Or, the free end surface 864c of the driven transmission portion comes into contact with the free end surface 81k (see FIG. 4). The operations when the drive transmission member 81 of the apparatus main assembly A is rotationally driven after the opening/closing door 13 is closed are as described above.

Embodiment 8-4

Embodiment 8-4 will be described. This embodiment is an embodiment (modification example) in which the structure of the Embodiment 8 is partially modified. In this embodiment as well, the description of the same points as in the above-described embodiment will be omitted. Among the elements disclosed in this embodiment, those corresponding to the elements described in the above-described embodiment are assigned with the same names as the members of the above-mentioned embodiment, and only the point different from those of the above-mentioned embodiment will be described.

Figure 107:
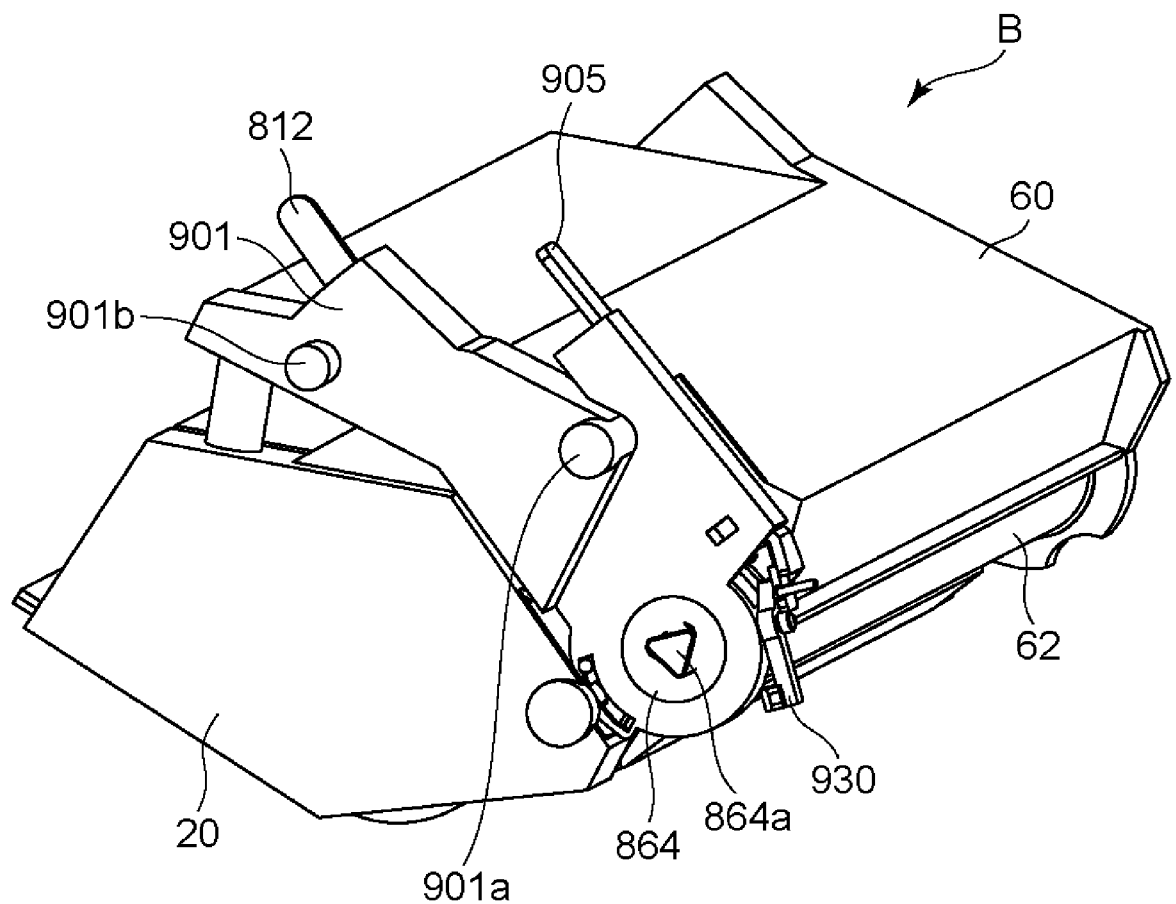
FIG. 107 is a perspective view of the process cartridge.

FIG. 107 is a perspective view of the process cartridge B of this embodiment. A side member 901 is provided on the drive side of the cleaning unit 60, and is provided with a drive-side first positioning projection 901a and a drive-side second positioning projection 901b. In addition, it is provided with a lever member 812, a third lever member 905, and a rotatable member 930.

Figure 108:
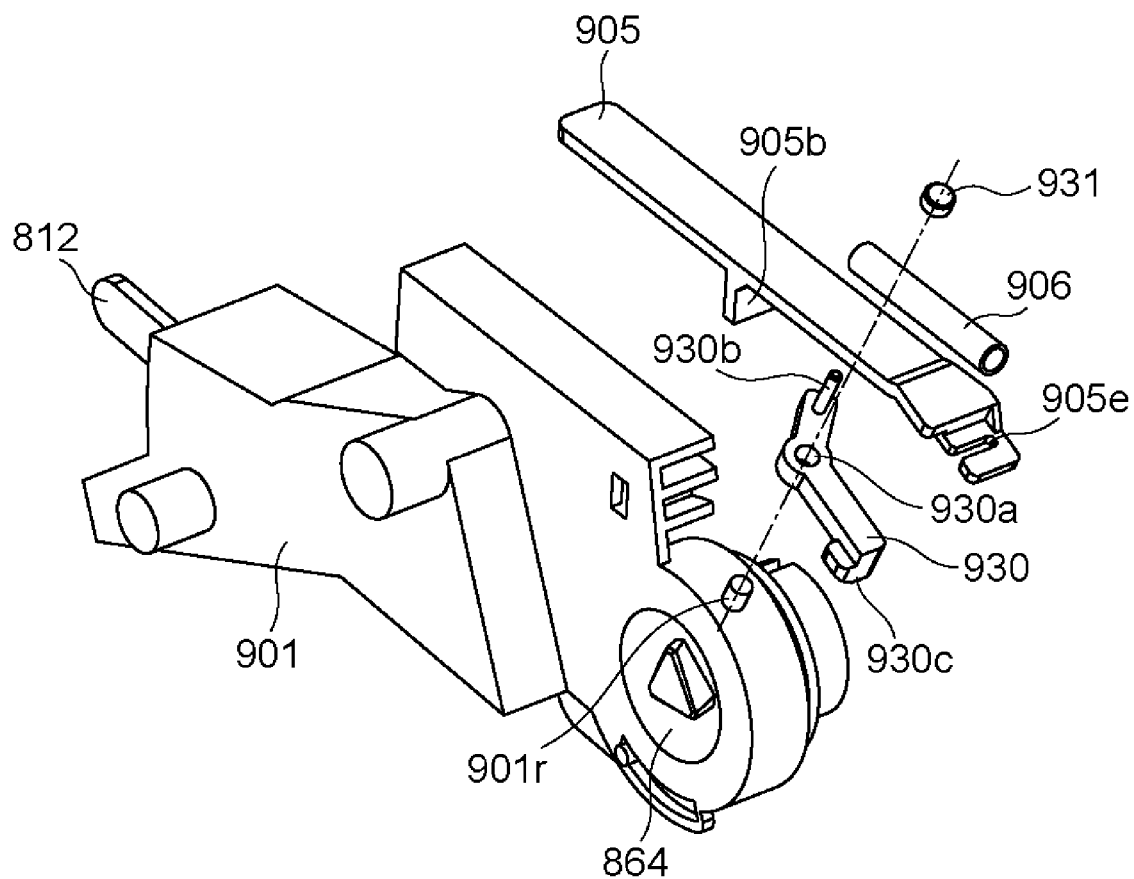
FIG. 108 is a perspective view of the advancement/retraction member and the periphery of the coupling member.
Figure 109:
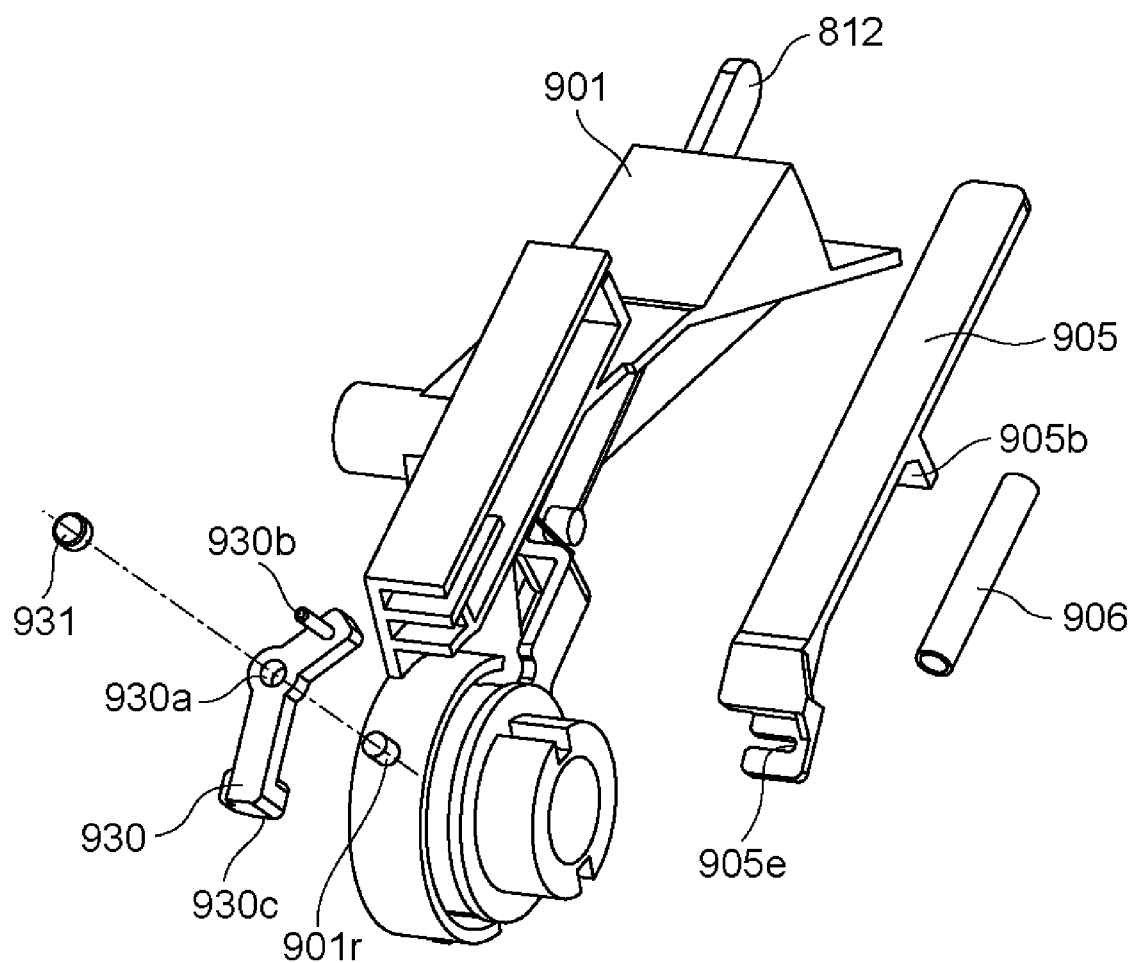
FIG. 109 is a perspective view of the advancement/retraction member and the periphery of the coupling member.
Figure 110:
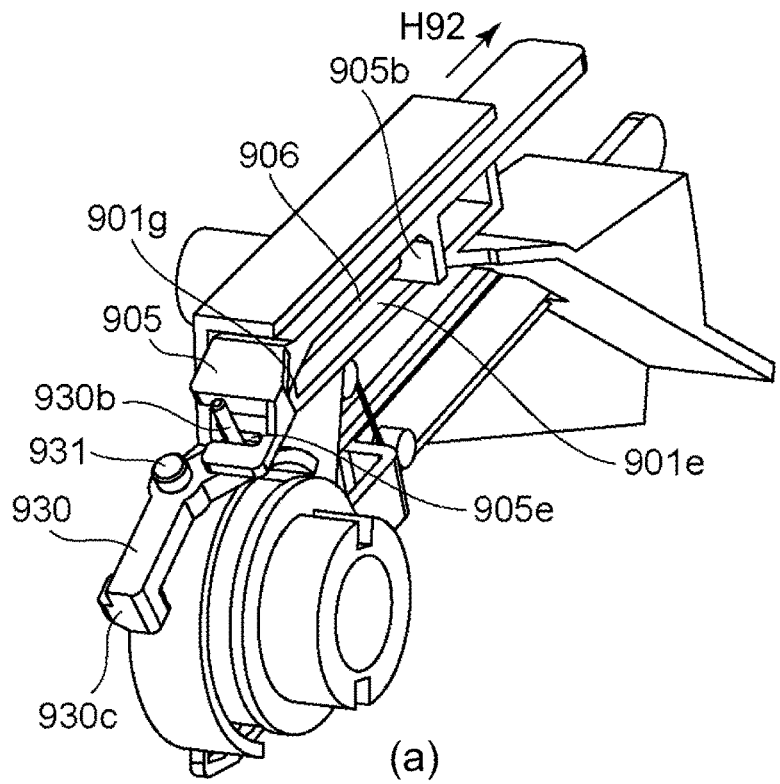
FIG. 110 is a perspective view of the advancement/retraction member and the periphery of the coupling member.
Figure 110:
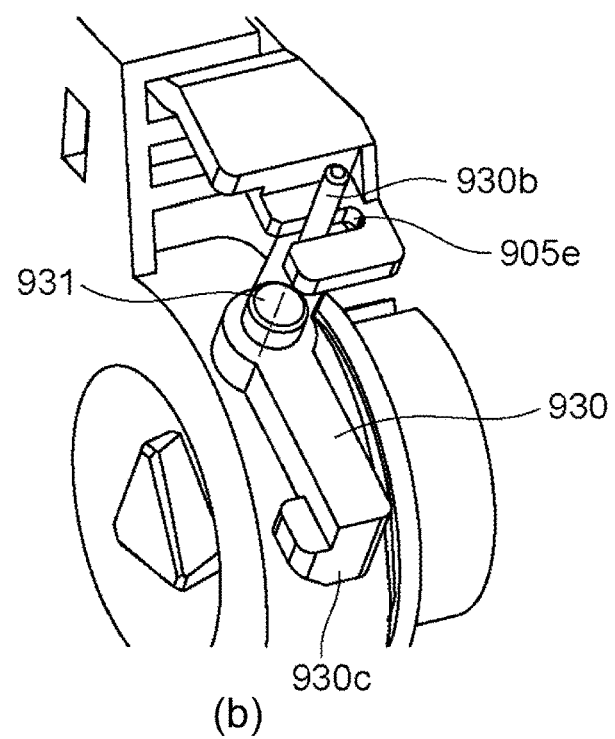

Referring to FIGS. 108 and 109 and part (a) of FIG. 110 and part (b) of FIG. 110, The structure around the rotatable member 930 will be described. FIGS. 108 and 109 are exploded perspective views around the rotatable member 930. Part (a) of FIG. 110 and part (b) of FIG. 110 are perspective views of the rotatable member 930 and the third lever member 905. In the Figures, some portions are omitted for the sake of better illustration.

As shown in FIG. 109 and FIG. 107, the rotatable member 930 is provided with a support hole 930a, a cam pin 930b, and a contact portion 930c. As shown in the Figure, a support hole 930a of the rotatable member 930 is slidably and rotatably inserted into the rotating shaft 901r of the side member 901. After the rotatable member 930 is mounted, a retaining member 931 is fixed to the free end of the rotating shaft 901r by a method such as adhesion to prevent the rotatable member 930 from disengaging off the rotating shaft 901r.

As shown in part (a) of FIG. 110 and part (b) of FIG. 110, a cam groove 905e is provided at the end of the third lever member 905. The cam pin 930b of the rotatable member 930 is slidably engaged with the cam groove 905e.

Further, the third urging member 906 is provided on the urging member supporting portion 901e of the side member 901, and the opposite ends thereof are in contact with the contact wall 901g of the side member 901 and the urging wall 905b of the third lever member 905, respectively.

With these structures, the third lever member 905 is supported so as to be movable in the direction of arrow H92 and the opposite direction thereto, while being urged in the direction of arrow H92 in part (a) of FIG. 110.

Figure 111:
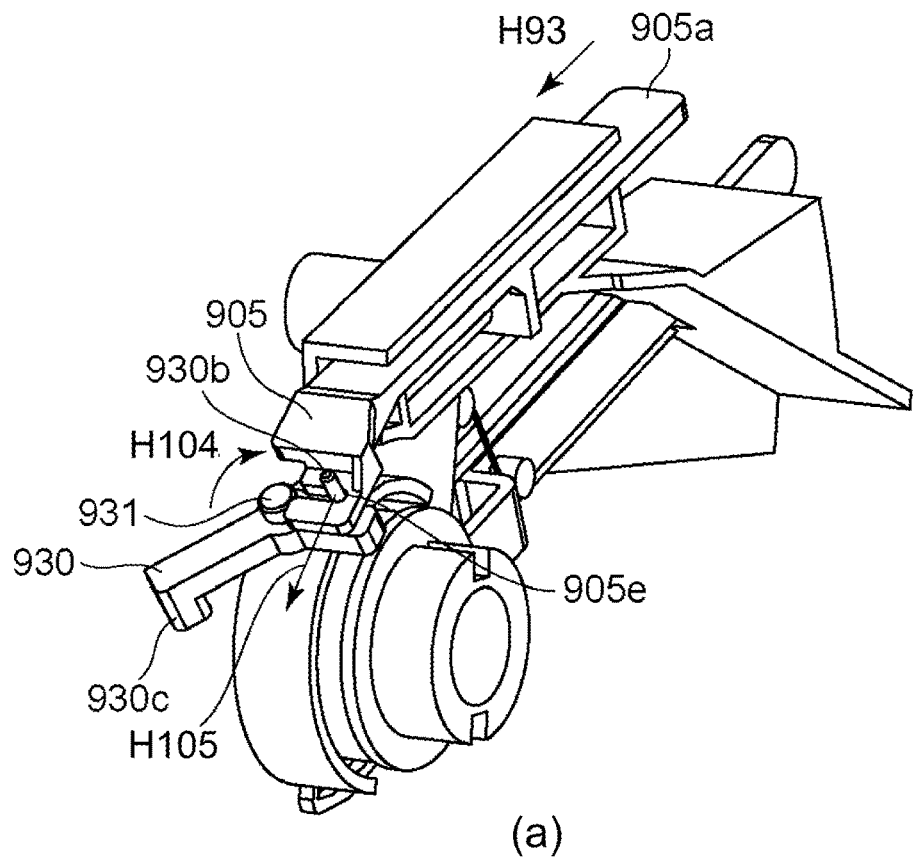
FIG. 111 is an operation illustration of the advancement/retraction member, the coupling member, and the third lever member.
Figure 111:
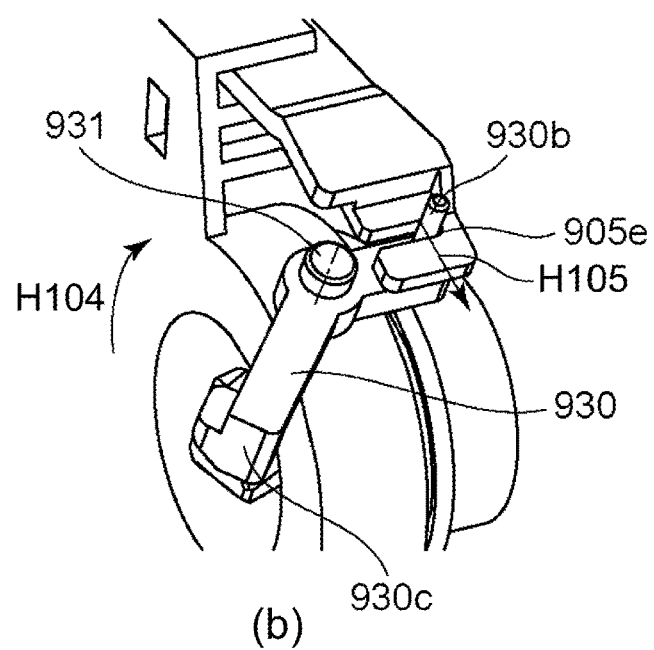
Figure 112:
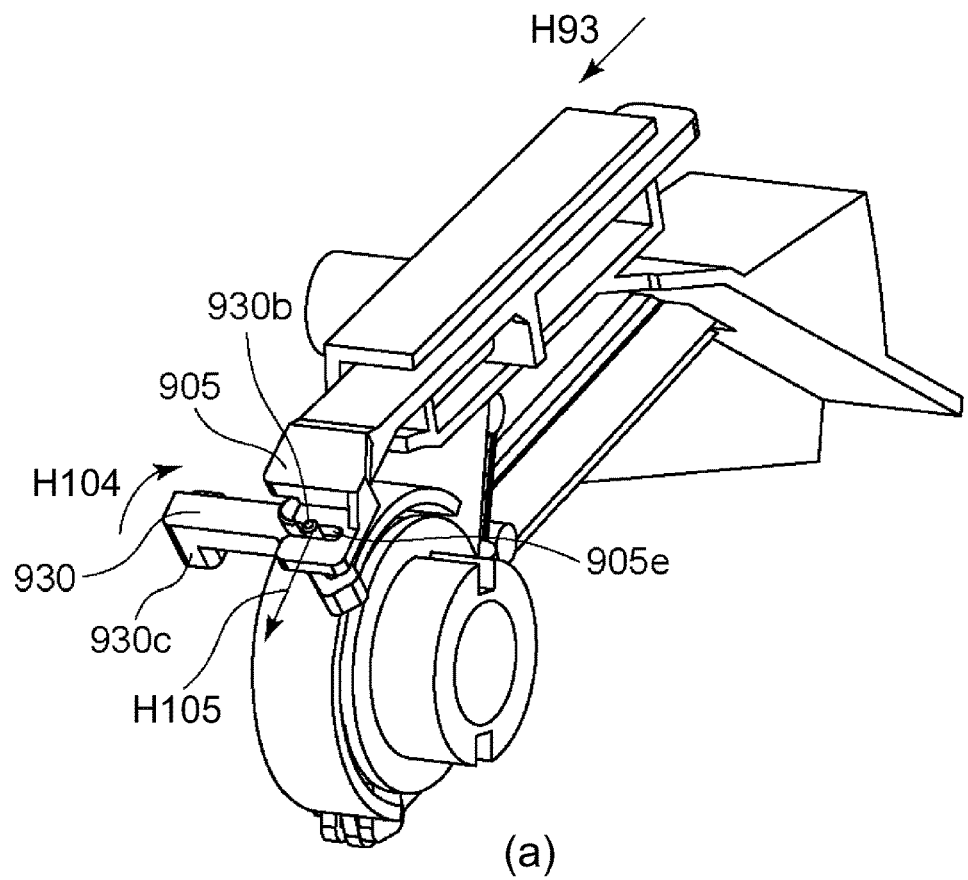
FIG. 112 is an operation illustration of the advancement/retraction member, the coupling member, and the third lever member.
Figure 112:
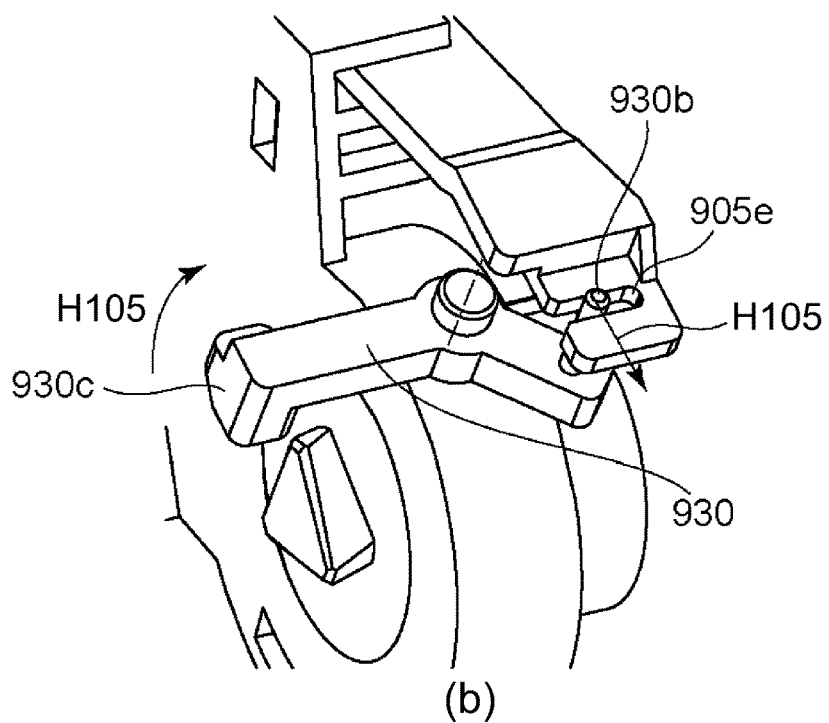

Referring to part (a) of FIG. 110, part (b) of FIG. 110 to part (a) of FIG. 112 and part (b) of FIG. 112, the operations of the rotatable member 930 and the third lever member 905 will be described. FIGS. 110 to 112 are perspective views of the rotatable member 930 and the third lever member 905. In the Figure, some portions are omitted for better illustration.

Part (a) of FIG. 110 and part (b) of FIG. 110 show a state of a natural state (free state) in which no external force is applied to the third lever member 905. The third lever member 905 is moved in the direction of arrow H92 in the Figure by the force of the third urging member 906. At this time, the rotatable member 930 is in the retracted position shown in the Figure.

Part (a) of FIG. 111 and part (b) of FIG. 111 show a state when the third lever member 905 starts to be pushed. As shown in the Figure, when a force is applied to the contact portion 905a of the third lever member 905 in the direction of arrow H93 in the Figure, the third lever member 905 moves in the direction of arrow H93 in the Figure.

In the rotatable member 930, the cam pin 930b is engaged with the cam groove 905e of the third lever member 905, and therefore, the cam pin 930b receives a force in the direction of arrow H105 in the Figure from the cam groove 905e, as the third lever member 905 moves in the direction of arrow H93 in the Figure. By this force, the rotatable member 930 is rotated in the direction of arrow H104 in the Figure.

Figure 113:
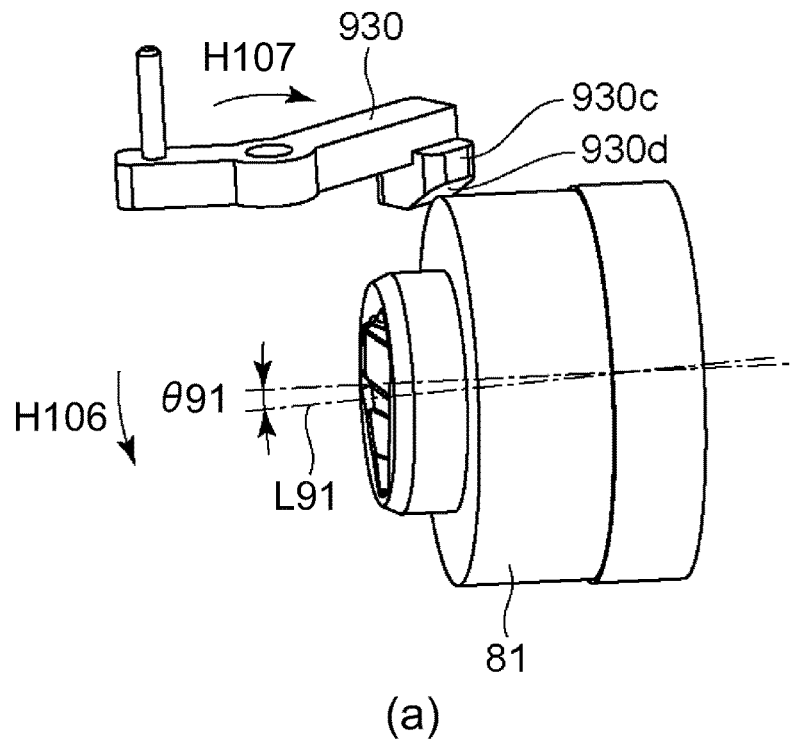
FIG. 113 is an operation illustration of the advancement/retraction member, the coupling member, and the third lever member.
Figure 113:
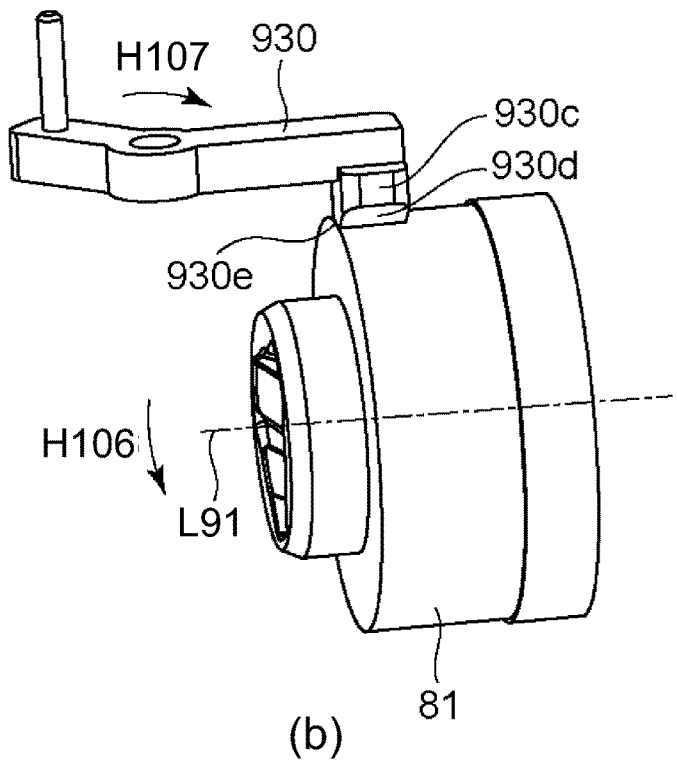

Part (a) of FIG. 112 and part (b) of FIG. 112 are illustrations after the third lever member 905 is further pushed. As shown in the Figure, the third lever member 905 moves in the direction of arrow H93 in the Figure, and the rotatable member 930 further rotates. Referring to FIG. 113 A and part (b) of FIG. 113, The operation of the rotatable member 930 on the drive transmission member 81 of the apparatus main assembly A will be described. Part (a) of FIG. 113 and part (b) of FIG. 113 are perspective views around the rotatable member 930 and the drive transmission member 81. In the Figure, some parts are omitted for the sake of better illustration. The drive transmission member 81 in part (a) of FIG. 113 is in a state in which the opening/closing door 13 of the apparatus main assembly A is opened and the cartridge B is mounted at a position for image formation (image forming operation) as has been described referring to FIG. 68. In part (a) of FIG. 113, L91 depicts the direction of the rotation axis of the drum 62 (not shown) of the cartridge B placed at the position for image formation (image forming operation). As shown in the Figure, the drive transmission member 81 of the apparatus main assembly A is tilted by Θ91° with respect to L91.

In this state, when the opening/closing door 13 of the apparatus main assembly A is closed (see FIG. 69), the cartridge pressing portion 13a provided on the opening/closing door 13 pushes the contact portion 905a of the third lever member 905. At this time, as described above, the rotatable member 930 of the cartridge B rotates.

Part (a) of FIG. 113 shows a state in which the inclined surface 930d of the rotatable member 930 which has rotated in the direction of arrow H107 in the Figure abuts on the drive transmission member 81 in the process of closing the opening/closing door 13. Further, when the rotatable member 930 rotates in the direction of the arrow H107 in the Figure, the contact surface 930e of the rotatable member 930 presses the drive transmission member 81 and tilts the drive transmission member 81 to move it in the direction of the arrow H106 in the Figure (state shown in part (b) of FIG. 113. In this manner, the angle Θ91 is reduced, and as shown in part (b) of FIG. 113, the rotation axis of the drive transmission member 81 becomes close to be coaxial with the rotation axis direction L91 of the drum 62 (not shown) of the cartridge B.

Further, in the process of closing the opening/closing door 13, The operation of popping out of the coupling member 864 of the cartridge B to the drive side, and the operation of the engagement between the drive transmission member 81 of the device main assembly A and the coupling member after closing the opening/closing door 13 are as described in the foregoing controlled to the.

The rotatable member 930 in this embodiment corresponds to the advancement/retraction member 920 (see FIG. 70) in Embodiment 8. The advancement/retraction member 920 in Embodiment 8 is a pressing member which linearly moves in the axial direction of the photosensitive drum. On the other hand, the rotatable member 930 is a pressing member which moves in the axial direction of the photosensitive drum with rotation.

That is, as the lever member 905 receives an external force, the free end (contact portion 930c) of the rotatable member 930 moves away from the cartridge in the axial direction. That is, the contact portion 930c of the rotatable member 930 moves in the direction approaching the drive transmission member 81, that is, toward the right side in FIG. 113.

Embodiment 9

In Embodiment 3 described above, the structure is such that the coupling member is moved forward and backward in the axial direction of the photosensitive drum 62 by the lever member 12. This embodiment is a further development of Embodiment 3. The members equivalent to the members used with the above-described embodiment will be assigned with the same name, and only the points different from those in the above-described embodiment will be described. Although the details will be described hereinafter, the cartridge B can be mounted to the rear side of the position at the time of image forming operation in substantially the same direction as the direction N1 in which the drive transmission member 81 is tilted when the cartridge B is mounted on the apparatus main assembly A. By this, the amounts of advancement and retraction of the coupling member can be reduced as compared with Embodiment 3.

Figure 78:
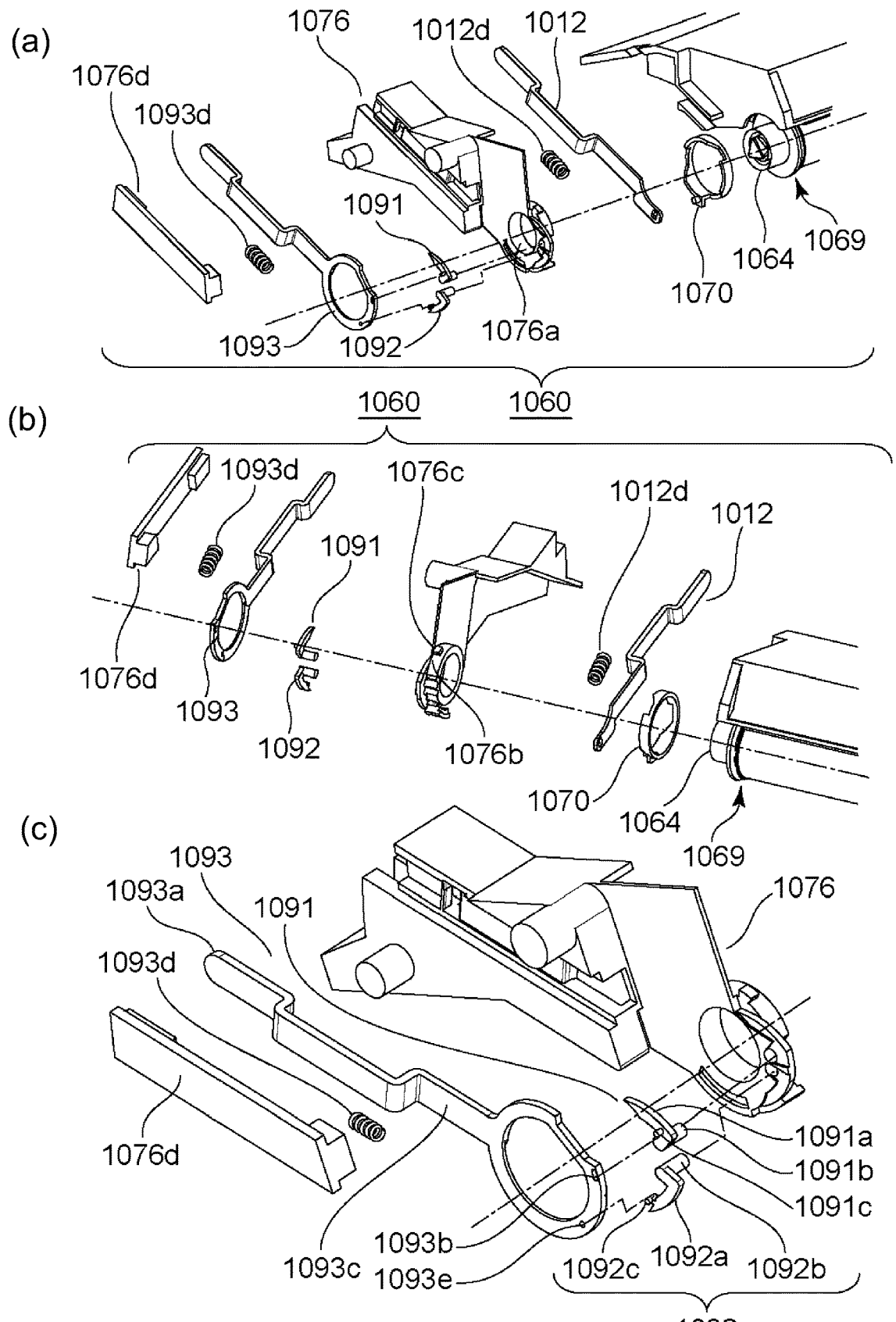
FIG. 78 is an exploded perspective view of the cleaning unit.

FIG. 78 is an exploded perspective view illustrating the structure of a driving side of the cleaning unit 1060 side in this embodiment.

Figure 79:
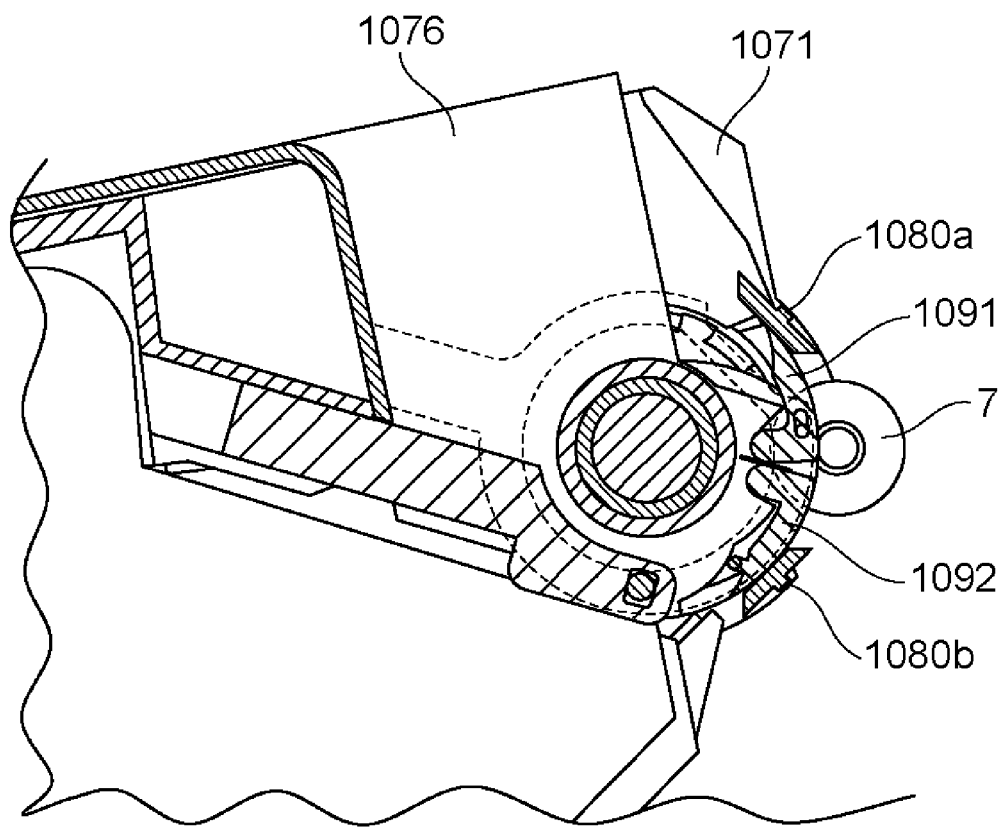
FIG. 79 is an illustration showing an attitude of the cartridge in the main assembly of the apparatus.

FIG. 79 is an illustration of the attitude of the cartridge B according to the present embodiment at the time of image forming operation of the apparatus main assembly A.

Figure 80:
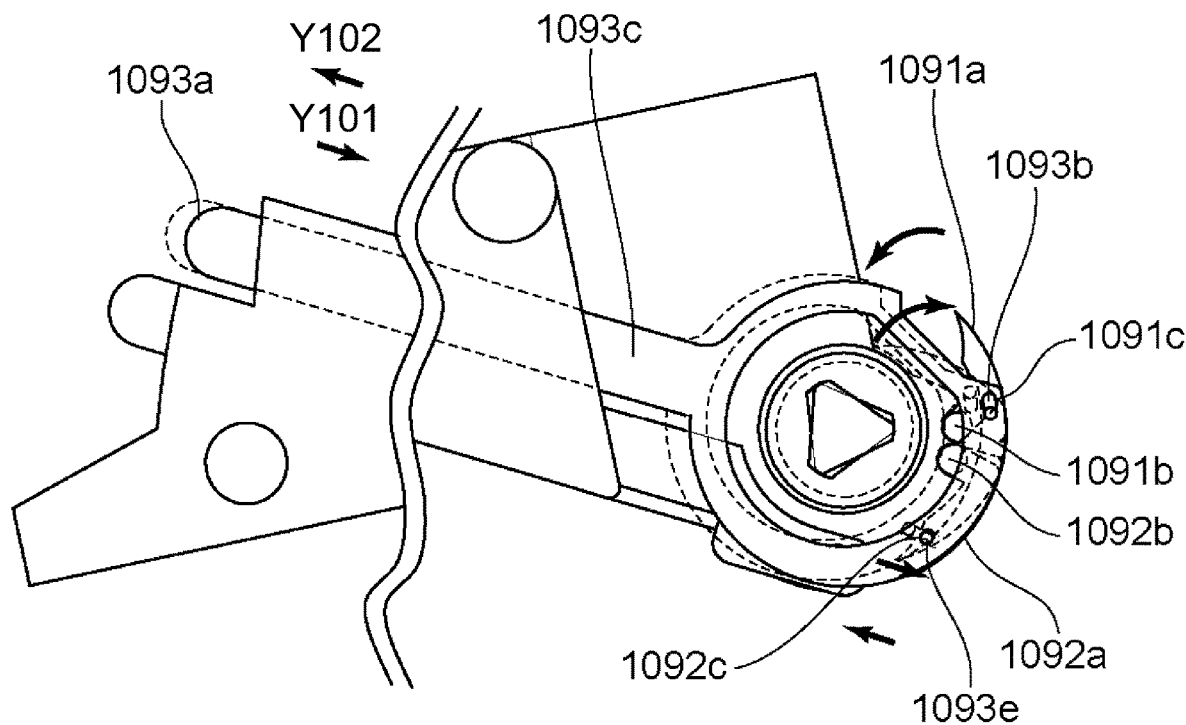
FIG. 80 is an illustration of operation of a positioning member.

FIG. 80 is a side view illustrating the operation of a positioning member in the present embodiment.

Figure 81:
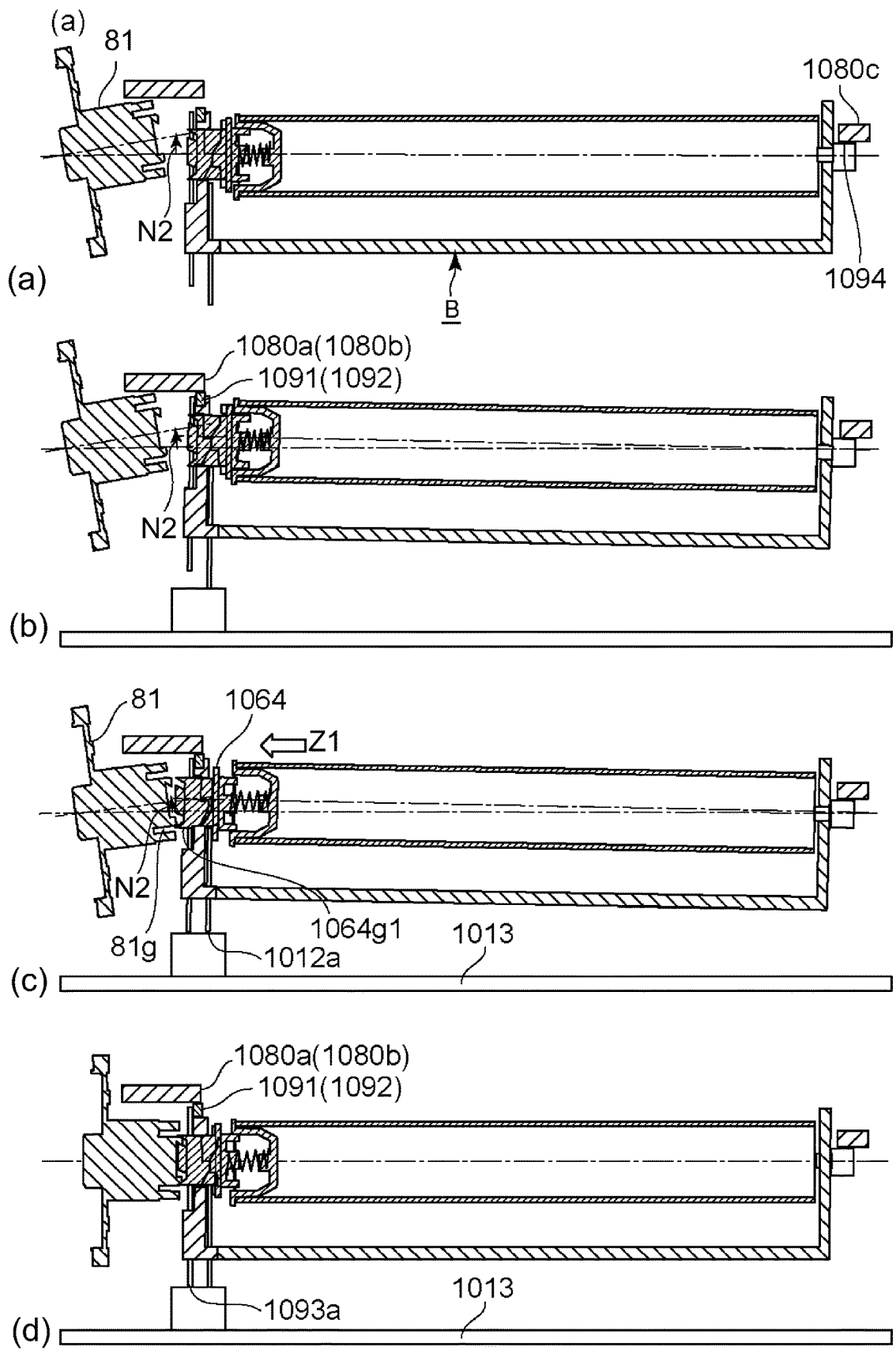
FIG. 81 is a schematic sectional view illustrating a process of mounting the cartridge to the main assembly of the apparatus.

FIG. 81 is a schematic cross-sectional view illustrating the order of operations in the mounting the cartridge B according to this embodiment to the apparatus main assembly A.

Figure 83:
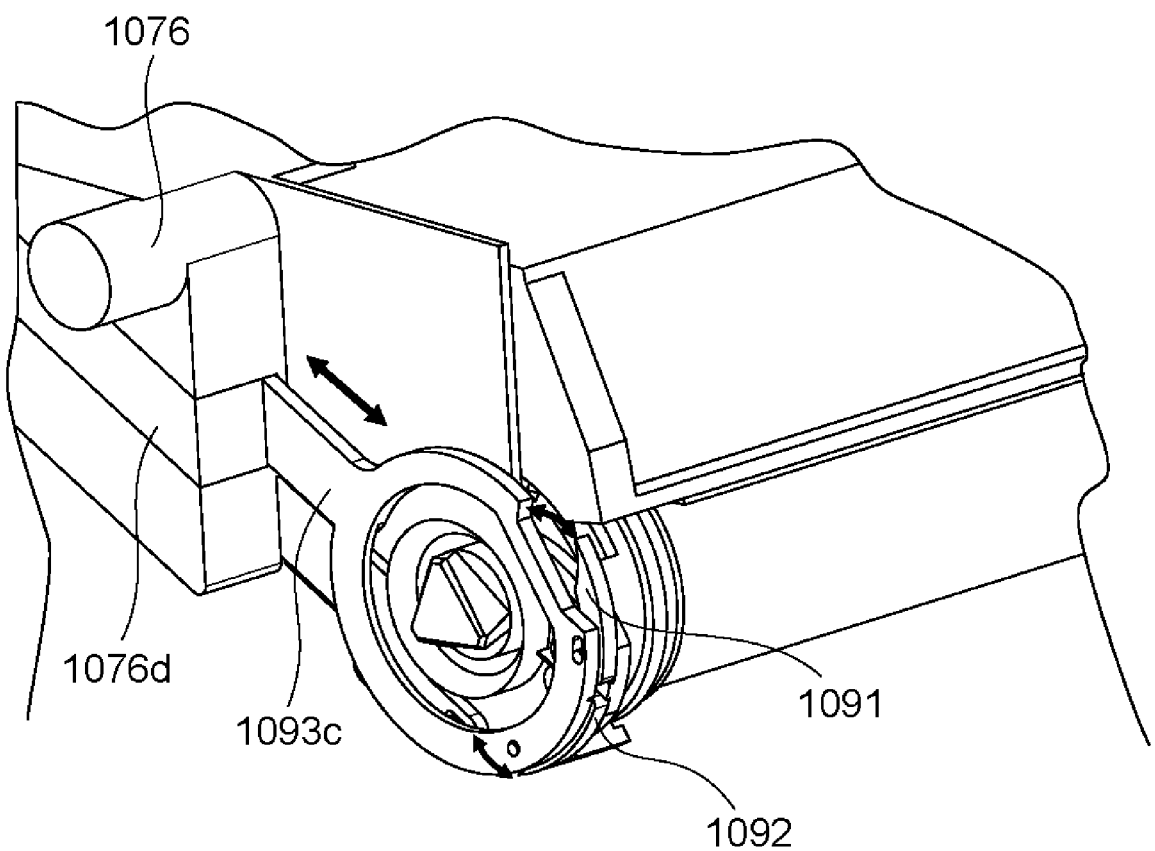
FIG. 83 is a perspective view of the periphery of the side member.

FIG. 83 is a perspective view of the cartridge B.

As shown in FIG. 79, when the cartridge B is mounted on the device main assembly A completely, cartridge positioning members (hereinafter, positioning members) 1091 and 1092 provided on a side member 1076 come into contact with the positioning portions 1080a and 1080b provided in the apparatus main assembly A. By this, the positioning members 1091 and 1092 can determine the position of the cartridge B in a state that the photosensitive drum 62 is close to the drive transmission member 81.

The photosensitive drum 62 has an exposed portion which is not covered by a cleaning frame 1071 or the developing device unit 1020 and is exposed at a position facing the transfer roller 7. The main assembly side positioning portions 1080a and 1080b are arranged so as to sandwich the exposed portion of the photosensitive drum 62.

Referring to FIG. 78, The structure of the cleaning unit 1060 used for the cartridge B will be described. Part (a) of FIG. 78 and part (b) of FIG. 78 are exploded perspective views of the cleaning unit 1060 including the advancing/retracting mechanism of the coupling member 1064. Part (c) of FIG. 78 is an exploded perspective view illustrating the structures of the positioning members 1091 and 1092 and a positioning lever 1093 of the side member 1076.

Similarly to Embodiment 3, as shown in part (a) of FIG. 78 and part (b) of FIG. 78, the side member 1076 has a cylindrical inner peripheral surface 1076a, a cylindrical outer peripheral surface 1076b, a projection 1076c, and so on. The inner peripheral surface of the cylinder 1076a supports the coupling member 1064. The cylindrical outer peripheral surface 1076b supports the cam member 1070. The projection 1076c projects outward from the outer peripheral surface of the cylinder.

Further, the lever member (operation member) 1012 and the cam member 1070 are provided between a drive side flange unit 1069 and the side member 1076. In addition, the lever member 1012 is provided with an urging means 1012d which urges the lever member in the Y2 direction. By this, the coupling member 1064 can be held in the retracted position until the contact portion 1012a of the lever member 1012 is brought into contact with the opening/closing door 1013 (not shown) of the apparatus main assembly A. With this structure, the coupling member 1064 can be advanced and a retracted in the axial direction of the photosensitive drum 62 in interrelation with the opening/closing operation of the opening/closing door 1013.

Further, as shown in part (c) of FIG. 78, the side member 1076 is provided with positioning members 1091 and 1092, the positioning member lever (hereinafter, lever member) 1093, and a holding member 1076d for constraining the lever member 1093. The positioning member 1091 has an acting portion 1091a which contacts the main assembly side positioning member 1080a, a rotation center 1091b about which the acting portion 1091a rotates, and a connecting boss 1091c which controls a rotation angle by being connected to the lever member 1093. Similarly, the positioning member 1092 also has an acting portion 1092a, a rotation center 1091b, and a connecting boss 1092c. The connecting bosses 1091c and 1092c are placed closer to the acting portions 1091a and 1092a than the rotation centers 1091b and 1092b.

The lever member 1093 is provided with a pressing portion 1093a to be pushed by the opening/closing door 1013, connecting holes 1093b and 1093e and pressing portions 1093a for assembling the connecting bosses 1091c and 1092c, and a connecting portion 1093c connecting the connecting holes 1093b and 1093e. It also has an urging means 1093d which urges the pressing portion 1093a in a direction away from the photosensitive drum 62.

As shown in FIG. 80, the connecting holes 1093b and 1093e has a hole shape corresponding to a movement locus of the connecting bosses 1091c and 1092c, for permitting the acting portions 1091a and 1092a to move between the first position (first positioning member position) and the second position (second positioning member position). In addition, the lever member 1093 is provided with the pressing portion 1093a pressed by the opening/closing door 1013, and the lever member 1093 moves in the direction of the arrow Y101. When released by pressing the opening/closing door 1013, it moves in the direction of arrow Y102 by the urging force of the urging means 1093d. With this structure, in interrelation with the opening/closing operation of the opening/closing door 1013, the moving operation of Y101 and Y102 causes the acting portion 1091a to rotate as indicated by R101 and R102, and causes the acting portion 1092a to rotate as indicated by R103 and R104. By this, the positioning members 1091 and 1092 can move between the first position (first positioning member position) and the second position (second positioning member position).

The moving angles of the first position of the positioning members 1091 and 1092 relative to the second position need not be the same. It is desirable to determine the amounts of rotation of the positioning members 1091 and 1092 so that the cartridge B can be mounted in the direction N1 in which the drive transmission member 81 is tilted relative to the second position.

(Mounting Operation of Cartridge B to Apparatus Main Assembly A)

Referring to FIG. 81, The mounting of the cartridge B to the apparatus main assembly A will be described.

As shown in part (a) of FIG. 81, the cartridge B is inserted substantially perpendicularly to the axis of the photosensitive drum 62 to the apparatus main assembly A until the non-driving side positioning portion 1094 of the photosensitive drum 62 abuts to the apparatus main assembly side positioning 1080c. This insertion operation is carried out by the user. At this time, the drive transmission member 81 is inclined in the N2 direction with respect to the image forming position. Further, at this time, the positioning members 1091 and 1092 are in the first positions (first positioning member positions). Since the positioning members 1091 and 1092 are in the first positions, there are gaps between the main assembly side positioning portions 1080a and 1080b and the positioning members 1091 and 1092 at the image forming position, respectively.

Next, as shown in part (b) of FIG. 81, the cartridge B is inserted until the positioning members 1091 and 1092 come into contact with the main assembly side positioning members 1080a and 1080b, in the state that they are in the first position (first positioning member position). As described above, the amounts of rotation of the positioning members 1091 and 1092 are determined so that the cartridge B can be mounted in the direction N1 in which the drive transmission member 81 is inclined. By this, the user inserts the cartridge B such that the drive side thereof to N1 side of the image forming position in the apparatus main assembly A. At this time, the photosensitive drum 62 enters more toward the transfer roller 7 beyond the position for the image formation, but the transfer roller 7 has sufficient elasticity, and therefore, the cartridge B can be mounted without any problem. In this state, the cartridge B is in a position (first cartridge position) which is more inward of the apparatus main assembly A toward the downstream side in the mounting direction than the regular mounting position.

Thereafter, the cylindrical cam 83 (shown in FIG. 5) moves in interrelation with the closing operation of the opening/closing door 1012, and the drive transmission member 81 changes its inclination direction in the N1 direction.

When the opening/closing door 1013 is closed further, the contact portion 1012a of the lever member 1012 comes into contact with the opening/closing door 1013 in interrelation with the closing operation of the opening/closing door 1013 of the apparatus main assembly A as shown in part (c) of FIG. 81, so that the coupling member 1064 projects to the outside (Z1 side) in the direction of the axis of the photosensitive drum 62. At this time, as in Embodiment 3, the inclined surface 1064g1 of the coupling member 1064 enters the slit portion 81g of the drive transmission member 81. The coupling member 1064 and the drive transmission member 81 are brought into contact with each other and are engaged with each other.

When the opening/closing door 1013 is closed further, the pressing portion 1013a of the lever member 1093 is pushed by the opening/closing door 1013, So that the positioning members 1091 and 1092 are rotated to the second positions (second positioning members) in interrelation with the lever member. By this rotation operation, as shown in part (d) of FIG. 81, the cartridge B moves to the regular mounting position (image forming position, second cartridge position) in the apparatus main assembly A. During this mounting operation of the cartridge B, the coupling member 1064 is in contact with and engaged with the drive transmission member 81, and therefore, the drive transmission member 81 reduces its inclination angle in accordance with the movement of the cartridge B. As a result, the axis of the drive transmission member 81 and the axis of the photosensitive drum 62 are substantially aligned with each other, and the drive transmission member is connected to the cartridge B so that the drive can be transmitted. By this, the cartridge B is enabled to form an image. (Modified examples of this embodiment)

Figure 82:
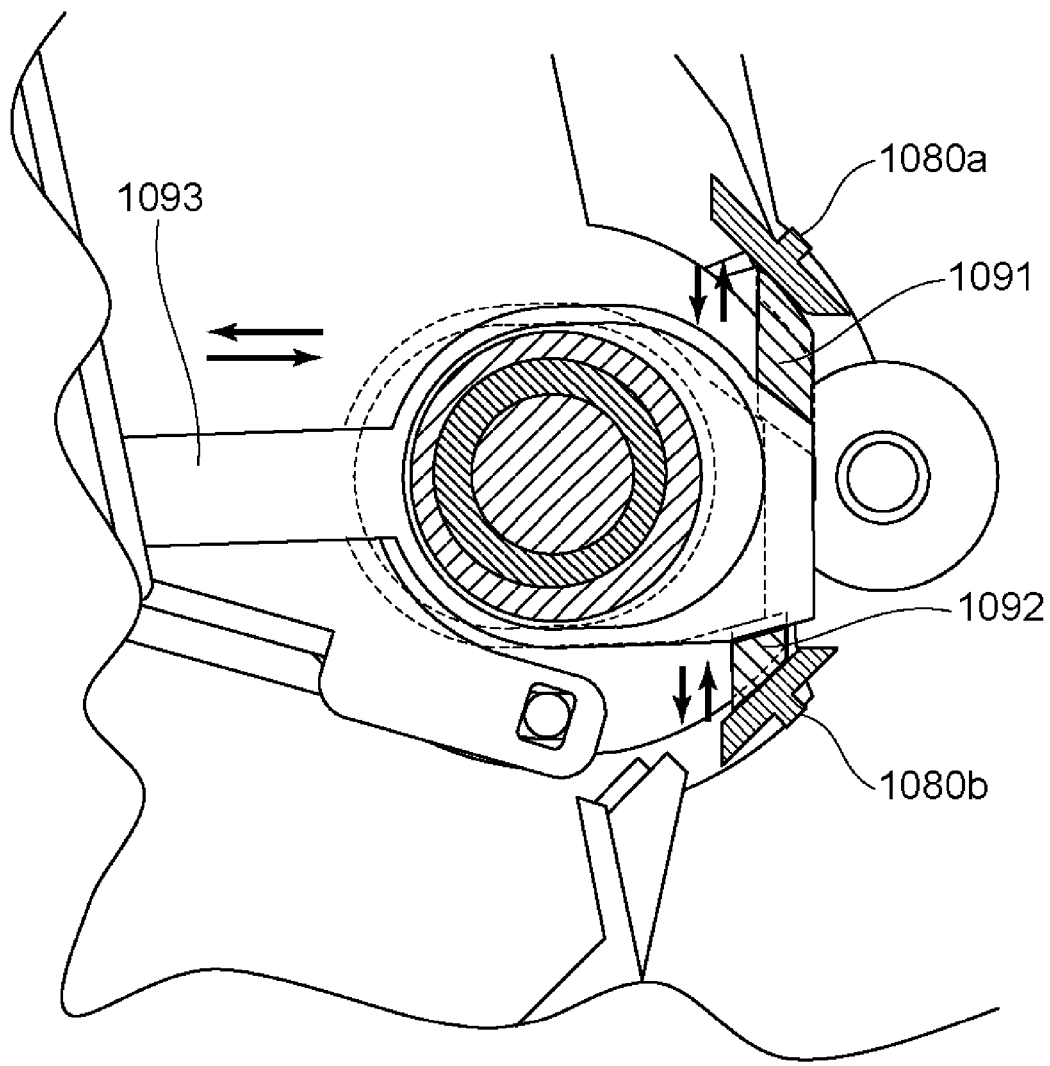
FIG. 82 is an illustration of a modified example of a positioning member.

In this embodiment, the positioning members 1091 and 1092 are structured to take the first positions and the second positions by rotating, but the structure is not limited to such an example. For example, as shown in FIG. 82, a structure using a linear motion cam which linearly moves the positioning members 1091 and 1092 which take the first position and the second position by the operation of the lever member 1093 may be used.

Further, in this embodiment, the lever member 1012 and the lever member 1093 are used as separate members. However, if the coupling member 1064 and the positioning members 1091 and 1092 can perform the operations shown in part (a) of FIG. 81 to part (d) of FIG. 81, only one operating member may be used to operate them.

For example, the lever member 1012 and the lever member 1093 may be connected to each other inside the cartridge, and one of them may be linked to the operation of the other. By one lever member receiving an external force from the outside of the cartridge, the other lever member can also be moved. Then, the operating members operated from the outside of the cartridge can be integrated into one. An example of such a structure has been described in the foregoing, using the lever member 812 and the lever member 905 in Embodiment 8-3 (see FIG. 103 and the like).

The structure of this embodiment is summarized below.

The apparatus main assembly A includes a drive transmission member (drive output member) 81 capable of outputting a driving force and capable of tilting. Further, the cartridge B includes a photosensitive drum 62, a coupling member 1064, positioning members 1091, 1092, and so on.

The coupling member 1064 is an engaging member for engaging with the drive transmission member 81, and is a movable member provided adjacent to the end of the photosensitive drum 62. The coupling member 1064 is movable in an axial direction of the photosensitive drum.

The positioning members 1091 and 1092 are movable members for determining the position of the cartridge B inside the apparatus main assembly A. The coupling member 1064 described above is mounted to the photosensitive drum, whereas the positioning members 1091 and 1092 are disposed outside the photosensitive drum (outside the drum unit).

More specifically, the positioning members 1091 and 1092 are placed in front of the cartridge and on the drive side. The right side in FIG. 79 corresponds to the front side of the cartridge, and the front side of the surface of the sheet of the drawing corresponds to the drive side. That is, the positioning members 1091 and 1092 and the coupling member 1064 are placed on the same side of the cartridge in the axial direction of the photosensitive drum.

In this embodiment, the positioning member is provided only on the driving side of the cartridge, but it is also possible to provide the positioning member on the non-driving side as well. An example of the positioning member on the non-driving side is the lever member 825 (see FIG. 50) described in Embodiment 7.

When viewed along the axis of the photosensitive drum, the positioning members 1091 and 1092 are arranged in the neighborhood of the exposed portion of the photosensitive drum.

The cartridge of this embodiment is provided with two positioning members 1091 and 1092, one of which may be referred to as a first positioning member and the other positioning member may be referred to as a second positioning member. In this embodiment, both of the two positioning members are movable, but only one of them may be movable. The positioning members 1091 and 1092 can be moved so as to change the distance with respect to the axis of the photosensitive drum (see FIG. 80).

In FIG. 80, the dotted line indicates a state in which the positioning members 1091 and 1092 are close to the axis of the photosensitive drum and are in the first positioning member position. The solid line depicts the positions of the positioning members 1091 and 1092 placed at the positions of the second positioning members which are away from the axis of the photosensitive drum. The position of the first positioning member (dotted line in FIG. 80) is the position taken before the cartridge B is mounted on the apparatus main assembly, that is, the positions of the positioning members 1091 and 1092 in a state where no external force is applied to the cartridge B. The position of the second positioning member (solid line in FIG. 80) is the position of the positioning member when the cartridge B is mounted inside the device main assembly A and an external force is applied to the cartridge B from the apparatus main assembly A.

By moving the two positioning members 1091 and 1092 to the position of the second positioning member, the distance between the acting portions provided at the free ends of the two positioning members increases. That is, the longest distance (maximum distance) between the positioning members 1091 and 1092 becomes large.

By moving the positioning members 1091 and 1092, the position of the cartridge B relative to the apparatus main assembly A can be changed. This will be described, referring to FIG. 81.

When the positioning members 1091 and 1092 are in the first positioning member position (FIG. 79), the cartridge B is in the first cartridge position shown in part (b) of FIG. 81. When the positioning members 1091 and 1092 move to the second positioning member position (FIG. 82), the cartridge B moves to the second cartridge position shown in part (d) of FIG. 81. This is the proper mounting position of the cartridge for image formation.

The drive side of the cartridge B moves to the upstream side in the cartridge inserting direction from the first cartridge position (part (b) of FIG. 81) toward the second cartridge position (part (d) of FIG. 81). Here, the inserting direction of the cartridge is the direction in which the cartridge B is inserted into the apparatus main assembly A. In FIG. 81, the cartridge B is moved and inserted upward with respect to the apparatus main assembly A. That is, the upstream in the inserting direction means the downward in FIG. 81.

In the process of change from part (b) of FIG. 81 to part (d) of FIG. 81 states, the left side (that is, the drive side) of the cartridge and the coupling member 1064 are moving downward inside the apparatus main assembly A.

In this embodiment, the inclination angle of the cartridge B with respect to the apparatus main assembly A is changed by moving the positioning members 1091 and 1092. That is, when the cartridge B is in the first cartridge position (part (b) of FIG. 81), it is tilted with respect to the attitude when it is in the second cartridge position (81 (*d*)).

The mounting process of the cartridge B is as follows.

In a state where the cartridge B is placed at the position (first cartridge position) shown in part (b) of FIG. 81, the coupling member 1064 advances in the axial direction toward the drive transmission member 81, so that the coupling member 1064 is brought into contact with the drive transmission member 81 (see part (d) of FIG. 81). In this state, the positioning members 1091 and 1092 move away from the axis of the photosensitive drum. That is, the positioning members 1091 and 1092 move downstream in the inserting direction of the cartridge B and toward the front side of the cartridge. With this operation, the cartridge B moves inside the apparatus main assembly A to the position (mounting position, second cartridge position) shown in part (d) of FIG. 81. In addition, the drive transmission member 81 is made to change the inclination angle thereof by the coupling member in accordance with the movement of the cartridge B.

As a result, the drive transmission member 81 and the cartridge B reach the normal attitude and position for image formation, and both become in a state of connection with which the drive transmission is possible.

The mounting process of the cartridge B in this embodiment is similar to the mounting process of the cartridge B in the above-mentioned Embodiment 7 (see FIGS. 51 and 57).

In this embodiment, unlike the Embodiment 7, the cartridge B is provided with a lever member as an operating member operated to operate the positioning members 1091 and 1092. The lever member 1093 has the same structure as the operating member (lever member) in the above-described embodiment. That is, the lever member 1093 also receives the external force from the device main assembly A in response to the closing operation of the door 13 (see FIG. 21). By the lever member 1093 receiving the external force, it moves to the front of the cartridge to operate the positioning members 1091 and 1092. That is, the lever member 1093 moves the positioning members 1091 and 1092 toward the front of the cartridge so as to move away from the axis of the photosensitive drum, and moves them to the second positioning member positions (see the solid line in FIG. 80).

In this embodiment, the coupling member 1064 is used as an engaging member for engaging with the drive transmission member 81 to change the inclination angle of the drive transmission member 81. However, the engaging member does not necessarily have to be a coupling member for transmitting a driving force to the photosensitive drum 62. If the engaging member is structured so as not to transmit the driving force to the photosensitive drum 62, the cartridge B may be additionally provided with a gear member capable of receiving the driving force by engaging with the gear portion of the drive transmission member 81. Here, the gear member 187 shown in part (a) of FIG. 15 is referred to.

Summary of all Embodiments

In Embodiments 1 to 9, various structures are employed in order to engage the drive transmission member 81 with the cartridge for the purpose of the drive transmission. That is, the cartridges or attachments described in these embodiments have various structures in order to reduce the inclination angle of the drive transmission member 81. For example, the structure has been described in which the inclination of the drive transmission member is reduced by bringing the inclined portion of the cartridge or the attachment into contact with the drive transmission member. As another means, the structure in which the drive transmission member is pressed by a pressing member provided on the cartridge or attachment has been described. As a further means, the structure of the pressing member on the cartridge side or the attachment side that presses the pressing member on the device main assembly side which tilts the drive transmission member has been described.

In addition, the cartridges or attachments of the embodiments have various structures in order to reduce the distance between the drive transmission member 81 and the cartridge in the axial direction of the photosensitive drum.

For example, a structure has been described in which the drive transmission member is attracted to the cartridge by a gear member provided on the cartridge or the attachment. Furthermore, as another method, a structure in which the coupling member provided in the cartridge is advanced toward the drive transmission member has also been described.

The cartridge or attachment may different combination of the structures of these embodiments. Further, the cartridge B may have any of the structures including a structure in which the driving force is received from a gear portion provided on the drive transmission member, a structure in which the driving force is received from a coupling portion provided in the drive transmission member, or a structure in which the driving force is received from both of the gear portion provided on the drive transmission member and the coupling. A part of the structure provided in the cartridge may be provided in the attachment, or a part of the structure provided in the attachment may be provided in the cartridge.

INDUSTRIAL APPLICABILITY

According to the present invention, the cartridge mountable to and dismountable from the main assembly of an image forming apparatus such as an electrophotographic image forming apparatus, the attachment therefor, and the mounting kit are provided.

The present invention is not limited to the above-described embodiments, and various modifications and alternations can be made without departing from the spirit and scope of the present invention. Therefore, the following claims are attached to publicize the scope of the present invention.

This application claims priority on the basis of Japanese Patent Application Patent Application No. 2019-109672 filed on Jun. 12, 2019 and Japanese Patent Application No. 2019-180284 submitted on Sep. 30, 2019, and all of the contents are incorporated herein.

The invention claimed is:

1. A cartridge detachably mountable to a main assembly of an image forming apparatus, the main assembly including a drive output member configured to output a driving force, a main assembly side pushing member configured to incline the drive output member by pushing the drive output member, the cartridge comprising:
   a photosensitive drum; and
   a cartridge side pushing member that is movable relative to the photosensitive drum and is configured to change an inclination angle of the drive output member by pushing the main assembly side pushing member.

2. A cartridge according to claim 1, further comprising an operation member configured to cause the cartridge side pushing member to push the main assembly side pushing member by receiving an external force from the main assembly of the image forming apparatus.

3. A cartridge according to claim 1, further comprising an engagement member provided adjacent to an end portion of the photosensitive drum so as to be movable in an axial direction of the photosensitive drum, the engagement member being engageable with the drive output member,
   wherein, when the cartridge side pushing member pushes the main assembly side pushing member, the engagement member is engageable with the drive output member by moving toward the drive output member.

4. A cartridge according to claim 3, wherein the engagement member is a coupling member capable of transmitting the driving force to the photosensitive drum.

5. A cartridge according to claim 1, wherein the cartridge side pushing member is configured to perform at least (a) a first operation of moving in an axial direction of the photosensitive drum toward an outside of the cartridge and (b) a second operation of moving in a direction different from the axial direction.

6. A cartridge according to claim 1, further comprising a gear member capable of meshing engagement with the drive output member.

7. A cartridge comprising:
   a photosensitive drum provided in a front part of the cartridge; and
   a movable pushing member provided at one side of the cartridge in an axial direction of the photosensitive drum, the movable pushing member being provided in the front part of the cartridge,
   wherein the pushing member is configured to perform at least (a) a first operation of moving in an axial direction of the photosensitive drum toward outside of the cartridge and (b) a second operation of moving in a direction different from the axial direction.

8. A cartridge according to claim 7, further comprising an operation member configured to operate the pushing member by receiving an external force from outside of the cartridge.

9. A cartridge according to claim 7, further comprising an engagement member provided adjacent to an end portion of the photosensitive drum so as to be movable in an axial direction of the photosensitive drum,
   wherein the pushing member and the engagement member are disposed on the same side in the axial direction of the photosensitive drum.

10. A cartridge according to claim 9, further comprising an operation member configured to move the engagement member to outside of the cartridge by receiving an external force from outside of the cartridge.

11. A cartridge according to claim 10, wherein the operation member is configured to cause the pushing member to perform the first operation and the second operation.

12. A cartridge according to claim 10, wherein the operation member is a first operation member, and the cartridge further comprises a second operation member configured to cause the pushing member to perform the first operation and the second operation.

13. A cartridge according to claim 9, wherein the engagement member is a coupling member capable of transmitting a driving force to the photosensitive drum.

14. A cartridge according to claim 7, further comprising a gear member having at least a portion exposed to outside of the cartridge and capable of transmitting the driving force toward the photosensitive drum.

15. A cartridge comprising:
a photosensitive drum provided in a front part of the cartridge;
a first movable member provided adjacent to an end portion of the photosensitive drum so as to be movable in an axial direction of the photosensitive drum;
a second movable member provided at the same side as the side provided with the first movable member in the axial direction of the photosensitive drum, the second movable member being configured to perform at least (a) a first operation of moving in an axial direction of the photosensitive drum toward outside of the cartridge and (b) a second operation of moving in a direction different from the axial direction.

16. An attachment mountable to a main assembly of an image forming apparatus, the main assembly including a drive output member configured to output a driving force, a main assembly side pushing member configured to incline the drive output member by urging the drive output member, wherein a cartridge is detachably mountable to the main assembly, the attachment comprising:
a contact portion configured to change an inclination angle of the drive output member by moving, for connecting the drive output member with the cartridge, a main assembly side pushing member in contact with the drive output member.

17. A mounting kit for a main assembly of an image forming apparatus, the mounting kit comprising:
a cartridge including a photosensitive drum and a drive input member; and
an attachment according to claim 16,
wherein the drive input member is connectable with the drive output member of the main assembly of the image forming apparatus, and
wherein the drive output member has an inclination angle changed by the attachment.

18. A cartridge detachably mountable to a main assembly of an image forming apparatus, the image forming apparatus including an inclinable drive output member capable of outputting a driving force, the cartridge comprising:
a photosensitive drum;
an engagement member provided adjacent to an end portion of the photosensitive drum so as to be movable in an axial direction of the photosensitive drum, the engagement member being engageable with the drive output member; and
a movable positioning member configured to determine a position of the cartridge inside the main assembly,
wherein the engagement member is configured to be brought into contact with the drive output member by moving toward the drive output member, and
wherein the cartridge is configured such that by movement of the positioning member in a state that the engagement member is in contact with the drive output member, (a) an inclination angle of the drive output member is changed, and (b) the cartridge is moved to a mounted position that is inside the main assembly.

19. A cartridge according to claim 18, wherein the engagement member is a coupling member capable of transmitting a driving force toward the photosensitive drum.

20. A cartridge according to claim 18, further comprising an operation member configured to move the engagement member toward the drive output member by receiving an external force from the main assembly of the image forming apparatus.

21. A cartridge according to claim 18, wherein the positioning member is configured to change an inclination angle of the cartridge relative to the main assembly of the image forming apparatus by movement thereof.

22. A cartridge according to claim 18, wherein the cartridge is capable of being inserted into the main assembly of the image forming apparatus, and the positioning member is configured to move the cartridge to the mounted position while moving the engagement member toward upstream in an inserting direction of the cartridge, by movement thereof.

23. A cartridge comprising:
a photosensitive drum provided in a front part of the cartridge;
an engagement member provided adjacent to an end portion of the photosensitive drum so as to be movable in an axial direction of the photosensitive drum;
an operation member configured to move the engagement member in the axial direction toward outside of the cartridge by receiving an external force from outside of the cartridge; and
a positioning member provided at a position which is in the front part of the cartridge and which is on a side opposite from the engagement member in the axial direction of the photosensitive drum, the positioning member projecting toward a front side of the cartridge and movable toward a rear side thereof.

24. A cartridge according to claim 23, wherein the engagement member is a coupling member capable of transmitting a driving force toward the photosensitive drum.

25. A cartridge according to claim 23, further comprising a gear member having at least a portion exposed to outside of the cartridge and capable of transmitting the driving force toward the photosensitive drum.

26. A cartridge comprising:
a photosensitive drum provided in a front part of the cartridge;
an engagement member provided adjacent to an end portion of the photosensitive drum so as to be movable in an axial direction of the photosensitive drum;
a movable positioning member provided at a position which is in the front part of the cartridge and which is on the same side as the side provided with the engagement member in the axial direction of the photosensitive drum; and
an operation member configured to move the positioning member away from an axis of the photosensitive drum by receiving an external force from outside of the cartridge.

27. A cartridge according to claim 26, wherein the positioning member is configured to move toward a front side by the operation member receiving the external force.

28. A cartridge according to claim 26, wherein the positioning member includes a first positioning member and a second positioning member, and the first positioning member and the second positioning member are configured to increase a maximum distance therebetween by the operation member receiving the external force.

29. A cartridge according to claim 26, wherein the operation member is configured to cause the engagement member to move in the axial direction toward outside of the cartridge.

30. A cartridge according to claim 26, wherein the operation member is a first operation member, and the cartridge further comprises a second operation member configured to move the engagement member toward outside of the photosensitive drum by the external force received from outside of the cartridge.

31. A cartridge according to claim 26, wherein the engagement member is a coupling member capable of transmitting a driving force toward the photosensitive drum.

32. A cartridge according to claim 26, further comprising a gear member having at least a portion exposed to outside of the cartridge and capable of transmitting the driving force toward the photosensitive drum.

33. A cartridge comprising:
a photosensitive drum provided in a front part of the cartridge;
a first movable member provided adjacent to an end portion of the photosensitive drum so as to be movable in an axial direction of the photosensitive drum;
a second movable member provided outside the photosensitive drum at a position which is in the front part of the cartridge and which is on the same side as the side provided with the first movable member in the axial direction of the photosensitive drum; and
an operation member configured to move the second movable member toward the front part by receiving an external force from outside of the cartridge.

34. An attachment mountable to a main assembly of an image forming apparatus, the main assembly including an inclinable drive output member cap able of outputting a driving force, wherein a cartridge is detachably mountable to the main assembly, the attachment comprising:
a movable positioning member configured to determine a position of the cartridge inside the main assembly of the image forming apparatus,
wherein the positioning member is configured such that by movement of the positioning member in a state that an engagement member provided on the cartridge is in contact with the drive output member, (a) an inclination angle of the drive output member is changed, and (b) the cartridge is moved to a mounted position that is inside the main assembly.

35. A mounting kit for a main assembly of an image forming apparatus having a drive output member, the mounting kit comprising:
a cartridge including (i) a photosensitive drum, (ii) an engagement member provided adjacent to an end of the photosensitive drum and movable in an axial direction of the photosensitive drum, the engagement member being engageable with the drive output member; and
an attachment according to claim 34.

36. A cartridge detachably mountable to a main assembly of an image forming apparatus, the main assembly including an inclinable drive output member capable of outputting a driving force, the cartridge comprising:
a photosensitive drum;
a pushing member provided outside the photosensitive drum and movable in an axial direction of the photosensitive drum, the pushing member being configured to change an inclination angle of the drive output member by pushing the drive output member; and
an engagement member provided adjacent to an end portion of the photosensitive drum so as to be movable in an axial direction of the photosensitive drum, the engagement member being configured to be engageable with the drive output member by moving toward the drive output member pushed by the pushing member.

37. A cartridge according to claim 36, wherein the pushing member pushes the drive output member by receiving an external force from the main assembly of the image forming apparatus.

38. A cartridge according to claim 37, further comprising an operation member configured to cause the engagement member to move toward the drive output member by receiving the external force.

39. A cartridge according to claim 36, further comprising a first operation member configured to cause the pushing member to push the drive output member by receiving an external force from the main assembly of the image forming apparatus, and a second operation member configured to move the engagement member toward the drive output member by receiving the external force from the main assembly of the image forming apparatus.

40. A cartridge according to claim 36, wherein the engagement member is a coupling member capable of transmitting a driving force toward the photosensitive drum.

41. A cartridge comprising:
a photosensitive drum provided in a front part of the cartridge;
an engagement member provided adjacent to an end portion of the photosensitive drum so as to be movable in an axial direction of the photosensitive drum;
a pushing member provided outside the photosensitive drum at a position which is in the front part of the cartridge and which is on the same side as the side provided with the engagement member in the axial direction of the photosensitive drum; and
an operation member configured to cause the engagement member to move in the axial direction toward outside of the cartridge by receiving an external force from outside of the cartridge.

42. A cartridge according to claim 41, wherein the operation member is configured to move the pushing member in the axial direction toward outside of the cartridge by receiving the external force.

43. A cartridge according to claim 41, wherein the operation member is a first operation member, the cartridge further comprises a second operation member configured to move the pushing member in the axial direction toward outside of the cartridge by receiving the external force from outside of the cartridge.

44. An attachment mountable to a main assembly of an image forming apparatus, the main assembly including an inclinable drive output member capable of outputting a driving force, wherein a cartridge is detachably mountable to the main assembly, the attachment comprising:
a movable pushing member configured to push the drive output member to change an inclination angle of the drive output member so that the drive output member is connected to the cartridge.

45. A cartridge according to claim 44, wherein the pushing member includes a gear member configured to move the drive output member toward the cartridge by rotation thereof in a state of being in engagement with a gear portion provided in the drive output member.

46. A mounting kit for a main assembly of an image forming apparatus, the mounting kit comprising:
a cartridge including a photosensitive drum and a drive input member; and
an attachment according to claim 44,
wherein the drive input member is configured to be connected to the drive output member of the main assembly of the image forming apparatus to receive a driving force therefrom, the drive output member having an inclination angle changed by the attachment.

47. A cartridge detachably mountable to a main assembly of an image forming apparatus, the main assembly including an inclinable drive output member capable of outputting a driving force, the cartridge comprising:
a photosensitive drum;
a gear member configured to cause the drive output member to approach to the cartridge by rotation of the gear member in a state where the gear member is engaged to a gear portion provided in the drive output member; and
a contact portion provided outside the photosensitive drum and configured to change an inclination angle of the drive output member by contacting the drive output member that is caused to approach to the cartridge by the gear member.

48. A cartridge according to claim 47, wherein the gear member includes a helical gear.

49. A cartridge according to claim 47, wherein the gear member is movable such that a distance from an axis of the photosensitive drum to an axis of the gear member is changed.

50. A cartridge according to claim 47, further comprising a coupling member provided adjacent to an end portion of the photosensitive drum and capable of transmitting a driving force to the photosensitive drum.

51. A cartridge according to claim 47, wherein the cartridge has a first side provided with the gear member and the contact portion and a second side opposite from the first side in an axial direction of the photosensitive drum, and
wherein the contact portion is an inclined portion, and a distance between an axis of the photosensitive drum to the inclined portion in a direction perpendicular to the axis increases as a distance from the second side of the cartridge measured in the axial direction increases.

52. A cartridge comprising:
a photosensitive drum;
a developing roller;
a gear member provided on a first side of the cartridge in an axial direction of the photosensitive drum; and
an inclined portion provided on the first side of the cartridge outside the photosensitive drum,
wherein, when a second side of the cartridge is a side opposite from the first side in the axial direction, (a) at least a part of teeth of the gear member is farther from the second side in the axial direction of the photosensitive drum than the inclined portion is from the second side in the axial direction of the photosensitive drum, and (b) a distance measured from an axis of the photosensitive drum to the inclined portion in a direction perpendicular to the axis increases as a distance from the second side of the cartridge in the axial direction increases, and
wherein, as viewed in a direction of the axis of the photosensitive drum, a center of the gear member is within a range of more than 60° and less than 120° as measured from a line extending from a center of the photosensitive drum through a center of the developing roller and toward an upstream in a rotational direction of the photosensitive drum.

53. A cartridge according to claim 52, wherein the gear member includes a helical gear.

54. A cartridge according to claim 52, wherein the gear member is connected to the photosensitive drum so as to be capable of transmitting a driving force.

55. A cartridge according to claim 52, further comprising a coupling member provided adjacent to an end portion of the photosensitive drum and capable of transmitting the driving force to the photosensitive drum.

56. An attachment for a main assembly of an image forming apparatus to which a cartridge is detachably mountable, the main assembly including a drive output member capable of outputting a driving force, the attachment comprising:
a gear member configured to cause the drive output member to approach to the cartridge to connect the drive output member to the cartridge by rotation of the gear member in a state where the gear member is engaged to a gear portion of the drive output member.

57. A mounting kit for a main assembly of an image forming apparatus having a drive output member, the mounting kit comprising:
a cartridge including a photosensitive drum and a drive input member; and
an attachment according to claim 56,
wherein the drive input member is configured to be connected to the drive output member that is caused to approach to the cartridge by the attachment so that the drive input member can receive a driving force.

58. A cartridge comprising:
a photosensitive drum;
a gear member provided on a first side of the cartridge in an axial direction of the photosensitive drum; and
an inclined portion provided on the first side of the cartridge,
wherein, when a second side of the cartridge is a side opposite from the first side in the axial direction, (a) at least a part of teeth of the gear member is farther from the second side in the axial direction of the photosensitive drum than the inclined portion is from the second side in the axial direction of the photosensitive drum, and (b) a distance measured from an axis of the photosensitive drum to the inclined portion in a direction perpendicular to the axis increases as a distance from the second side of the cartridge in the axial direction increases, and
wherein the gear member is movable such that a distance from the axis of the photosensitive drum to an axis of the gear member is changeable.

59. A cartridge according to claim 58, wherein the gear member includes a helical gear.

60. A cartridge according to claim 58, wherein the gear member is configured to transmit a driving force to the photosensitive drum.

61. A cartridge according to claim 58, further comprising a coupling member provided adjacent to an end portion of the photosensitive drum, the coupling member being capable of transmitting a driving force to the photosensitive drum.

62. A cartridge detachably mountable to a main assembly of an image forming apparatus, the main assembly including an inclinable drive output member capable of outputting a driving force, the cartridge comprising:

a photosensitive drum; and a coupling member provided adjacent to an end portion of the photosensitive drum, the coupling member being capable of transmitting the driving force toward the photosensitive drum and movable in an axial direction of the photosensitive drum, the coupling member including (a) a driving force receiving portion capable of receiving the driving force from the drive output member and (b) an inclined portion movable together with the driving force receiving portion in the axial direction and rotatable together with the driving force receiving portion, wherein the inclined portion is farther from an axis of the photosensitive drum than the driving force receiving portion is from the axis of the photosensitive drum, and wherein the inclined portion is configured to contact the drive output member to reduce an inclination angle of the drive output member to enable engagement between the drive output member and the driving force receiving portion when the coupling member moves toward the drive output member.

63. A cartridge according to claim 62, wherein the coupling member includes a cylindrical portion surrounding the driving force receiving portion, and the inclined portion is disposed adjacent to a free end of the cylindrical portion.

64. A cartridge according to claim 62, wherein the coupling member is maintained in a predetermined phase such that the inclined portion is at a predetermined position.

65. A cartridge according to claim 62, further comprising an operation member configured to cause the coupling member to move toward the drive output member by receiving an external force from the main assembly of the image forming apparatus.

66. A cartridge detachably mountable to a main assembly of an image forming apparatus, the cartridge comprising:

a photosensitive drum having a first end portion and a second end portion opposite from the first end portion; and a coupling member provided adjacent to the first end portion of the photo sensitive drum, the coupling member being capable of transmitting a driving force to the photosensitive drum and being movable in an axial direction of the photosensitive drum, the coupling member including a projected driving force receiving portion and an inclined portion capable of advancing and retracting together with the driving force receiving portion, wherein the inclined portion is farther from an axis of photosensitive drum than the driving force receiving portion is from the axis of the photosensitive drum, and wherein a distance measured from the axis of the photosensitive drum to the inclined portion in a direction perpendicular to the axis increases as a distance from the second end portion of the photosensitive drum in the axial direction increases.

67. A cartridge according to claim 66, wherein the coupling member includes a cylindrical portion surrounding the driving force receiving portion, and the inclined portion is disposed adjacent to a free end of the cylindrical portion.

68. A cartridge according to claim 66, wherein the coupling member is maintained in a predetermined phase such that the inclined portion is at a predetermined position.

69. A cartridge according to claim 68, wherein at least a part of the inclined portion is farther from the second end portion of the photosensitive drum than the driving force receiving portion is from the second end portion of the photosensitive drum in the axial direction of the photosensitive drum.

70. A cartridge according to claim 66, further comprising an operation member configured to move the coupling member toward outside of the cartridge in the axial direction by receiving an external force from outside of the cartridge.

* * * * *